(12) United States Patent
Palacios et al.

(10) Patent No.: US 11,953,692 B1
(45) Date of Patent: Apr. 9, 2024

(54) SYSTEM FOR AND METHOD OF PROJECTING AUGMENTATION IMAGERY IN A HEAD-MOUNTED DISPLAY

(71) Applicant: Augmenteum, Inc., Pasadena, CA (US)

(72) Inventors: David M. Palacios, Pasadena, CA (US); Joseph W. Gee, South Pasadena, CA (US); Chris S. Peay, Valencia, CA (US)

(73) Assignee: Augmenteum, Inc., Pasadena, CA (US)

(*) Notice: Subject to any disclaimer, the term of this patent is extended or adjusted under 35 U.S.C. 154(b) by 0 days.

(21) Appl. No.: 18/388,976

(22) Filed: Nov. 13, 2023

Related U.S. Application Data

(63) Continuation of application No. 18/117,898, filed on Mar. 6, 2023, which is a continuation of application (Continued)

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
CPC ... G09G 2320/0233; G09G 2320/0285; G09G 2320/041; G09G 2320/043; G09G 2320/046; G09G 2320/048
See application file for complete search history.

(56) References Cited

U.S. PATENT DOCUMENTS 2,355,910 A 8/1944 Gallasch
4,692,003 A 9/1987 Adachi et al.
(Continued)

FOREIGN PATENT DOCUMENTS

EP 2581776 A1 4/2013
KR 20060009494 A 2/2006
(Continued)

OTHER PUBLICATIONS

Curatu, "Wide Field-of-View Imaging System Using a Liquid Crystal Spatial Light Modulator", Current Developments in Lens Design and Optical Engineering VI, Proceedings of SPIE, 5874:587408-1-587408-7, Aug. 25, 2005 (8 pages).
(Continued)

*Primary Examiner* — Yuzhen Shen
(74) *Attorney, Agent, or Firm* — Caldwell Intellectual Property Law

(57) ABSTRACT

A system for and method of projecting augmentation imagery in a head-mounted display is disclosed. A system for projecting light onto an eye includes a display to project light, a beam combiner, first and second optical systems between the display and the beam combiner along respective first and second optical paths. The first and second optical paths differ. The system also includes a switchable reflector that, in a reflective state, reflects light incident upon the reflector, and, in a non-reflective state, transmits light incident upon the reflector. The reflector is between the display and the first and second optical systems along the first and second optical paths and directs light along the first path, in the reflective state, or along the second path, in the non-reflective state, to reflect light from the beam combiner to the eye from different directions when in the different states.

20 Claims, 136 Drawing Sheets

Related U.S. Application Data

No. 16/158,625, filed on Oct. 12, 2018, now Pat. No. 11,640,057, which is a continuation of application No. 15/367,413, filed on Dec. 2, 2016, now abandoned.

(60) Provisional application No. 62/372,270, filed on Aug. 8, 2016, provisional application No. 62/386,456, filed on Dec. 2, 2015.

(51) Int. Cl.
*G02B 27/10* (2006.01)
*G02F 1/133* (2006.01)
*G02F 1/1343* (2006.01)

(52) U.S. Cl.
CPC .............. *G02B 27/10* (2013.01); *G02F 1/133* (2013.01); *G02F 1/1343* (2013.01); *G02B 2027/013* (2013.01); *G02F 2203/18* (2013.01)

(56) References Cited

U.S. PATENT DOCUMENTS

| | | | |
|---|---|---|---|
| 4,853,745 A | 8/1989 | Kamiya et al. | |
| 5,311,018 A | 5/1994 | Zana et al. | |
| 5,642,442 A | 6/1997 | Morton et al. | |
| 5,995,214 A | 11/1999 | Bruckstein et al. | |
| 6,625,357 B2 | 9/2003 | Bowen et al. | |
| 6,681,151 B1 | 1/2004 | Weinzimmer et al. | |
| 6,765,603 B2 | 7/2004 | Border et al. | |
| 6,841,486 B2 | 1/2005 | Boudreau et al. | |
| 7,231,063 B2 | 6/2007 | Naimark et al. | |
| 7,583,834 B2 | 9/2009 | McCollough et al. | |
| 7,810,698 B2 | 10/2010 | Chung et al. | |
| 8,018,814 B2 | 9/2011 | Ogasawara et al. | |
| 8,115,993 B2 | 2/2012 | Hauger et al. | |
| 8,419,496 B1 | 4/2013 | Smith et al. | |
| 8,434,674 B2 | 5/2013 | Mangione-Smith | |
| 8,440,375 B2 | 5/2013 | Kiuchi et al. | |
| 8,497,924 B2 | 7/2013 | Widzinski et al. | |
| 8,570,516 B2 | 10/2013 | Liu et al. | |
| 8,594,381 B2 | 11/2013 | Fedorovskaya et al. | |
| 8,692,845 B2 | 4/2014 | Fedorovskaya et al. | |
| 8,711,364 B2 | 4/2014 | Brennan et al. | |
| 8,780,014 B2 | 7/2014 | Border | |
| 8,941,590 B2 | 1/2015 | Csaszar et al. | |
| 9,063,352 B2 | 6/2015 | Ford et al. | |
| 9,119,670 B2 | 9/2015 | Yang et al. | |
| 9,282,944 B2 | 3/2016 | Fallavollita et al. | |
| 9,304,338 B2 | 4/2016 | Franklin et al. | |
| 9,316,834 B2* | 4/2016 | Makino .............. | G02B 27/0176 |
| 9,337,926 B2 | 5/2016 | Bose et al. | |
| 9,341,837 B2 | 5/2016 | Li et al. | |
| 9,468,349 B2 | 10/2016 | Fong et al. | |
| 9,857,591 B2 | 1/2018 | Welch et al. | |
| 11,640,057 B2 | 5/2023 | Palacios et al. | |
| 2002/0109775 A1 | 8/2002 | White et al. | |
| 2002/0109843 A1 | 8/2002 | Ehsani et al. | |
| 2004/0080938 A1 | 4/2004 | Holman et al. | |
| 2004/0090606 A1 | 5/2004 | Ishikawa | |
| 2006/0186312 A1 | 8/2006 | Altman et al. | |
| 2006/0187196 A1 | 8/2006 | Underkoffler et al. | |
| 2008/0130981 A1 | 6/2008 | Lee | |
| 2008/0138604 A1 | 6/2008 | Kenney et al. | |
| 2009/0147331 A1 | 6/2009 | Ashkenazi | |
| 2009/0262976 A1 | 10/2009 | Huang et al. | |
| 2009/0279050 A1 | 11/2009 | McGinn et al. | |
| 2009/0322653 A1 | 12/2009 | Putilin et al. | |
| 2010/0069720 A1 | 3/2010 | Fulghum et al. | |
| 2010/0100160 A1 | 4/2010 | Edman et al. | |
| 2010/0168763 A1 | 7/2010 | Zhao et al. | |
| 2010/0283842 A1 | 11/2010 | Guissin et al. | |
| 2011/0007279 A1 | 1/2011 | Silverstein et al. | |
| 2011/0116050 A1 | 5/2011 | Katou | |
| 2011/0149237 A1 | 6/2011 | Zhang et al. | |
| 2011/0230755 A1 | 9/2011 | MacFarlane et al. | |
| 2012/0008098 A1 | 1/2012 | Akiyama | |
| 2012/0050044 A1 | 3/2012 | Border et al. | |
| 2012/0050141 A1 | 3/2012 | Border et al. | |
| 2012/0075343 A1 | 3/2012 | Chen et al. | |
| 2012/0182206 A1 | 7/2012 | Cok et al. | |
| 2012/0182433 A1 | 7/2012 | Dupre et al. | |
| 2013/0028380 A1 | 1/2013 | Bleuet et al. | |
| 2013/0044206 A1 | 2/2013 | Liu et al. | |
| 2014/0232651 A1 | 8/2014 | Kress et al. | |
| 2014/0266987 A1 | 9/2014 | Magyari | |
| 2014/0267031 A1 | 9/2014 | Huebner | |
| 2015/0031990 A1 | 1/2015 | Boctor et al. | |
| 2015/0098636 A1 | 4/2015 | Bergman et al. | |
| 2015/0098709 A1 | 4/2015 | Breuer et al. | |
| 2015/0177864 A1 | 6/2015 | Wong | |
| 2015/0205126 A1 | 7/2015 | Schowengerdt | |
| 2015/0205135 A1 | 7/2015 | Border et al. | |
| 2015/0235452 A1* | 8/2015 | Schowengerdt ........ | G06F 3/013 345/633 |
| 2015/0277123 A1 | 10/2015 | Chaum et al. | |
| 2015/0338639 A1 | 11/2015 | Matsumoto et al. | |
| 2016/0051134 A1 | 2/2016 | Hatzilias | |
| 2016/0120437 A1 | 5/2016 | Graham et al. | |
| 2016/0122038 A1 | 5/2016 | Fleischman et al. | |
| 2016/0139265 A1* | 5/2016 | Yahav ................ | G02B 27/0093 356/614 |
| 2016/0174897 A1 | 6/2016 | Sherman | |
| 2016/0191911 A1 | 6/2016 | Filhaber et al. | |
| 2016/0195720 A1* | 7/2016 | Travis .................. | G03H 1/2205 359/19 |
| 2016/0220324 A1 | 8/2016 | Tesar | |
| 2016/0242744 A1 | 8/2016 | Mihailescu et al. | |
| 2016/0339371 A1 | 11/2016 | Ellsworth et al. | |
| 2017/0010473 A1* | 1/2017 | Ide ........................ | G02B 3/0056 |
| 2018/0045960 A1 | 2/2018 | Palacios et al. | |

FOREIGN PATENT DOCUMENTS

| | | |
|---|---|---|
| WO | WO-2005118210 A1 | 12/2005 |
| WO | WO-2015005959 A1 | 1/2015 |
| WO | WO-2015054265 A1 | 4/2015 |
| WO | WO-2015176163 A1 | 11/2015 |

OTHER PUBLICATIONS

Goodwin, et al., "MANIFEST Instrument Concept and related Technologies," 15 pages.

Hirzer, "Marker Detection For Augmented Reality Applications," Inst. for Computer Graphics and Vision, Graz University of Technology, Austria, Technical Report, ICG-TR-08/05, Graz, Oct. 27, 2008, 27 pages.

International Search Report in related International Application No. PCT/US2016/064737 dated Apr. 6, 2017, 18 pages.

Love, "Wave-front correction and production of Zernike modes with a liquid-crystal spatial light modulator", Applied Optics, 36(7):1517-1524, Mar. 1997 (8 pages).

Marquez, et al., "Programmable apodizer to compensate chromatic aberration effects usng a liquid crystal spatial light modulator", Optics Express, 13(3):716-730, Feb. 7, 2005 (15 pages).

Mohan, et al., "Bokode: Imperceptible Visual Tags for Camera Based Interaction from a Distance," Camera Culture Group, MIT Media Lab, http://cameraculture.media.mit.edu/bokode, 8 pages.

* cited by examiner

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Uncorrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

Fully Corrected

SYSTEM FOR AND METHOD OF PROJECTING AUGMENTATION IMAGERY IN A HEAD-MOUNTED DISPLAY

CROSS-REFERENCE TO RELATED APPLICATIONS

This application is a continuation of U.S. patent application Ser. No. 18/117,898, entitled "System for and Method of Projecting Augmentation Imagery in a Head-Mounted Display," filed on Mar. 6, 2023; which is a continuation of U.S. patent application Ser. No. 16/158,625, entitled "System for and Method of Projecting Augmentation Imagery in a Head-Mounted Display," filed on Oct. 12, 2018; which is a continuation of U.S. patent application Ser. No. 15/367,413, entitled "System for and Method of Projecting Augmentation Imagery in a Head-Mounted Display," filed on Dec. 2, 2016; which claims priority under 35 U.S.C. § 119(e) to U.S. Provisional Application No. 62/386,456, entitled "System and Method for Athletic Head Mounted Display of Augmentation Imagery", filed Dec. 2, 2015, and U.S. Provisional Application No. 62/372,270, entitled "System and Method for Aberration Correction of a Dynamic Region of interest Over a Wide Field of View", filed Aug. 8, 2016, the contents of each of which are incorporated by reference herein in their entireties.

FIELD OF THE INVENTION

The technical field relates generally to projecting augmentation imagery in a head-mounted display, and in particular to systems and techniques that employ multiple beam launchers for image projection and systems and techniques to correct image errors.

BACKGROUND

Our perception of the physical world is informed by our five senses: sight, hearing, taste, smell, and touch. As a consequence, if what we sense is altered our perception of reality is also altered. A primary sense is vision. Augmenting a user's vision of her surroundings with virtual imagery powerfully adds to her perspective. This function is advantageous in industry as well as for recreation. In order to provide this experience however, many new devices and subsystems must be devised.

SUMMARY OF THE DISCLOSURE

The techniques described herein present improved systems and method for projecting augmentation imagery in a head-mounted display.

In one aspect of the invention, a system for projecting light onto an eye includes a display configured to project light, a beam combiner, a first optical system disposed between the display and the beam combiner along a first optical path, and a second optical system disposed between the display and the beam combiner along a second optical path. The second optical path is different from the first optical path. The system also includes a switchable reflector configured to selectively switch between a reflective state, in which light incident upon the switchable reflector is reflected by the switchable reflector, and a non-reflective state, in which light incident upon the switchable reflector is transmitted via the switchable reflector. The switchable reflector is disposed between the display and the first and second optical systems along the first and second optical paths. The switchable reflector directs the light along the first optical path to the beam combiner when in the reflective state, such that the light is reflected off the beam combiner and projected upon an eye from a first direction. The switchable reflector directs the light along the second optical path to the beam combiner when in the non-reflective state, such that the light is reflected off the beam combiner and projected upon the eye from a second direction different from the first direction.

In an embodiment of the invention, the light is viewable by the eye in a first field of view when the light is projected upon the eye from the first direction, and the light is viewable by the eye in a second field of view when the light is projected upon the eye from the second direction. Optionally, the first field of view is at least 30°.

In an embodiment of the invention, the first optical system is configured to project the light over the first field of view, the second optical system is configured to project the light over the second field of view, and the first field of view overlaps the second field of view by at least 10°.

In an embodiment of the invention, the system also includes an eye tracking system configured to determine an orientation of the eye relative to the beam combiner and a controller configured to switch the switchable reflector between the reflective state and the non-reflective state based at least in part on the orientation of the eye.

In an embodiment of the invention, the switchable reflector has a clear aperture having a width of at least 2 mm.

In an embodiment of the invention, at least one of the first optical system and the second optical system includes a foveated optical system. Optionally, the foveated optical system includes a liquid crystal wave front corrector.

In an embodiment of the invention, the switchable reflector includes a liquid crystal mirror.

In an embodiment of the invention, at least one of the first optical system and the second optical system is configured to collimate the light, and the beam combiner is partially reflective.

In an embodiment of the invention, at least one of the first optical system and the second optical system is configured to linearly polarize the light.

In an embodiment of the invention, at least a portion of the beam combiner is curved to collimate the light that is reflected to the eye.

In an embodiment of the invention, the first optical path is longer than the second optical path.

In an embodiment of the invention, a reflector is disposed between the switchable reflector and the first optical system along the first optical path.

In an embodiment of the invention, the switchable reflector reflects substantially all light incident upon the switchable reflector in the reflective state.

In an embodiment of the invention, the display includes a first sub-display that projects a first group of light rays having a first resolution and a second sub-display that projects a second group of light rays having a second resolution different than the first resolution. The projected light includes the first group of light rays and the second group of light rays.

In another aspect of the invention, a method of projecting an image onto an eye includes projecting light defining an image, via a display, onto a switchable reflector and selectively switching the switchable reflector between a reflective state and a non-reflective state. When the switchable reflector is in the reflective state, the light incident upon the switchable reflector is reflected by the switchable reflector and directed along a first optical path to a beam combiner, and the directed light reflects off the beam combiner and is projected upon an eye from a first direction. When the switchable reflector is in the non-reflective state, the light incident upon the switchable reflector is transmitted via the switchable reflector and directed along a second optical path, different from the first optical path, to the beam combiner, and the directed light reflects off the beam combiner and is projected upon the eye from a second direction.

In an embodiment of the invention, the method also includes tracking an orientation of the eye relative to the beam combiner and the selectively switching the switchable reflector is performed based at least in part on the orientation of the eye.

In an embodiment of the invention, when the switchable reflector is in the non-reflective state, the light incident upon the switchable reflector is transmitted via a clear aperture defined in the switchable reflector, the clear aperture having a width of about 2 mm to about 10 mm.

In an embodiment of the invention, projecting the light defining an image onto the switchable reflector includes projecting a foveated image.

In an embodiment of the invention, the switchable reflector includes a liquid crystal mirror.

In an embodiment of the invention, the first optical path is defined in part by a first optical system configured to project the directed light over a first field of view, and the second optical path is defined in part by a second optical system configured to project the directed light over a second field of view. The first field of view overlaps the second field of view by at least 10°. Optionally, at least one of the first optical system and the second optical system collimates the light that defines the image and the beam combiner is partially reflective.

In an embodiment of the invention, the display linearly polarizes the light that defines the image.

In an embodiment of the invention, the beam combiner collimates the light comprising the image that is reflected to the eye.

In an embodiment of the invention, the first optical path is longer than the second optical path.

In an embodiment of the invention, the method also includes reflecting light from a reflector disposed between the switchable reflector and the first optical system along the first optical path.

In an embodiment of the invention, the switchable reflector reflects substantially all light incident upon the switchable reflector in the reflective state.

In an embodiment of the invention, at least one of the first optical system and the second optical system include a liquid crystal wave front corrector.

In an embodiment of the invention, projecting the light includes projecting a first group of light rays having a first resolution and projecting a second group of light rays having a second resolution different for the first resolution. The projected light includes the first group of light rays and the second group of light rays.

In another aspect of the invention, an accommodating projection system includes a display configured to project light, a beam combiner disposed to at least partially reflect the projected light upon an eye, and a liquid crystal lens disposed along an optical path between the display and the beam combiner configured to selectively focus the light. The liquid crystal lens comprises a liquid crystal cell and an electrode layer in electrical field communication with the liquid crystal cell. The electrode layer comprises a plurality of electrodes separated by a plurality of contour lines. The plurality of contour lines are configured according to a defocus wave front mode, and the defocus wave front mode along at least one contour line has a value that is within 30% of a constant wave front value.

In an embodiment of the invention, the light forms an image viewable by the eye that is associated with a virtual distance from the eye.

In another embodiment of the invention, the system includes a liquid crystal lens controller configured to update, at an accommodation update rate, the liquid crystal lens based at least in part on the virtual distance.

In another embodiment of the invention, the system also includes an eye tracking system configured to determine an orientation of the eye, and an eye tracking controller configured to determine the virtual distance based at least in part upon the orientation of the eye.

In another embodiment of the invention, the system also includes a display controller configured to update the display at a selected frame rate. Optionally, the accommodation update rate is equal to or greater than the frame rate. Further optionally, the accommodation update rate is about a whole number multiple of the frame rate.

In another embodiment of the invention, the liquid crystal lens has a clear aperture having a width of at least 2 mm.

In another embodiment of the invention, the display is configured to linearly polarize the light. Optionally, the liquid crystal lens is configured to act upon linearly polarized light.

In another aspect of the invention, an accommodating projection method includes projecting light along an optical path incident on a liquid crystal material disposed along the optical path and selectively varying an index of refraction within the liquid crystal material in a pattern that is associated with a defocus wave front mode to selectively focus the light. The method also includes at least partially reflecting the light upon an eye.

In another embodiment of the invention, the light forms an image viewable by the eye that is associated with a virtual distance from the eye.

In another embodiment of the invention, selectively varying the index of refraction of the liquid crystal material is based at least in part on the virtual distance.

In another embodiment of the invention, selectively varying the index of refraction of the liquid crystal material occurs at an accommodation update rate.

In another embodiment of the invention, the method also includes determining an orientation of the eye, and determining the virtual distance based at least in part upon the orientation of the eye.

In another embodiment of the invention, the method also includes projecting the light at a frame rate. Optionally, the accommodation update rate is greater than or equal to the frame rate. Further optionally, the accommodation update rate is about a whole number multiple of the frame rate.

In another embodiment of the invention, the method includes linearly polarizing the light.

In another embodiment of the invention, the method includes collimating the light with an optic disposed along the optical path between the display and the liquid crystal material.

In another aspect of the invention, an optical system for introducing wave front changes includes a liquid crystal cell and an electrode layer in electrical field communication with the liquid crystal cell. The electrode layer comprises a plurality of electrodes separated by a plurality of contour lines. The plurality of contour lines are configured according to an orthonormal wave front mode of an orthonormal basis set. The orthonormal wave front mode along at least one contour line has a value that is within 30% of a constant wave front value. The optical system is configured to produce a wave front change associated with the orthonormal wave front mode that is at least 60% of an ideal wave front change.

In another embodiment of the invention, the orthonormal basis set includes a Zernike basis set.

In another embodiment of the invention, the wave front change has a maximum optical path difference of at least 3 waves.

In another embodiment of the invention, the wave front change is at least 80% of an ideal wave front change.

In another embodiment of the invention, the electrode layer further comprises at least one transparent resistor configured to bridge adjacent electrodes of the plurality.

In another embodiment of the invention, the system also includes a floating electrode layer between the electrode layer and the liquid crystal cell. The floating electrode layer comprises a plurality of floating electrodes disposed between the contour lines of the electrode layer and the liquid crystal cell.

In another embodiment of the invention, the orthonormal wave front mode is Zernike mode Noll index number 5.

In another embodiment of the invention, the system includes a controller for controlling an electrical potential of one or more electrodes.

In another embodiment of the invention, the liquid crystal cell has a clear aperture with a width of at least 2 mm.

In another embodiment of the invention, the liquid crystal cell is configured to act upon linearly polarized light.

In another aspect of the invention, a method for introducing wave front changes includes projecting light along an optical path incident on a liquid crystal material disposed along the optical path and selectively varying an index of refraction within the liquid crystal material in a pattern that is associated with an orthonormal wave front mode selected from an orthonormal basis set to selectively change the light by at least 60% of an ideal wave front change.

In another embodiment of the invention, the orthonormal basis set includes a Zernike basis set.

In another embodiment of the invention, the wave front change has a maximum optical path difference of at least 3 waves.

In another embodiment of the invention, the wave front change is at least 80% of an ideal wave front change.

In another embodiment of the invention, the orthonormal wave front mode is Zernike mode Noll index number 5.

In another embodiment of the invention, selectively varying the index of refraction within the liquid crystal material includes controlling an electrical potential of at least one electrode in electrical field communication with the liquid crystal material.

In another embodiment of the invention, the method also includes linearly polarizing the light.

In another embodiment of the invention, the pattern comprises a plurality of equal index of refraction regions delimited by a plurality of contour lines. Optionally, the pattern along at least one contour line of the pattern associated with the orthonormal wave front mode has a value that is within 30% of a constant wave front value.

In another embodiment of the invention, the pattern comprises a plurality of equal index of refraction regions delimited by a plurality of equi-phase contour lines.

In another aspect of the invention, a jitter stabilization system includes a display configured to project light along an optical path to a location upon an eye, an augmentation jitter sensor that measures a movement of the eye relative to an environment, and an augmentation stabilization system disposed along the optical path between the display and the eye that redirects the optical path based at least in part upon the movement of the eye.

In another embodiment of the invention, the augmentation stabilization system comprises a fast steering mirror.

In another embodiment of the invention, the fast steering mirror has a clear aperture having a width of at least 2 mm.

In another embodiment of the invention, the augmentation stabilization system comprises a liquid crystal wedge. The liquid crystal wedge includes a liquid crystal cell and an electrode layer in electrical field communication with the liquid crystal cell. The electrode layer comprises a plurality of electrodes separated by a plurality of contour lines. The plurality of contour lines are configured according to a wave front mode of at least one of a tip wave front mode and a tilt wave front mode.

In another embodiment of the invention, the liquid crystal wedge has a clear aperture having a width of at least 2 mm.

In another embodiment of the invention, the augmentation jitter sensor comprises an accelerometer.

In another embodiment of the invention, the system also includes a display controller that updates the display at a frame rate, and the augmentation stabilization system redirects the optical path at an augmentation stabilization rate that greater than or equal to the frame rate. Optionally, the augmentation jitter sensor measures the movement of the eye at a jitter sensor rate that greater than or equal to the frame rate.

In another embodiment of the invention, the system also includes an optical jitter sensor that measures optical jitter, and the augmentation stabilization system redirects the optical path based at least in part upon optical jitter.

In another embodiment of the invention, the system also includes at least one of a beam combiner disposed along the optical path between the augmentation stabilization system and the eye and a waveguide disposed along the optical path between the display and the eye.

In another aspect of the invention, a jitter stabilization method includes projecting light defining an image along an optical path to an eye. The image being viewable to the eye and appearing positioned at a virtual image location within a surroundings. The method also includes measuring a movement of the eye relative the surroundings and, based at least in part upon the movement of the eye, redirecting the optical path to cause the image to appear to remain positioned at the virtual image location.

In another embodiment of the invention, redirecting the optical path comprises reflecting the light off a fast steering mirror.

In another embodiment of the invention, the fast steering mirror has a clear aperture having a width of at least 2 mm.

In another embodiment of the invention, redirecting the optical path comprises introducing a wave front change to the light of at least one of a tip wave front change and a tilt wave front change by a liquid crystal wedge disposed along the optical path.

In another embodiment of the invention, the liquid crystal wedge has a clear aperture having a width of at least 2 mm.

In another embodiment of the invention, measuring the movement of the eye comprises measuring a specific force exerted on a body that shares translational movements with the eye.

In another embodiment of the invention, the method also includes updating the image at a frame rate, and redirecting the optical path is done at an augmentation stabilization rate that is greater than or equal to the frame rate. Optionally, measuring the movement of the eye is done at a jitter sensor rate that is greater than or equal to the frame rate. Further optionally, measuring optical jitter and redirecting the optical path is based at least in part upon the optical jitter.

In another embodiment of the invention, the projecting the light defining an image to the eye further comprising at least one of partially reflecting the light off of a beam combiner and transmitting the light via a waveguide.

Additional aspects of the invention and additional features of the various embodiments of the invention are disclosed in more detail below. The phraseology and terminology employed herein are for the purpose of description and should not be regarded as limiting. Moreover, any of the aspects and embodiments set forth above or otherwise herein may be combined with any of the other aspects and embodiments and remain within the scope of the invention.

DETAILED DESCRIPTION

Figure 1A:
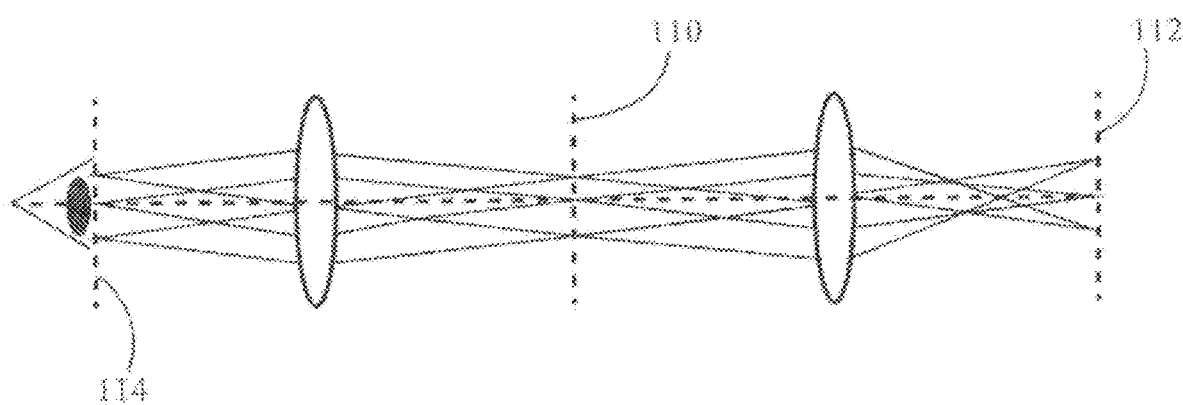
FIG. 1A shows a diagram of a pupil forming architecture according to some embodiments.

Augmented Reality (AR) is a technique used to enhance a user's perception of the world by augmenting their normal sensory input with computer-generated imagery. Taken to the extreme, if a user's perception is completely replaced by a simulation, one can create a pure "virtual reality" (VR). Mixed Reality (MR) combines these techniques to merge a user's perception of physical reality with a VR simulation that co-exists with the physical world in space and time.

The merging of physical and virtual realities creates a new experience of reality where a user feels like they are "inside" the computer simulation. With MR, a user senses both virtual and physical objects in the same space, at the same time, and as a consequence both types of objects have the potential to be perceived as "real".

Mixed reality gaming is the fusion of a physical sport with a virtual reality simulation that enables a new kind of experience. A novel mixed reality gaming experience is expected to provide participants with a form of recreation that is more immersive and sophisticated than current gaming. A mixed reality gaming experience may be imagined by the reader, as being similar to playing your favorite video game in a 3D IMAX theater. Except: you are not sitting down, your opponents may be present (physical) or remote (virtual), and the environment you are playing in comprises the physical world.

Computer games have become increasingly popular in recent years. According to a recent report, the computer gaming industry may soon grow to a size of $100 Billion. Using the sheer size of the gaming industry as grounds, it is fair to infer that many find pleasure in gaming. The mixed reality gaming experience, as proposed within, is far superior to the experience offered by current computer games. It is therefore expected, that mixed reality gaming has the potential to offer great numbers of people untold hours of pleasure. Currently, the benefits of mixed reality gaming have yet to be realized. This is in large part due to: limitations of optical systems present in current augmented reality technologies. A technology that's current state precludes the realization of mixed reality gaming is head mounted displays.

A head mounted display should provide the augmentation imagery in a way that is comfortable to most users. For decades it has been understood by many stereoscopic cinema experts, that affected individuals find 3D movies, or stereoscopic head mounted displays, uncomfortable. It is widely believed that this discomfort is often, because these individuals' stereoscopic perception of depth is coupled with the focusing of their eyes. In 3D cinema, an image having positive parallax is perceived by a viewer to be closer to them than the screen. However, light rays that comprise the image are reflected from the screen. Therefore in order to see the image clearly and in 3D, a viewer focuses their eyes as if the image is located at the screen, while perceiving the image at a different depth than the screen. Some affected individuals have difficulties focusing properly on the image, and maintaining a stereoscopic perception of depth. The perceived incongruence between focal depth and stereoscopic depth thus causes these individuals discomfort. An athletic head mounted display provides an image having stereoscopic depth, or parallax, such that the augmentation imagery has a perceivable depth. An A-HMD therefore, displays the augmentation image with a focal depth that is congruent with the stereoscopic depth of the image.

An athletic head mounted display should also provide high resolution augmentation imagery to the user. Augmentation imagery that has poor resolution will jump out as false, when collocated with physical objects in sight nearby. Therefore, augmentation imagery should be delivered to the user in lifelike or near-lifelike resolutions.

A head mounted display (HMD) for mixed reality gaming, or an athletic head mounted display (A-HMD), as shown and described herein, provides a game participant with an unbroken coherent perception of the augmentation imagery. To realize this, augmentation imagery is displayed to a participant over a full field of view and over a full range of eye movement. in other words, the augmentation imagery should not appear only when the participant's eyes are straight forward, or when the participant adjusts her eyes so that the augmentation imagery is in her central vision.

The augmentation imagery should appear to the participant at all times to be located in the physical world. That is to say, the augmentation imagery should appear to stay in the same location, relative the physical environment, as the participant moves her head. In the case of an athletic head mounted display, participants are expected to be physically active. Therefore, An A-HMD should update a location of the augmentation imagery on the participant's eye faster than the participant can perceive as she moves her head.

Information relevant to attempts to address these problems can be found in U.S. Application No. 61/909,774, U.S. Patent Application No. 2014/0232651 and U.S. Pat. No. 8,780,014. However, each one of these references suffer from one or more of the following disadvantages: The system taught by the reference is unable to sense a movement of a user's eye and reposition projected imagery, based upon the eye movement. The system taught by the reference does not selectively project imagery into distinct ranges of field of view of the user, such as central vision, near-, mid-, and far-periphery. The system as taught by the reference therefore is unable to project imagery at the central vision of a user, which is of a higher resolution than imagery being projected in a periphery vision of a user. The system taught by the reference does not allow augmentation imagery to be corrected and steered within limits of perceivable resolution of the user. The system as taught in the reference cannot be optically calibrated based upon the unique characteristics of a user's eyes. And, the system taught by the reference is unable to correct jitter of projected imagery that results from fast movements of a user's head.

For the foregoing reasons, there exists a need for a head mounted display that can allow people to enjoy an immersive and sophisticated mixed reality gaming experience.

Unlike virtual reality gaming, mixed reality gaming requires display of augmentation imagery amongst physical surroundings, which are also perceptible to the user. See through head mounted displays (HMDs) allow for the display of virtual content, while largely not obstructing the user's view of her surroundings.

Figure 1B:
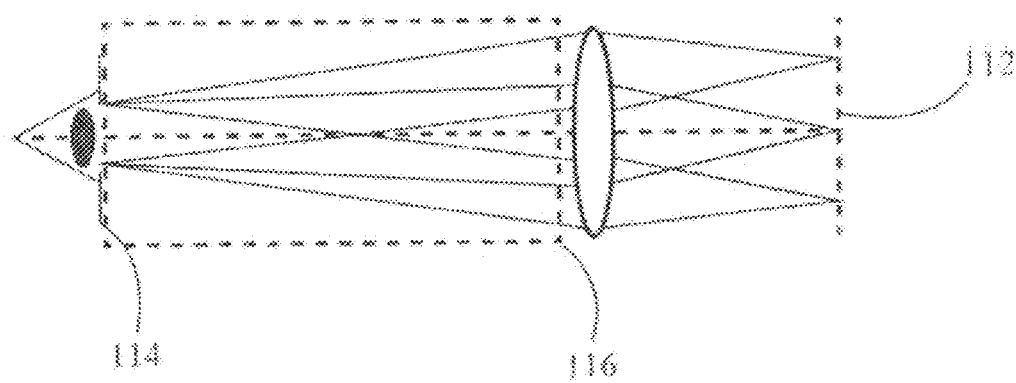
FIG. 1B shows a diagram of a non-pupil forming architecture according to some embodiments.

There are primarily two types of optical system architectures for see through HMDs: pupil forming and non-pupil forming architectures. For comparison, both architectures are illustrated in FIG. 1. In pupil forming architectures, there are one or more intermediate pupil planes, 110, between an image source, 112, and a final pupil plane, 114, being a pupil of a user's eye. In a non-pupil forming architecture, there is only the one pupil plane, 114, and no intermediate pupil planes. FIG. 1A illustrates a pupil forming HMD architecture having an intermediate image, 110. FIG. 1B shows a non-pupil forming architecture with a viewing eye box, 116.

Pupil forming architectures allow flexibility in the optical design layout (e.g. head wrapped optical train) and optical system functionality (e.g. eye tracking capability). A non-pupil forming optical architecture tends to be much more compact with a viewing eye box, 116, that tends to be wider in depth and narrower in lateral directions.

Identifying how the transmitted and projected beams are combined further refines the optical system architectures of an HMD. There is a wide range of see-through HMD architectures that take advantage of several optical fields such as: traditional optics, Fresnel optics, micro-optics, diffractive optics, and volume holograms. All the architectures provide some capability while also yielding some drawbacks. Typical HMD beam combining methods are drawn in FIG. 2.

Figure 2A:
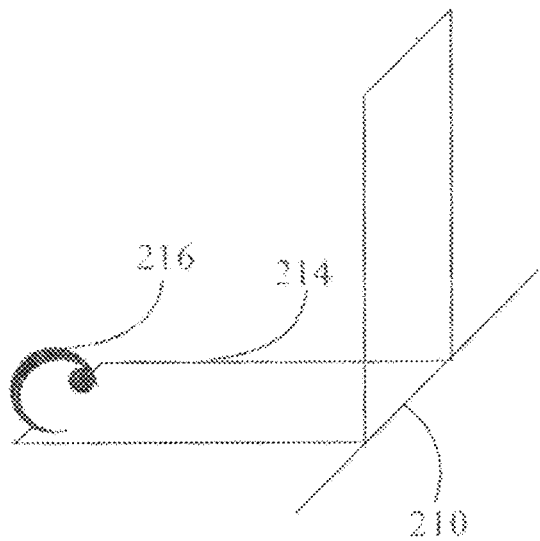
FIG. 2A shows a head mounted display comprising a flat beam combiner according to some embodiments.
Figure 2B:
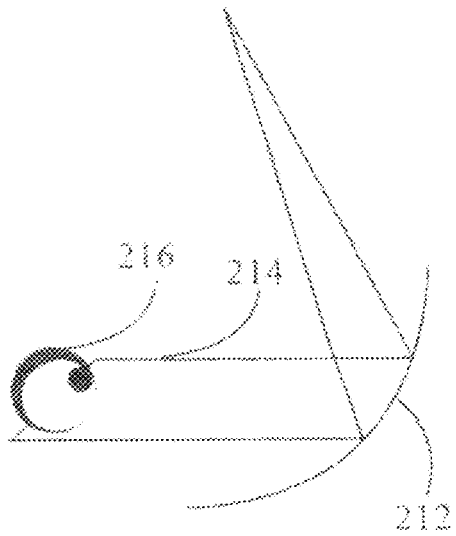
FIG. 2B shows a head mounted display comprising a curved beam combiner according to some embodiments.
Figure 2C:
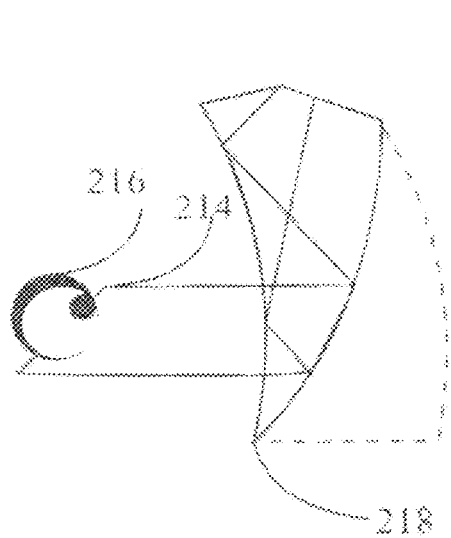
FIG. 2C shows a head mounted display comprising a total internal reflection prism lens according to some embodiments.
Figure 2D:
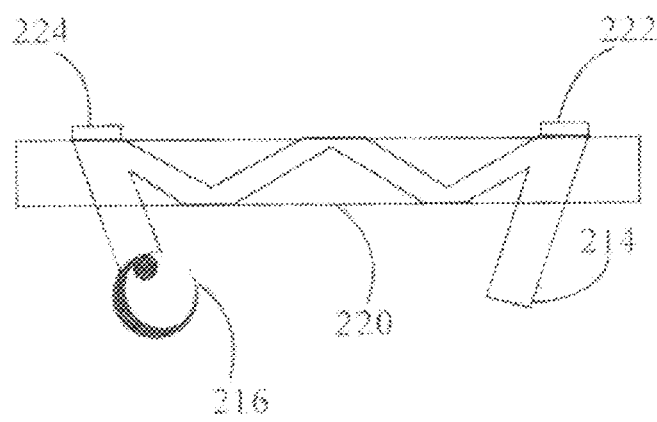
FIG. 2D shows a head mounted display comprising a planar waveguide according to some embodiments.

The simplest see-through HMD is illustrated in FIG. 2A, and makes use of a conventional flat combiner, 210. An embodiment incorporating the flat combiner, 210, uses a simple 50/50 beam splitter tilted at 45 degrees to combine the beams. Another interesting design employs curved combiners, 212, which is illustrated in FIG. 2B. The curved combiner, 212, comprises one or more curved surfaces that collimate the projected beam, 214, and project it onto the user's eye, 216. Curved combiners may be made semi-transparent by the proper application of thin film coatings. Numerous companies have attempted to make use of a total internal reflection (TIR) prism lens, 218, as a beam combiner. The TIR prism lens is illustrated in FIG. 2C. A beam combining system that implements a TIR prism lens consists of a micro-display mounted on top of the combiner prism. A second corrector element, not shown, is used to restore see-through functionality. A current favored method for HMD beam combining comprises a planar waveguide, 220. An exemplary configuration of such a system is shown in FIG. 2D. The planar waveguide, 220, having an input coupler, 222, and an output coupler, 224, may be input, and/or output coupled with diffraction gratings, holograms, or micro-mirror arrays. Other HMD beam combiner methods include: cascaded extractors, dual contact lens/retro-diffuser, and tapered light guides.

An athletic HMD (A-HMD) is an HMD that enables athletic mixed reality gaming. An athletic HMD enables a user to sense simulated objects as if they were real, as the user and her eye's move uninhibited in athletic action. This demands strict performance requirements not yet met by current HMD systems. Ideally, an A-HMD would allow for sensed simulated objects to be perceivable over a full field of view and an entire range of eye movement.

Figure 3:
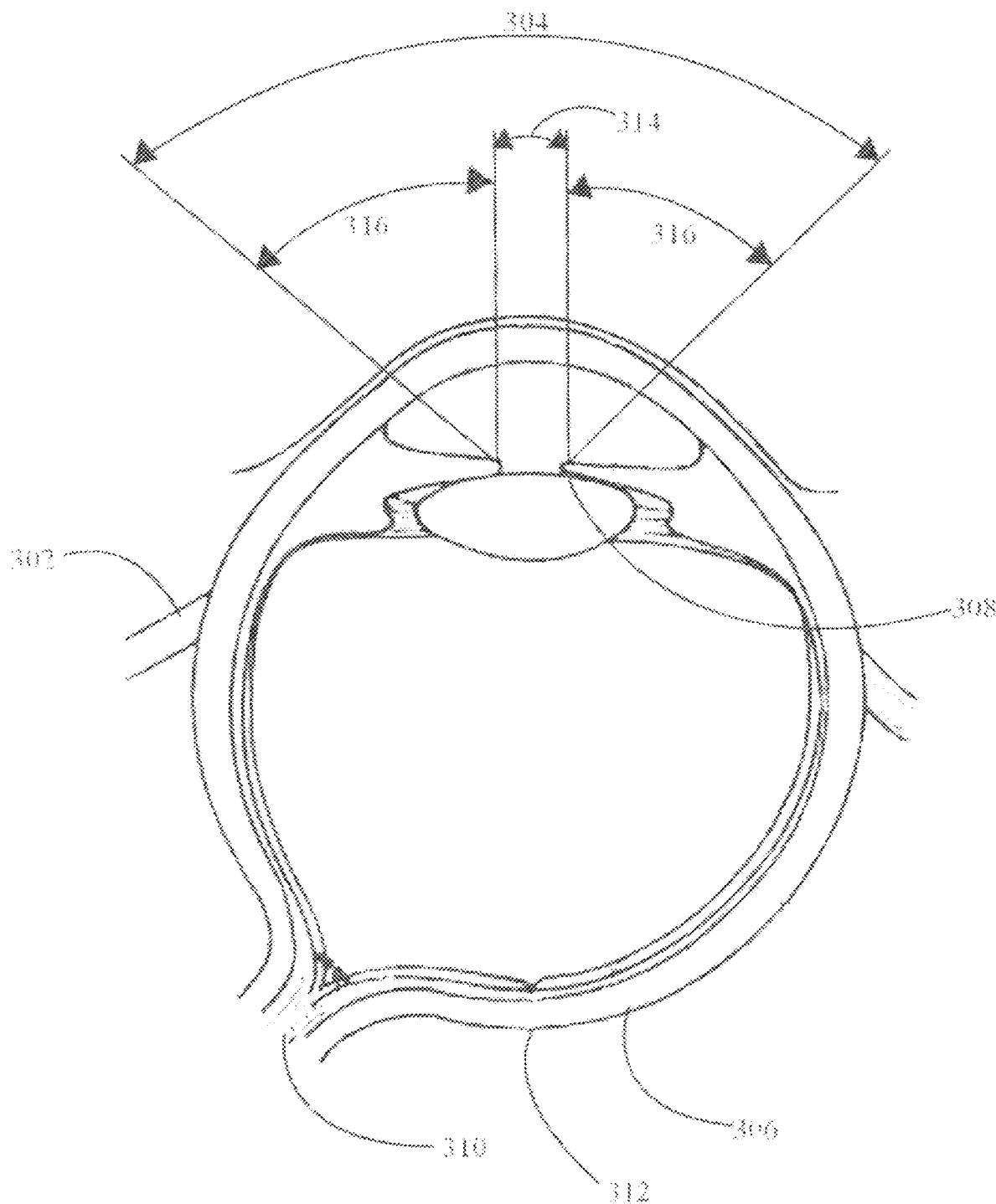
FIG. 3 shows a human eye having a field of view.

As depicted in FIG. 3, a human eye, 302, has an instantaneous field of view (iFOV), 304, that is greater than 120° per eye. However, the eye does not maintain the same vision quality over the entire FOV. The varying vision quality is because of the structure of the eye and a light-sensitive layer at the back of the eye called a retina, 306. Light entering a pupil, 308, projects upon the retina, which covers roughly 65% of the eye's interior surface. The retina, 306, is comprised of rods and cones. Rods and cones are photosensitive cells in the retina that convert incident photons into electrical signals that are carried to the brain via the optic nerve, 310. Cones are color sensitive cells approximately 6 microns in diameter that perform well in bright lighting but are insensitive in low-light conditions. Rods are highly light-sensitive cells approximately 2 microns in diameter that perform well in low-lighting conditions. Rods are not able to distinguish color; and rods do not form as sharp an image as the cones do. The majority of the cones are located at the center of the retina on a small bump called a fovea, 312.

The distribution of rods and cones on the retina, combined with other anatomical considerations in the eye, results in their being regions of the field of view with different vision qualities: central vision, 314, and peripheral vision, 316.

Central vision, 314, may be defined by the boundaries of the macula, which is a region of the retina defined as having at least two layers of ganglia. The macula has a diameter of 5.5 mm or 18° FOV. The definition of central vision may also be defined in terms of visual acuity. In this case, central vision is referred to as foveal vision and may be defined as the region of the FOV in which visual acuity is 20/20. This corresponds to roughly the central 2° FOV.

Peripheral vision, 316, may be defined as the region of the FOV outside the central vision region. Peripheral vision may be divided into three regions: near, mid, and far. The dividing line between near and mid peripheral vision may be defined according to visual acuity, which declines by about 50% every 2.5° from the center of the FOV up to 30° where it falls off more sharply. This sharp decline in visual acuity defines the boundary between near and mid peripheral vision. In addition, color perception is strong at 20° but weak at 40° and the 30° boundary between near and mid peripheral vision is also taken as the boundary between adequate and poor color perception. This boundary also naturally occurs for dark-adapted vision as well, where the 30° boundary corresponds to the edge of good night vision, primarily resulting from the distribution of rods in the retina. Far peripheral vision may be defined as the region of vision that lies outside stereoscopic vision, which is defined as the region of the FOV that overlaps for each eye. This overlap occurs for the inner 60° of FOV and allows people to perceive depth stereoscopically.

Figure 4:
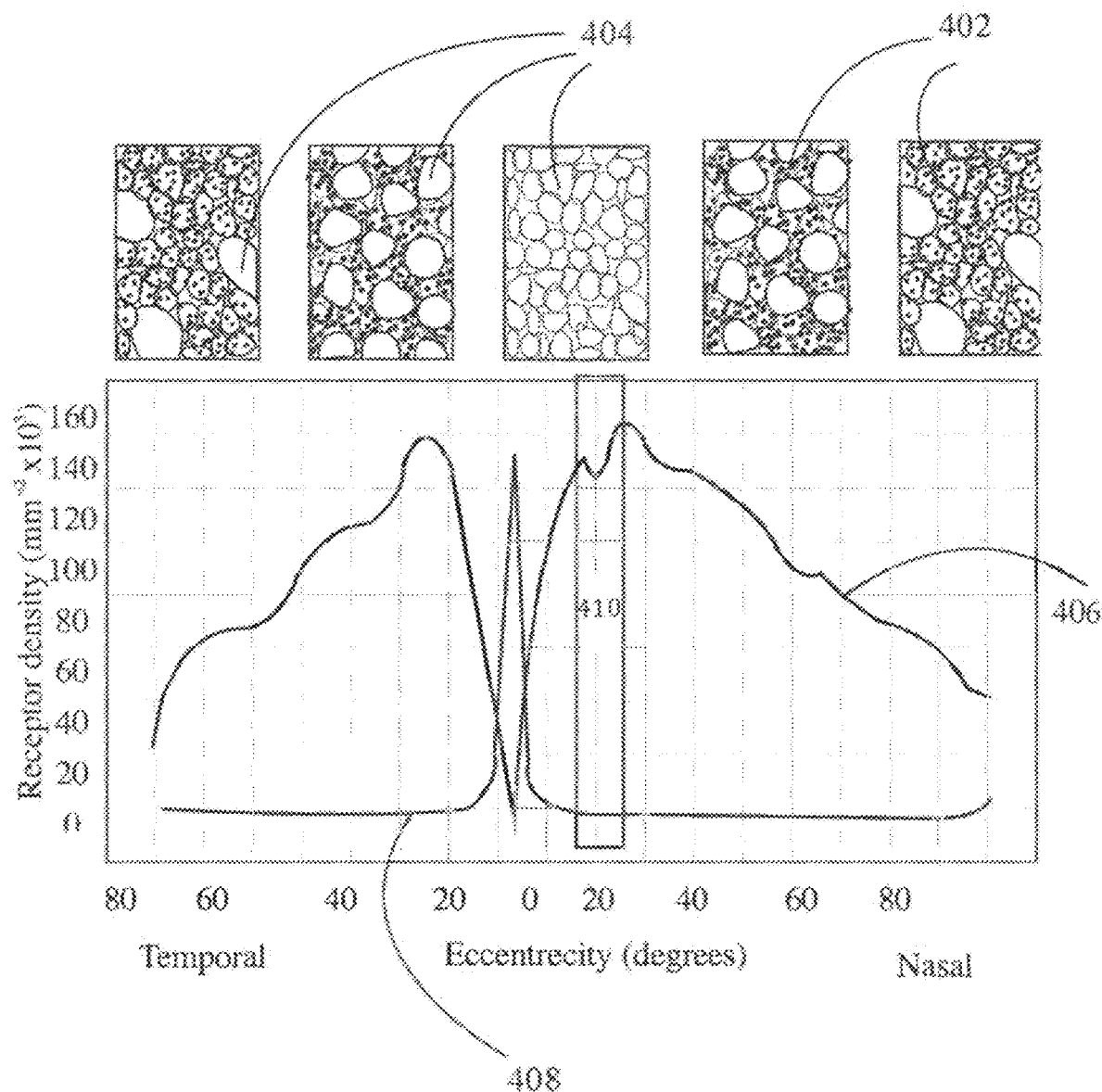
FIG. 4 shows a graph depicting a distribution of rods and cones within a normal human eye.

There are approximately 100 million rods and 5 million cones spread across the retina. As alluded to above, the rods, 402, and cones, 404, are not distributed uniformly over the retina. The density of rods, 406, and the density of cones, 408, over a retina is graphed in FIG. 4. A peculiarity of the retina is the presences of an optic disk, or optic nerve head, 410, where there are no rods or cones resulting in a seldom perceived blind spot. The fovea contains the highest density of cones, 408, and provides the eye's sharpest vision and the majority of the eye's color vision.

An athletic HMD (A-HMD) may be defined as an HMD that enables athletic mixed reality gaming. To do so, an HMD should enable a user to sense simulated objects as if they were real. In order to achieve this, the HMD should provide greater functionality than achieved by prior methods. Ideal specifications of four functions of an A-HMD are defined in terms of human perfectibility, and are not necessarily met by all embodiments: An A-HMD should provide stereoscopic display of augmentation imagery, which enables normal eye accommodation for a user. Normal eye accommodation of stereoscopic imagery prevents discomforting experiences many affected individuals experience when viewing 3D content. Some embodiments of an A-HMD include an accommodating projection system that displays stereoscopic augmentation imagery with more than four focal depths. An A-HMD should update augmentation imagery at a rate that is imperceptible to the human eye. Some embodiments of an A-HMD comprise a frame rate that updates the augmentation imagery content at a rate greater than 10 Hz, such as 30 Hz. An A-HMD should display augmentation imagery, such that it appears to be placed stably amongst the surroundings of the real word. Some embodiments of an A-HMD correct augmentation imagery instabilities, to within the resolution limit of a human eye, or within +/−10 microns on a user's retina. An A-HMD should provide the greatest possible field of view, resulting in the most immersive mixed reality experience for the user. Some embodiments of an A-HMD allow a user to see a full +/−60° FOV horizontally and +50°/−70° FOV vertically A head mounted display able to meet the functional specifications as outlined above, may comprise any of the following subsystems: A head-tracking system, an eye-tracking system, an accommodating projection system, an augmentation stabilization system, a ray densification system, and a head mounted display controller.

Figure 5:
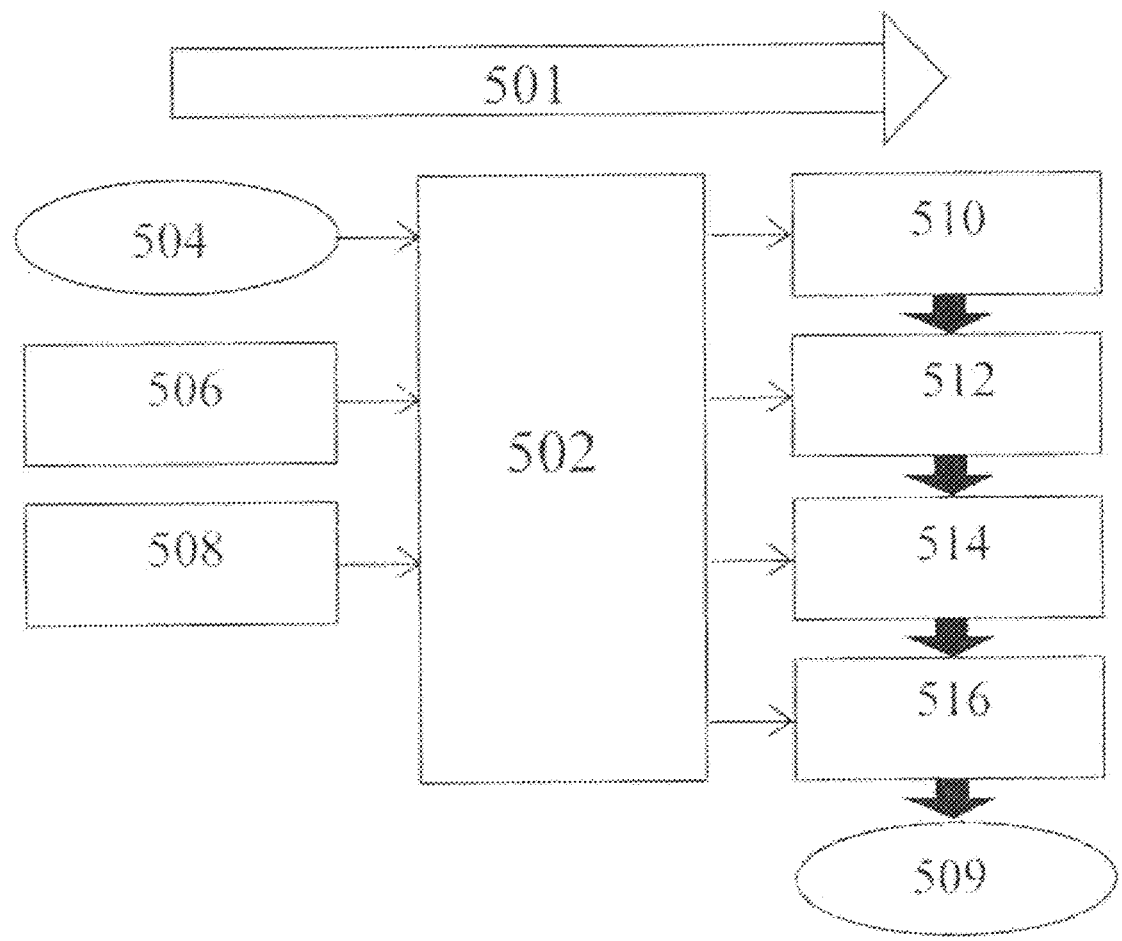
FIG. 5 shows a block diagram of an athletic head mounted display comprising a number of subsystems according to some embodiments.

A block diagram of an HMD system, comprising a number of subsystems is shown in FIG. 5, having data flow, 501, from left to right. In respect to FIG. 5: An HMD Controller, 502, receives externally generated scene render data, 504, initiating the process. The HMD Controller, 502, also receives internally generated head-tracking, or jitter sensing data and eye-tracking data from a jitter sensor system, 506, and an eye-tracking system respectively, 508. The HMD Controller, 502, controls a plurality of subsystems in order to generate augmentation imagery, 509, on the retina of a user's eye. The plurality of subsystems may comprise one or more of the following: An accommodating projection system, 510, an augmentation stabilization control system, 512, an image fusion system, 514, and a ray densification system, 516.

Image Fusion System

Figure 6A:
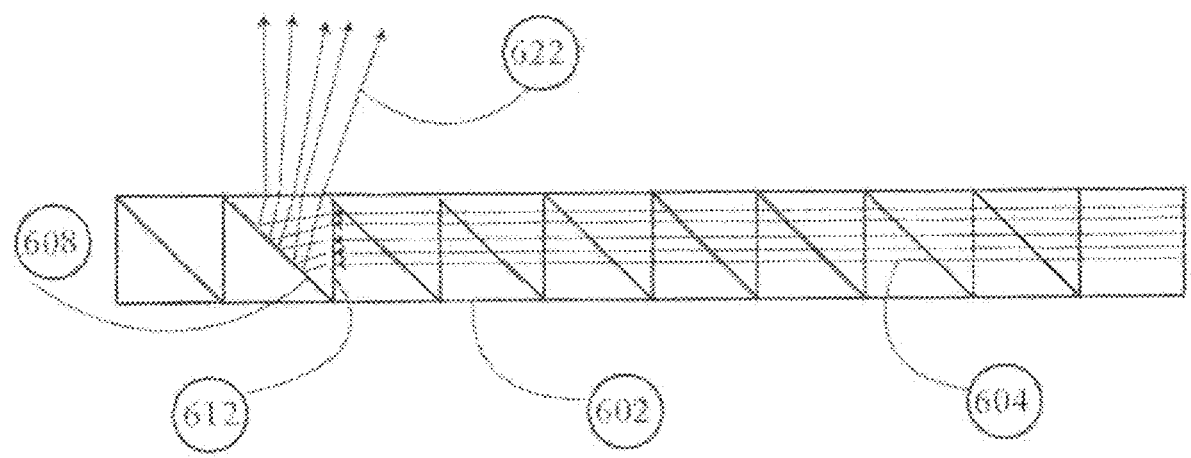
FIG. 6A shows a beam launching array according to some embodiments.
Figure 6B:
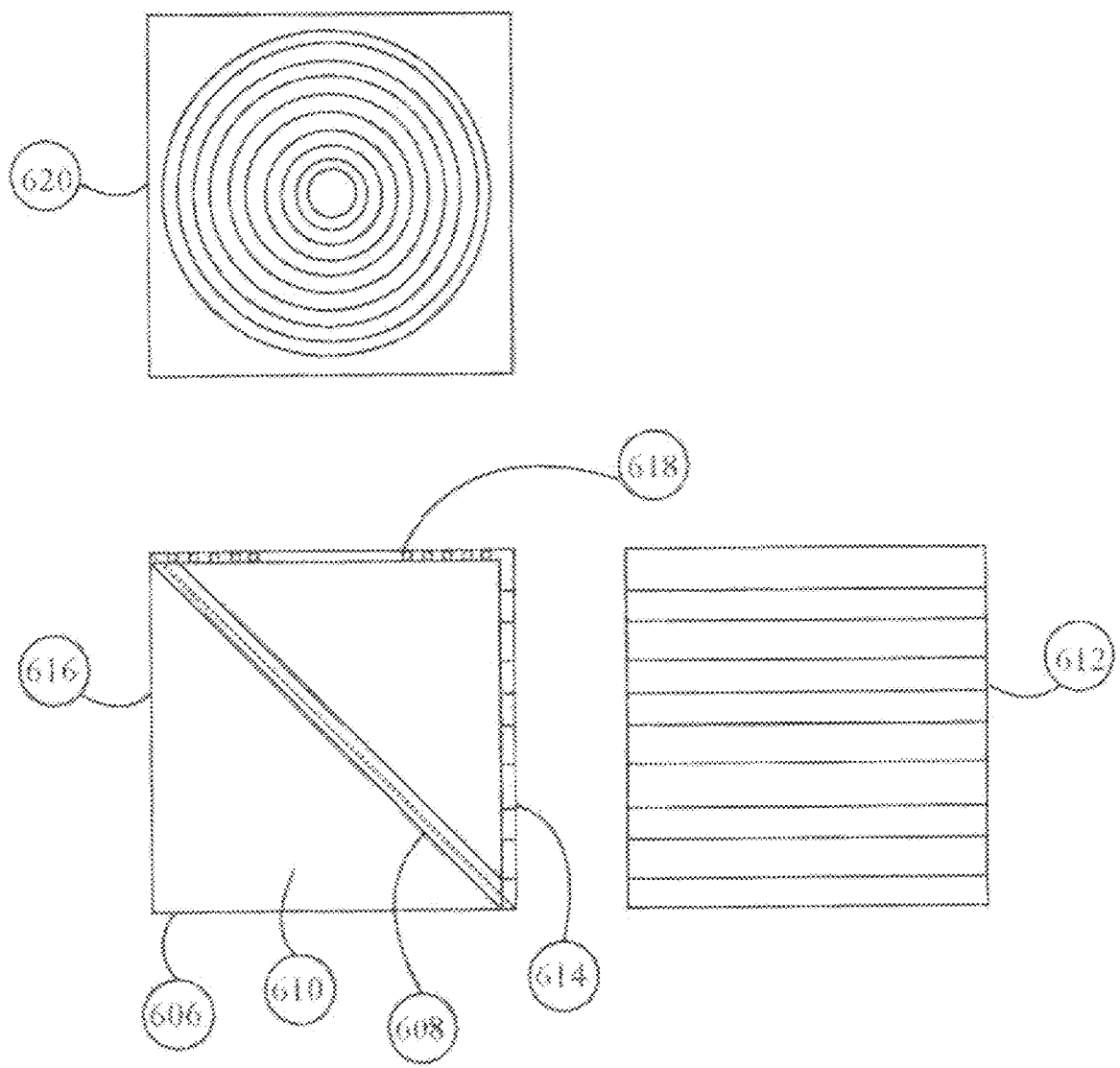
FIG. 6B shows an element of a beam launching array, or a "beam launching cube" according to some embodiments.

An image fusion system performs the critical task of mixing the real and augmented imagery, so that a user perceives the scene as the fusion of the two. Referring now to FIG. 6, in some embodiments, an A-HMD system, comprises a beam launcher array (BLA), 602. Versions of image fusion systems comprising a BLA allow a user to have access to a significantly large FOV, for example greater than 25%, 50%, 70% of an iFOV of a user. Said embodiments also, allow the user to turn her eyes and see a significantly large FOV in most gaze directions. The BLA is an output-coupling device that allows light, 604, output by a projector to stay locked on the pupil of a user's eye. The beam launcher array (BLA), as depicted graphically in FIG. 6A, provides image fusion over large FOV and many eye orientations.

The BLA comprises: an array of beam launching cubes (BLCs), 606. The BLCs are so named, because they may be shaped as cubes. Embodiments of BLCs exist that are not shaped like cubes. In an embodiment shown in FIG. 6B, the BLCs are constructed by placing a switchable reflector, 608, along one diagonal face of a substrate, 610. A first adjustable gradient optic, 612, is placed along an input surface, 614, of the substrate, 610, and a second adjustable gradient optic, not shown, may be placed at a first output surface, 616, of the substrate, 610. The switchable reflector, 608, is selectively switched from transparent to reflective. When the switchable reflector is in a reflective (ON) state, rays entering the input surface are reflected out a second output surface, 618. When the switchable reflector, 608, is in a non-reflective (OFF) state, the light, 604, passes out the first output surface, 616. In some embodiments, the switchable reflector, 608, comprises a liquid crystal mirror (LCM); and the LCM may be switched from a reflective to a non-reflective state at a rate of about 120 Hz. In some embodiments the variable gradient optic, comprises a liquid crystal wedge. In some versions, the BLA's are sized having a clear aperture, or aperture stop that is large enough to selectively reflect all of the light associated with an image. For example, A BLA may accommodate a similarly sized image width, by having a clear aperture of 1, 3, or 5 mm.

In some embodiments, A liquid crystal wedge (LCW), 612, placed at an input face, 614, of the beam launcher is used to steer an input beam, 604, vertically or horizontally. The LCW, 612, adds a tip or tilt phase gradient to a pupil, which shifts the vertical or horizontal position of the augmentation imagery. The LCW works in a similar fashion to a liquid crystal lens (LCL), 620; a potential is applied across the device, and the index of refraction of the liquid crystals changes. Unlike an annular, ring pattern electrode, on the LCL, 620, the LCW, 612, has an electrode pattern comprising: a series of strips through which a non-uniform potential is applied across the whole device. A phase gradient (tip/tilt) may be introduced by varying the potential in a linear ramp, causing the input beam, 604, to deflect at an angle equal to the induced wedge angle.

Figure 6C:
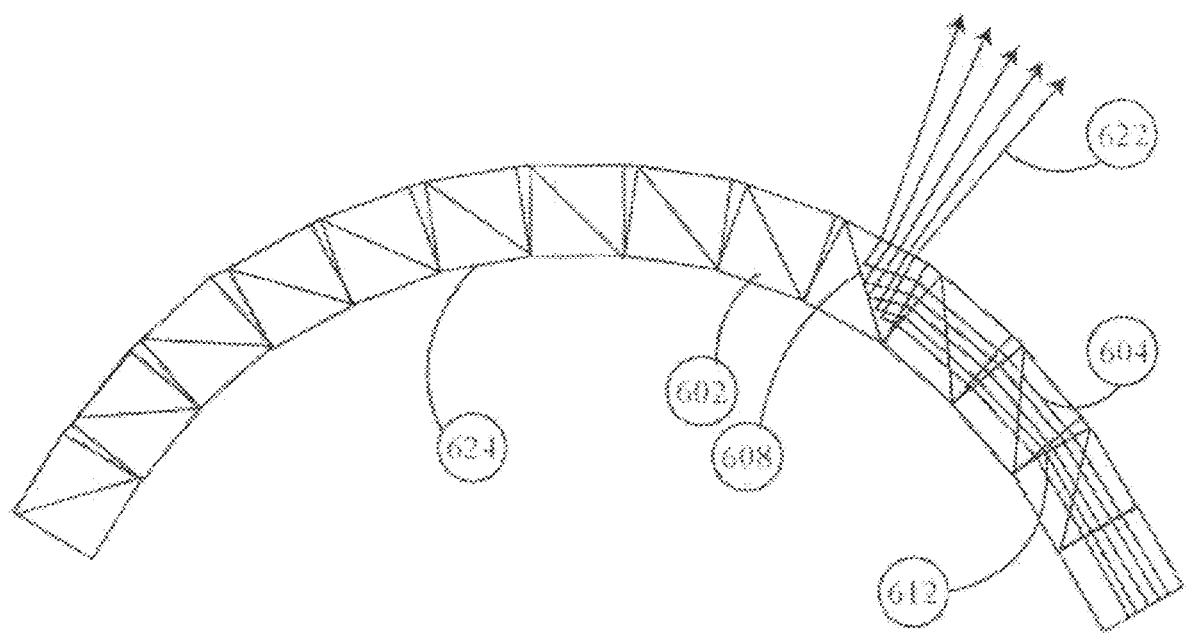
FIG. 6C shows a curved beam launching array according to some embodiments.

In some embodiments, a liquid crystal lens (LCL), 620, as described in further detail below, is placed at the second output surface, 618, of the beam launcher cube to expand the output beam, 604. In combination with a curvature of a curved beam combiner, as described above, the function of the LCL, 620, provides the ability to increase the size of the output beam, 622, to match the diameter of a user's pupil, 308. Light launched from the BLA reflects off the partially mirrored surface of the beam combiner into the user's eye. In some versions, the curvature of the beam combiner is matched to the curvature of a curved BLA, 624, in order to collimate the projected beam entering the user's eye. A wide FOV may be achieved by the curved BLA, 624, as shown in FIG. 6C.

In some embodiments a beam launching array is a two dimensional array, having a first column of beam launching cubes into which light is input coupled. The first column is substantially disposed along a first axis (Y). The light is selectively reflected and output coupled from the first column and into any one of a multitude of rows of beam launching cubes. Each row of beam launching cubes comprises a multitude of beam launching cubes, and is disposed along a second axis (X). In some embodiments the first (Y) and second (X) axes are generally orthogonal to one-another. The light is finally selectively reflected and output coupled from a beam launching cube within a row, and ultimately directed toward the eye of a user. Thus, light may be selectively launched from the two dimensional beam launching array according to a coordinate (X', Y').

Figure 7:
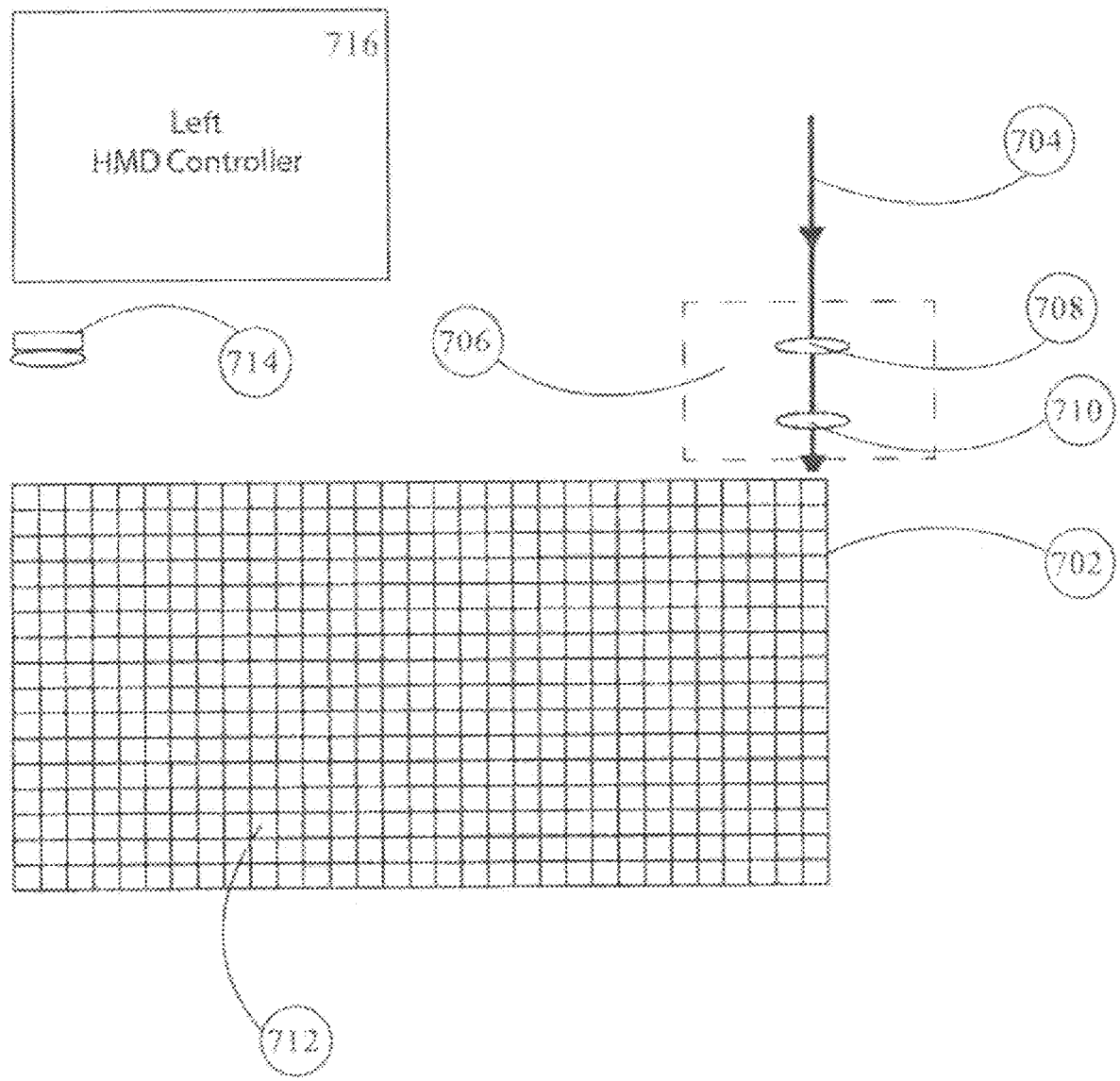
FIG. 7 shows a schematic representation of a portion of an image fusion system, comprising: an HMD controller, an eye-tracking system, a compressor, and a beam launch array according to some embodiments.

An embodiment of an image fusion system, up to and including the beam launcher array (BLA), 702, is depicted schematically in FIG. 7. The image fusion system is depicted graphically from the BLA, 702, to an eye. Referring to FIG. 7, light, 704, from an entrance pupil is decreased in size by a compressor, 706, such that the diameter of the projected beam matches an entrance aperture, not shown, of the BLA, 702. In the version an image fusion system shown, the compressor, 706, comprises a first compressor lens, 708, and a second compressor lens, 710. Additionally, the compressor may comprise: curved reflectors, diffractive gratings or other optical elements. The projected light, 704, then passes into the BLA, 702, and is routed to a correct beam launching cube, 712, based upon pupil orientation measured by an eye-tracking system, 714. An HMD controller, 716, controls the performance of the beam launch array, 702, in response to feedback from an eye tracking system, 714.

Figure 8:
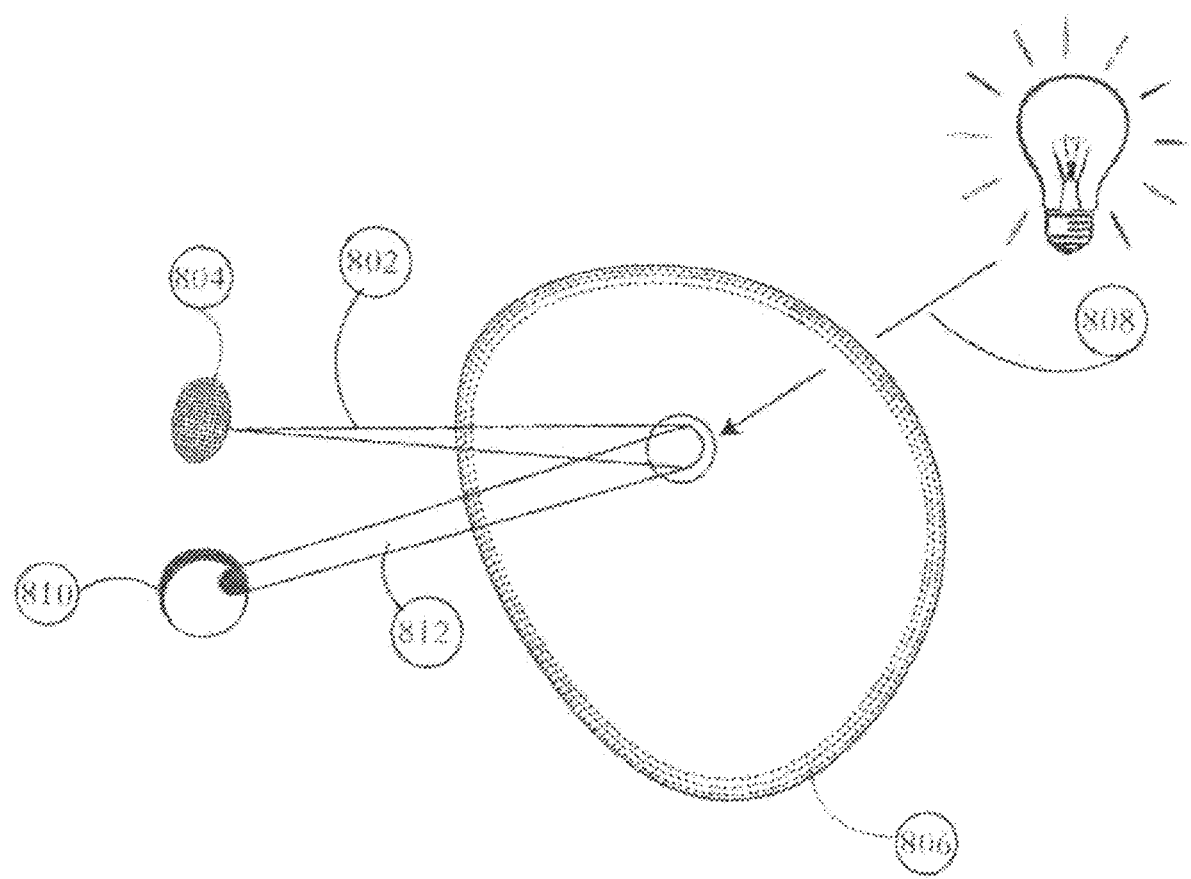
FIG. 8 shows a graphical representation of a portion of an image fusion system, comprising: a beam launch array, and a beam combiner according to some embodiments.

The projected beam, 802, is launched from the BLA, 804, onto a beam combiner, 806, as illustrated in FIG. 8. In some embodiments, the beam combiner, 806, comprises a glass surface that is partially mirrored. External light sources, 808, shine through the beam combiner into the user's eye, 810, and projected augmentation imagery, 812, is reflected from the partially mirrored surface into the user's eye, 810, as depicted in FIG. 8. This effectively combines the real, 808, and augmentation imagery, 812, together into one scene, as viewed by the user's eye.

Field of View (FOV) Specifications

Figure 9:
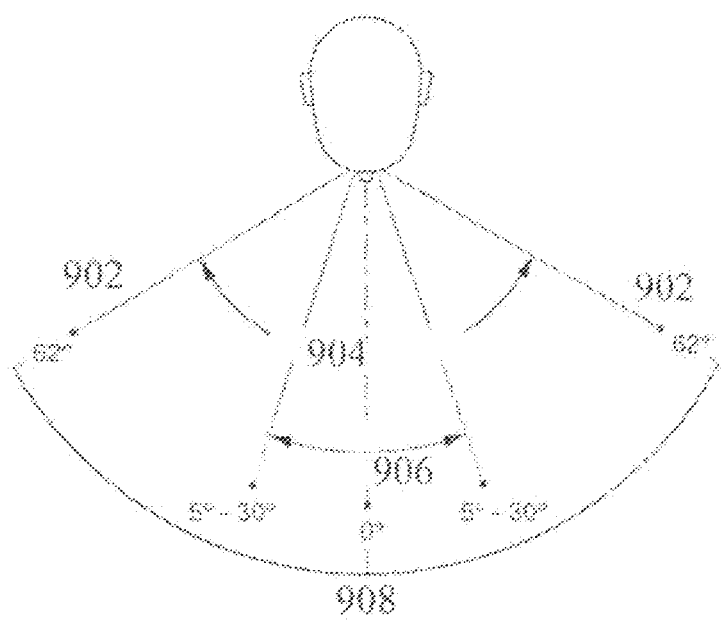
FIG. 9 shows a field of view (FOV) of a user in horizontal and vertical planes.
Figure 9:
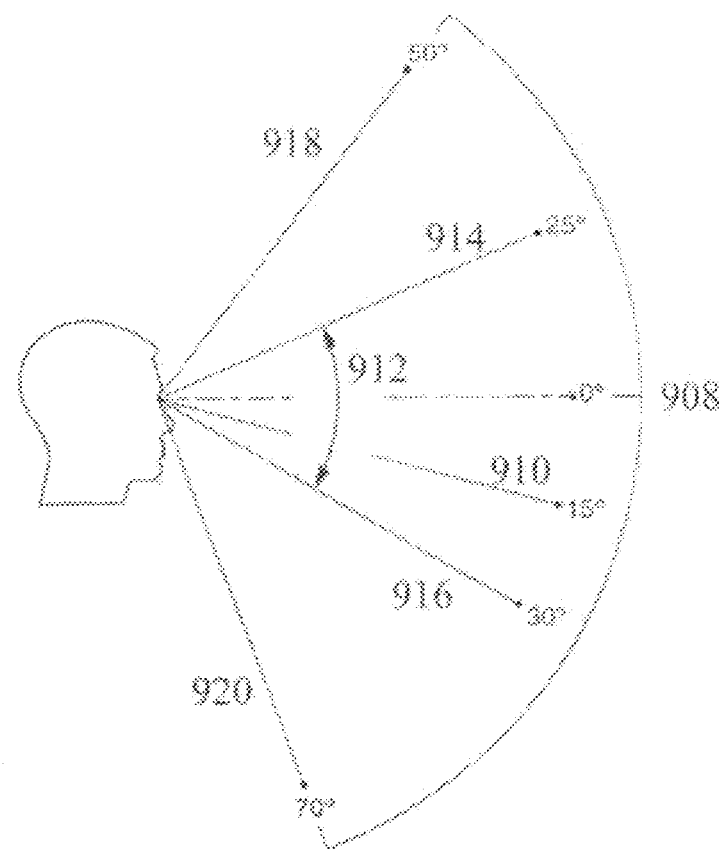

A typical person has a large field of view (FOV), as depicted in horizontal and vertical planes in FIG. 9. A horizontal visual limit, 902, for each eye is roughly 62° off center. A region of binocular vision, 904, typically is present in between the horizontal visual limits, 902. Symbol recognition, 906, is typically only possible within 5°-30° of the standard line of sight, 908. The standard line of sight, 908, is generally 15° higher than the seated line of sight, 910. Optimum vertical eye rotation, 912, is between an upper maximum eye rotation, 914, of about 25°, and a lower maximum eye rotation, 916, of about 30°. Vertical limits of vision are about 50° upper limit to visual field, 918, and 70° lower limit to visual field, 920. Referring back to FIG. 3, the instantaneous FOV (iFOV), 304, is the FOV that an eye is able to image at a given instance. The level of mixed reality immersion is proportional to the amount of the iFOV that may be augmented with AR content, which we shall refer to as the AR-FOV. An AR device is said to be immersive if the AR-FOV is a significant fraction of the eye's iFOV.

Total accessible FOV is an amount of total FOV that is accessible by a user's eyes when the eyes are rotated. Ideal A-HMD FOV specifications, which are not necessarily achieved in all embodiments, are: An AR-FOV that provides augmentation imagery over at least 70% of the total instantaneous field of view of an average human eye. And, an accessible FOV that provides augmentation imagery over at least 70% of an average human eye's total accessible FOV. According to some embodiments, the AR-FOV is about 50% allowing for augmentation imagery to be projected, only within the limits of stereoscopic vision. In another version, the AR-FOV is further reduced to about 25% the iFOV of the user, and augmentation imagery is only projected within the user's central vision and near-to-mid peripheral vision. In another embodiment, the AR-FOV is still further reduced, such that it includes only the central vision and the near-peripheral vision. Like the AR-FOV, the accessible FOV of the system is also ideally as large as possible, although in some embodiments it is as low as 50%. In other embodiments the accessible FOV is hardly constraining to a user and represents greater than 70%, 90%, or 97% of the iFOV.

As described above, the human eye, 302, has a relatively large peripheral vision, 316 (referring back to FIG. 3). It is therefore necessary for a near-to-eye projection system, such as a head mounted display (HMD), to display over a wide field of view, greater than 30° and, according to some embodiments greater than 60°. A 2D beam launcher array, 1002 (depicted in FIGS. 10A-B) may be employed to display augmentation imagery over a large accessible-FOV and provide a large AR-FOV and an immersive mixed reality experience. According to some embodiments, the HMD comprises multiple optical systems that are configured to provide a wide total accessible FOV greater than 60°, and in some embodiments greater than 120°.

Figure 10A:
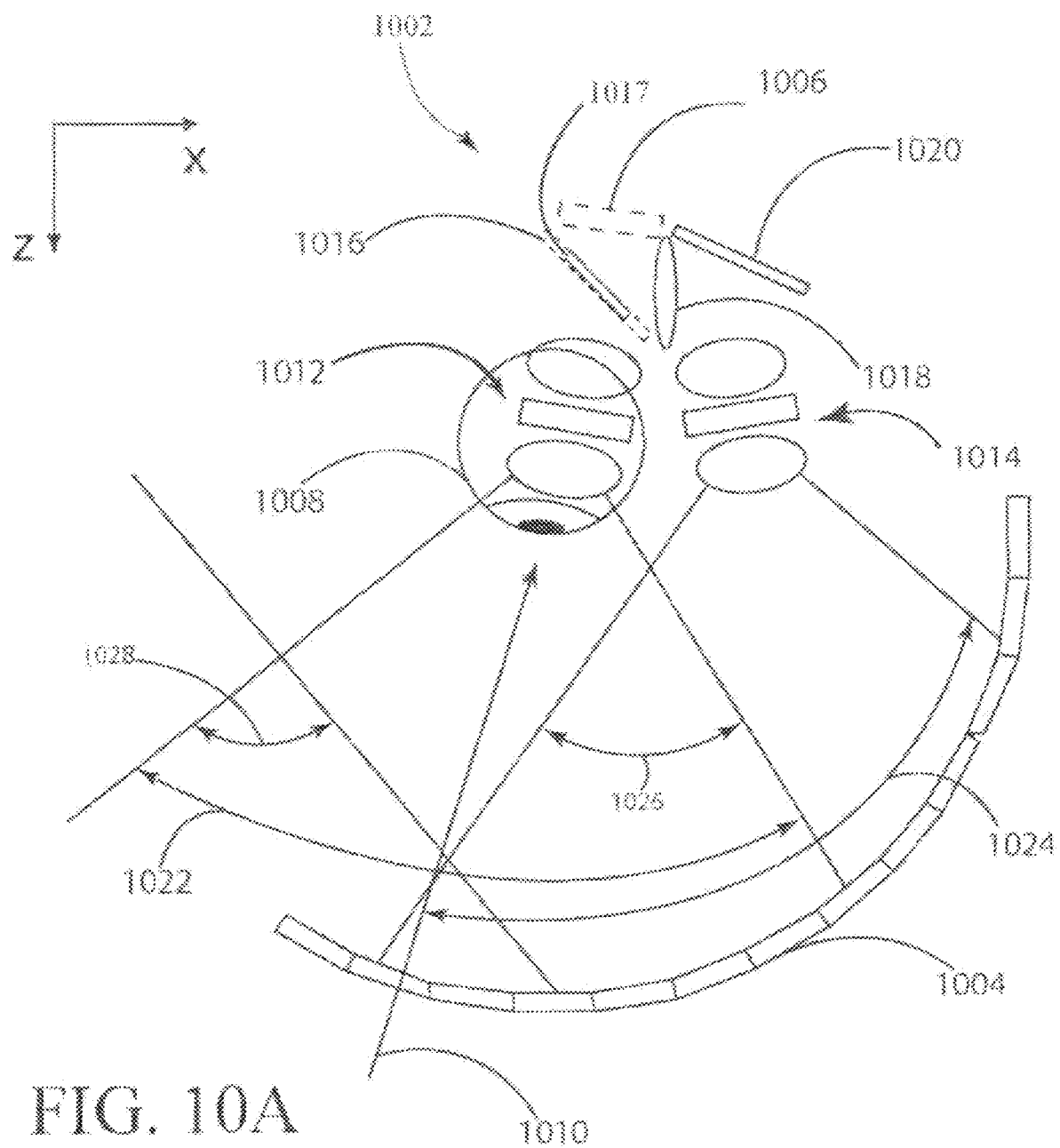
FIGS. 10A-10B illustrates an HMD in which two foveated optical systems are employed to project augmented imagery into an eye of a user according to some embodiments.
Figure 10B:
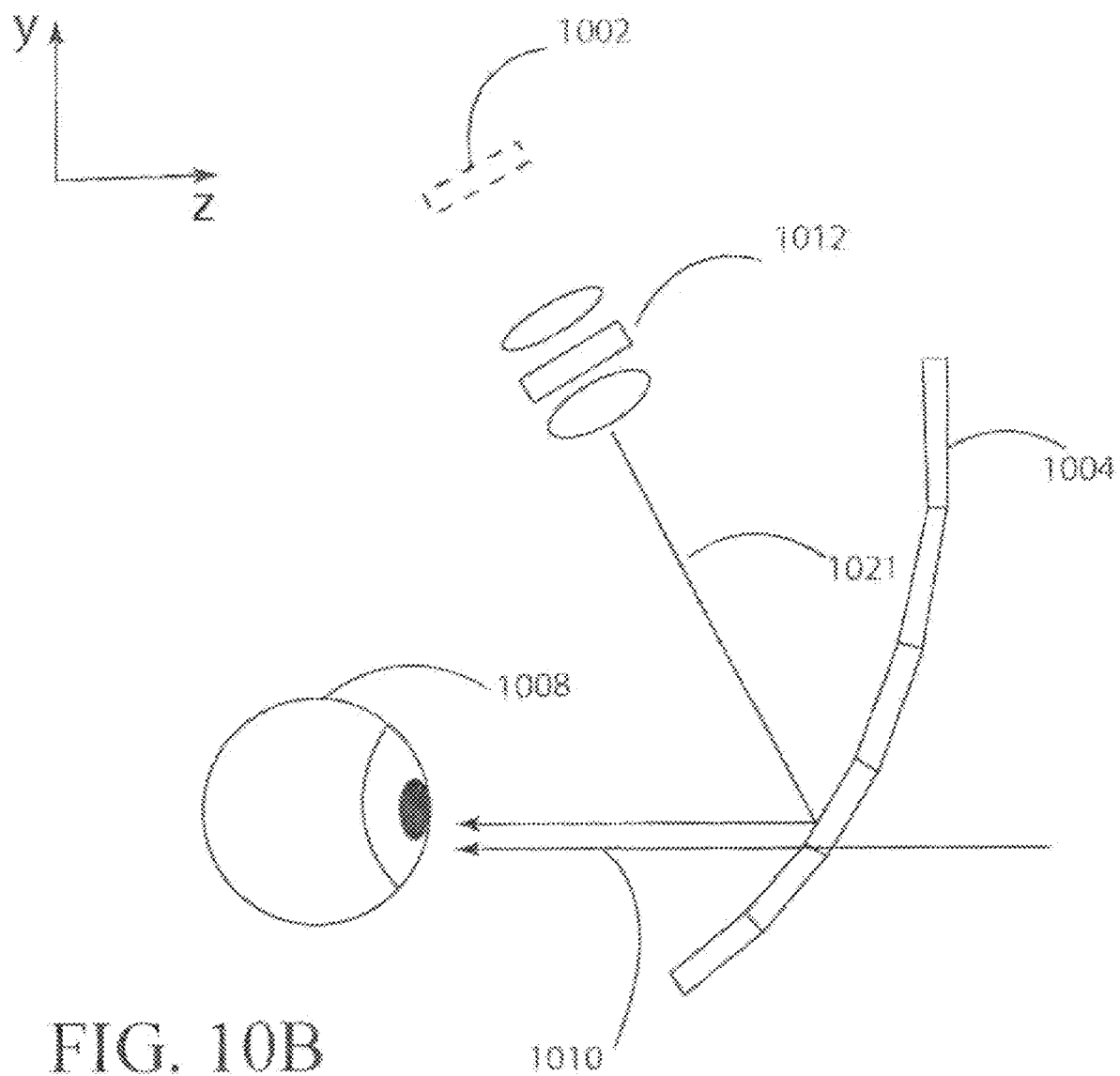

An X-Z cross section view of an embodiment of an HMD incorporating multiple optical systems is shown in FIG. 10A. A Y-Z cross section view of the same HMD embodiment is shown in FIG. 10B. The HMD depicted in FIGS. 10A-B includes a beam combiner, 1004. The beam combiner reflects projected light being reimaged from an image plane, 1006, by the 2D beam launcher array, 1002, toward an eye of a user, 1008. In some embodiments the beam combiner partially transmits light from the surroundings, 1010, allowing some of it to reach the user's eye, 1008. Examples of beam combiners include: curved and flat 50/50 beam splitters. As a user's eye moves, multiple optical systems, 1012 and 1014, selectively provide virtual imagery over the total accessible FOV of the user, see FIG. 10A. In such situations, one or more switchable reflectors, or liquid crystal (LC) mirrors, 1016, may be used to direct projected light toward an individual optical system. The switchable reflector can be said to have a clear aperture, 1017, which constrains the area of light transmitted or reflected by the switchable reflector. In some embodiments, the minimum overall clear aperture of the 2D beam launching array is constrained by the switchable reflector's clear aperture, 1017. Also shown in FIG. 10A is a reimaging lens, 1018, and a reflector, 1020. The reimaging lens is used to correct for differences in path length between the two optical systems. The reflector further directs the projected light through the second optical system, 1014.

Referring now to the function of the embodiment shown in FIGS. 10A-10B, an image generating source (OLED display, projector, LCOS device, etc.) projects light forming an image at an image plane, 1006. In some embodiments, the projected light is linearly polarized, and therefore efficiently acted upon by liquid crystal devices. The light propagates from the image plane and passes through (or is reflected by) a switchable reflector, 1016. When the switchable reflector is in a non-reflective state; light from the image source passes through a first beam launcher, 1012. When the switchable reflector is in a reflective state; light from the image source passes through the second beam launcher, 1014. In either case, the light, 1021, passing through the beam launchers is directed toward a beam combiner, 1004. The beam combiner finally reflects the light from the source into a user's eye, 1008. The system is typically symmetrical for both eyes of the user, such that each eye has virtual imagery displayed to it. In some embodiments, the light passing through the beam launchers, or optical systems, 1012 and 1014, is collimated by one or more of the optical systems (such as is described below in reference to FIGS. 42A-42D) and the collimated light is reflected off a partially reflective beam combiner, 1004, and into the user's eye. In another embodiment, the light from the beam launchers is not collimated, and a curved beam combiner is incorporated to collimate the light that is reflected to the eye.

Referring again to FIG. 10A, an HMD is partially shown, in which two optical systems are incorporated per eye. A first optical system (OS), 1012, images over a first wide angle, 1022. A second OS, 1014, images over a second wide angle, 1024. In some embodiments, the wide angle is greater than: 45°, 60°, or 80°. It can be seen in FIG. 10A that the first OS, 1012, and the second OS, 1014, are positioned such that they overlap at an overlap angle, 1026. In some embodiments, the overlap, 1026, is negligible. In other embodiments, the overlap angle, 1026, is greater than: 60°, 45°, 30°, or 10°. In some embodiments, adjacent OSs are configured such that there is an eye overlap angle, 1028, between a third OS associated with a second eye, not shown, and the first OS, 1012. In some embodiments, the eye overlap, 1028, is negligible. In other embodiments, the eye overlap angle, 1028, is greater than: 10°, 30°, 45°, or 60°.

Multiple optical systems, or beam launchers, may be incorporated to display an image to an eye. Parameters related to beam launchers are outlined in Table 1, below:

TABLE 1

| | Min. | Nom. | Max. |
|---|---|---|---|
| Beam Launcher-Clear Aperture (mm) | 0.5 mm | 4-10 mm | 50 mm |
| Beam Launcher-FOV (% iFOV*) | 2% | 40%-60% | 100% |
| Beam Launcher-FOV (°) | 2° | 50°-70° | 120° |
| No. Beam Launchers per Eye (—) | 1 | 2-5 | 100 |
| Multiple Beam Launchers-Accessible-FOV (% Total Accessible-FOV) | 30% | 50%-90% | 100% |
| Multiple Beam Launchers-Accessible-FOV (°) | 60° | 100°-160° | 180° |
| Operable Wavelengths: | Broadband within 400-700 nm range, and Monochromatic, and IR 700-1500 nm. | | |
| Type of Optical System: | Pupil forming, and Non-pupil forming | | |

*Assume an instantaneous Field of View (iFOV) of 120° for a nominal human eye.
** Assume 180° of total accessible Field of View (TA-FOV) for a nominally rotatable human eye.

In some embodiments the optical systems (OS) used to direct the light to toward the eye are foveated optical systems (FOS). A foveated optical system may be described as an optical system that provides varying resolutions over a field of view, much like the human eye which images at a high resolution only at the fovea. Therefore, an embodiment of a FOS has a region of interest (ROI) that is imaged at a foveal resolution, outside of which the image has a resolution lower than the foveal resolution.

Introduction to Foveated Optical System

Because angular resolution is inversely proportional to wavelength of light divided by aperture diameter, larger aperture sizes result in high resolution imaging. An eye's aperture, or pupil, can vary in diameter from approximately 1.5 mm in bright light, to approximately 8 mm in dim light. Therefore, generally speaking, for an optical system to project images of imperceptibly high resolution to the eye, the optical system must have an aperture size of at least 5 mm for average viewing conditions. It is advantageous for an HMD optical system to project wide field of view images at resolutions, which are imperceptible to the surrounding images. Therefore, an HMD optical system with an aperture size at least as large as a human pupil, and which can pass enough light for high resolution imaging is required. A wide angle foveated optical system may be used to display augmentation imagery over a large field of view, and with high-resolution. Wide angle foveated optical systems are described in U.S. application Ser. No. 14/020,223 (Li et al.); Ser. No. 14/726,429 (Welch et al.); and U.S. Pat. No. 8,018,814 (Ogasawara et al.), incorporated by reference herein. However, each one of these references suffer from one or more of the following disadvantages: a non-dynamic region of aberration correction, small optical path differences, and fill factor effects. A non-dynamic region of interest means that a region imaged at high resolution is static, or in one place in the field of view. For a mixed reality application, the static region of interest will constrain the user's eye movements and hobble immersivity. Small optical path differences limit the aberrations corrected by the optical system, thus reducing the quality of the displayed imagery and mixed reality (MR) experience. Fill factor effects are the result of the use of spatial light modulators, and reduces the transmission efficiency of the optical system.

A doctoral thesis titled: ANALYSIS AND DESIGN OF WIDE-ANGLE FOVEATED OPTICAL SYSTEMS by George Caratu describes design considerations for wide-angle foveated optical systems. The designs outlined by Caratu suffer from the following disadvantageous: fill factor effects, reduced transmission, limited to monochromatic applications, and small phase stroke. For example, Caratu describes systems that are limited to a phase stroke of about and describes that phase stroke will be small enough in compact wide-angle systems, such that aberration correction will require modulo-k techniques. Modulo-$\lambda$, corrections however severely limit the wavelength that can be corrected, as diffraction efficiency drops quickly away from the center wavelength.

For the foregoing reasons, improvements in technology related to wide-angle foveated imaging is needed, in order for a truly immersive mixed reality experience.

Foveated Optical System: Parameters Table

Parameters related to foveated optical systems are outlined in Table 2:

TABLE 2

|  | Minimum | Reference | Maximum |
| --- | --- | --- | --- |
| No. Optical Elements (–) Note: A fewer number of elements is typically preferred. | 1 | 3 | 100 |
| Clear Aperture Diameter (mm) Note: an aperture size at least as large as a human pupil is generally preferred. | 0.5 mm | 6 mm | 50 mm |
| No. Wave Front Correctors (–) | 1 | 1 | 50 |
| Field of View (°) | 20° | 60° | 180° |
| Region of Interest (°) | 2° | 8° | 90° |
| System Thickness (mm) | 0.1 mm | ~25 mm | >100 mm |
| Type of Optical System |  | pupil forming non-pupil forming |  |
| Application |  | Display Systems: Augmented Reality HMD, Virtual Reality HMD, etc. Imaging Systems: Surveillance, Autonomous vehicle camera systems. etc. |  |

Figure 11:
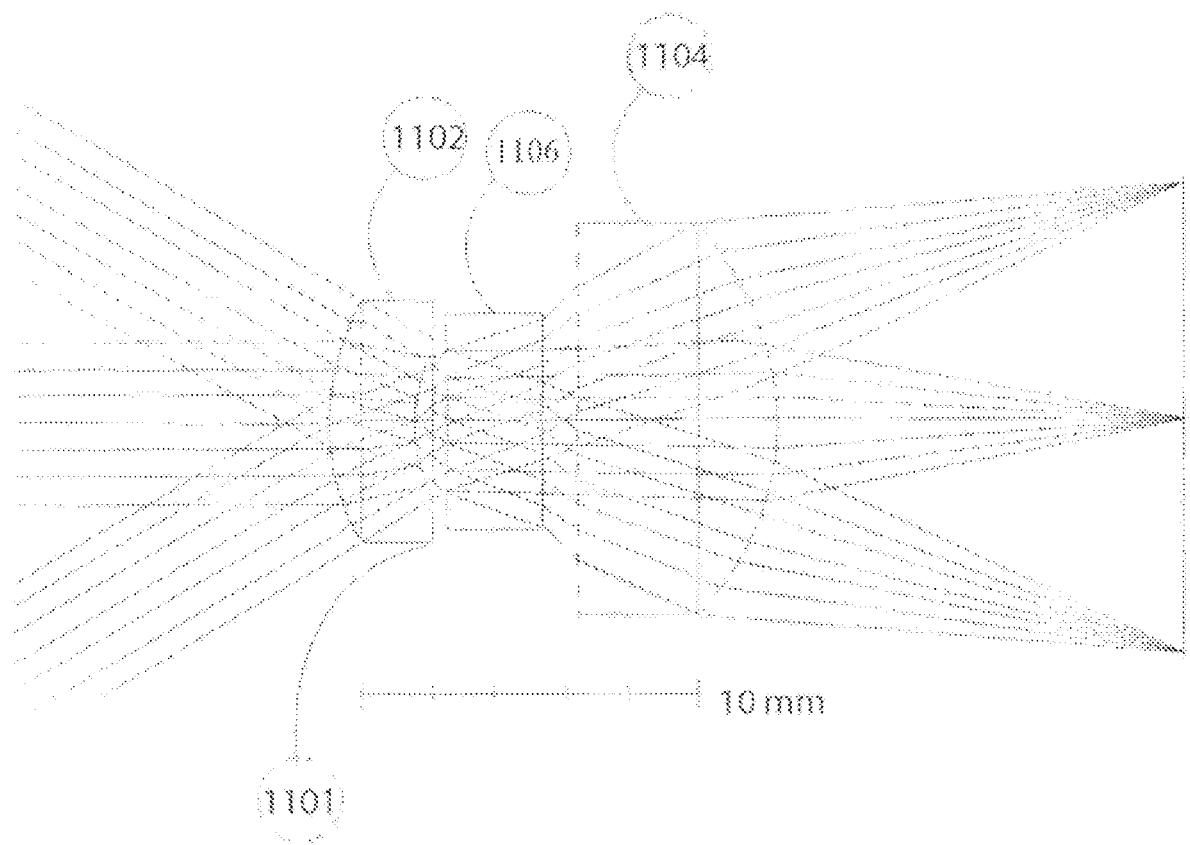
FIG. 11 shows a reference embodiment of a wide field of view foveated optical system.

In some embodiments, such as a reference embodiment shown in FIG. 11, a foveated optical system, 1101, comprises three optics: two even aspheric lenses, 1102 and 1104, in a fisheye projector configuration, with a liquid crystal (LC) wave front corrector, 1106, positioned between them. This configuration images light over a wide field of view. For example, the reference embodiment provides a field of view of 60°. Generally, increased field of view can result in greater aberrations. In the reference embodiment, the two aspheric optics, 1102 and 1104, are configured to correct azimuthally symmetric aberrations, but do not correct azimuthally asymmetric aberrations. Depending upon the design of the foveated optical system, 1101, different aberration sources will contribute more or less. Specifications for the aspheric optics, 1102 and 1104, of the reference embodiment are included below in Table 3:

TABLE 3

|  | Lens No. 1 | | Lens No. 2 | |
| --- | --- | --- | --- | --- |
| Numerical Indicator | 42A | | 42B | |
| Type | EVENASPHERE | | EVENASPHERE | |
| Thickness | 2.66 mm | | 6.00 mm | |
| Material | SF57_MOLD | | SF57_MOLD | |
|  | Front | Back | Front | Back |
| Semi-Diameter | 3.71 mm | 2.39 mm | 4.15 mm | 5.89 mm |
| Conic | 0 | 0 | 0 | 0 |
| 2nd Order Term | 0 | 0 | 0 | 0 |
| 4rd Order Term | 6.88E-05 | 6.83E-04 | -1.81E-04 | -4.33E-05 |
| 6th Order Term | -1.34E-06 | -1.03E-06 | -3.26E-06 | -7.46E-07 |
| 8th Order Term | 2.72E-08 | 1.48E-06 | 1.74E-07 | -2.76E-09 |
| 10th Order Term | -6.84E-10 | 2.98E-09 | -5.98E-10 | -3.06E-10 |

Many liquid crystal materials act most efficiently on linearly polarized light. Some embodiments comprise a polarizer up beam of the wave front corrector Examples of polarizers include: wire-grid polarizers and absorptive polarizers.

Figure 12:
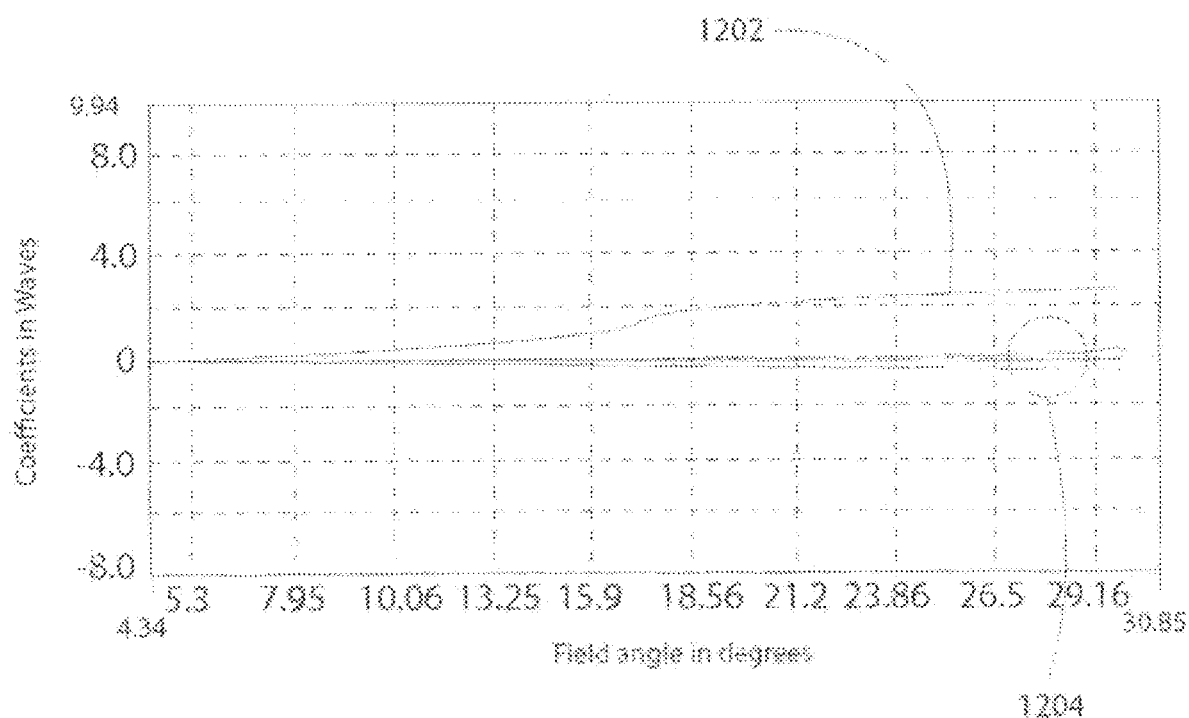
FIG. 12 shows a graph of Zernike Mode strength versus field angle for a reference embodiment of a foveated optical system according to some embodiments.

Aberration sources may be characterized by Zernike Mode and their contribution may be quantified by Zernike Mode strength. FIG. 12 shows a graph of Zernike Mode strength versus field angle for the reference embodiment described in FIG. 11 and Table 3. It can be appreciated from FIG. 12 that the primary contributor for wave front error for the foveated optical system reference embodiment is Zernike Mode Noll index No. 6, or astigmatism, 1202. Comparatively, Zernike Modes Noll index No. 1, 2, 3, 4, 7 and 8, 1204, produce very little aberrations. It should be noted that for other foveated optical system designs, other aberration sources may be significant contributors to wave front error. Other aberrations sources that may contribute to wave front error include: piston, tip, tilt, astigmatism, defocus, trefoil, coma, secondary astigmatism, spherical, and other higher order Zernike Modes.

Figure 13A:
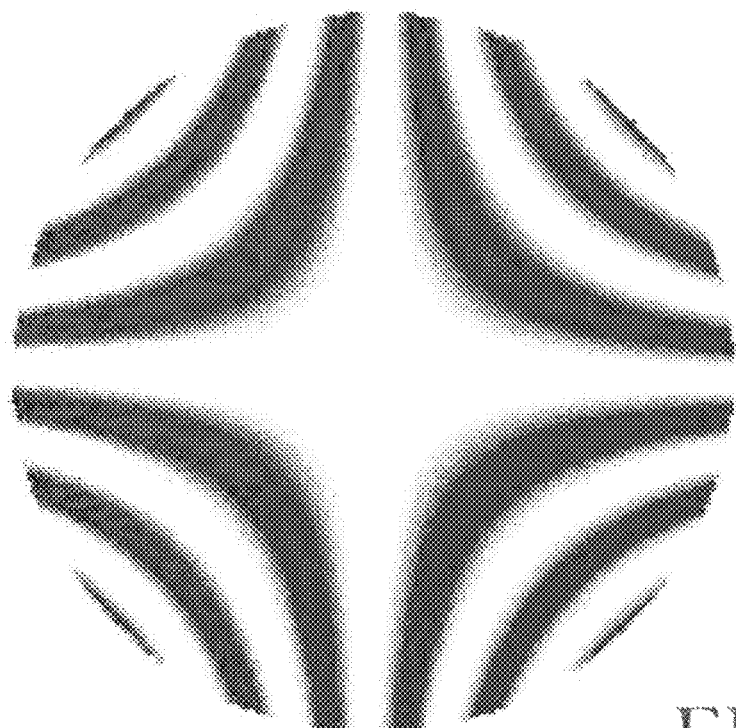
FIGS. 13A-13B illustrates Noll-ordered Zernike modes 5 and 6.
Figure 13B:
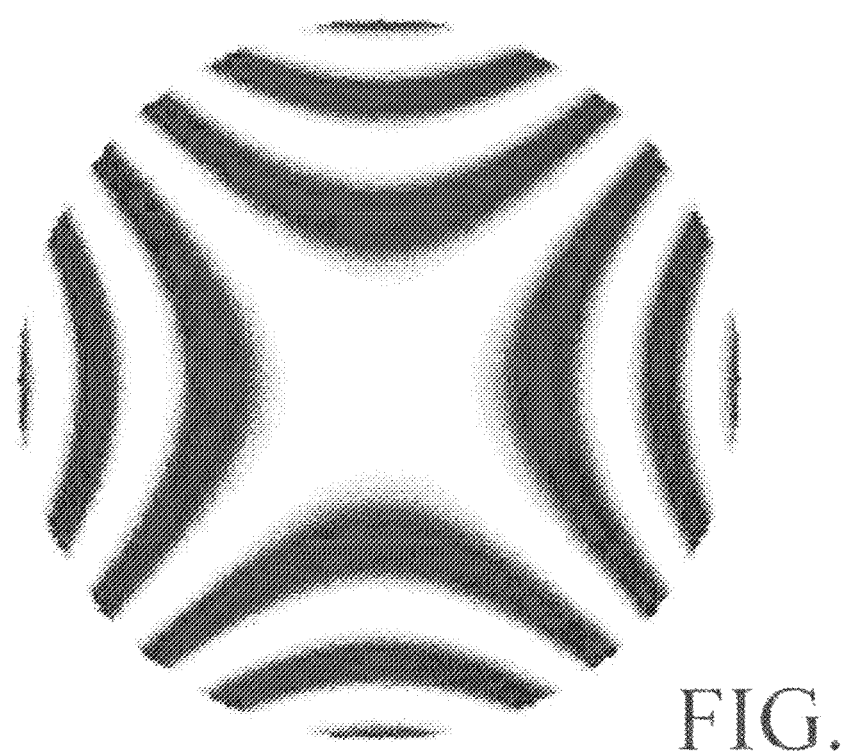

FIGS. 13A-13B depict astigmatism, or Noll-ordered Zernike modes 5 and 6. Referring back to FIG. 12, astigmatism, 1202, is an azimuthally asymmetric aberration that in some optical systems gets worse with increased field angle. In some embodiments, the wave-front corrector depicted in FIG. 11, may be configured to specifically correct for astigmatism. In this case, the astigmatic corrector consists of a liquid crystal cell with two or more etched electrode layers in specific patterns. An exemplary wave front corrector liquid crystal (LC) cell is depicted in FIG. 14.

Figure 14:
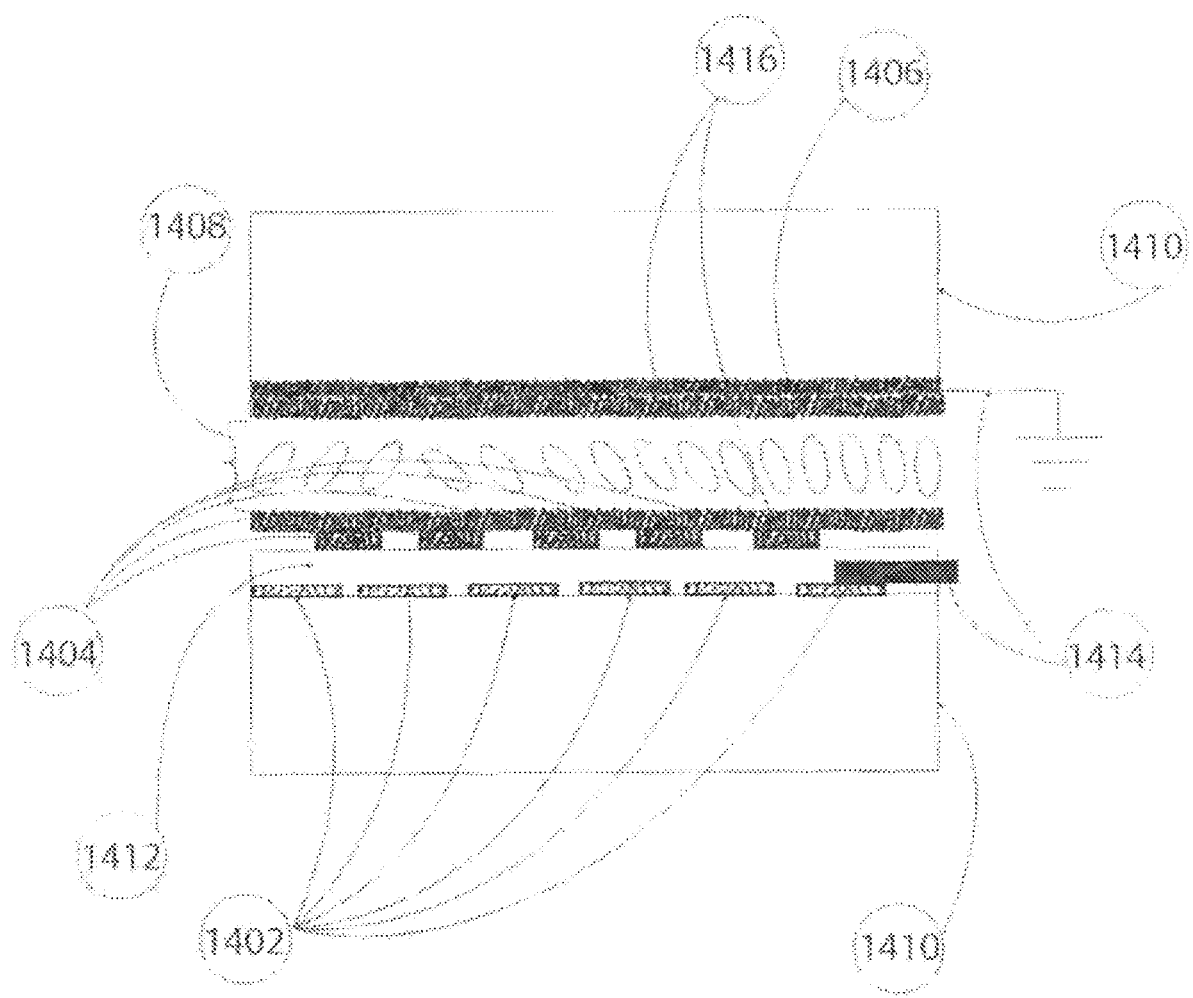
FIG. 14 shows a liquid crystal cell for an exemplary wave front corrector according to some embodiments.

The LC cell in FIG. 14 consists of three transparent electrodes: a patterned electrode 1402, a floating electrode 1404, and a ground electrode, 1406, with a liquid crystal solution, 1408, sandwiched between the floating and ground electrodes. Examples of different liquid crystal materials include: Nematic, Smectic, Cholesteric, and Discotic types. A transparent electrode may be constructed by depositing Indium Tin Oxide (ITO) onto a glass or plastic substrate, 1410. In some embodiments, one or more electrode layers are etched in specific patterns in order to be able to produce a spatially varying potential within the LC cell. A layer of a transparent insulator, such as SiO2, 1412, is deposited on top of the patterned electrode, 1402. The SiO2 is etched to expose a small patch of each electrode, 1402. Electrical conductors, such as Nickel bus lines, 1414, are then connected to the electrodes, 1402, 1404, and 1406, at these exposed patches. Preferentially, another layer of SiO2, 1412, is deposited on top of the Nickel bus lines, 1414, to protect them from damage. In some embodiments, the electronically floating layer of transparent electrodes, 1404, is deposited on top of the SiO2 layer, 1412. This layer contains an etched pattern of floating electrodes, 1404. The floating electrodes, 1404, are etched into a spatially varying pattern, like the patterned electrodes, 1402. Gaps between electrodes in a floating electrode layer can cause narrow regions within the LC material to be less affected by electrical potential and thus to be not properly oriented. The narrow regions of improperly oriented LC material cause phase variations and introduce haze, or reduced contrast. In some embodiments, the etched pattern of the floating electrodes, 1404, coincide with the gaps in the patterned electrode, 1402. In some embodiments, the floating electrodes, 1404, are patterned such that each floating electrode is roughly half the width of the corresponding patterned electrode, 1402, such that each floating electrode is wide enough to cover a gap between patterned electrodes, and at least ¼ of each of the patterned electrodes adjacent the gap. The floating electrode through capacitive coupling, will be at an average potential between the two adjacent patterned electrodes it is overlaid upon. This effectively multiplies the number of electrode regions (or steps) increasing the wavefront correctors resolution without increasing the required number of electrical connections. The floating electrode layer therefore, acts to smooth the wave front correction, which decreases the scattered light from gaps between patterned electrodes. The Strehl ratio may be used to indicate the effects of the floating electrode on the performance of a wave front corrector. A typical wave front corrector having only patterned electrodes, with gaps between electrodes will yield a Strehl ratio of greater than 0.6, and typically greater than 0.8. A wave front corrector additionally employing a floating electrode pattern will typically have a Strehl ratio greater than 0.7, and typically greater than 0.9. In some embodiments, more than one floating electrode layer is used per patterned electrode layer to further increase the resolution of the wave front corrector. For example, if one floating electrode layer is used to bridge the gaps between a patterned electrode layer, the number of electrodes, and resolution of the wave front corrector doubles. To complete the LC cell, each electrode is coated with a standard alignment layer, 1416, deposition and rubbing procedure. Polyimide may be used for the alignment layer, 1416. In order to efficiently produce wave front corrections that are specific to certain aberration sources, transparent electrode layers are patterned according to the Zernike mode they are designed to excite.

Figure 15A:
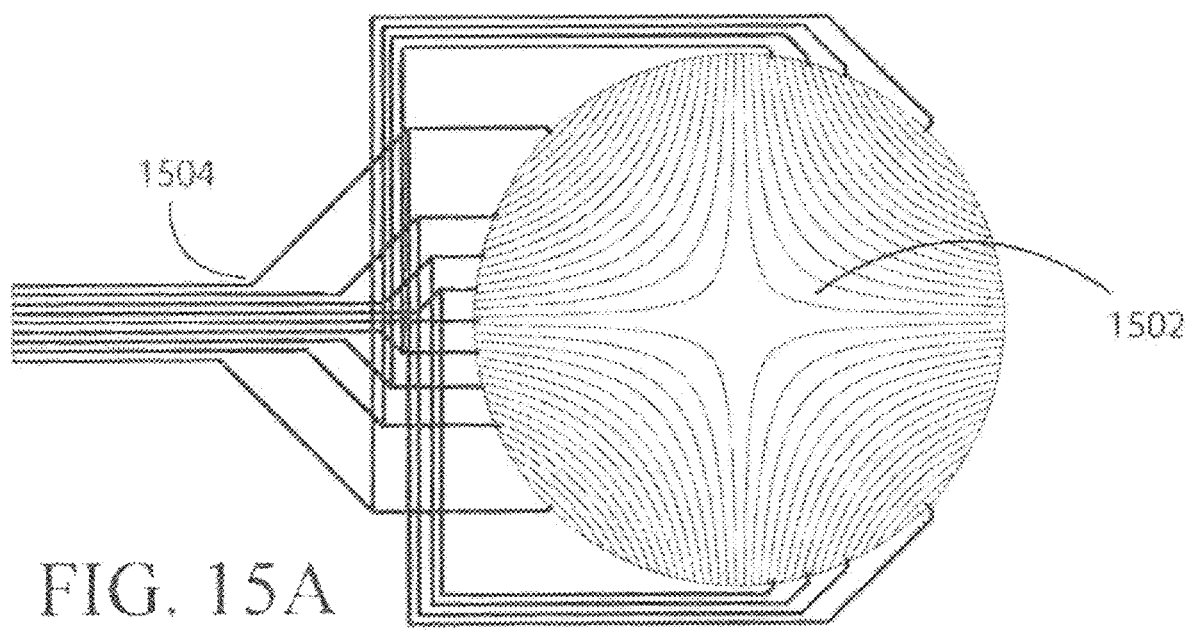
FIGS. 15A-15B depict an etched electrode pattern for a wave front corrector that corrects Zernike mode 5 and Zernike mode 6 according to some embodiments.
Figure 15B:
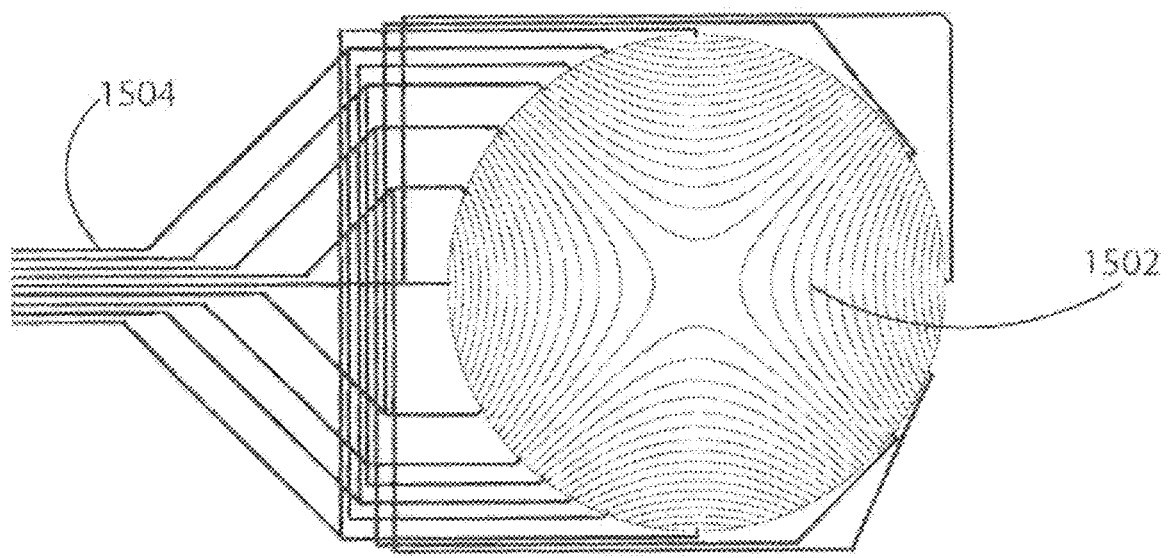

In some embodiments, a wave front corrector is configured with one or more layers, comprising transparent electrodes, 1502, that are patterned to excite Zernike mode Noll index Nos. 5 and 6. Transparent electrode patterns that correct Noll-ordered Zernike modes 5 and 6 are depicted in FIGS. 15A and 15B. In some embodiments, transparent electrodes, 1502, are arranged in a pattern similar to that illustrated in FIG. 15A, in order for the wave front corrector to selectively produce an oblique astigmatism (Zernike mode Noll index No. 5). Likewise, in some embodiments, transparent electrodes, 1502, are arranged in a pattern similar to that illustrated in FIG. 15B, in order for the wave front corrector to selectively produce a vertical astigmatism (Zernike mode Noll index No. 6). Electrical bus lines, 1504, are connected to roughly every third electrode.

Figure 16A:
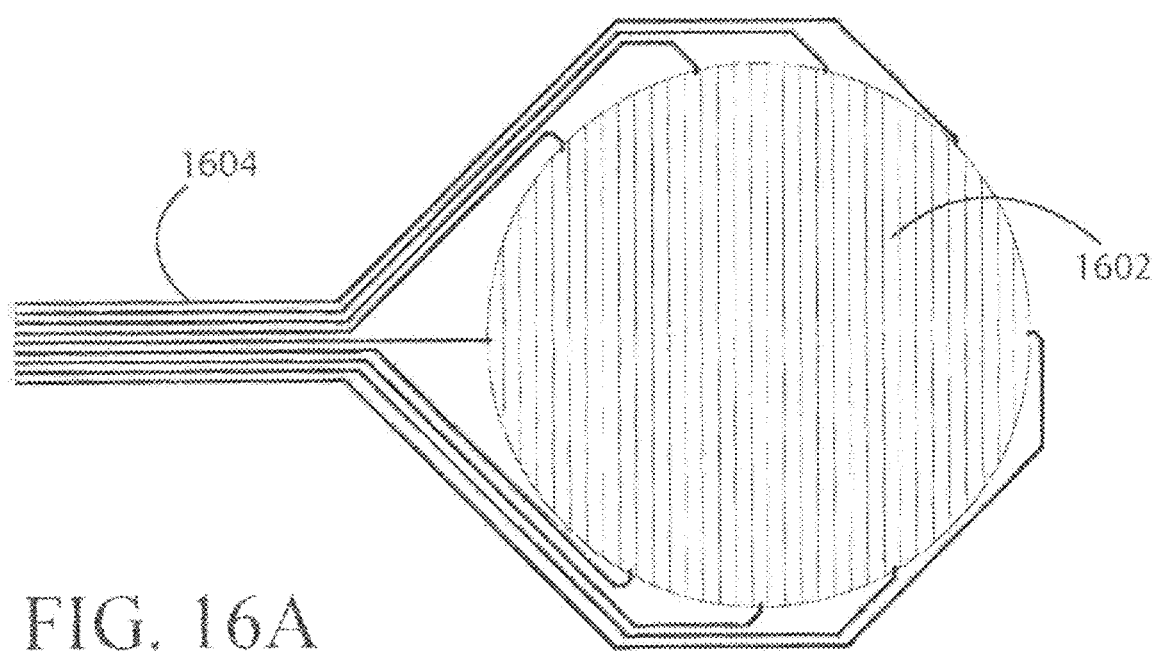
FIGS. 16A-16B depict an etched electrode pattern for a wave front corrector that corrects Zernike mode 2 and Zernike mode 3 according to some embodiments.
Figure 16B:
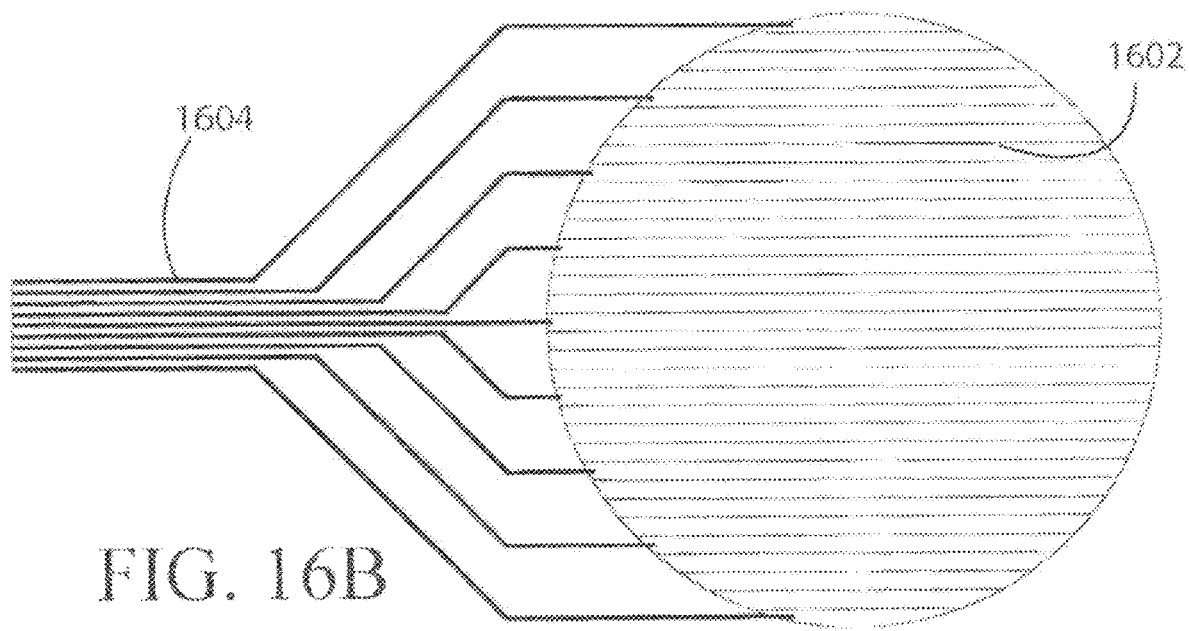

In some embodiments, a wave front corrector is configured with one or more layers, comprising transparent electrodes, 1602, which are patterned to excite Zernike mode Noll index Nos. 2 and 3. A wave front corrector acting on Zernike mode Noll index Nos. 2 and 3, is similar to a liquid crystal wedge, and introduces a tip/tilt. Transparent electrode patterns that correct Noll-ordered Zernike modes 2 and 3 are depicted in FIGS. 16A and 16B. In some embodiments, transparent electrodes, 1602, are arranged in a pattern similar to that illustrated in FIG. 16A, in order for the wave front corrector to selectively produce a tip (Zernike mode Noll index No. 2). Likewise, in some embodiments, transparent electrodes, 1602, are arranged in a pattern similar to that illustrated in FIG. 16B, in order for the wave front corrector to selectively produce a tilt (Zernike mode Noll index No. 3). Electrical bus lines, 1604, are connected to roughly every third electrode.

Figure 17:
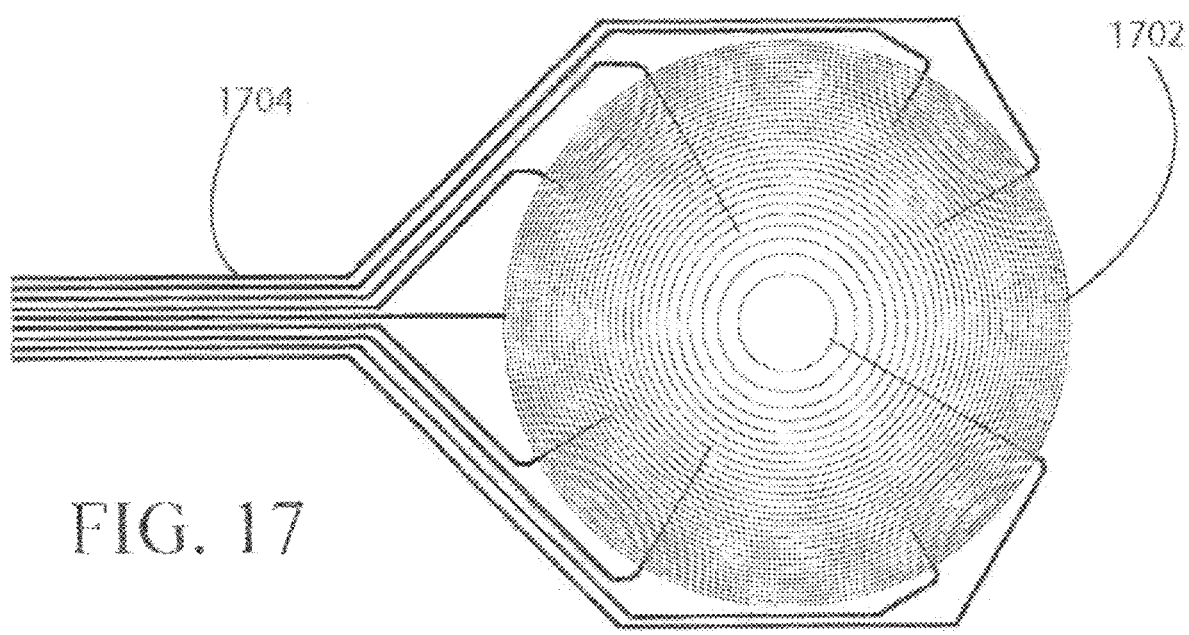
FIG. 17 depicts an etched electrode pattern for a wave front corrector that corrects Zernike mode 4 according to some embodiments.

In some embodiments, a wave front corrector is configured with one or more layers, comprising transparent electrodes, 1702, which are patterned to excite Zernike mode Noll index No. 4. A transparent electrode pattern that corrects Noll-ordered Zernike mode 4 is depicted in FIG. 17. In some embodiments, transparent electrodes, 1702, are arranged in a pattern similar to that illustrated in FIG. 17, in order for the wave front corrector to selectively produce a focus (Zernike mode Noll index No. 4). Electrical bus lines, 1704, are connected to roughly every third electrode.

Figure 18A:
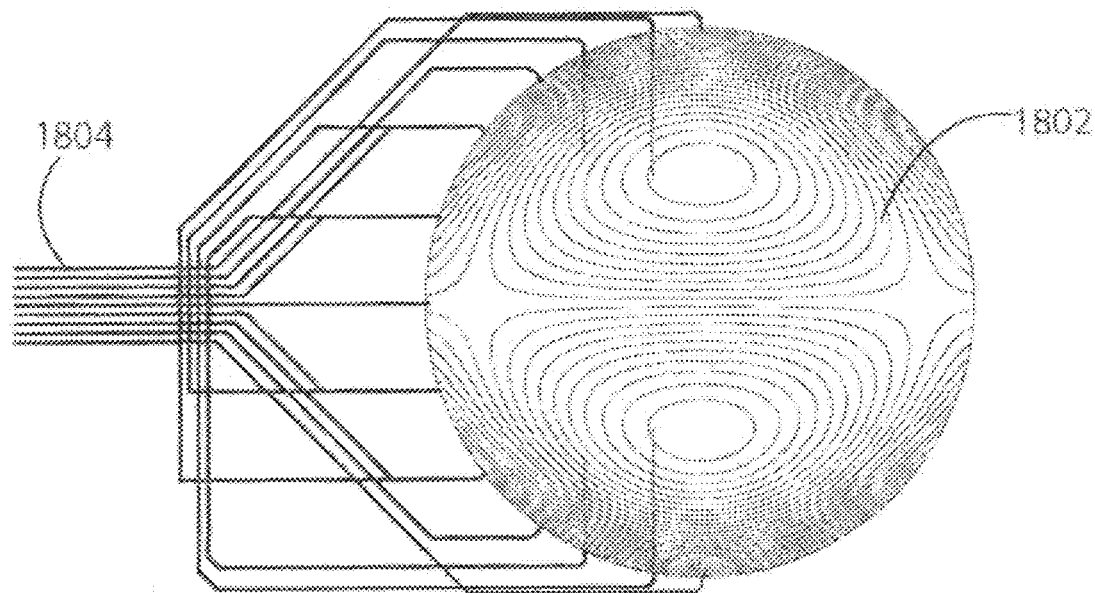
FIGS. 18A-18B depict an etched electrode pattern for a wave front corrector that corrects Zernike mode 7 and Zernike mode 8 according to some embodiments.
Figure 18B:
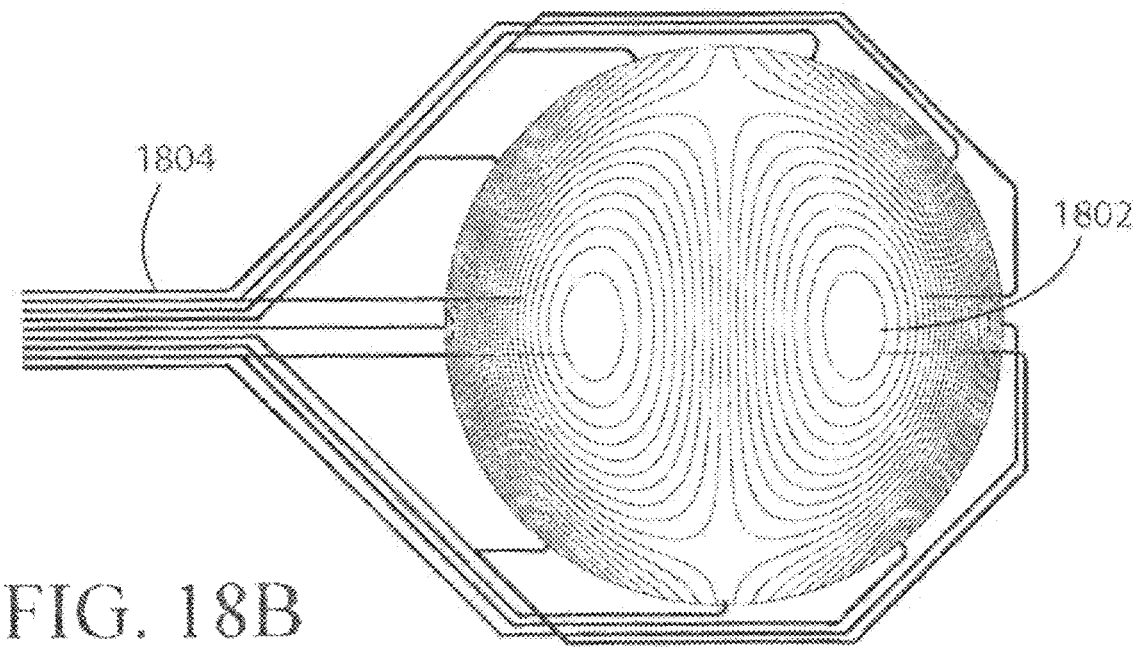

In some embodiments, a wave front corrector is configured with one or more layers, comprising transparent electrodes, 1802, which are patterned to excite Zernike mode Noll index Nos. 7 and 8. Transparent electrode patterns that correct Noll-ordered Zernike modes 7 and 8 are depicted in FIGS. 18A and 18B. In some embodiments, transparent electrodes, 1802, are arranged in a pattern similar to that illustrated in FIG. 18A, in order for the wave front corrector to selectively produce a vertical coma (Zernike mode Noll index No. 7). Likewise, in some embodiments, transparent electrodes, 1802, are arranged in a pattern similar to that illustrated in FIG. 18B, in order for the wave front corrector to selectively produce a horizontal coma (Zernike mode Noll index No. 8). Electrical bus lines, 1804, are connected to roughly every third electrode.

Figure 19A:
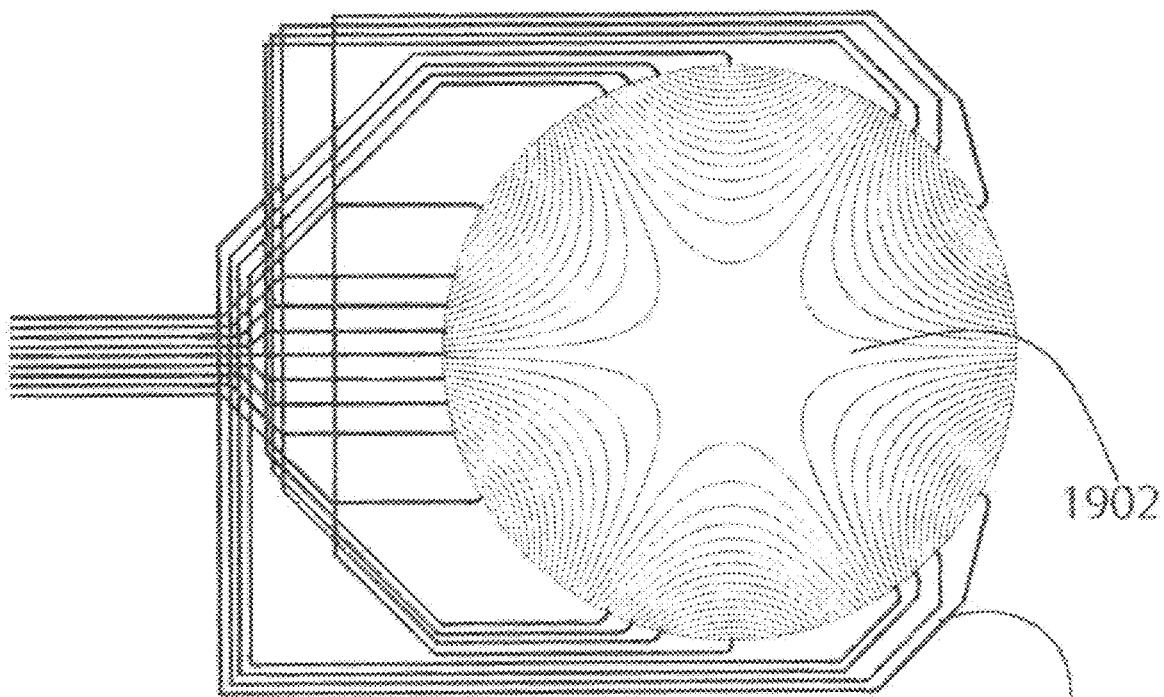
FIGS. 19A-19B depict an etched electrode pattern for a wave front corrector that corrects Zernike mode 9 and Zernike mode 10 according to some embodiments.
Figure 19B:
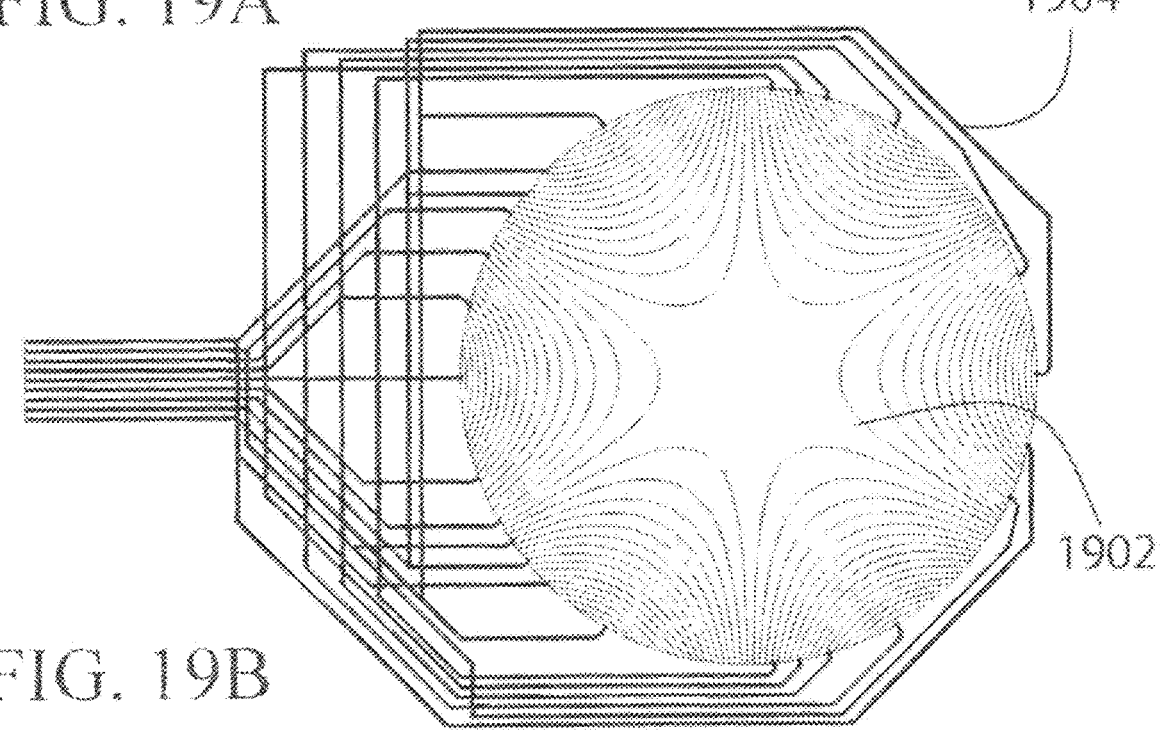

In some embodiments, a wave front corrector is configured with one or more layers, comprising transparent electrodes, 1902, which are patterned to excite Zernike mode Noll index Nos. 9 and 10. Transparent electrode patterns that correct Noll-ordered Zernike modes 9 and 10 are depicted in FIGS. 19A and 19B. In some embodiments, transparent electrodes, 1902, are arranged in a pattern similar to that illustrated in FIG. 19A, in order for the wave front corrector to selectively produce a vertical trefoil (Zernike mode Noll index No. 9). Likewise, in some embodiments, transparent electrodes, 1902, are arranged in a pattern similar to that illustrated in FIG. 19B, in order for the wave front corrector to selectively produce an oblique trefoil (Zernike mode Noll index No. 10). Electrical bus lines, 1904, are connected to roughly every third electrode.

Figure 20:
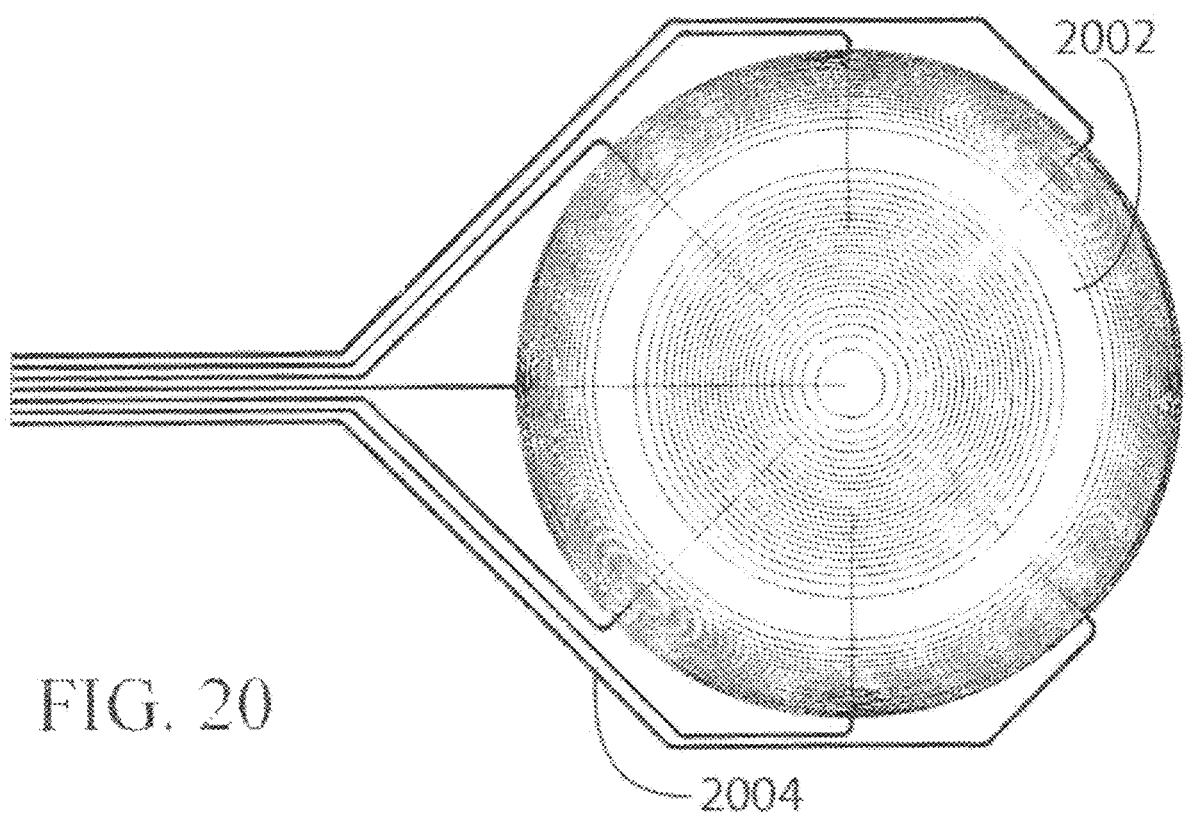
FIG. 20 depicts an etched electrode pattern for a wave front corrector that corrects Zernike mode 11 according to some embodiments.

In some embodiments, a wave front corrector is configured with one or more layers, comprising transparent electrodes, 2002, which are patterned to excite Zernike mode Noll index No. 11. A transparent electrode pattern that corrects Noll-ordered Zernike mode 11 is depicted in FIG. 20. In some embodiments, transparent electrodes, 2002, are arranged in a pattern similar to that illustrated in FIG. 20, in order for the wave front corrector to selectively produce a primary spherical mode (Zernike mode Noll index No. 11). Electrical bus lines, 2004, are connected to roughly every third electrode.

In some embodiments, a wave front corrector is configured with one or more layers, comprising transparent electrodes, which are patterned to excite Zernike mode Noll index Nos. greater than 11. These patterns are not shown.

Wave Front Corrector Parameters Chart

Parameters related to wave front correctors are outlined in Table 4:

TABLE 4

| | Minimum | Reference | Maximum |
|---|---|---|---|
| No. Patterned Electrode Layers (−) (Not including floating electrode layers) | 1 | 10 | 25 |
| No. Floating Electrode Layers (−) | 0 | 10 | 50 |
| Clear Aperture Diameter (mm) | 0.1 mm | 6 mm | 50 mm |
| No. Regions in Patterned Electrode (−) Note: Minimum width of a transparent electrode is typically about 200 nm | 2 | 33 | 1000 |
| Width of gap between electrodes (um) Note: Gap width is ideally as small as possible | 1 | 3 | 500 |
| No. Zernike Modes Produced (−) | 1 | 10 | 25 |
| Thickness (mm) | 0.1 mm | ~3 mm | 50 mm |
| Switching Frequency (Hz) | <1 Hz | 240 Hz | 5 KHz |
| Electrode Polarity Alternating Rate (KHz) | <60 Hz | 2 KHz | 100 KHz |
| Operable Wavelengths (nm) | Achromatic within 400-700 nm range, and Monochromatic, and IR 700-1500 nm. | | |
| Location in Optical System | At pupil plane, and outside of pupil plane | | |
| Application | Display Systems: Augmented Reality HMD, Virtual Reality HMD, etc. Imaging Systems: Surveillance, Autonomous vehicle camera systems. etc. | | |

Specification for the wave front corrector, 1106, (depicted in FIG. 11) of the reference embodiment described above are included in Table 5, below:

TABLE 5

| | |
|---|---|
| Aperture | 6 mm |
| Transparent Electrode Thickness | 20 nm |
| Etch Width Defining Electrode Regions | 3 μm |
| SiO2 Thickness | 130 nm |
| LC Cell Thickness | 10 μm |
| LC Material | Merck 18349 |
| Design Wavelength | 550 nm (Center of Visible Band) |
| Max. Optical Path Difference (OPD) | ~3.3λ |
| Electrode regions per mode | 33 |
| OPD per region | ~0.1λ |

Figure 21:
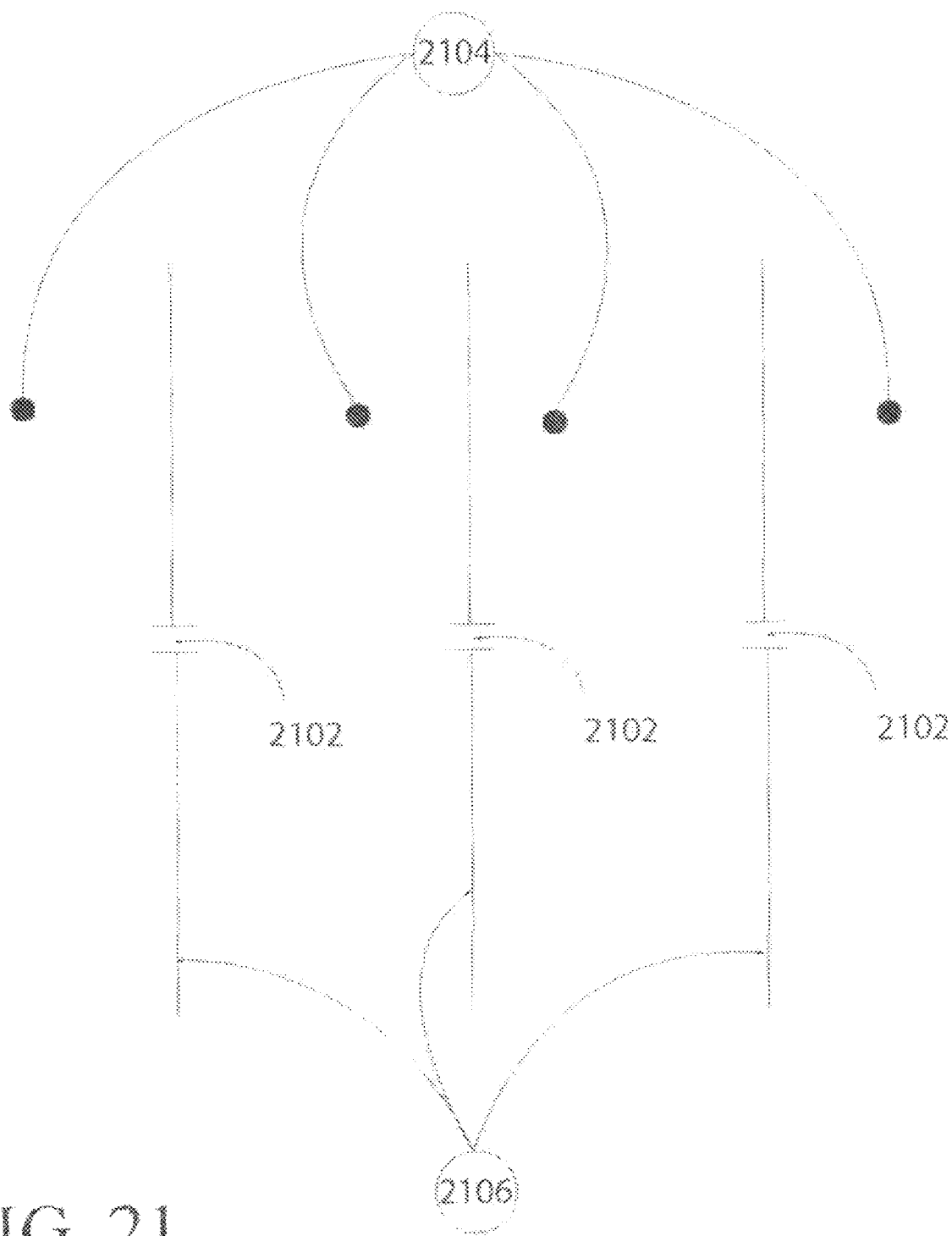
FIG. 21 shows transparent resistors connecting adjacent transparent electrodes according to some embodiments.

In some embodiments, electrode layers of the wave front corrector, 1106, (depicted in FIG. 11) are additionally configured with transparent resistors, 2102, as depicted in FIG. 21. In some embodiments, the transparent resistors, 2102, are comprised of the same material as the transparent electrodes, 2104, preferably indium-tin-oxide (ITO). The transparent resistors, 2102, bridge etch lines, 2106, which separate electrodes, thereby electrically connecting adjacent electrodes, 2104, with a specified resistance. The reference embodiment comprises transparent resistors, 2102, having a width of 4.5 μm and a length of 9 μm. The electrical resistance provided by the transparent resistors is a function of the size of the transparent resistor, 2102. The thicker wider or larger in cross-sectional area the transparent electrode is, the lower the electrical resistance provided. Likewise, the longer the transparent electrode is the greater its electrical resistance. In some embodiments, the transparent resistors allow for multiple electrode regions, 2104, to be driven with a single conductor (depicted in FIGS. 15-20).

Figure 22A:
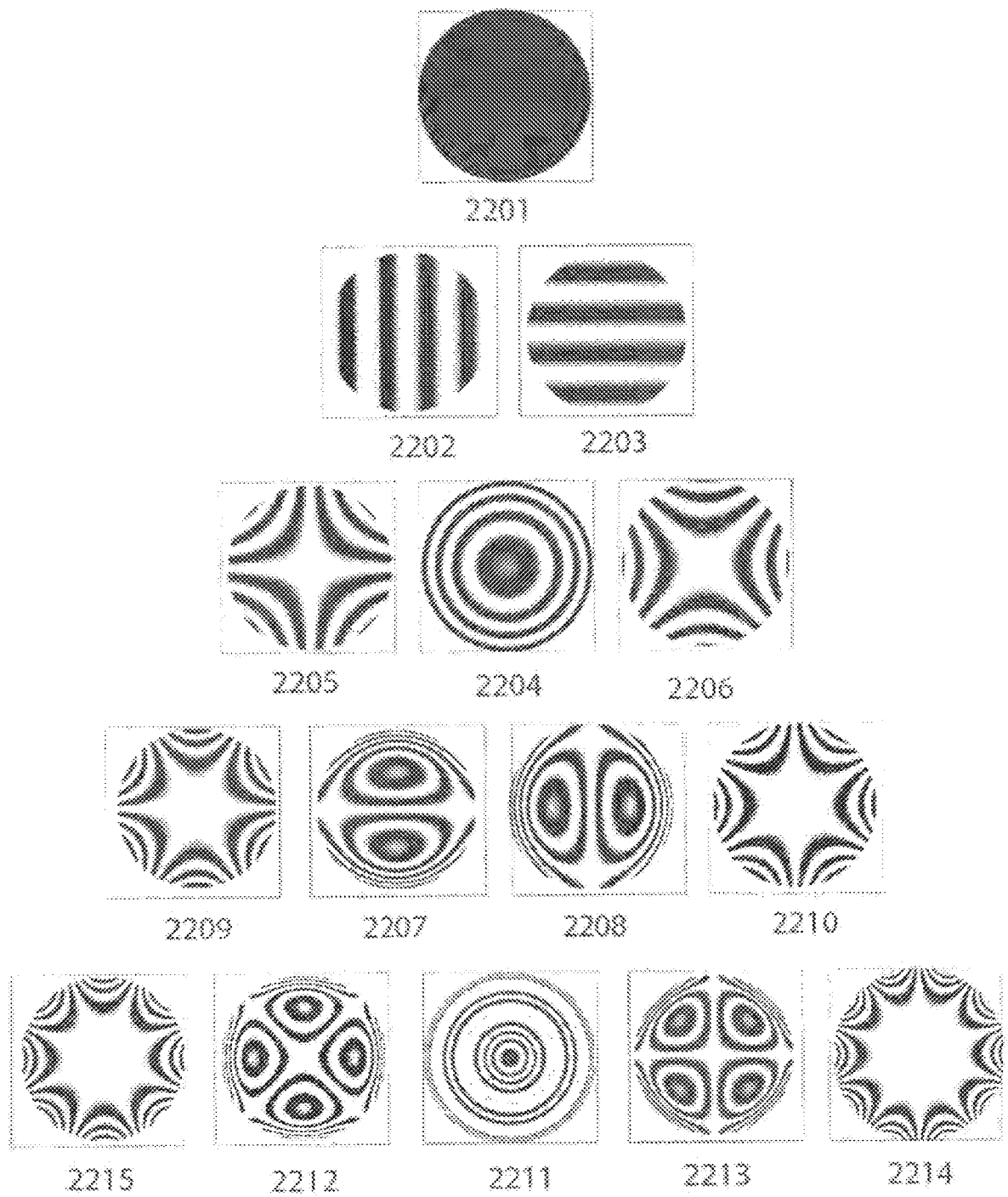
FIGS. 22A-22B illustrate Zernike modes at the pupil and image plane.
Figure 22B:
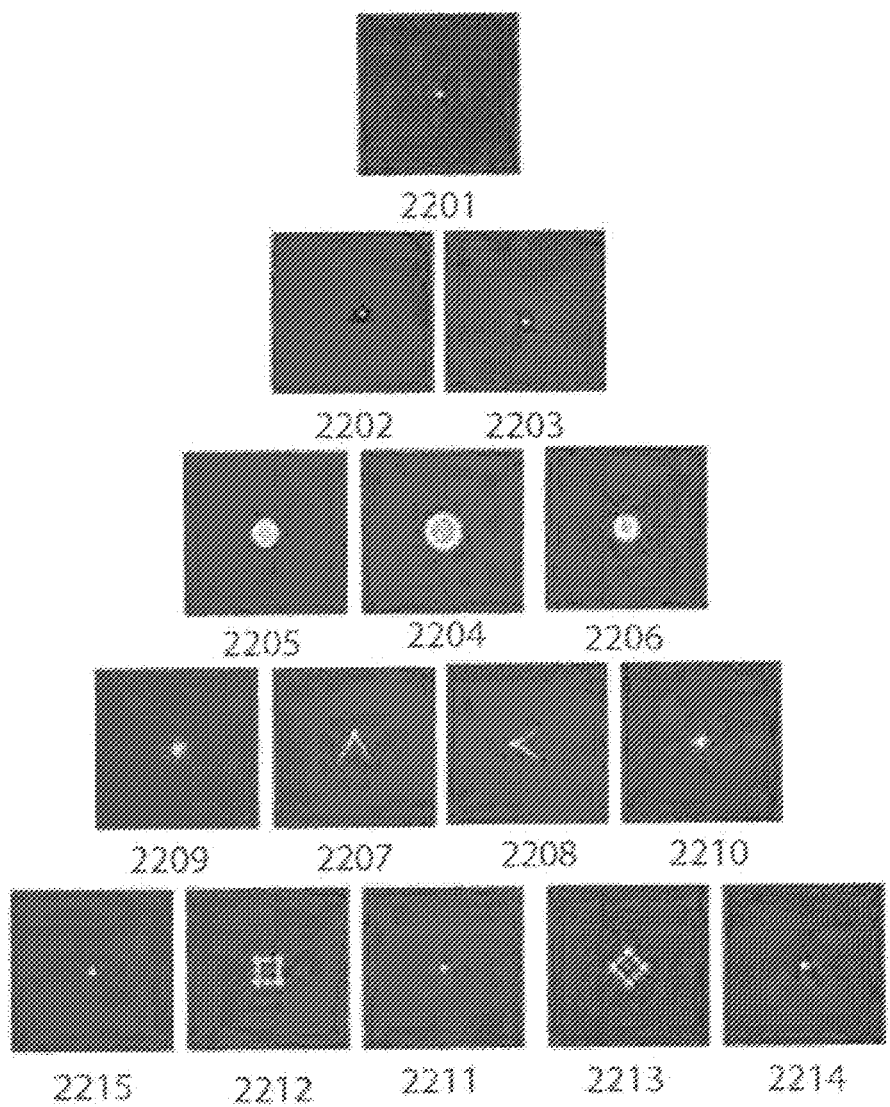

In some embodiments, wave front correctors are provided that have sufficient etched electrode patterns to correct Noll Order Zernike Modes 2-8. Other modes may also be corrected. For example, the reference embodiment described above is configured with a wave front corrector having sufficient etched electrode layers to correct Noll Order Zernike Modes 2-11. Optical performance for the reference embodiment is described below. The 15 Zernike Modes in the pupil plane are shown in FIG. 22A. The 15 Zernike Modes in the retinal plane are shown in FIG. 22B. The 15 Zernike Modes shown in FIGS. 22A and 22B comprise: Piston, 2201; tip, 2202; tilt, 2203; defocus, 2204; oblique astigmatism, 2205; vertical astigmatism, 2206; vertical coma, 2207; horizontal coma, 2208; vertical trefoil, 2209; oblique trefoil, 2210; primary spherical, 2211; vertical secondary astigmatism, 2212; oblique secondary astigmatism, 2213; oblique quadrafoil, 2214; and vertical quadrafoil, 2215.

Figure 23A:
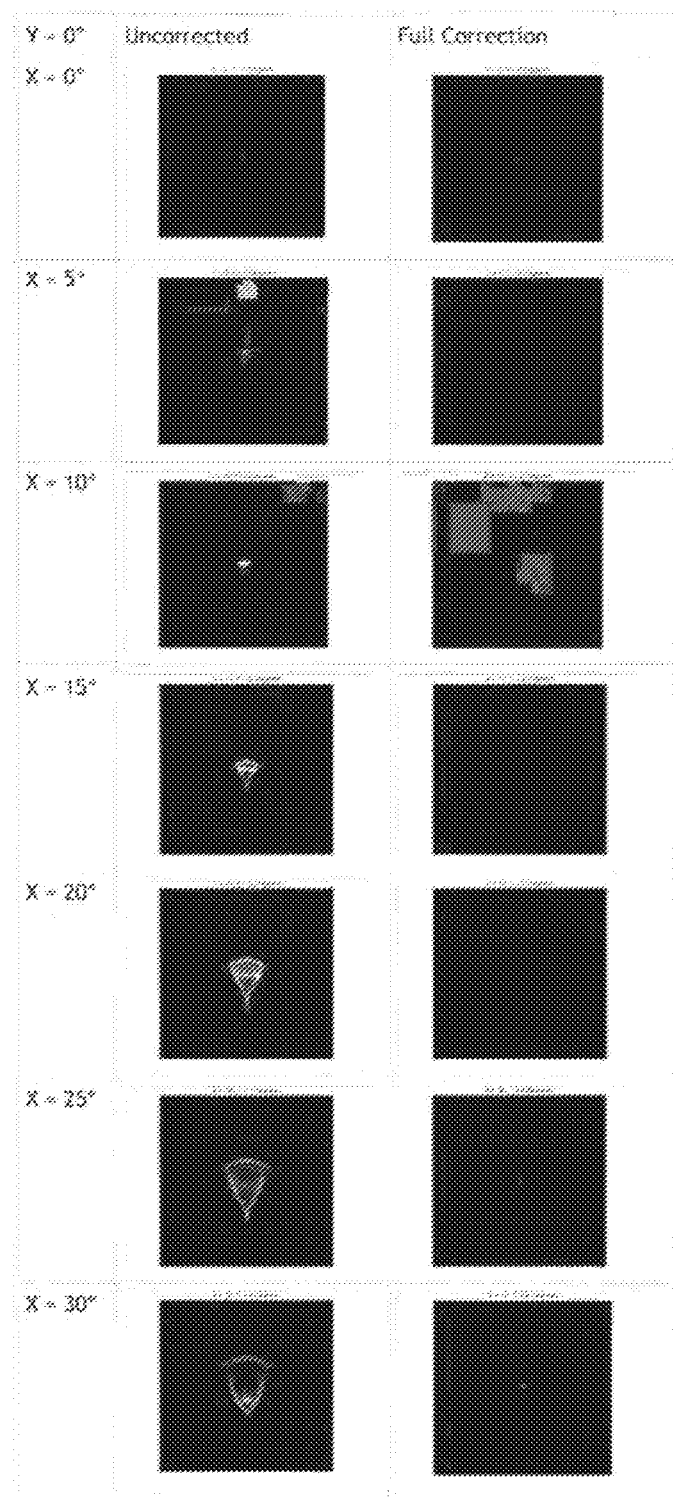
FIGS. 23A-23C contain corrected and uncorrected point source function images for a reference embodiment of a foveated optical system.
Figure 23B:
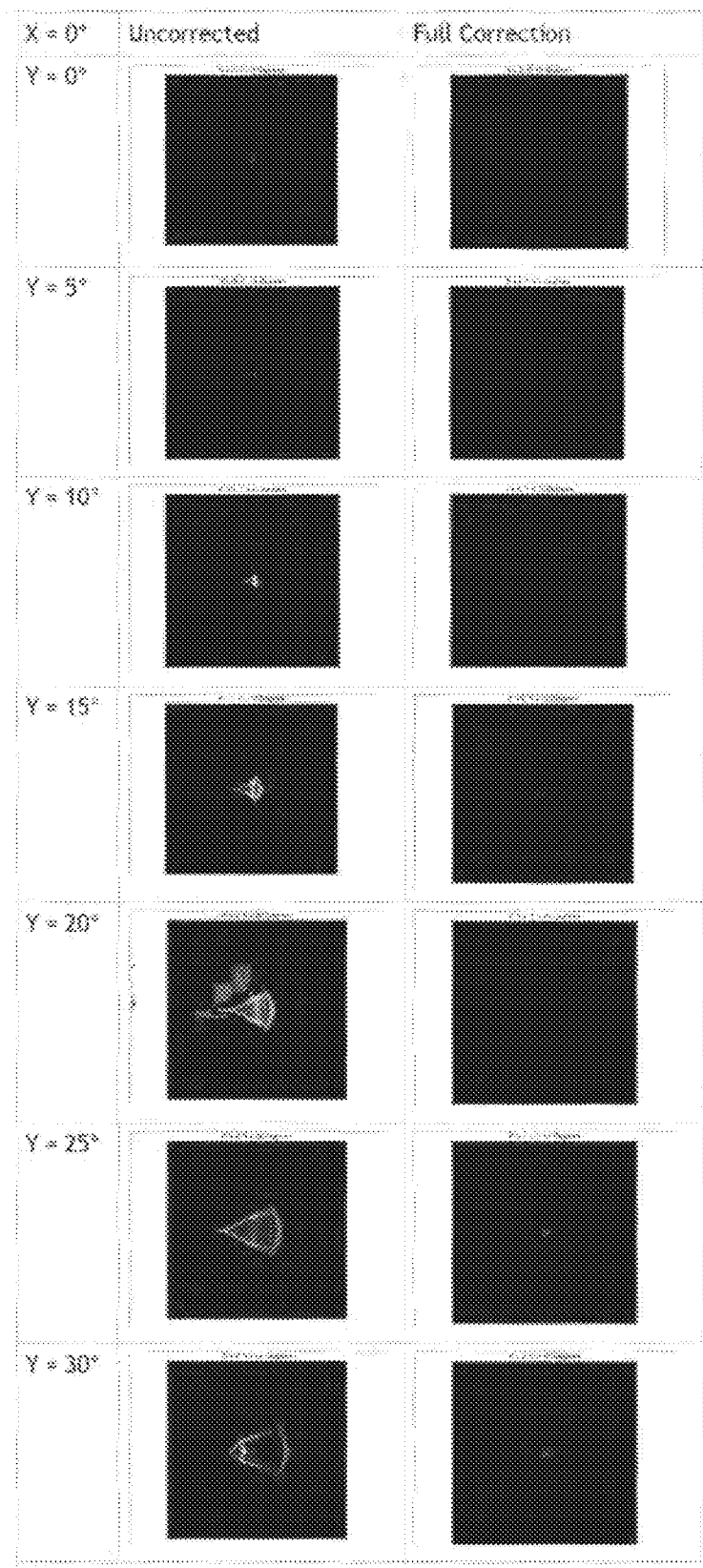
Figure 23C:
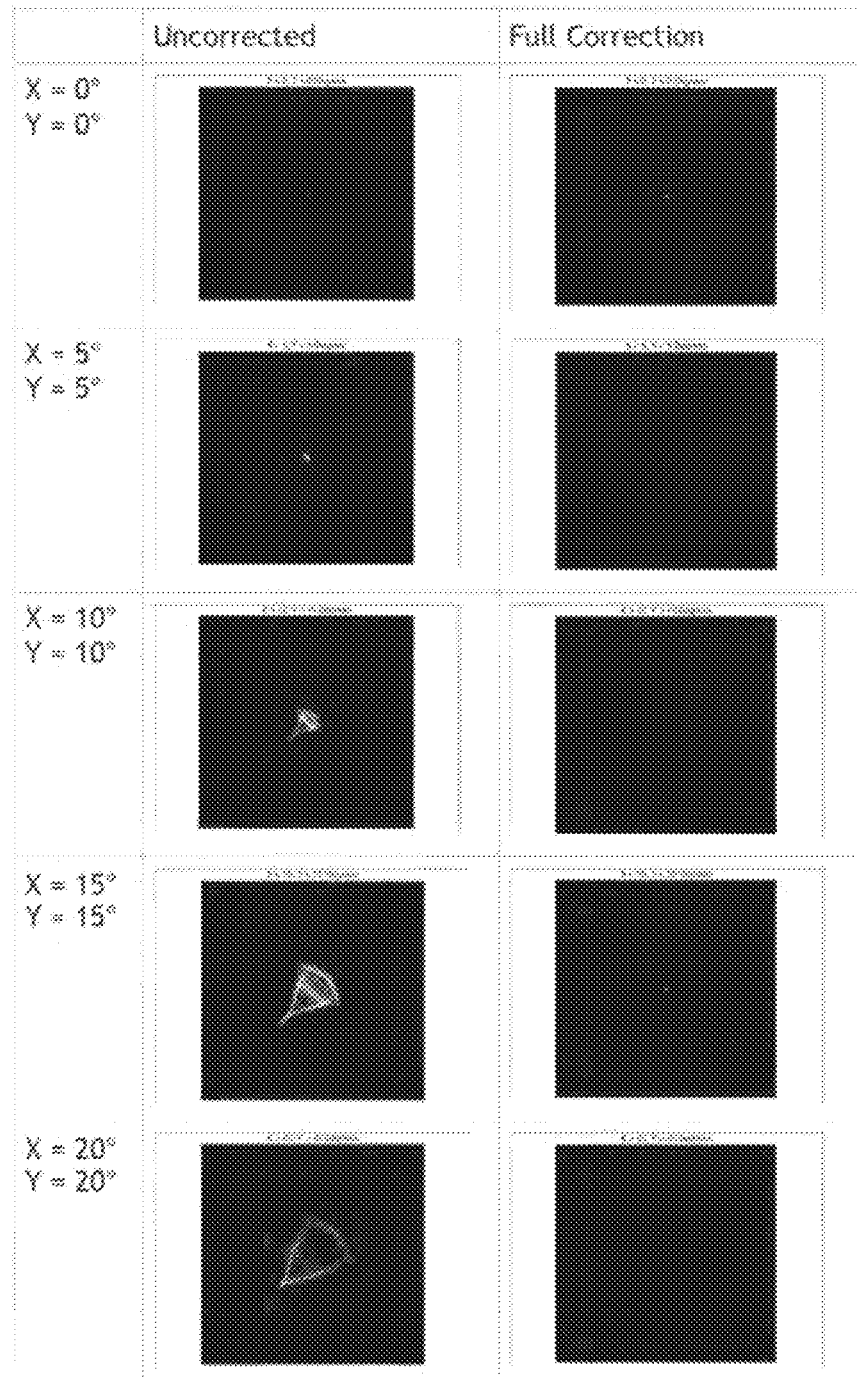
Figure 24A:
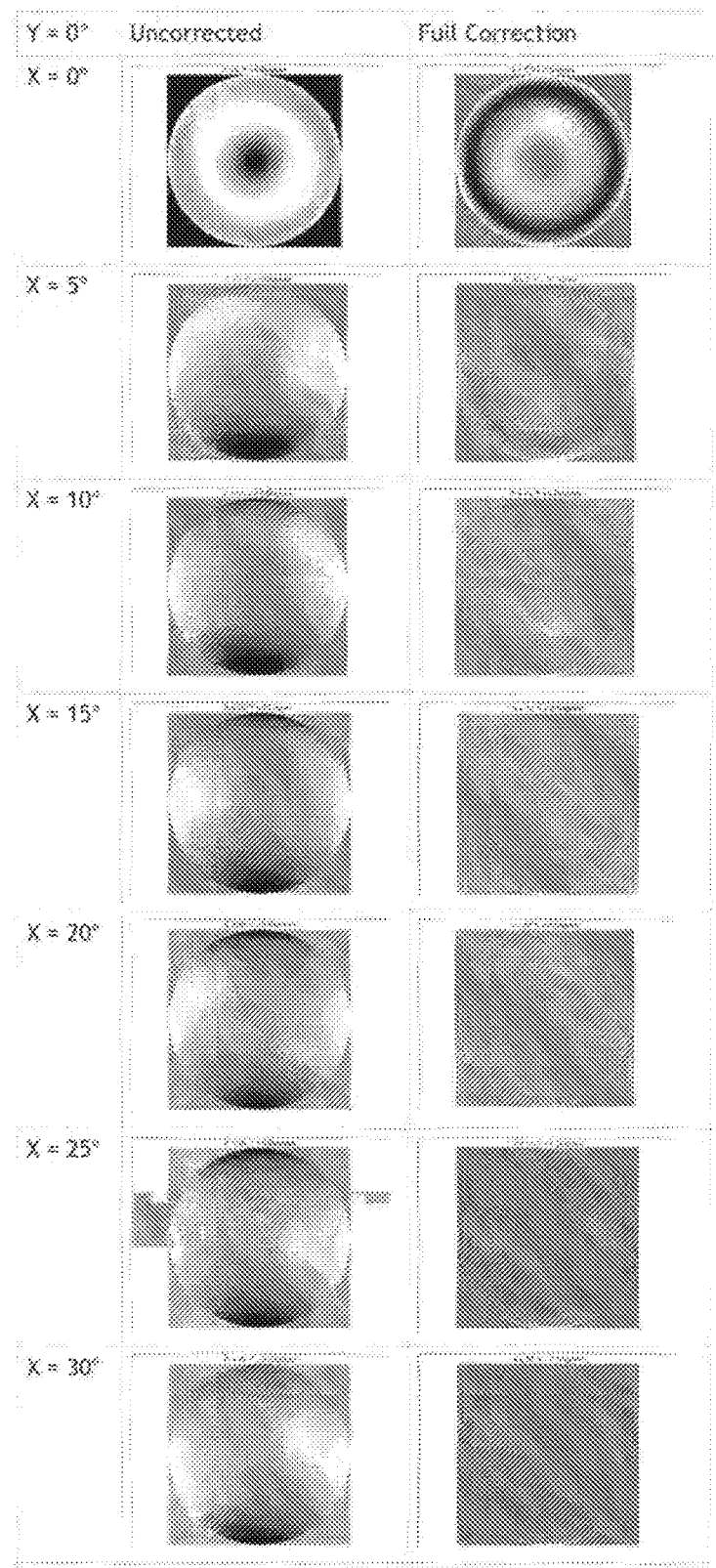
FIGS. 24A-24C contain corrected and uncorrected wave front images for a reference embodiment of a foveated optical system.
Figure 24B:
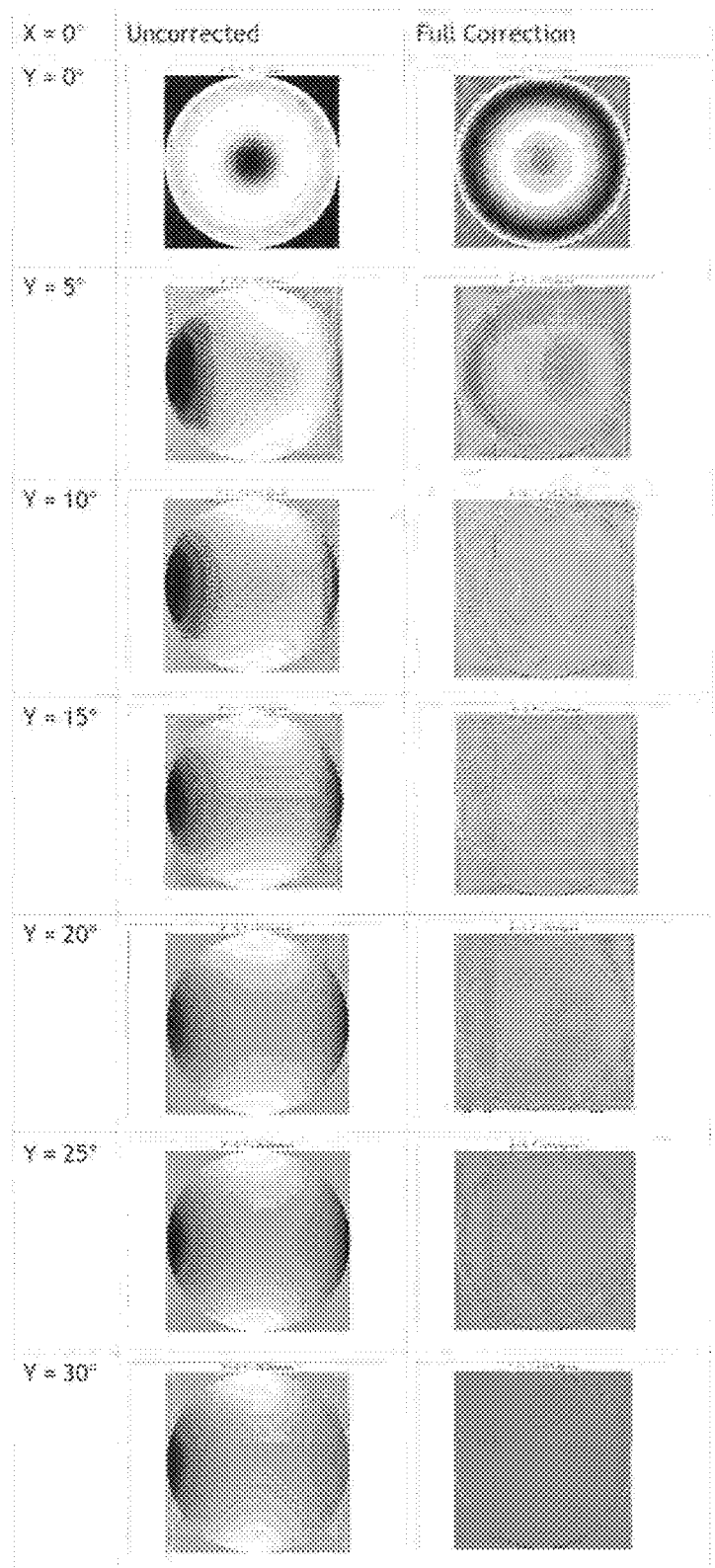
Figure 24C:
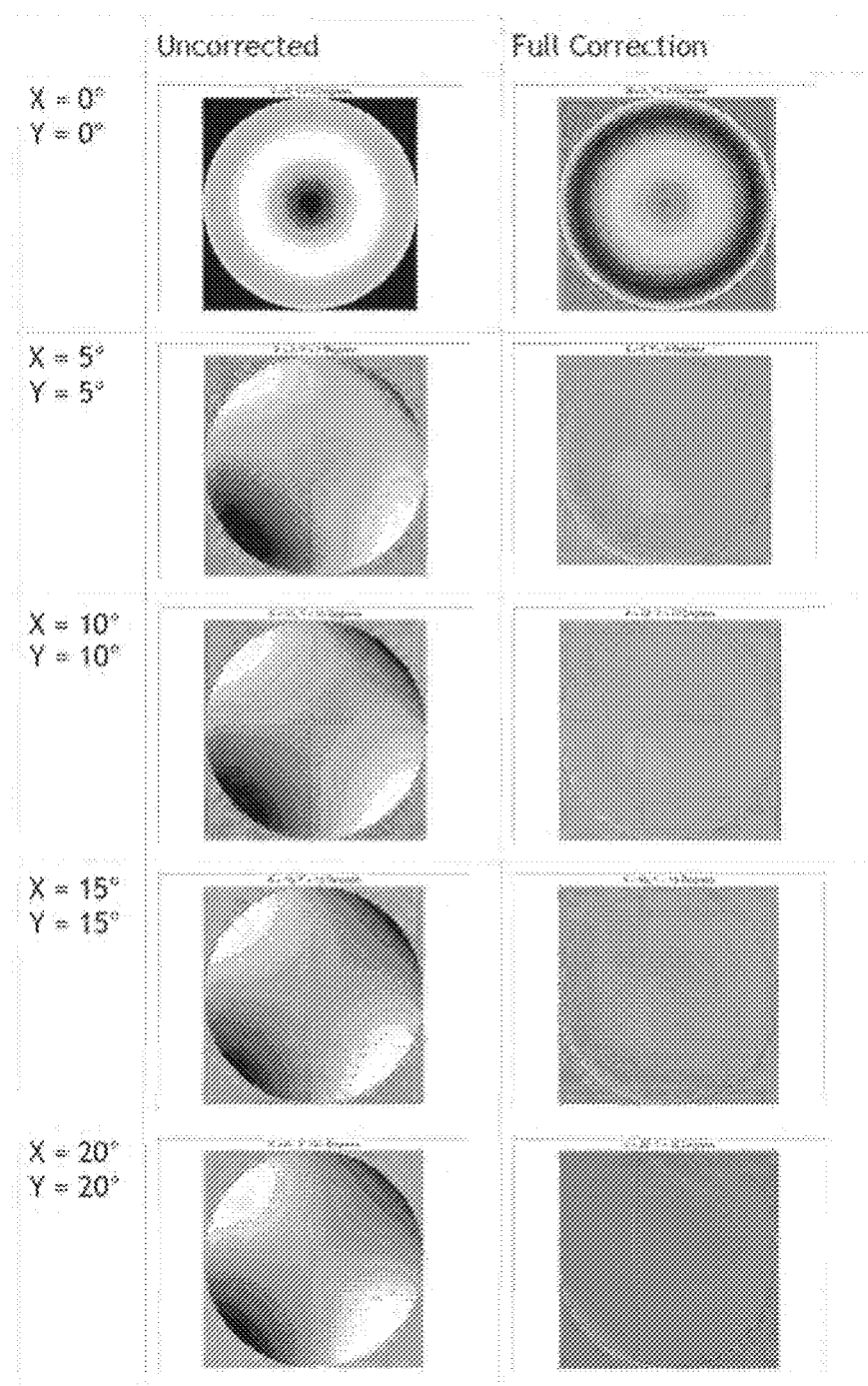

FIGS. 23A-23C contain corrected and uncorrected point source function images for the reference embodiment described above. Full sized corrected and uncorrected point source function images corresponding to those shown in FIGS. 23A-23C are shown in FIGS. 60-93. FIGS. 24A-24C contain corrected and uncorrected wave front images for the reference embodiment described above. Full sized corrected and uncorrected wave front images corresponding to those shown in FIGS. 24A-24C are shown in FIGS. 94-127. It can be seen that uncorrected image quality decreases with increased field angle. Image quality at a given field angle increases as the wave front corrector is controlled to correct aberrant modes at a given field angle. A presently corrected area within the field of view is defined as a region of interest. The region of interest has a size, determined by the foveated optical system design.

Figure 25A:
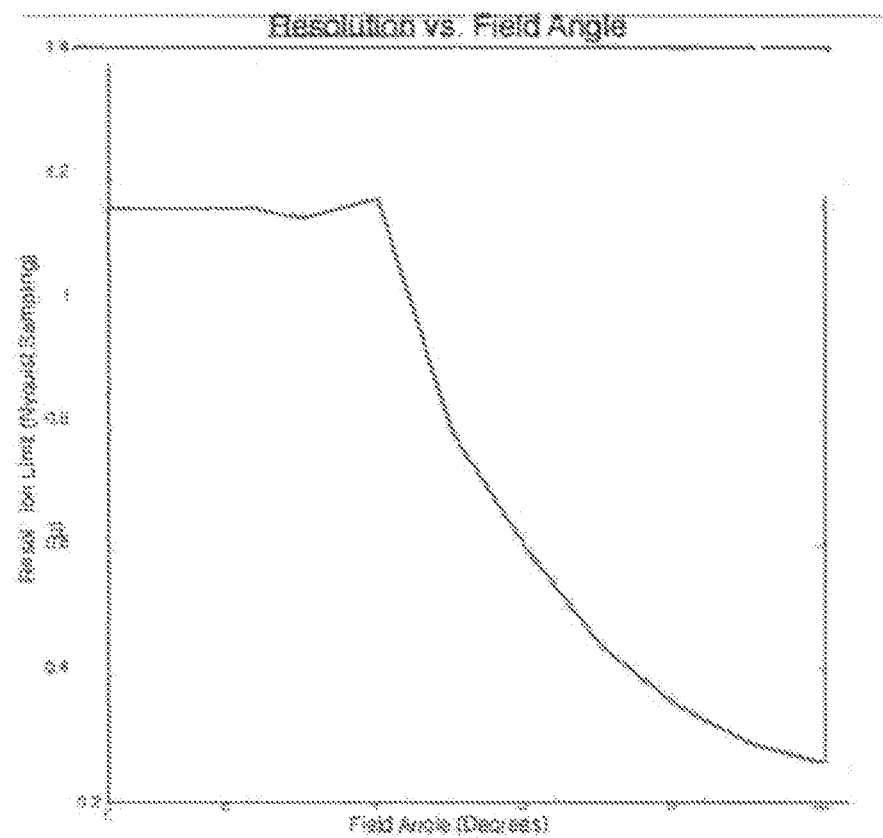
FIGS. 25A-25B are plots showing resolution limit as a function of field angle, defining a region of interest for a reference embodiment of a foveated optical system.
Figure 25B:
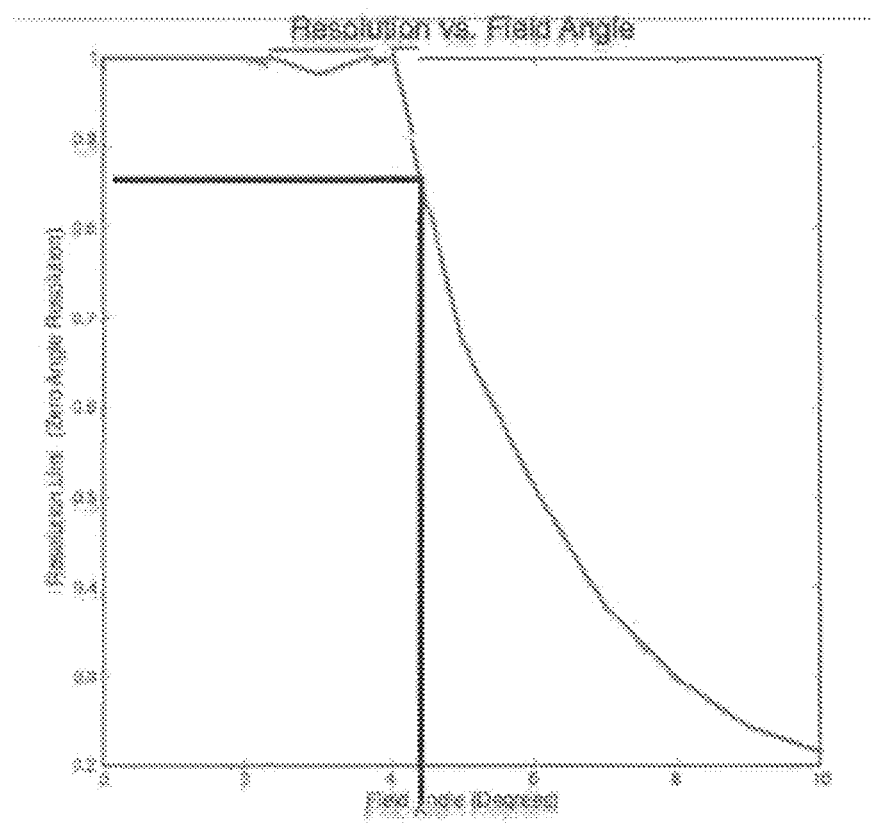

FIGS. 25A-25B are plots that show resolution limit as a function of field angle for a region of interest using the reference embodiment of a foveated optical system. In reference to FIGS. 25A-25B, resolution limit is defined as a spatial frequency where modulation transfer function (MTF) drops to 10%. The resolution limit in FIG. 25A is shown proportional to Nyquist sampling, where 2*Nyquist is defined as the ideal spatial frequency. The resolution limit in FIG. 25B is the same graph as FIG. 25A except that the resolution limit has been normalized, so that the highest resolution limit is equal to one (1.0). It can be appreciated from the graphs that there is no significant change to the resolution limit under 4° field angle, at which point the resolution limit decreases. It can be seen from FIG. 25B that at a field angle of approximately 4.5° the resolution has dropped 10%. Therefore, the region of interest can be said to have a size of approximately 9° total, or ±4.5°. Performance outlined in FIGS. 25A-25B was achieved without additional symmetric aberration correction by the wave front corrector. That is to say, focus and spherical aberrations were left uncorrected by the wave front corrector in the determination of these plots. With additional symmetric aberration correction provided by the wave front corrector, the region of interest will only increase in size. In some embodiments, the region of interest is as small as 1°, although a region of interest of at least 2° is preferred, and regions of interests greater than 15°, 30°, 45°, 60°, and 90° are possible depending on resolution limits. FIG. 25A shows a maximum resolution limit of just under 1.2*Nyquist. In other embodiments the foveated optical system preforms with a resolution limit greater than 1.2, 1.3, and 1.4*Nyquist. In still other embodiments, the foveated optical system has been configured such that the resolution limit of the system is reduced to below 1.0, 0.9, and 0.8*Nyquist in order for the region of interest size to be greater.

Figure 26:
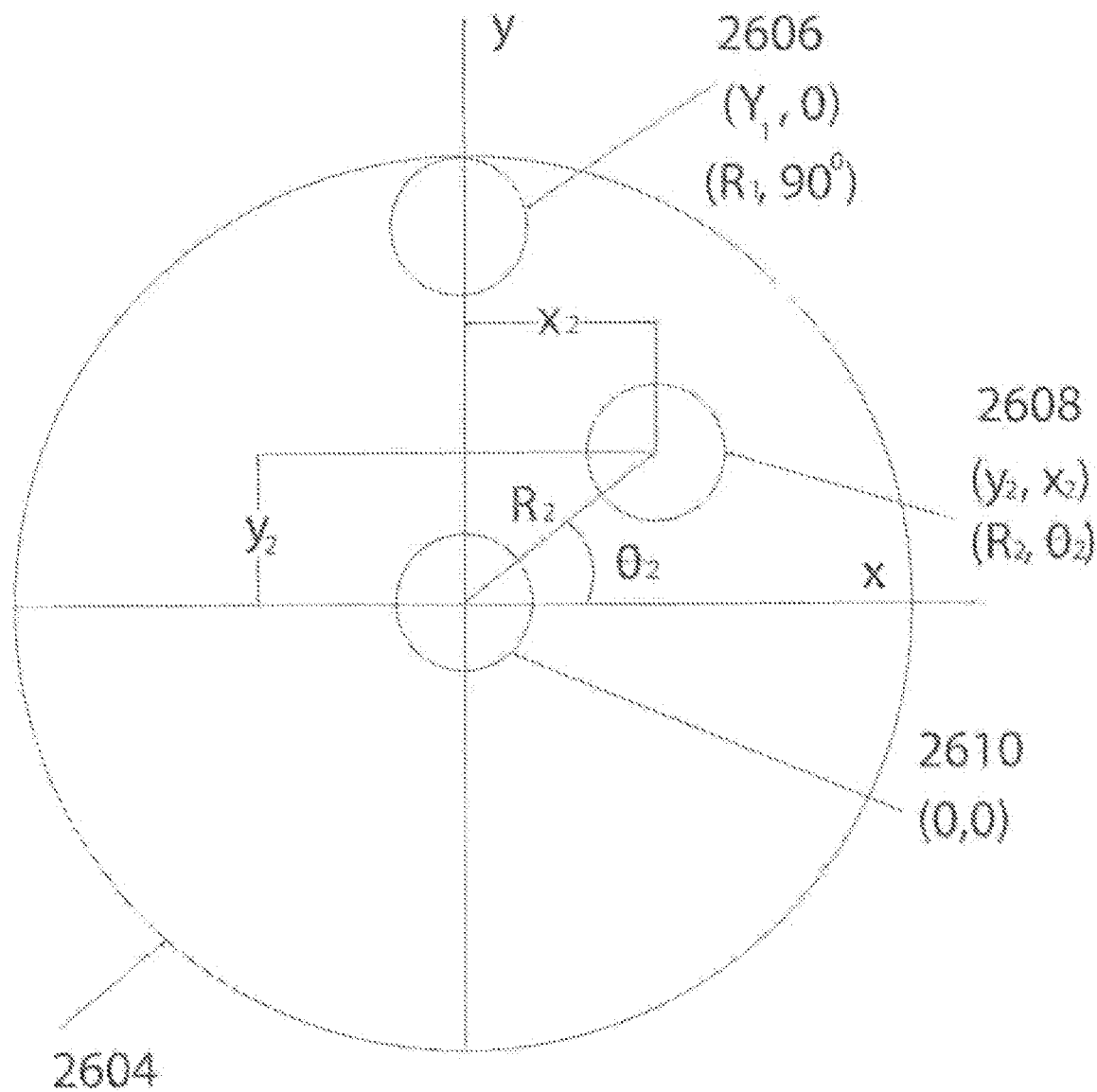
FIG. 26 depicts a wide field of view having selectable regions of interest according to some embodiments.

Referring to FIG. 26, in some embodiments, the region of interest may be selectably moved to any location within the field of view, 2604, by introducing wave front changes with the wave front corrector. A simplified example is provided by the reference embodiment, where the foveated optical system error is largely from a single mode at a certain field angle. Referring back to FIG. 12, it can be seen that at large field angles astigmatism, 1202, specifically Zernike Mode Noll index No. 6, or vertical astigmatism, provide the greatest wave front error. In order to effectively move the region of interest to a position, 2606, having a large field angle, such as $(Y_1, 0)$, a wave front change is introduced to correct the astigmatism at that location. Referring to FIG. 26, a second region of interest, 2608, is shown located in both Cartesian and Polar Coordinates. And, a third region of interest, 2610, is shown at an origin, or the center of the field of view, 2604. As described above, a wave front change is introduced by altering the index of refraction within a liquid crystal layer in a specific pattern. This is achieved by providing patterned transparent electrodes adjacent a liquid crystal layer with appropriate electrical potentials. In order to correct large vertical astigmatic modes, electrical potential must be provided to patterned electrodes, such that a wave front change is introduced. The wave front change acts on the light similarly to an appropriately powered cylindrical lens to correct the astigmatism.

Figure 27:
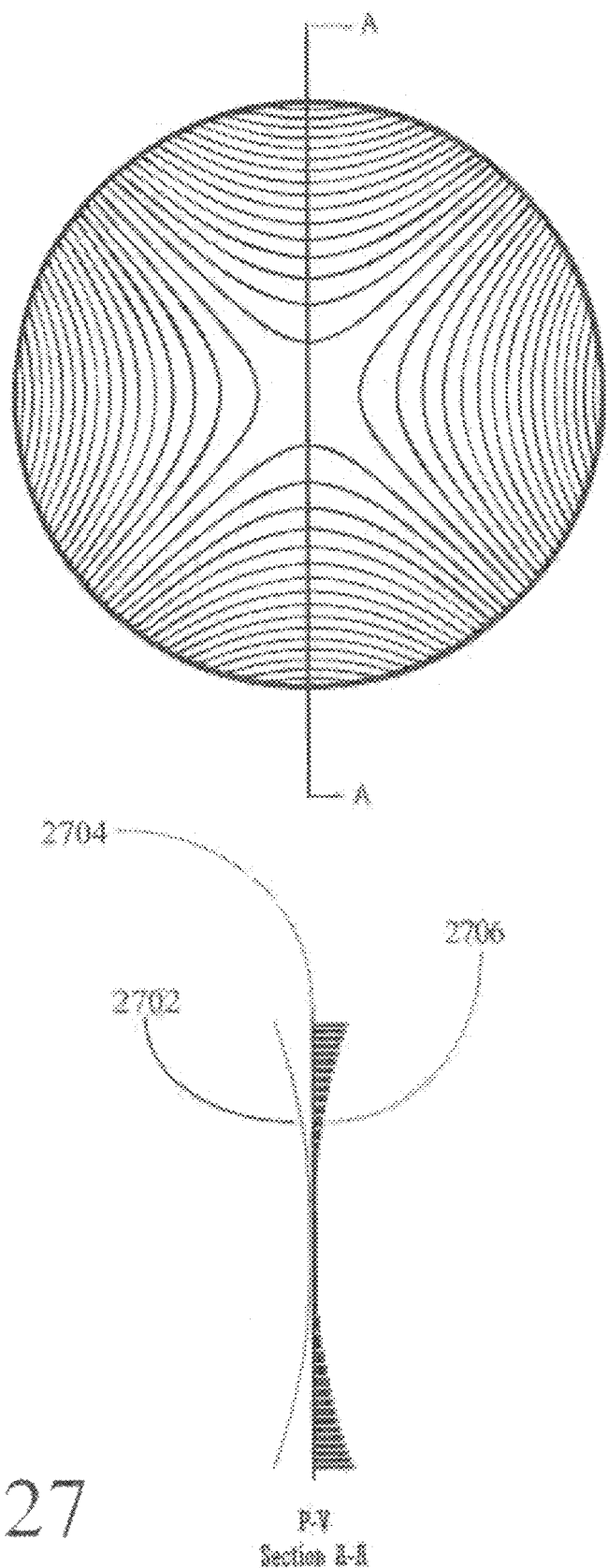
FIG. 27 illustrates wave front changes to correct an astigmatic aberration according to some embodiments.

Referring to FIG. 27, an electrode pattern for correcting vertical astigmatism is shown above, and an optical path difference plot (OPD) is shown below. The OPD plot shows the astigmatic error, 2702, along the vertical axis of the wave front corrector. The electrode pattern is arranged according to correct vertical astigmatism. Boundaries of the electrodes are contour lines of a vertical astigmatism wave front. Vertical astigmatism is a part of a Noll indexed Zernike basis set, and therefore a part of an orthonormal basis set. Because the electrode is patterned according to the mode of an orthonormal basis set, the wave front corrector may correct a single mode (astigmatism), without significantly impacting other modes. The OPD plot, 2704, additionally shows the wave front correction, 2706, introduced by the wave front corrector to correct the vertical astigmatic aberration. The electrode pattern is such that the highest frequency of electrodes are located where vertical astigmatism wave front changes are steep. Likewise, in the center of the wave front, where vertical astigmatic errors change more slowly, fewer electrodes are present. Thus, the residual wave front error is minimized, as the number of electrodes are conserved. An ideal wave front change to correct the vertical astigmatism is an equal and opposite wave front to the vertical astigmatism. FIG. 27 shows that the wave front change produced by the wave front corrector is not a smooth line, like the vertical astigmatism, but is comprised of a number of steps. Each step in a wave front change corresponds to an electrode. The difference between a wave front correction produced by the wave front corrector and an ideal wave front correction required to undo the wave front error is the residual wave front error. The residual wave front error, is less than 40%, and preferably less 20%, 10%, and 5%.

Figure 28:
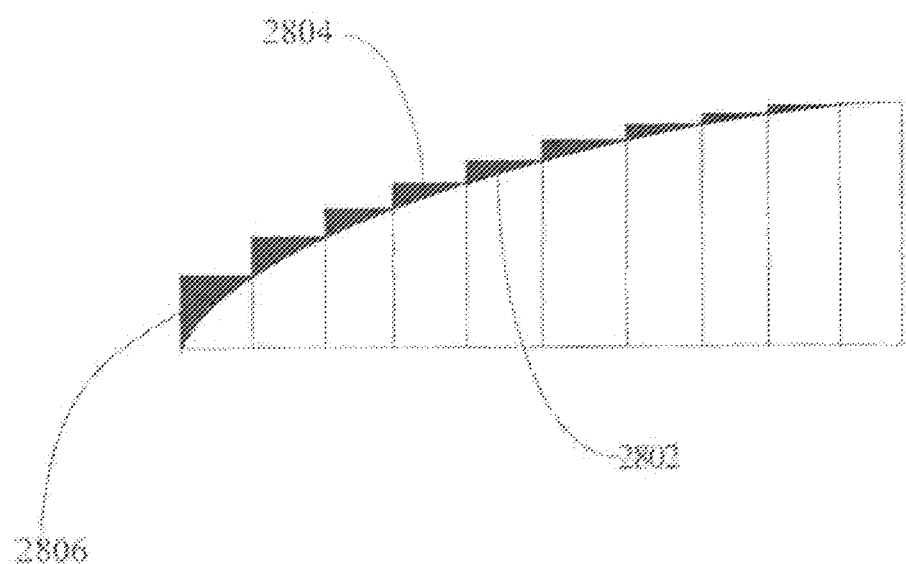
FIG. 28 illustrates wave front a stepped wave front compared to a desired non-stepped wave front according to some embodiments.

FIG. 28 illustrates an ideal or desired wave front change, 2802, and a stepped or actual wave front change, 2804. The difference between the stepped wave front change, 2804, and the ideal wave front change, 2802, is depicted as residual wave front error, 2806. More generally, deviations between a wave front change produced by a wave front corrector, 2804, and a corresponding ideal wave front change, 2802, can be defined proportionally. A wave front change, 2804, is considered 90% of an ideal wave front change, 2802, when the two changes differ by 10%. Or said another way, a wave front change, 2804, that corrects wave front error yielding a 10% residual wave front error, 2806, is considered 90% of an ideal wave front change, 2802, that corrects the entire wave front error.

Residual wave front error from the reference foveated optical system embodiment is qualitatively shown in corrected PSF and wave front images above. For the reference embodiment the measured Strehl ratio was greater than 96%.

Figure 29:
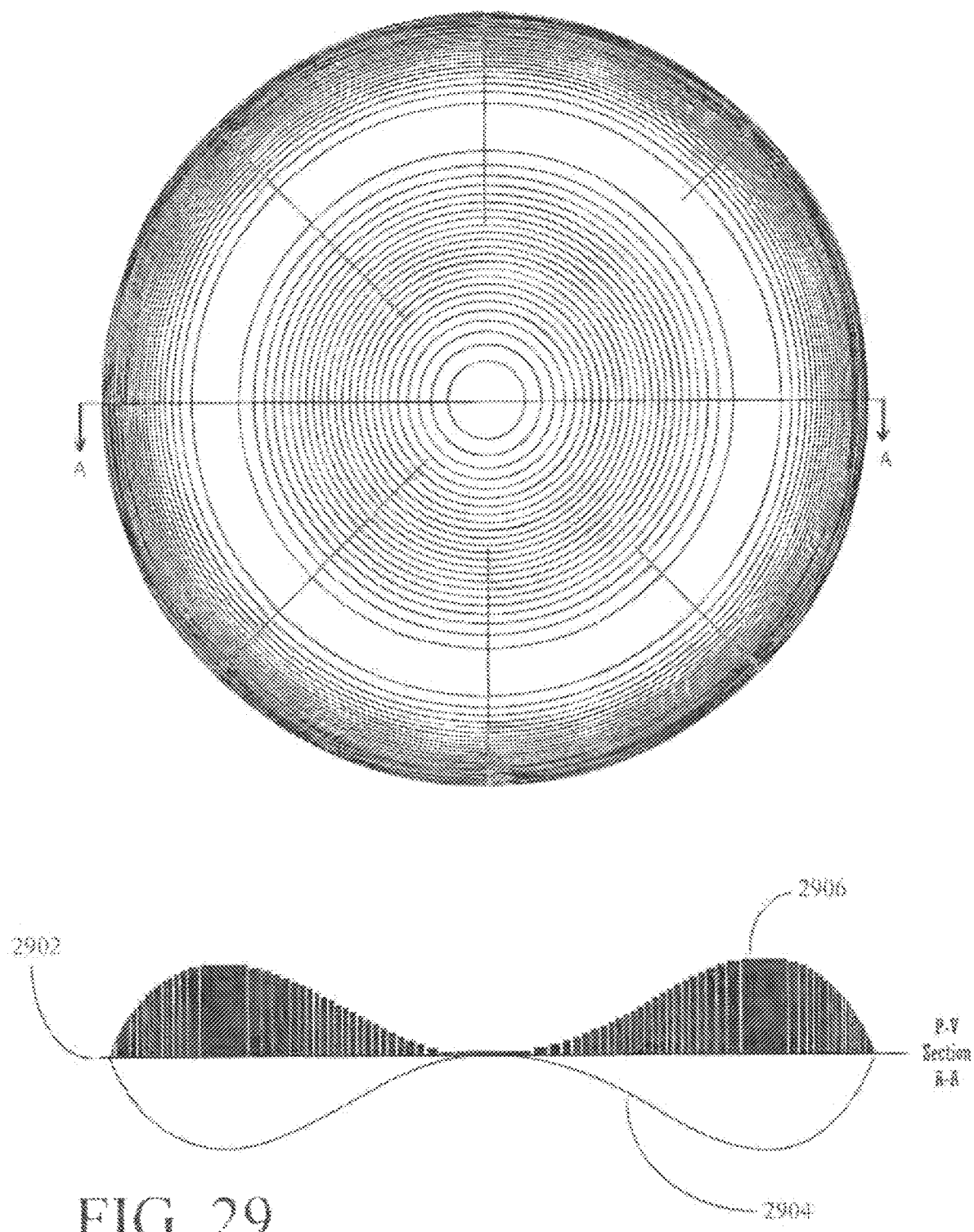
FIG. 29 illustrates wave front changes to correct a spherical aberration according to some embodiments.

FIG. 29 shows a wave front corrector electrode pattern arranged to produce spherical wave front changes. Divisions between electrodes are etched along contour lines of a spherical wave front. Contour lines typically are traced where the wave front is a constant value. For example, equi-phase contour lines trace over points of constant phase. In some embodiments, it is possible, but likely disadvantageous, to have the divisions of the electrodes located on lines that are traced where the wave front value is within a certain range, but not exactly constant. For example, in some embodiments electrode divisions are traced where wave front values are within 50%, 30%, 20% or 10% of a constant value. An exemplary spherical wave front electrode pattern may be created having electrode divisions, which for manufacturing reasons, are rectilinear, so long as the divisions are traced over areas where a spherical wave front having a near constant value. In such non-ideal embodiments, wave front changes produced by the wave front corrector with the rectilinear spherical wave front pattern, will have greater residual wave front error.

An optical path difference (OPD) plot, 2902, of a spherical aberration, 2904, along the horizontal axis of the wave front corrector is shown below in FIG. 29. A wave front correction, 2906, opposite the spherical aberration is also shown. The correction, 2906, on the OPD plot, 2902, shows that narrow electrodes are densely packed where spherical wave fronts are steepest, and less dense wider electrodes are located where spherical wave front changes are slow. Because a spherical wave front may be defined as a part of an orthonormal basis set, it is possible to make spherical wave front corrections without significantly changing other wave front modes. It can be generally appreciated from the OPD plot, 2902, the wave front corrections, 2906, of the spherical aberrations, 2904, result in a residual wave front error less than 40%, and typically less than 10%.

Wave front changes required to correct aberrations at certain locations may be determined from optical modeling, as described above and in reference to FIG. 12. Similarly, the electrode potential values required to produce the required wave front changes may be determined from the optical and electrical properties of the liquid crystal material used, as well as the known dimensions of the pattern of the transparent electrodes. In some embodiments, a look-up table is used to store the electrode potential values required to correct wave front errors at a number of different locations within the field of view, and effectively move the region of interest to those locations. In some embodiments, electrode potential values are interpolated from look-up table values to move a region of interest to a desired location, which is not collocated with a stored location within the lookup table. Alternatively, the look-up table includes a sufficient number of location entries, such that the desired location is always within a region of interest located at a nearest location entry within the lookup table. In another embodiment, electrode potential values are determined from functions of the position of the region of interest, in either Cartesian or polar coordinates.

The electrode potentials are supplied by a liquid crystal controller. An example of an off the shelf, single-channel liquid crystal controller, which is suitable to provide an electrical potential to one or more electrodes is: Thorlabs Part No. LCC25. Typically, a liquid crystal controller will provide electronic signals, which alternate in polarity. For example, Thorlabs Part No. LCC25 alternates signal polarity at 2 Khz. Ideally, the liquid crystal material will respond linearly to changes in electrode potential. The reference embodiment comprises a liquid crystal material that responds linearly to potential in the range of 1-2.5V.

In some embodiments, a liquid crystal controller comprises: a microprocessor, and a multi-channel digital-to-analog converter (DAC). A multi-channel DAC chip provides an analog signal to multiple electrodes, in response to a digital input value provided by the microprocessor. An exemplary multi-channel DAC is National Instruments Part No. NI 9264, which has 16 channels that can be simultaneously updated at a rate as fast as 25 KHz. Each of the exemplary electrode patterns described above, contain 33 electrodes and therefore require 33 potential levels. However, because the exemplary electrode patterns comprise transparent resistors, fewer than 33 potential levels may be provided, per electrode pattern. The above described electrode patterns typically have three (3) or more electrodes being supplied by one (1) conductor that is connected to the liquid crystal controller. The microprocessor is configured to send digital input signals to the DAC, such that the polarity of the electrode signals is alternated at a rate of about 2 Khz. As mentioned above, in some embodiments the liquid crystal controller operates in response to other systems, such as: an eye tracking system, or other interfaces, such as keyboard, mouse, or joystick. In such embodiments, additional software is configured to modify the digital signals sent to the DAC in order to provide the required electrode potential values to achieve the desired wave front changes.

In many cases, a foveated optical system which is incorporated into a head mounted display, moves the region of interest in response to the tracked orientation of a user's eyes, such that the user's gaze coincides with the region of interest. As mentioned above a human eye, because of its structure has a limited central field of view, over which it senses light at a high resolution. Outside this central field of view, human vision is poor. Embodiments of foveated optical systems may therefore correct wave front error, and provide a high resolution image to the eye within its central field of view. In some embodiments, an eye-tracking system is incorporated in order to provide feedback regarding the position of a user's eye.

Accommodating Projector System

In order to generating stereoscopic accommodated, augmentation imagery and project it onto retina's of a user's eyes, a HMD may incorporate an Accommodating Projection System. An Accommodating projector is a projection system that's purpose is to render an augmentation image where each pixel in a scene is assigned a unique RGB color value and a focal depth associated with its distance along a line-of-sight (LOS) of a user's eye. An embodiment of an accommodating projection system for a user's left eye is diagrammed in FIG. 30A (right eye is just a mirrored version of the same design).

Figure 30A:
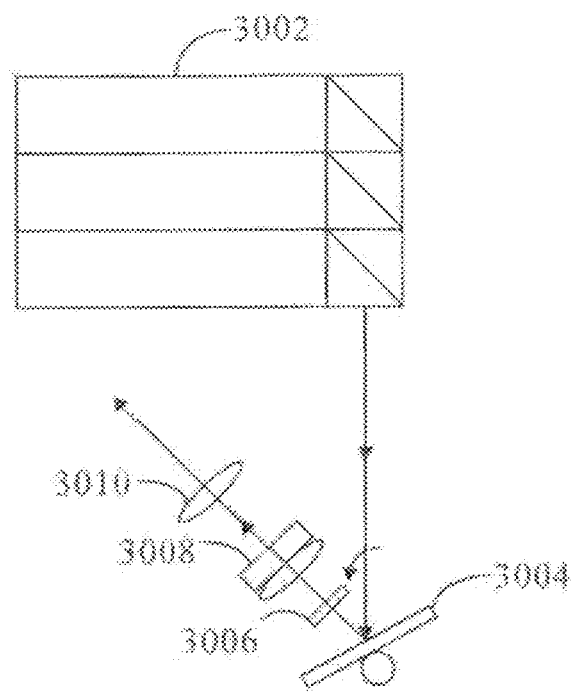
FIG. 30A shows an accommodating projection system according to some embodiments.
Figure 30B:
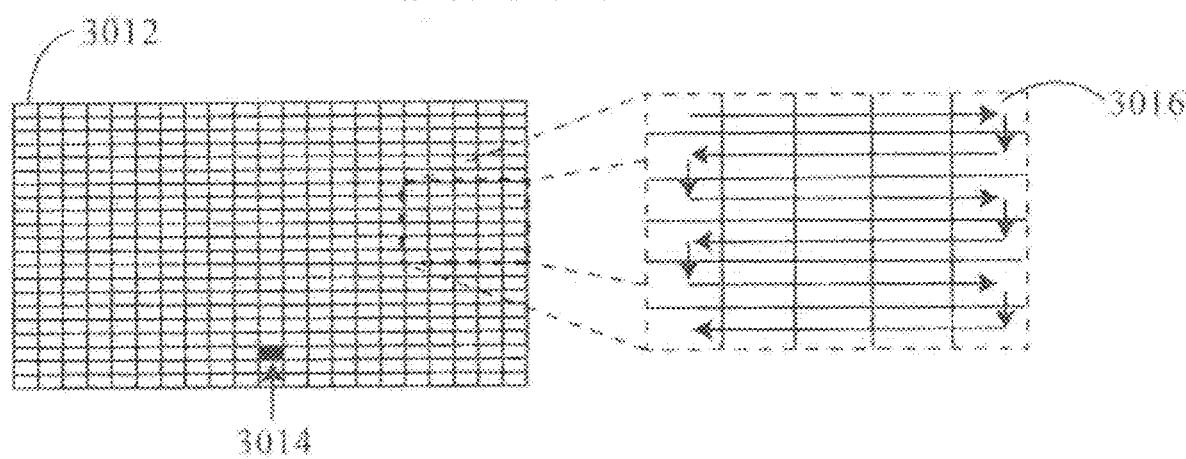
FIG. 30B shows a method of projected an image by scanning according to some embodiments.

Referring to an embodiment of an accommodating projector system illustrated in FIG. 30A, color encoded light from a projector source, 3002, is reflected off the surface of a MEMs mirror, 3004. The MEMs mirror raster scans an image of the augmentation scene onto an image plane aperture stop of the system, 3006. The light is further imaged by a lens, 3008, and then a variable lens, 3010. Referring to FIG. 30B, a displayed image, 3012, results that comprises a multitude of resolution elements or pixels, 3014. Raster scanning, 3016, of a displayed image, 3012, may be performed in such a manner that the image is displayed by moving a projected beam across the aperture stop, 3006, at a fast horizontal rate and a slower vertical rate as depicted in FIG. 30B. According to some embodiments, a light generator that comprises any of a family of 2D pixilated display technologies is used to project the augmentation imagery. Examples of 2D pixilated display technologies include: liquid crystal on silicon (LCOS) 2D microdisplay, and OLED microdisplay. According to some embodiments, light passing through the image plane aperture stop, 3006, is collimated by a lens, 3008, and a variable lens, 3010. The variable lens may be a liquid crystal lens, 3008. The liquid crystal lens (LCL) shapes the wave front of a beam as it passes through the liquid crystal lens. An effective focal length of the LCL is selectively controlled in response to an applied current. A schematic of an LC lens is drawn in FIG. 31.

Figure 31:
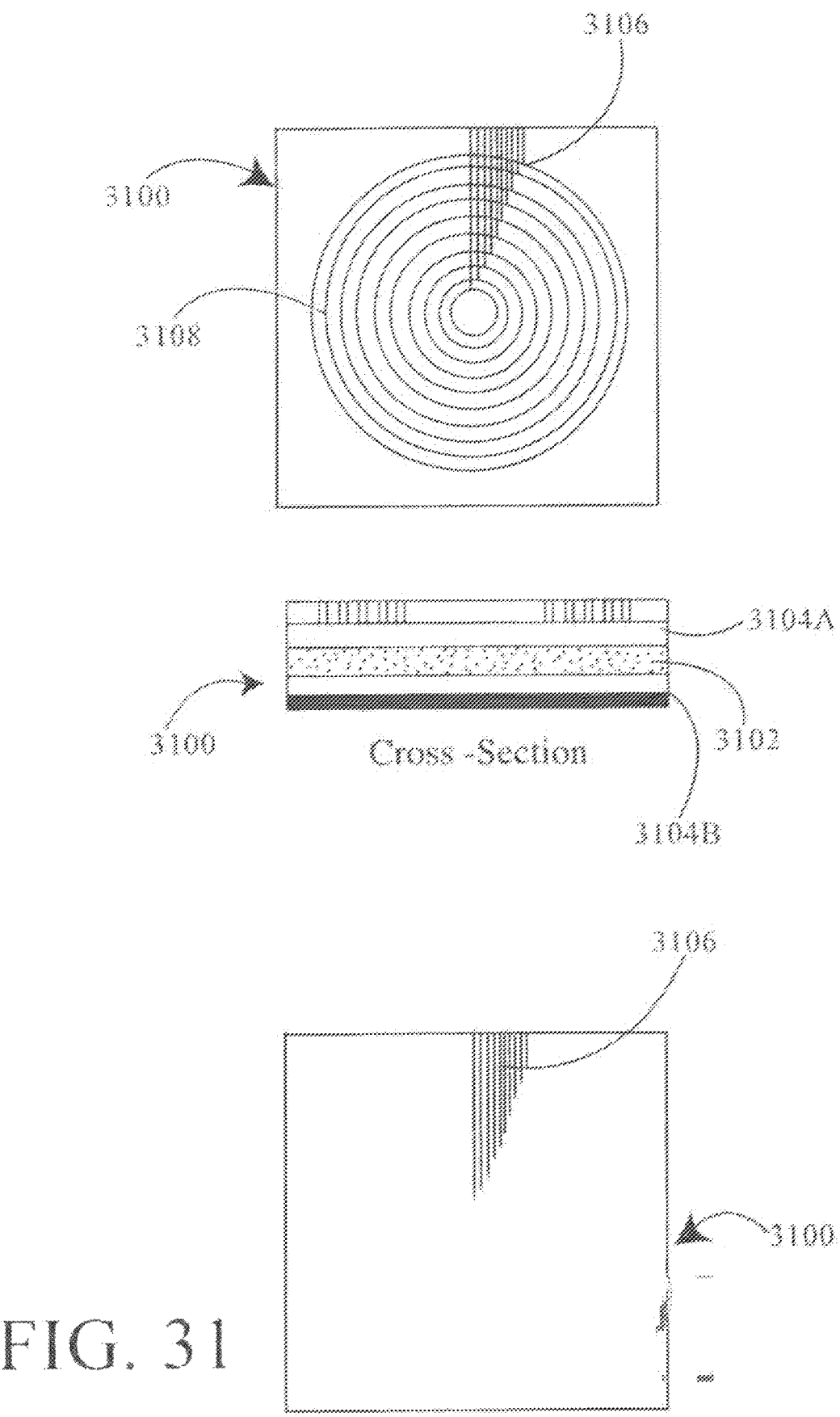
FIG. 31 shows a composition of a liquid crystal lens according to some embodiments.

Referring to an embodiment of a liquid crystal lens, 3100, shown in FIG. 31, liquid crystals, 3102, are sandwiched between two plates of glass, 3104A and 3104B, and are connected with electrical conductors, 3106, allowing a potential to be applied across them. The liquid crystals in an LC lens have the property that they tend to align with an applied potential. When a light is passed through the liquid crystals, the light experiences an index of refraction that varies with a potential applied to the liquid crystals. With multiple concentric transparent electrode rings, 3108, are used to apply an azimuthally symmetric potential across the device. By applying different potentials to each ring the index of refraction changes radially, shaping the wave front into a lens. In some embodiments the electrodes of an annular spatial light modulator are created by depositing Indium Tin Oxide (ITO) onto a glass substrate. The ITO glass is transparent to visible wavelengths and is therefore ideally suited for this application.

An embodiment of an accommodating projector that projects augmentation imagery having an added focal depth is illustrated in FIGS. 30A-30B. The added focal depth shapes a wave front of light, which comprises the displayed augmentation imagery. Shaping the wave front of the projected light as if it were emanating from the real world allows a user's eye to accommodate the stereoscopic imagery. A human eye can only focus at a single focal depth at a time. But, the human eye can discern approximately a dozen focal depths in its field of vision. Therefore, in some embodiments the variable lens, 3008, has a focal depth range that comprises about 12 focal depths. A process of accommodating projection may be accomplished by at least two methods involving projection and wave front shaping:

A first method for accommodating projection is a fast-rate multiplexing method. This method comprises refreshing each pixel at a rate that is an integer multiple ($N_z$) of your desired refresh rate (fast-rate). The integer multiple, $N_z$, is a number of focal depths to be displayed. The number depends on several design factors, but in at least some embodiments, a full depth range of an eye is not required. Instead only a single focal depth, which the user is currently focused upon, and a number of nearest focal depths within the central FOV are projected. For example, a total number of projected focal depths may be equal to 1, 2, 3, or 4 ($N_z=1-4$ depth levels). After each refresh of the image, the focal depth is changed and the image is refreshed with another focal depth. The user's eyes now integrate over these several realizations of the image. As an example, a fast-rate multiplexing accommodating projector system may project four focal depths simultaneously at a desired refresh rate of 120 Hz. In this example, $N_z=4$ and the projector system refreshes each pixel at a rate of 480 Hz.

A second method for accommodating projection is a slow-rate multiplexing method. It can be seen from the above example that the fast-rate multiplexing method can include a high projector refresh rate to accomplish accommodating projection. The slow-rate multiplexing method comprises a lower required pixel refresh rate. The slow-rate multiplexing method maintains the refresh rate, and updates the focal depths at an accommodation update rate that allows each multiple focal depth to be projected within an integration time of a human eye. The projector update rate is selected to ensure the pixels are updated within the integration time of the eye. Therefore, if the accommodation update rate of the accommodating lens is faster than the projector update rate, then the desired human eye integration time will be met. Referring back to our previous example, the slow-rate multiplexing method comprises a 120 Hz pixel refresh rate with a 120 Hz accommodation update rate. In reference to the slow-rate multiplexing method, the projector frame may be updated at projector update rate of 30 Hz (slow-rate). Each pixel is given 4 focal depth values to produce the correct weighted focal depth. A refresh rate, such as 120 Hz, maintains low flicker. A 120 Hz refresh and accommodation update rate, coupled with a projector update rate of 30 Hz allows 4 focal depths per frame of augmentation imagery projected.

In some embodiments, there is no predefined level of image quality for an athletic HMD to achieve athletic performance. However, HMD devices generally are expected to deliver imagery of a certain specification. Ideal HMD display specifications, which are not necessarily achieved in all embodiments, are: Provide a display resolution that displays a smallest resolvable resolution element that is no larger than a resolution element of an average human eye. Provide a display frame rate that renders the update image frames at a rate that is imperceptible to the human eye, for example greater than 10 Hz. And, provide a display refresh rate that refreshes pixels at a refresh rate that is imperceptible to the human eye.

Display Resolution

A display resolution is the smallest applicable resolution element. In order to achieve ideal imaging the resolution element would be approximately the same size as the rods/cones detectors in the eye. This is known as retina-limited imaging. In some embodiments of an A-HMD system, a resolution provided to a user varies within a range of possible values that include retina-limited imaging.

Display Refresh Rate

A display refresh rate is a refresh rate at which a pixel is updated with a new value. The eye's natural integration time varies depending on the type of cell. Rods have an integration time of approximately 100 milliseconds and cones have an integration time of 10-15 milliseconds. If a pixel is not refreshed before the next integration begins, a viewer may see an unintended amplitude flicker. For gaming applications, refresh rates are typically in a range of about 60-120 Hz, or greater.

Display Frame Rate

A display frame rate is a rate at which frames are updated for display. Frame rate and refresh rate may differ, because pixels may be refreshed more often than a frame is updated. In some embodiments a refresh rate, which is greater than a frame rate, is employed, causing individual pixels to be refreshed multiple times with a single value. A human eye has an effective frame rate of approximately 11 Hz. Frame rates are typically in a range of about 24-30 Hz, or greater.

In some embodiments an A-HMD will display augmentation imagery with depth accommodation. Ideal focal depth control specifications, which are not necessarily achieved in all embodiments, are: Provide a focal depth range that shapes a wave front of projected imagery over a focal depth range that is consistent with the accommodation range of an average human eye. Provide a sharp field of view (FOV) that renders a sharp FOV over the user's fovea, enabling human foveal vision of augmentation imagery. Provide a focal shift rate that shifts focal depths of the projected imagery at a frequency imperceptible by the human eye. And, provide a focal correction range that provides focal correction, which spans the total range ($2\sigma$ or 96%) of human inset depths.

Focal Depth Range

Figure 32A:
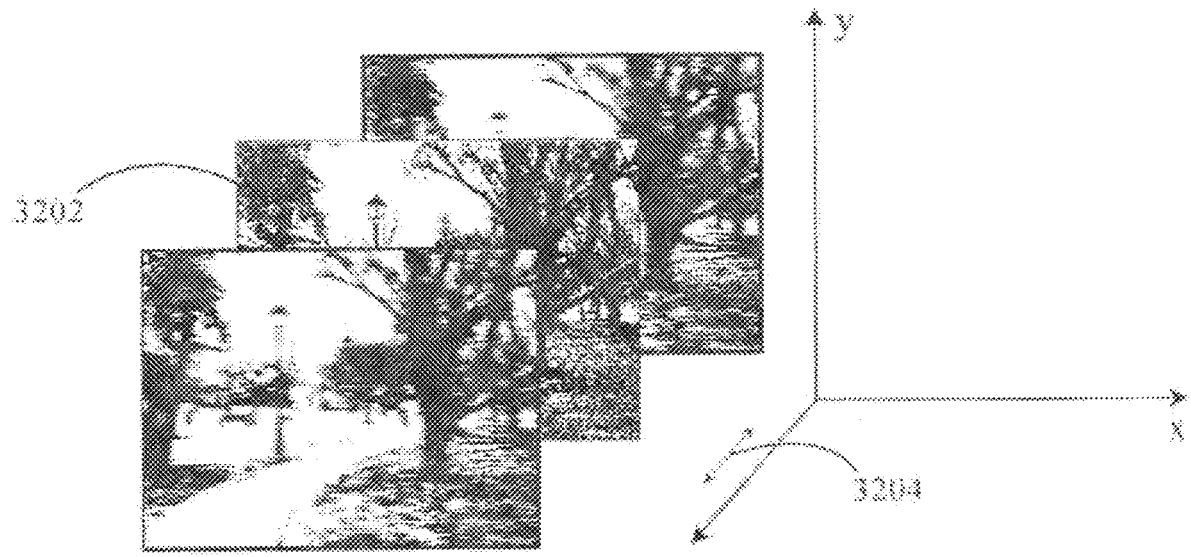
FIG. 32A shows a scene over a number of focal depths according to some embodiments.

Each resolution element of a virtual scene may be rendered at a particular focus. A focal depth range is a range of possible focal depths that may be applied to a ray. In some embodiments, the focal depth is applied by shaping the wave front of the ray, with an adjustable focus optic. The focal depth range determines the depth of the virtual scene. Rays that converge on the outer edge of the retina will experience significant aberrations due to the imperfections in the human visual system. This will limit the effective area of a scene that may be brought to sharp focus. FIG. 32A shows a scene, 3202, imaged at a number of focal depths, 3204.

Sharp FOV

Figure 32B:
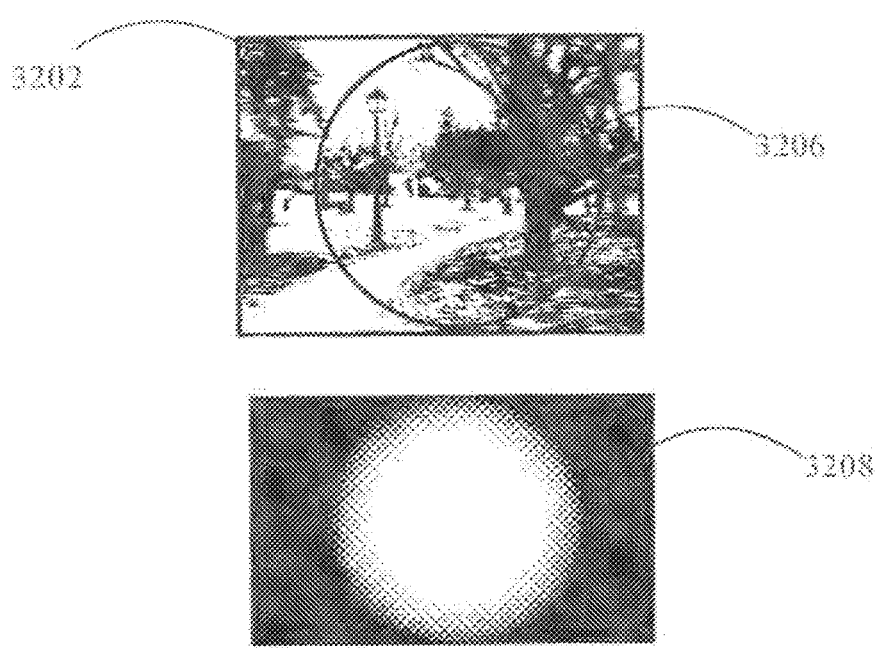
FIG. 32B shows and outlines a sharp field of view according to some embodiments.

Sharp Field of View (FOVs), 3206, is an angular area over which rays may be brought into sharp focus by an eye, as shown in FIG. 32B. In actuality, the sharpness of the image, as measured by a system's optical transfer function (OTF), degrades with radius from a center of the field of view. The Sharp FOV may technically be defined as a solid angle over which rays may be brought into sharp focus; where sharp focus may technically be defined as at least 96% an ideal system modulation transfer function (MTF). If the system's image quality degrades according to a Gaussian function of the radial angular distance, the Sharp FOV may be defined as the $2\square$ point of the field degradation Gaussian profile. Non-sharp FOV, 3208, is the FOV outside the sharp FOV, 3206.

Focal Shift Rate

A focal shift rate is a rate at which focus of a ray may be changed. Focus shifting devices tend to have a linear and nonlinear operational regime. In the linear regime, the focus shift rate is linearly related to the size of the focal shift, implying that in the linear regime the focal shift rate is constant. However, in the non-linear regime, the focal shift rate is not linearly related to the focal shift size and the focal shift rate may grow increasingly fast as the size of the focal shift is increased.

Focus Correction Range

Some embodiments of a HMD are capable of performing an auto-focus operation to determine an eye's focusing characteristics. A focal range may be applied during the auto-focus process, and is known as a focus correction range. It is desirable to create a system with a focal correction range large enough to encompass the majority of users.

An example of an HMD comprising an autofocus system is explained below in greater detail.

A controller determines one or more focal depths, based upon a distance along a user's line of sight that displayed imagery should be perceived at. In some embodiments, a focal depth is determined based upon eye-tracking data from one or more eyes. In one embodiment, eye-tracking data: comprising a gaze vector; as well as, head-tracking data, and render data are used by the controller to determine a focal depth. The render data comprises information that defines: content and location of an augmentation scene. The defined location of the augmentation scene is in global (real world) coordinates. The head-tracking data comprises information defining a position and a pose of the user's head in global coordinates. The controller determines, based upon the head-tracking data and render data, a distance along the gaze vector at which the augmentation imagery should be perceived. A focal depth is derived from the determined distance along the gaze vector.

According to some embodiments, eye-tracking data, comprising a gaze vector, from both eyes may be used to determine a focal depth. For example, a controller determines a point of intersection between gaze vectors from a right and a left eye of a user. A focal depth is derived from the point of intersection of the two gaze vectors. An exemplary eye-tracking system is explained below, although other versions of eye-tracking systems may be incorporated interchangeably.

Eye-Tracking System

Figure 33:
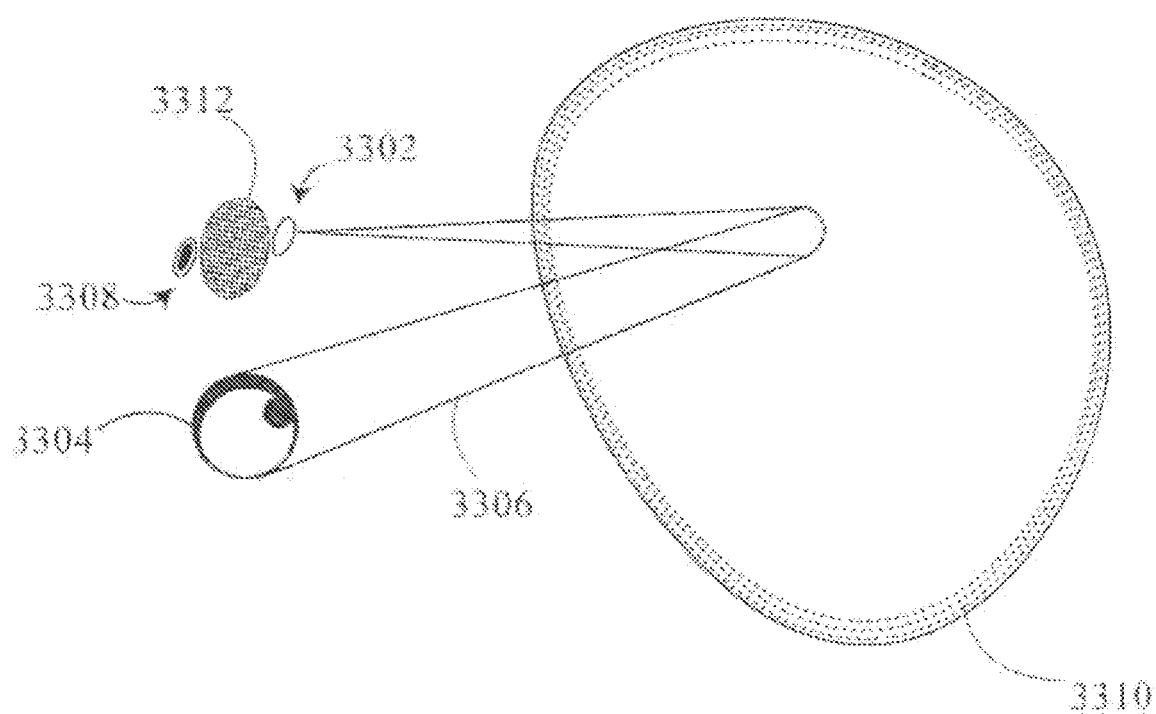
FIG. 33 represents an embodiment of a head mounted display comprising an eye-tracking system according to some embodiments.

Some embodiments of an HMD comprise an eye-tracking system, in order to provide eye-tracking data in response to a position of a user's pupil. Any method of eye tracking that provides feedback in response to the position of a user's pupil may be implemented in a HMD. For example, in some embodiments a video-based eye tracker is implemented. An embodiment comprising a video-based eye-tracker is illustrated in FIG. 33. Referring to FIG. 33, a diffuse light source, 3302, illuminates an eye, 3304, with a diffuse light, 3306. A camera, 3308, measures light reflected from the eye's surface. In some embodiments, an infrared (IR) diffuse light source and an IR camera are implemented in conjunction. Some embodiments further comprise a beam combiner, 3310, and a beam launcher array, 3312, as described above.

Figure 34A:
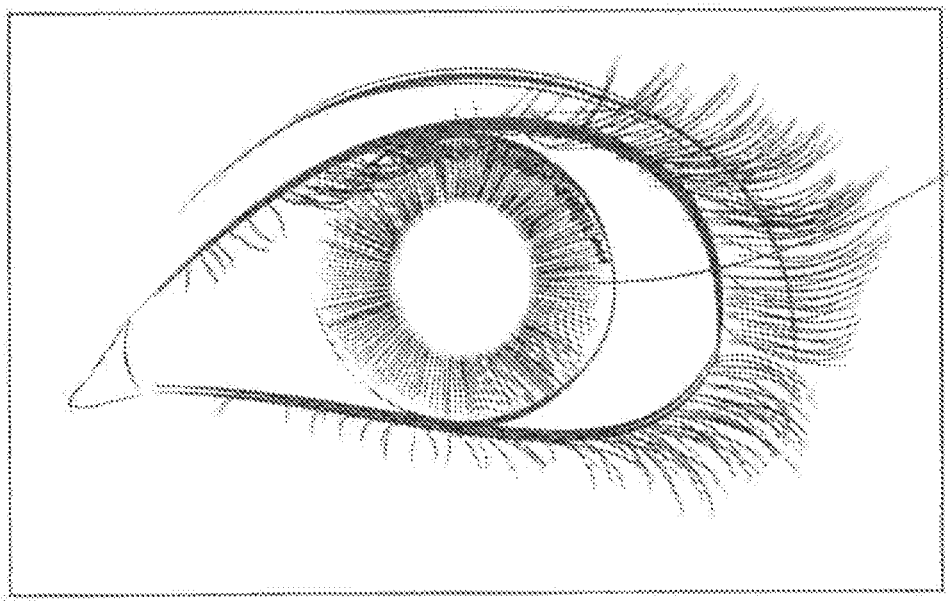
FIG. 34A represents a bright pupil measurement from a video-based eye-tracking system according to some embodiments.
Figure 34B:
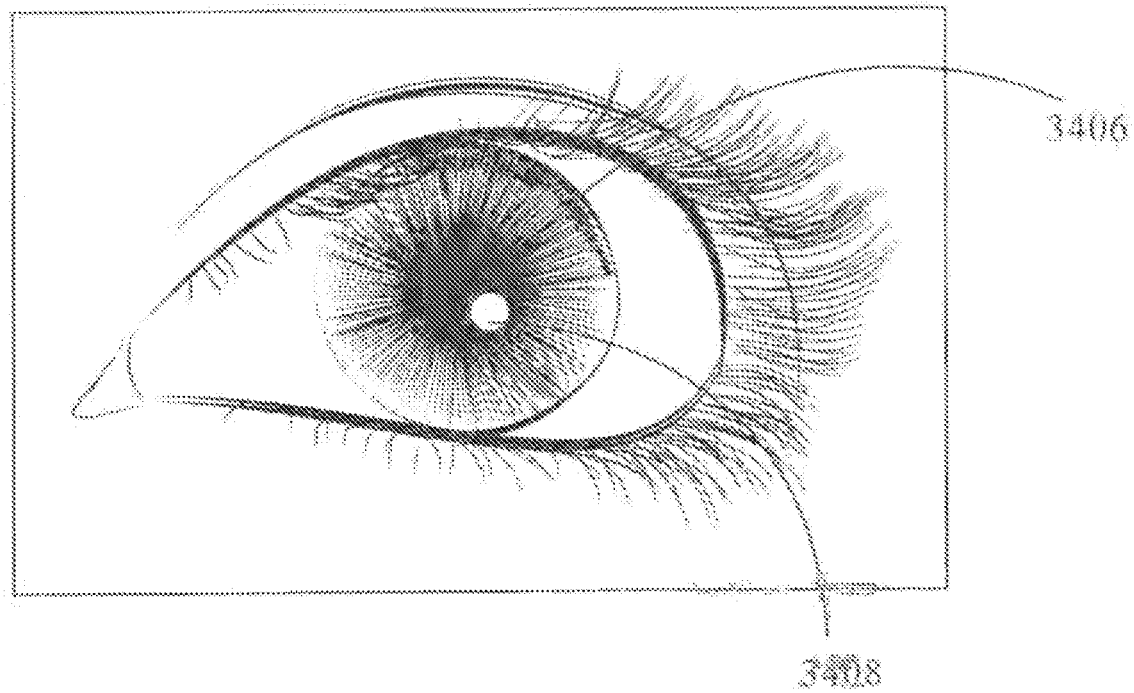
FIG. 34B represents a dark pupil measurement from a video-based eye-tracking system according to some embodiments.

FIGS. 34A-B illustrates reflection of the diffuse light as measured by a video-based eye-tracking system like that in FIG. 33. A bright pupil, 3402, indicates that the diffuse light source is generally coaxial with the optical path of the eye (not shown). A bright pupil measurement is illustrated in FIG. 34A. Where the diffuse light source is generally non-coaxial with the optical axis of the eye, a dark pupil, 3406, is measured having a bright corneal reflection, 3408, as shown in FIG. 34B. A threshold may be applied to the measurement in order to determine only a portion of the measurement that corresponds to the pupil. Determination of the portion of the measurement that corresponds to a dark pupil is an inverse calculation of that for a bright pupil. A centroiding system employing a centroiding algorithm, such as that in Equation 1, determines a center of the pupil.

$$\vec{R} = \frac{1}{I_{tot}} \int_A (I(\vec{r}) \cdot \vec{r}) dA \quad (1)$$

The position of the pupil is then determined, based upon the center of the pupil as measured, and a known orientation of the camera with respect to the user's eye. In embodiments employing a dark pupil measurement as illustrated in FIG. 34B, a vector between the center of the pupil and the corneal reflection, 3408, may also be used to deduce the gaze direction. In some embodiments, eye-tracking data comprises the position of a user's eye. In other embodiments, eye-tracking data comprises a gaze vector. The gaze vector is determined based upon the position of the user's pupil and represents a line of sight (LOS) of the user.

Figure 35A:
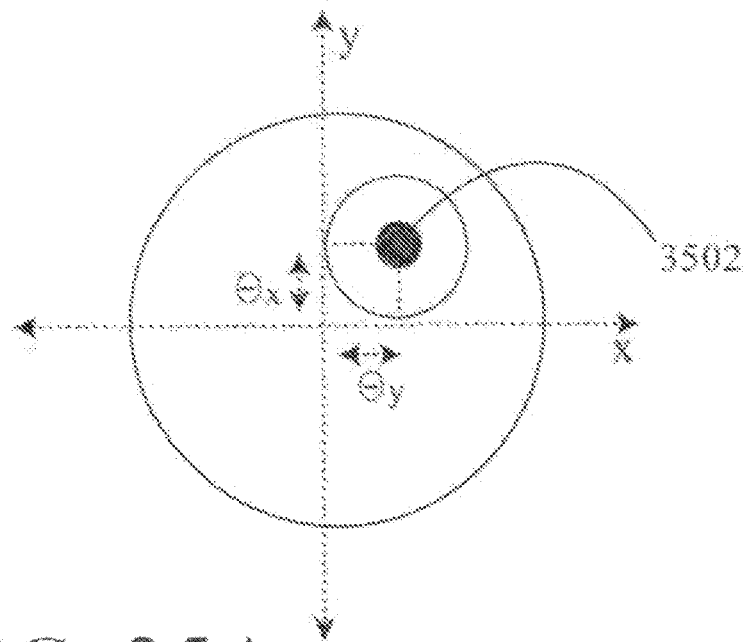
FIG. 35A shows a radial plot of a pupil position according to some embodiments.
Figure 35B:
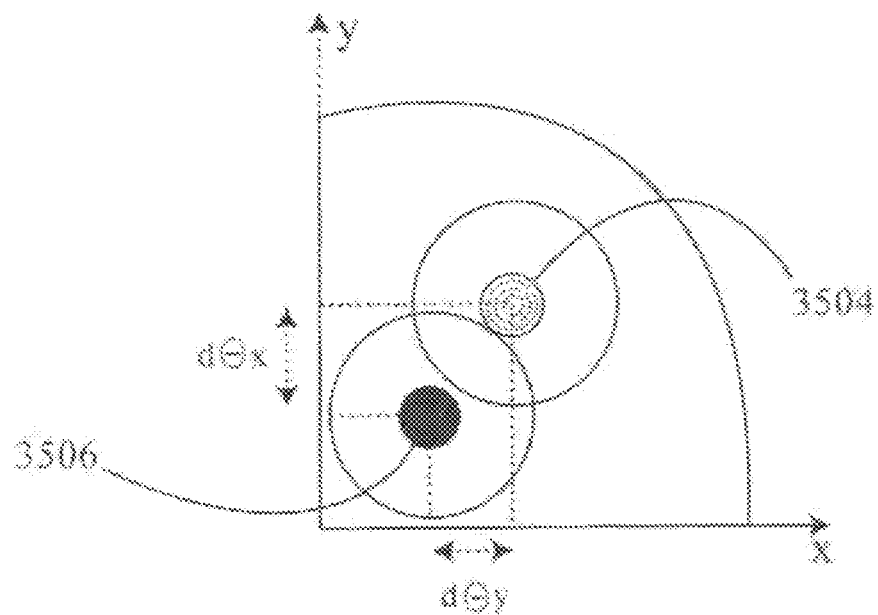
FIG. 35B shows a radial plot of an estimated pupil position and an actual pupil position according to some embodiments.

Error in the estimated pupil center position as compared to the actual pupil center position is referred to as the Pupil Position error, and is illustrated in FIGS. 35A-B. A pupil position error may be calculated as a positional error, having units such as millimeters. The pupil position error may, also be calculated as an angular error, having units such as milliradians. FIG. 35A illustrates an orientation of an eye, 3502, in terms of angles of rotation about coordinate axes. The pupil position error is depicted in FIG. 35B by showing an estimated orientation of an eye, 3504, as well as a true orientation of an eye, 3506. Pupil position error has a potential to affect the accurate function of HMDs comprising eye-tracking. The amount of pupil position error that is acceptable to such HMDs and HMD subsystems is dependent upon the perception of the user. Ideal eye-tracking specifications, which are not necessarily achieved in all embodiments, are: An eye-tracking rate that obtains eye-tracking updates at a rate that is imperceptible to the human eye. An eye-tracking accuracy that obtains eye-tracking updates that are accurate to within a specified tolerance. And, an eye-tracking precision that obtains eye-tracking precision, which allows for corrections that are unresolvable by an average human eye.

Movements of an eye that result from a change in viewing direction are large and are measurable by an eye-tracking systems, as described above. In some versions of an HMD, smaller eye movements caused by jitter, or a slight movement of an HMD relative a user's eyes are not measured by an eye-tracking system. Instead a jitter sensor takes measurements that correlate with smaller eye movements. The smaller eye movements are then corrected for by an augmentation stabilization system. In some embodiments, eye-tracking system specifications are loosened, as other systems allow for an increase in pupil position error. For example, an accommodation projector system that projects augmentation imagery at greater than three focal depths allows the HMD to more generally estimate the user's focal depth, and thus gaze vector. Likewise, a system that provides high resolution imagery over a FOV greater than a user can perceive in high resolution, can include a lower-accuracy eye-tracking system.

Eye-Tracking Rate

Tracking the position of an eye's pupil is known as eye-tracking. A rate at which an eye-tracking system can track the motion of an eye's pupil is an eye-tracking rate. In some embodiments, an A-HMD obtains eye-tracking data at a frequency no less than a projector update rate, also referred to as a frame rate or a rate at which a projected image is updated. Therefore, typical eye-tracking rates are greater than 30 Hz, and generally are about 60 Hz, 120 Hz, 240 Hz, 480 Hz or greater.

Eye-Tracking Accuracy

In some embodiments of an HMD, eye tracking accuracy limits how well augmentation imagery will be placed in a scene. That is to say how accurate the location of the augmentation imagery as perceived by the user is to the location targeted by the HMD. Eye-tracking accuracy has a stronger effect on augmentation imagery that is to be perceived as closer to a user than imagery that is to be perceived at a distance. This is because a positional error leads to an angular error given by:

$$EyePose_{error} = \frac{dx}{z} \quad (2)$$

Eye-Tracking Precision

Eye Tracking Precision refers to, how consistently the position of the pupil is tracked. Even if there is a nominal offset error that misaligns the actual and estimated pupil positions (inaccurate), it is possible to measure the same position repeatedly (precise). Eye tracking precision may be given by the rate of error change as a function of time:

$$\Delta EyePose_{error} = \int_0^\tau \frac{dx(t)}{z(t)} dt \quad (3)$$

Where τ is an integration time dictated by the eye-tracking rate.

The Augmentation Stabilization Control System

For athletic applications, it is not enough to render the correct augmentation imagery; it should be rendered in the right place. That means, for example, that it should be immune to the motion of a user to a degree greater than previous or currently available HMD devices. If the update rate of the projector system, or the frame rate, is 30 Hz for instance, then head motion faster than this rate will appear to move the augmentation imagery from the desired location within the FOV of a user's eye. An augmentation stabilization system typically addresses two types of jitter, optical jitter, 3602, and augmentation jitter, 3608. Optical and augmentation jitter are shown in FIGS. 36A-B.

Figure 36A:
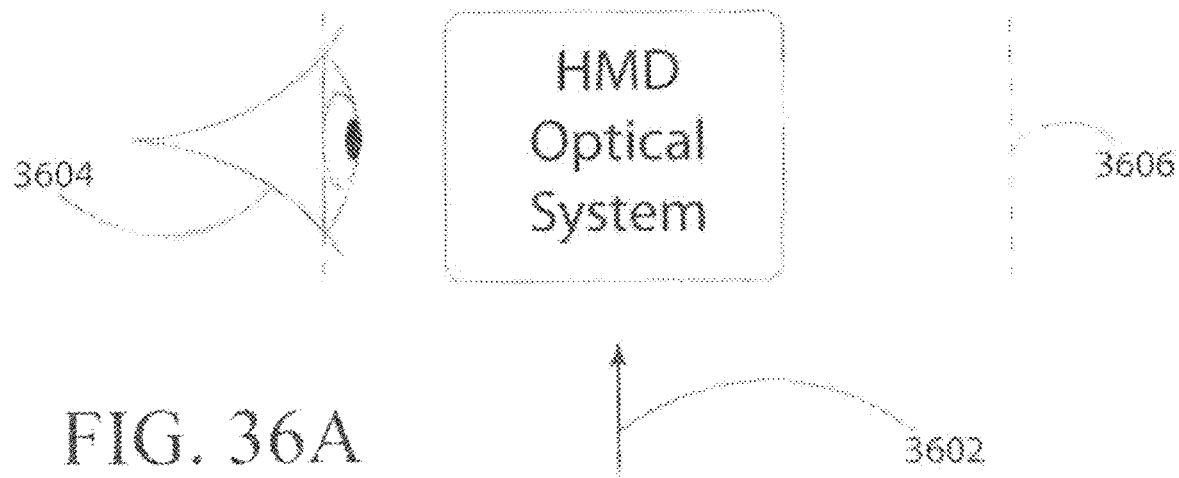
FIG. 36A illustrates system movement yielding optical jitter according to some embodiments.
Figure 36B:
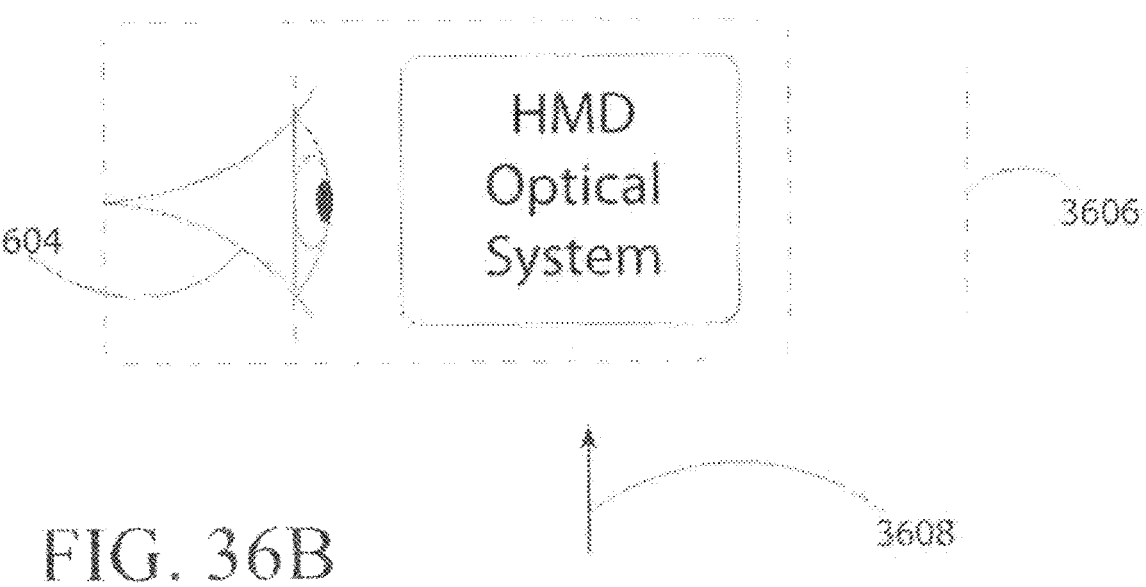
FIG. 36B illustrates system movement yielding augmentation jitter according to some embodiments.
Figure 37:
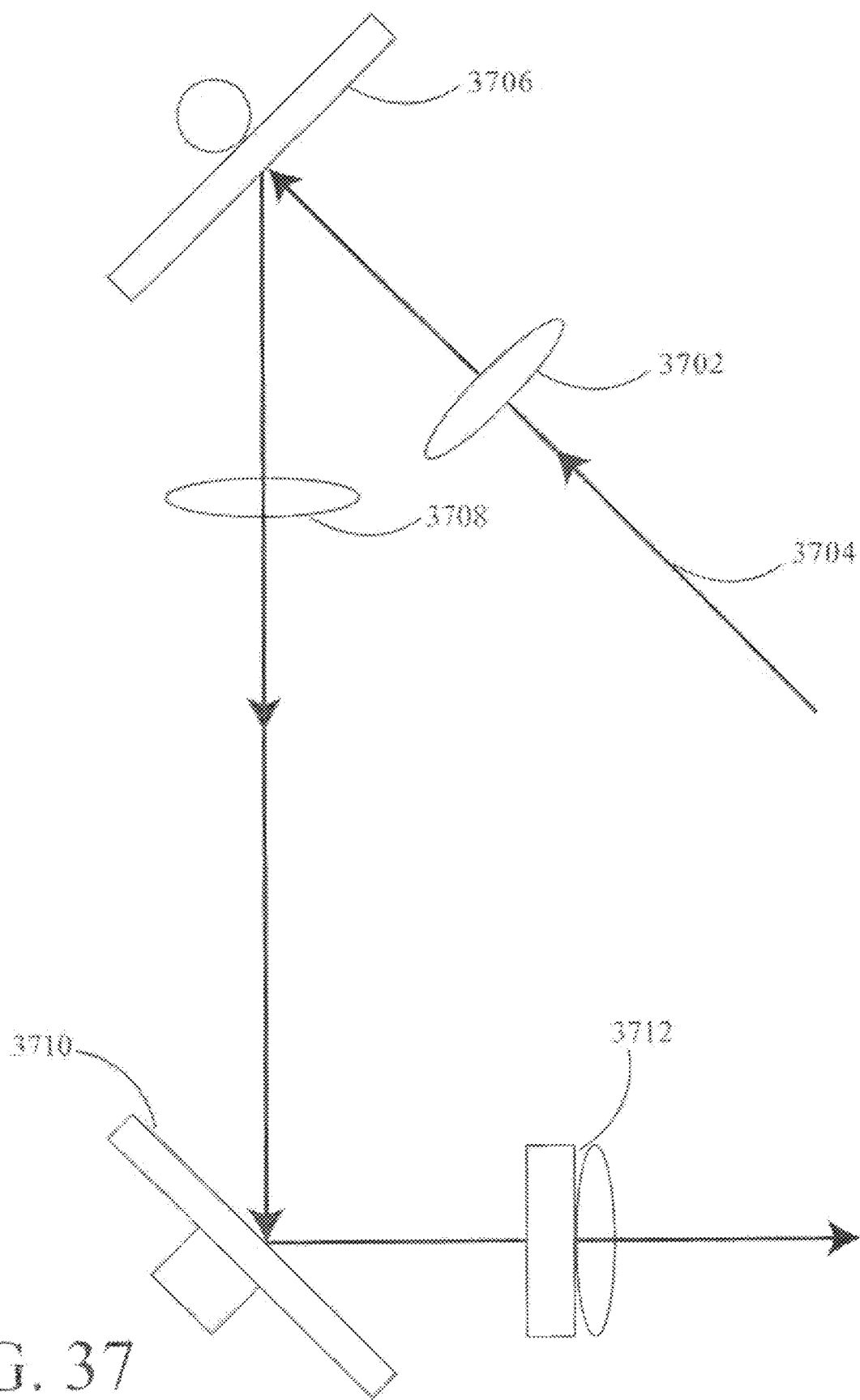
FIG. 37 shows a representation of an augmentation stabilization control system according to some embodiments.
Figure 38:
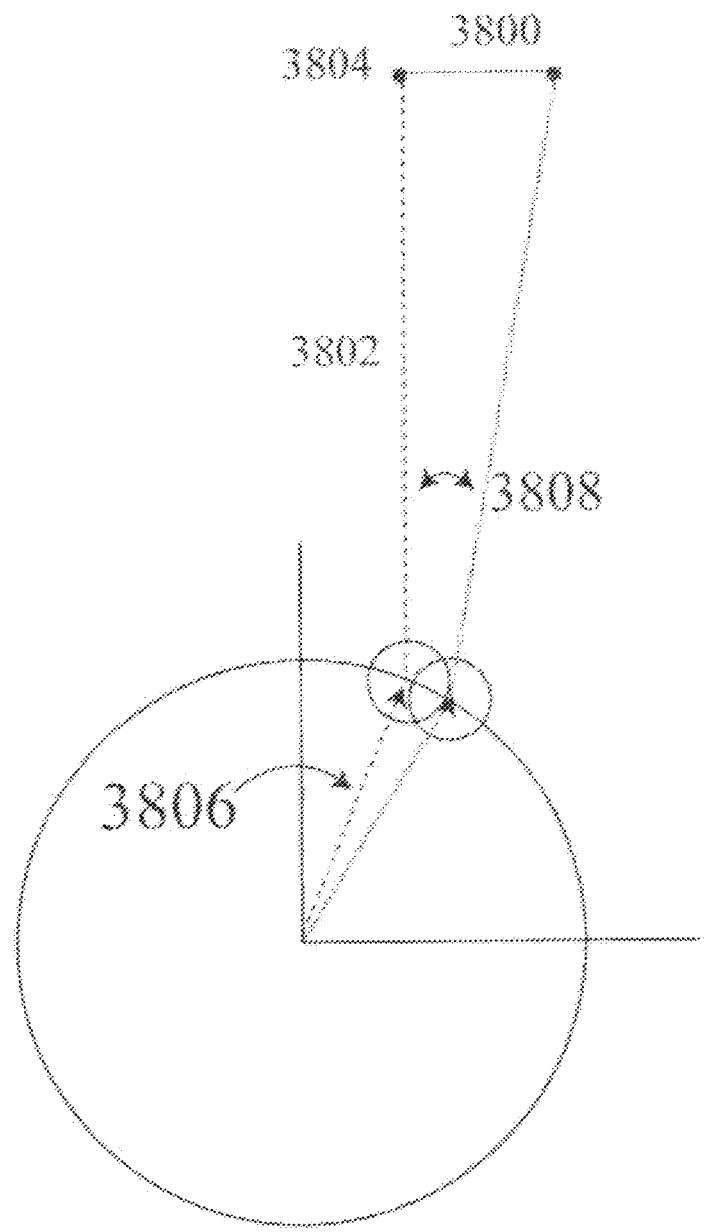
FIG. 38 illustrates eye jitter in one dimension.

As illustrated in FIG. 36A, optical jitter, sometimes referred to as projection jitter, 3602, is movement of an optical system of a head mounted display in relation to a user's eye, 3604. In some versions, optical jitter is controller with firm HMD mountings. Augmentation jitter, 3608, as illustrated in FIG. 36B is movement of the user and the optical system of the HMD with respect to an image source, 3606. In respect to augmented reality display, the image source, 3606, may be the real world. This occurs because the augmentation imagery is generated in a local eye coordinate system, but is made to appear as if it emanated from the image source, 3606, that may be defined in a global coordinate system. The augmentation jitter, 3608, will appear to a user as a jitter that reduces the resolution of the augmentation imagery or worse yet, ruins the immersive experience by highlighting to a user what is real and what is augmented. Therefore, it is desirable to ensure that augmentation imagery appears stable and locked in place in the global coordinate system. This may be accomplished by adding an augmentation stabilization system to the optical chain. An embodiment of an augmentation stabilization system is depicted in FIG. 37. A first lens, 3702, collimates light, 3704, emitted from an augmentation image to form a pupil plane coincident with the vertex of a fast steering mirror, 3706. A second lens, 3708, re-images the pupil plane coincident with the fast steering mirror onto a pupil alignment mirror, 3710. The pupil plane coincident with the pupil alignment mirror axis may be re-imaged onto the eye or another intermediate pupil plane by a third lens, 3712. Orientation changes to a user's head cause the user's eyes to change orientation and shift position. The change in orientation and position of a user's eyes is defined as eye jitter. If the orientation changes are small (dθ<<1), perspective changes to the augmentation imagery are negligible, and only image translations need be corrected. Eye jitter is illustrated in one dimension in FIG. 38.

The image displacement, dx, 3800, is given by the equation:

$$dx = (Z_P + R_{eye}) \cdot \tan d\theta \quad (4)$$

Where $Z_P$, 3802, is a distance to the augmentation image point P, 3804; $R_{eye}$, 3806, is a distance from the rotation axis of the head to the rotation axis of the eye, and dΘ, 3808, is a rotation jitter. Equation (4) may be applied to both vertical and horizontal eye jitter, where de is either the rotation about the horizontal or vertical axis respectively.

Jitter data is collected from a jitter sensor, at a jitter sensing rate. The jitter is then corrected by the augmentation stabilization system at an augmentation stabilization rate. During jitter correction, the augmentation stabilization rate can be high, typically greater than the frame rate of the projector, and often greater than the refresh rate of the projector. Therefore, the jitter sensing rate should be of a similar, or faster, rate than the jitter correction rate. In some embodiments, the jitter sensor measures movements of a user's head, in order to provide jitter data at high rates. A controller that is provided with the jitter data estimates the position of a user's eyes, and adjusts optical components to correct the imagery accordingly.

In some embodiments, a fast steering mirror (FSM), 3706, is used to shift the location of the imagery in the image plane by adding tip and tilt phase gradients to the pupil plane (Fourier shift theorem). In order to shift the imagery correctly, the distance to the augmentation imagery must be known or approximated. In some embodiments, the augmentation stabilization system and the FSM, 3706, are updated at a rate that is at least as fast as the refresh rate of a projector, which is generating the imagery. Typically, MEMs type FSMs are updated at kHz rates and the projector is refreshed at a rate greater than 30 HZ and more typically between 120-480 Hz. Eye jitter at frequencies below the update rate of the projector system, which is generally greater than 11 Hz and typically about 30 or 60 Hz, may be corrected by rendering the imagery shifted in location.

Eye Jitter Sensor

In some implementations, correcting augmentation jitter includes sensing and measuring augmentation jitter. As stated above, augmentation jitter results from head motion that imparts a change to the pose of a user's eyes. Therefore, in order to measure augmentation jitter you need to measure the motion of a user's eye. An inertial measurement unit (IMU) is a device for measuring the pose of an object. An IMU works by detecting changes in a rate of acceleration with one or more linear accelerometers and by detecting changes to rotational attributes (e.g. roll, pitch, and yaw) by using one or more gyroscopes. IMUs may also incorporate magnetometers or angular accelerometers as well. IMUs are able to provide measurements at rates specified by an augmentation stabilization system. In one embodiment, a controller continually calculates the pose of an object being measured by an IMU by integrating changes in acceleration to calculate the current velocity. Then, the controller integrates the velocity to obtain an estimate of the object's position and orientation. Inertial guidance systems that incorporate an IMU typically suffer from accumulated error. Some embodiments include jitter sensors that comprise accelerometers in perpendicular configuration (x-y). In some versions, absolute positional error is minimized with periodic updates from an absolute geo-positioning sensor, such as a GPS head tracking system. In a further example, movement of the eye can be determined by a sensor that measures forces exerted on a body (e.g., a known mass) that shares translational movements with the eye. For example, a sensor practicing this technique can be included in an HMD, and because the HMD moves with the wearer's head, the sensor shares such movements with the eye.

Stability Function

Stability can be divided into two types: optical stability and augmentation stability. Optical jitter, 3602, as depicted in FIG. 36A, results from the apparent motion of an optical system between to a user's eye, 3604, and the environment, 3606. Augmentation jitter, 3608, as depicted in FIG. 36B, results from the apparent motion of the user and HMD with respect to the global coordinate system. Ideal HMD image stability specifications, which are not necessarily achieved in all embodiments, are: Provide augmentation stability by placing augmentation imagery in a fixed global position with a precision that is smaller than the resolving power of a human eye. And, provide optical stability by attaching the HMD to the user, such that the variation in position does not exceed the resolving power of the human eye.

Augmentation Stability

The augmentation stabilization system senses augmentation jitter, and corrects augmentation jitter faster than is perceptible to a human eye. Sensing of augmentation jitter is achieved by head-tracking systems, and in some embodiment's eye-tracking systems. Correcting of the position of augmentation imagery is achieved through an optical system that translates the augmentation imagery at the user's pupil. Augmentation stability is, thus governed by an augmentation stabilization rate. An augmentation stabilization rate is an update rate at which augmentation jitter is stabilized. This update rate is itself throttled by a jitter sensing rate and a jitter correction rate. The jitter sensing rate comprises a rate at which jitter is measured, such as: an eye-tracking rate, an IMU sensing rate, and/or a head-tracking rate. The jitter correction rate comprises a rate at which the augmentation imagery is transformed, such as: a rate of adjustment of optical elements, like fast steering mirrors or adjustable gradient optics. Regardless, some residual augmentation jitter, or post-stabilization augmentation jitter, remains after augmentation stabilization. The post-stabilization augmentation jitter can limit the performance of the system. The smaller the residual jitter than the more "glued" to the real world the virtual content will seem. Therefore it is highly desirable to increase the stabilization system's rejection bandwidth (range of frequencies that are rejected by the stabilization system) in order to minimize the post stabilization residual jitter. Residual jitter is decreased by increased augmentation stabilization rates.

Optical Stability

Optical stability is measured in a similar fashion to augmentation stability. However, they differ in one key way: augmentation jitter is unavoidable whereas optical jitter may be reduced by design. Therefore, in some embodiments, optical stability is achieved through opto-mechanical considerations, such as: the use of a stiffer structure. Additionally, a wave front control system may be employed to reduce optical jitter.

Head-Tracking System

Figure 39A:
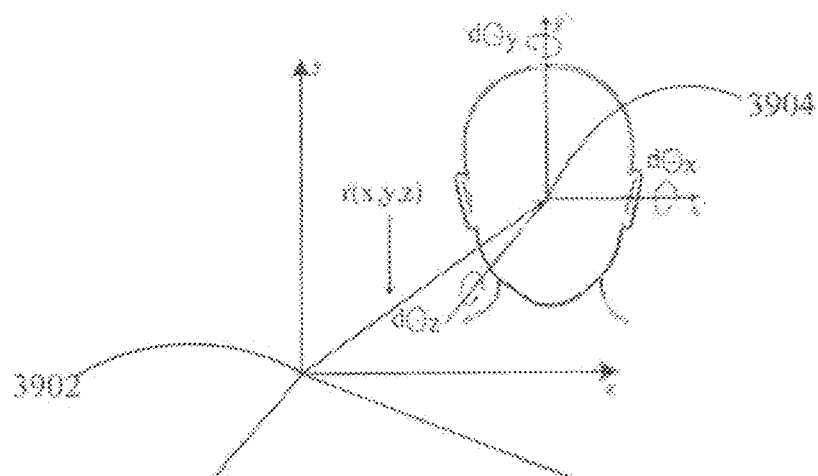
FIG. 39A shows a user's head in global and local coordinates according to some embodiments.

In some embodiments, an HMD may comprise a head-tracking system that provides periodic updates, relating to the position of a user's head, keeping a position error low. Head tracking is a process of estimating the position and orientation (pose) of a user's head. This is depicted graphically in FIG. 39A. FIG. 39A shows a global coordinate system (x, y, z), 3902, and a local coordinate system (x', y', z'), 3904. Technically, global positions of a user's eyes are most relevant to an HMD controller. The positions of the eyes are fixed with respect to the head, and thus the center position of the eyes follow the motion of the subject's head. However, a subject's eyes can swivel around the eye's center position. Thus the orientation of the eyes may change with respect to the head orientation, and this should also be tracked. The orientation of an eye may be measured with an eye-tracking system, which was discussed above.

In some embodiments, a head tracking system is specified by: head tracking rate, head tracking accuracy, and head tracking precision. Ideal head tracking specifications, which are not necessarily achieved in all embodiments, are: A head tracking rate that provides pose updates at a rate that is imperceptible to the human eye. A head tracking accuracy that provides head tracking pose updates that are accurate to within a specified tolerance. And, a head tracking precision that provides head tracking precision that allows for corrections, which are unresolvable by an average human eye.

Head Tracking Rate

Head tracking is tracking a position of a subject's head. A Head Tracking Rate is a rate at which a head-tracking system can track the motion of a user's head (eyes). The minimum head-tracking rate for an HMD may be determined based upon the application. Human brains process data at a maximum frequency of approximately 11 Hz. Therefore, in some embodiments, the projector renders each frame at a rate of about 30 Hz, as this frame update is imperceptible to the human eye. However, in some embodiments, pixels are refreshed by the projector at 60-120 Hz, in order to remove amplitude flickering. It follows that in order to reduce perceptible position errors, some embodiments comprise a head-tracking rate that is specified no less than the project update rate (30 Hz typical), and no more than the refresh rate (120-240 Hz typical).

Head Tracking Accuracy

Figure 39B:
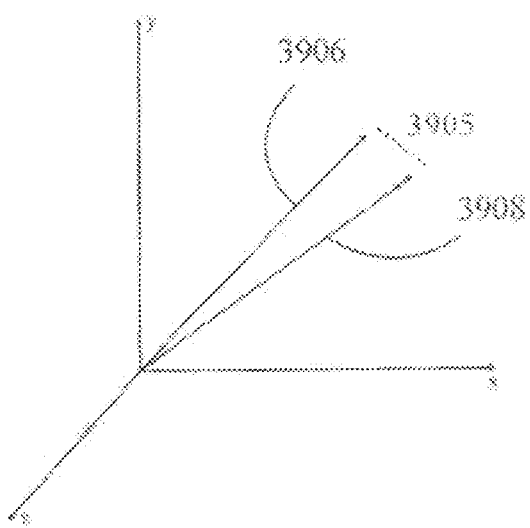
FIG. 39B illustrates head tracking accuracy according to some embodiments.

In some implementations, Head tracking not only tracks a user's head quickly (or at a rate greater than 30 Hz), it also tracks the user's head to within a specified accuracy, for example to within 10 cm, 1 cm, or 0.1 cm depending on the application. Head tracking accuracy, 3905, is shown in FIG. 39B, as the distance, $dPose_a$, 3905, between an estimated head pose, 3906, and an actual head pose, 3908. With respect to augmentation imagery, the head tracking accuracy can limit how well-simulated content will appear placed in a scene. Head tracking accuracy has a stronger effect on augmentations that are closer to a user than those at a relative distance because the position error leads to an angular error given by:

$$Pose_{error} = \frac{dx}{z} \tag{5}$$

Head Tracking Precision

Figure 39C:
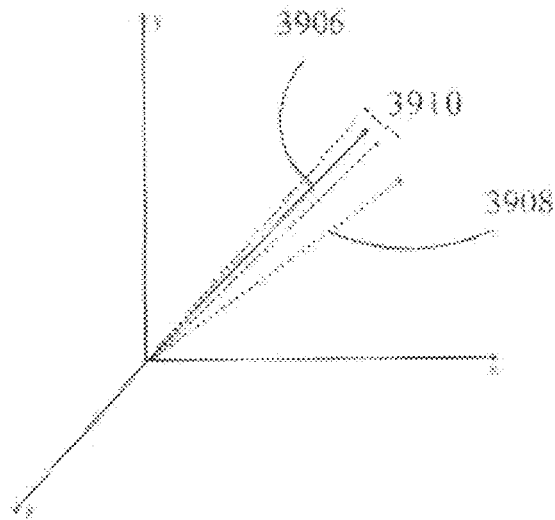
FIG. 39C illustrates head tracking precision according to some embodiments.

Head Tracking Precision, 3910, refers to, how consistently the position of the head is being tracked and is depicted in FIG. 39C. Even if there is a nominal offset error that misaligns the real and virtual simulations (inaccurate), it is possible to measure the same position repeatedly (precise). Head tracking precision may be given by the rate of error change as a function of time:

$$\Delta Pose_{error} = \int_0^\tau \frac{dx(t)}{z(t)} dt \qquad (6)$$

Where τ is an integration time dictated by the head-tracking rate.

Figure 40:
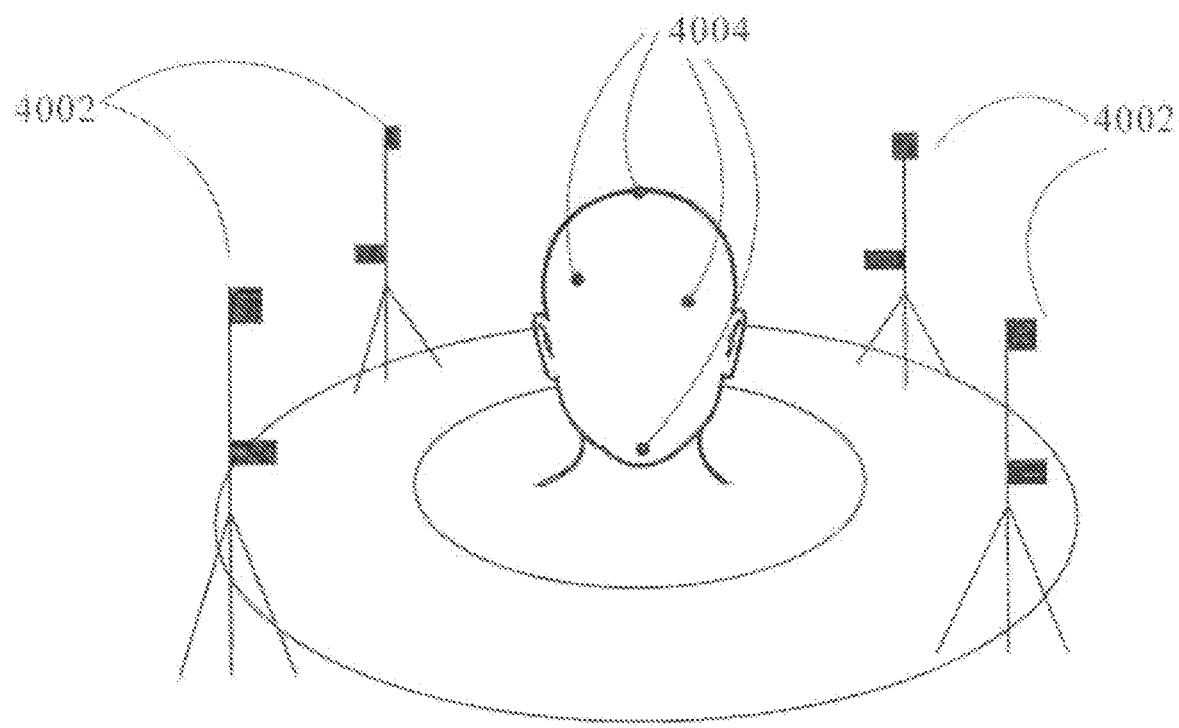
FIG. 40 shows an example layout of a commercially available head-tracking system.

In some embodiments, a head tracking-system comprises a motion capture system, as shown in FIG. 40. Typically, motion capture systems comprise one or more motion capture cameras, 4002, and one or more markers, 4004. Examples of motion capture systems include: Prime 41 from NaturalPoint Inc. DBA OptiTrack of Corvallis, OR; Impulse X2 motion capture system from PhaseSpace Inc. of San Leandro, CA; and Vicon Vantage of Vicon Motion Systems Ltd. UK registered no. 1801446. An example of a stop motion system specifically for head and face tracking is Vicon Cara of Vicon Motion Systems Ltd.

Ray Densification System

Figure 41:
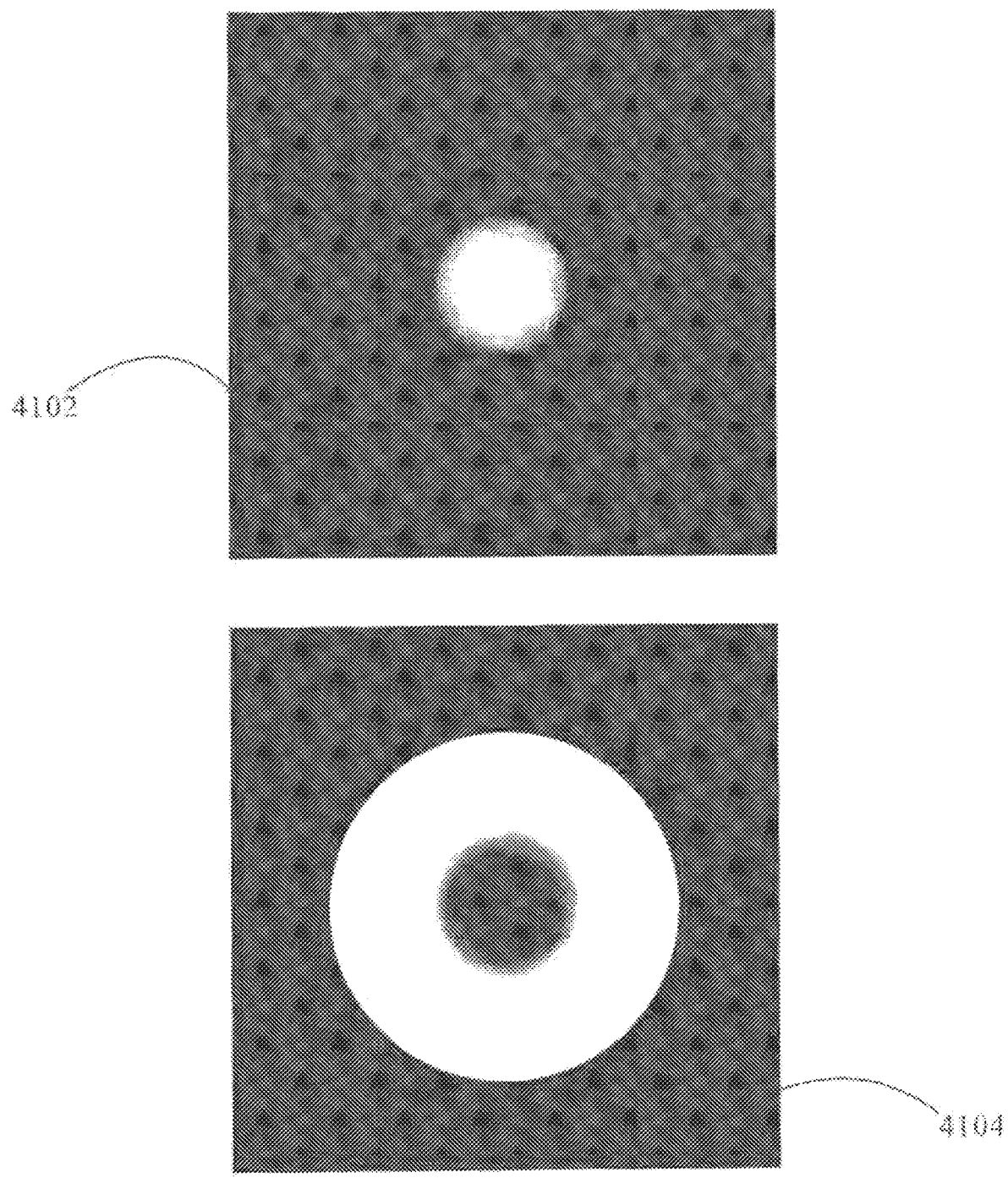
FIG. 41 illustrates a cross-sectional views of an inner field of view aperture stop and an outer field of view aperture stop according to some embodiments.

As explained above, anatomical retinal variations cause vision quality to vary over a user's field of view. A ray densification system takes advantage of anatomical retinal variations to increase the projector's FOV. In some embodiments, this is accomplished by modifying the beam launchers to include ray densification optics. Some versions include partially mirrored surfaces that segment projected imagery, into two pieces to be projected as: inner FOV, 4102, and outer FOV, 4104, as shown in FIG. 41.

Figure 42A:
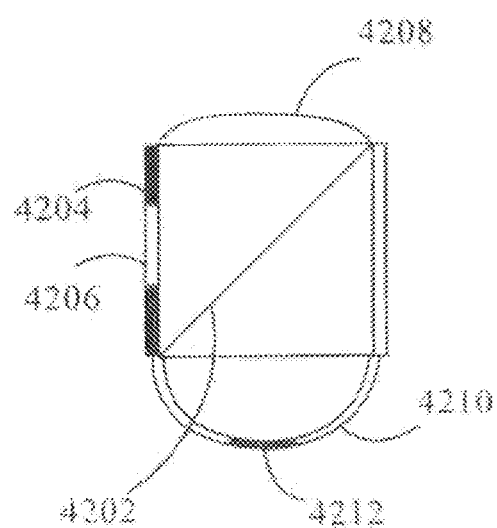
FIGS. 42A-D illustrate beam launching devices comprising ray densification means that project augmentation imagery within an inner and an outer field of view of a user according to some embodiments.

Four different versions of ray densifying beam launchers are depicted in FIGS. 42A-D. FIG. 42A illustrates a pseudo-lantern beam launcher design. A collimated projector beam enters from the right and is split into two beams by a 50/50 liquid crystal mirror (LCM), 4202. Half the light passes through the beam-splitter and reflects off a second LCM device, 4204, on the left hand face of the beam launcher cube, opposite the entry face. The second LCM, has a central mirrored surface, 4206. This light is collimated by a lens, 4208, placed at the exit face of the beam launcher cube. A second half of the light reflected from the beam-splitter surface is retro-reflected back from a parabolic mirrored surface, 4210. At the center of the parabolic surface, 4210, there is a dark spot of low reflectivity, 4212.

In some embodiments, light passing through the pseudo-lantern beam launcher will exit with a sharp FOV over the central 30 degree FOV, and a wide peripheral FOV, with less resolution. The rays have been compacted so that they are denser in the central portion of the user's FOV taking advantage of the anatomy of the human eye to produce an immersive wide FOV by putting optical information where it is most needed. The disadvantage of the pseudo-lantern beam launcher is its relatively poor throughput. Only 50% of the light entering the beam launcher makes it out the output face of the device. However, the small form factor this design allows makes it an attractive version of the ray densification system.

Figure 42B:
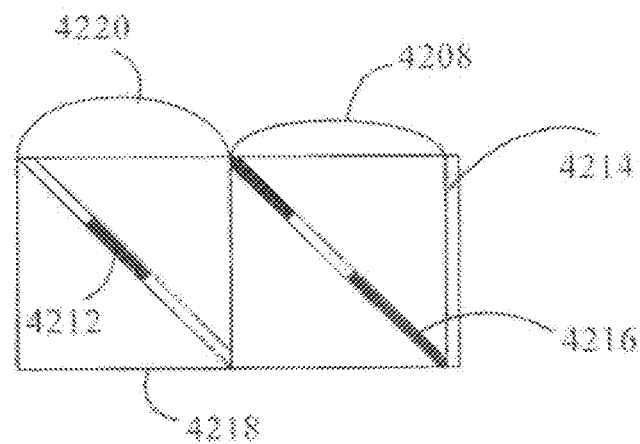

A second design, illustrated in FIG. 42B, is a 2-cube beam launcher. In this design, the inner and outer FOV are output coupled by 2 different beam launcher cubes. A first beam launcher cube, 4214, output couples the inner FOV. The rest of the beam passes through the beam splitter, 4216, and enters a second beam launcher cube, 4218. This beam launcher output couples with a short focal length lens (or negative lens), 4220, to spread the outer FOV over a desired FOV of a user. In some embodiments, lenses on the output faces of the beam launcher cubes, 4208 and 4220, comprise an adjustable focus optic, such as a liquid crystal lens to provide adaptive control. The 2-cube beam launcher design has the obvious disadvantage that it greatly increases the size of the beam launcher array.

Figure 42C:
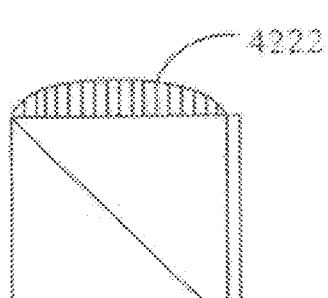

A third design, illustrated in FIG. 42C, is a single diffractive optical element (DOE) beam cube. In an embodiment of this design, an entire beam is output coupled through a DOE, 4222, that spreads the beam nonlinearly. At the center, the inner FOV of the beam is modified by the DOE, 4222, as if by a normal collimating lens. And at the periphery, the outer FOV of the beam is modified by the DOE to be spread out over a wide-angle. Embodiments of this version of a ray densification system are small and have high light throughput. However, DOEs are typically more expensive to manufacture than conventional optics.

Figure 42D:
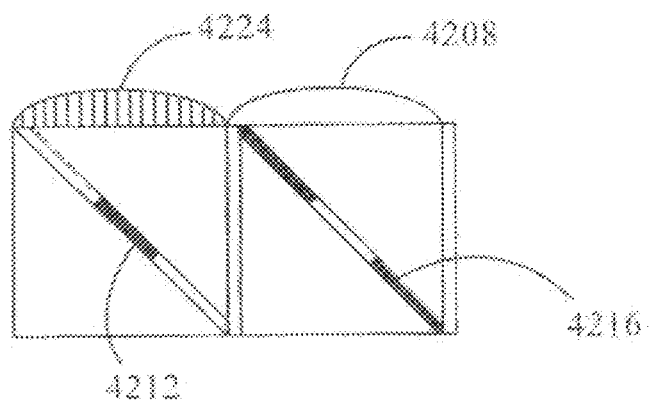

A fourth design, illustrated in FIG. 42D, is a DOE double beam launcher cube. The DOE double beam launcher cube comprises two beam launcher cubes. The inner FOV is output through a high-quality imaging lens, 4208, and the outer FOV is output through a DOE wide-angle lens, 4224. Embodiments of the DOE double beam launcher cube benefit from use of the DOE wide-angle lens, 4224, and retain high image quality over the inner FOV.

Figure 43A:
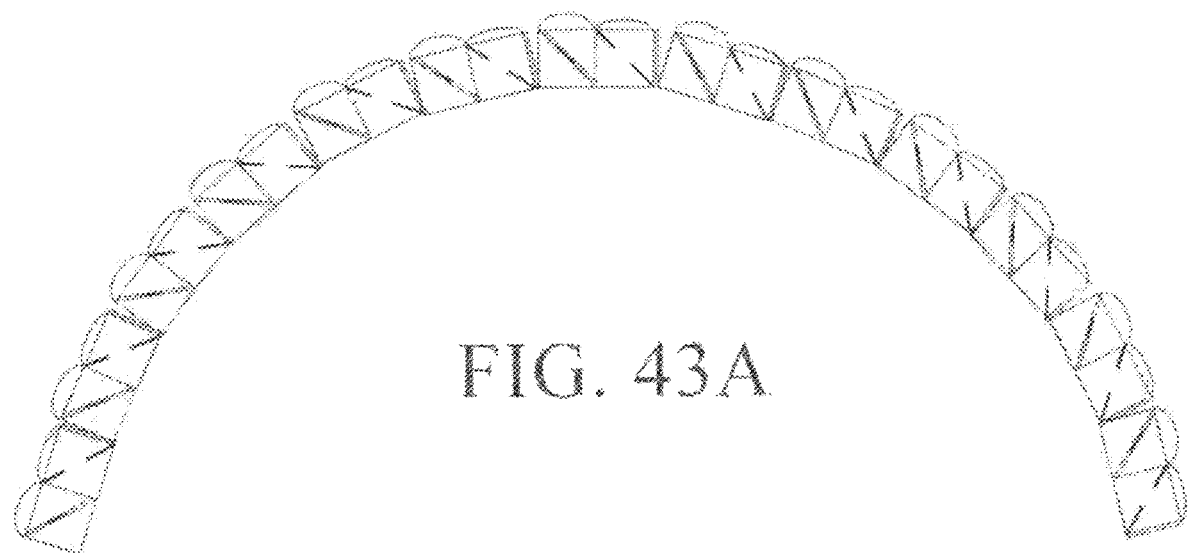
FIGS. 43A-C shows beam launching array rows comprising different means of ray densification, or projecting an image at an inner and an outer field of view of a user according to some embodiments.
Figure 43B:
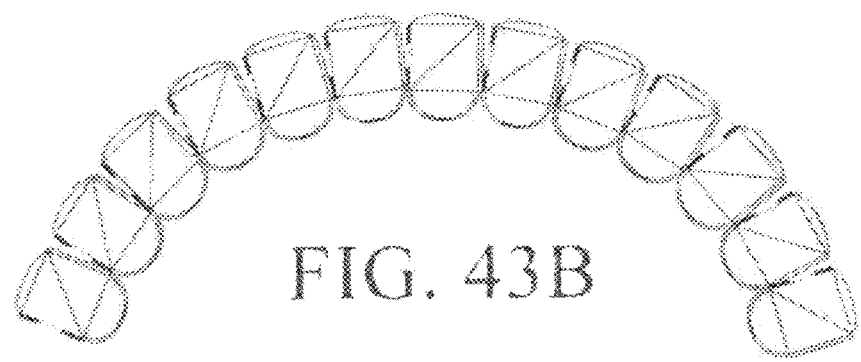
Figure 43C:
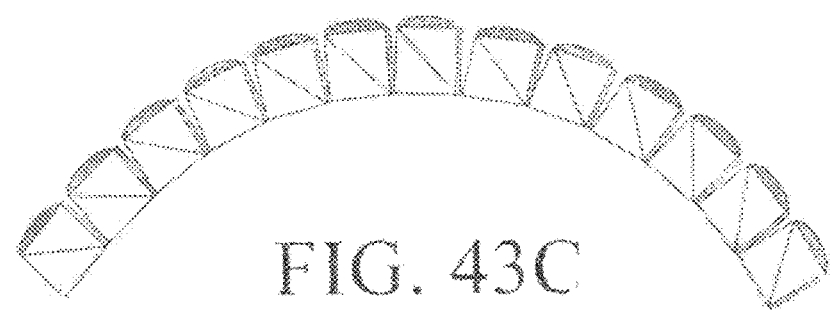

Beam launcher cubes comprising ray densification optics may also be assembled into a BLA as described above. An embodiment of a BLA comprising a two launcher cube, ray densification system is shown in FIG. 43A. An embodiment of a BLA comprising the pseudo-lantern beam launcher is illustrated in FIG. 43B. An embodiment of a BLA comprising the DOE beam launcher cube is illustrated in FIG. 43C. As can be seen in FIGS. 43A-C, BLAs comprising single cube beam launchers are smaller than BLAs comprising two cube beam launchers. However, there is little difference in size between BLAs comprising the pseudo-lantern beam launchers and BLAs comprising the DOE cube launchers.

In some versions, light associated with augmentation imagery is projected by a light generator over a wide field of view (FOV) of a user. The light is encoded by a field mapping, which comprises color values and depth values associated with render data. In some versions, the field mapping comprises a higher resolution color mapping over an inner portion of light than an outer portion of light. The inner portion of light being imaged incident a central vision of the user. And, the outer portion of light being imaged incident a peripheral vision of the user. In some version, the field mapping comprises a depth mapping containing focal depth values for accommodation of stereoscopic augmentation imagery. The depth mapping can contain depth information for all light being projected. According to another embodiment, the depth mapping contains focal depth values for the inner portion of light that is to be imaged at the central vision of the user, and provides no focal depth data for the outer portion of light that is to be imaged at the peripheral vision of the user. Some versions of the system, which comprise non-linear field mappings, further comprise: an eye-tracking system. The eye-tracking system provides eye-tracking data, in response to a measured position of the user's pupil. A controller is used to generate the field mapping in response to the eye-tracking data.

Head Mounted Display (HMD) Controller

In some embodiments, an HMD Controller is responsible for commanding all HMD subsystems in the correct sequence to generate desired output imagery. A version of an A-HMD Command process is depicted in FIG. 44.

Figure 44:
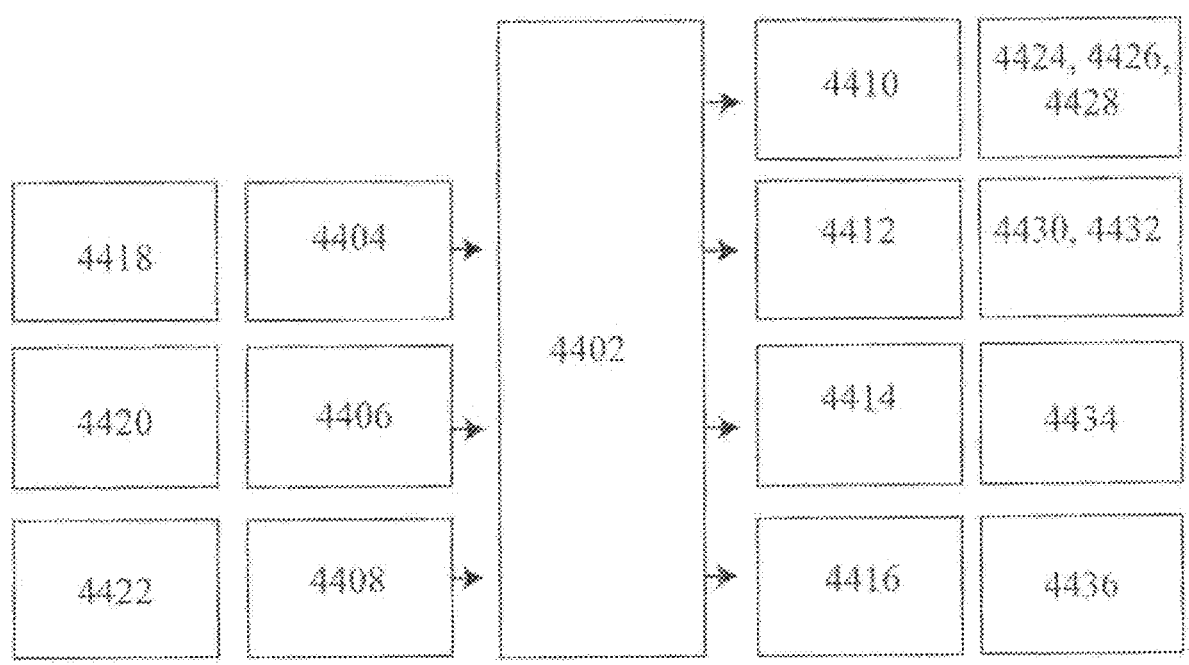
FIG. 44 is a block diagram showing an HMD controller, comprising an HMD local processing according to some embodiments.

Referring to FIG. 44, an HMD local processing, 4402, receives external render data, 4404, jitter sensor data, 4406, and eye-tracking data, 4408. The HMD Local processing updates the HMD system state, and the HMD local processing then sends commands to the accommodating projector,

4410, wide field projector, 4412, the jitter stabilization system, 4414, and the beam launching array, 4416. Exemplary data input rates of update for some embodiment systems are: 30 Hz for external render data rate, 4418, 480 Hz for a jitter sensor data rate, 4420, and 480 Hz for an eye-tracking data rate, 4422. Exemplary accommodating projector rates for some embodiments are: 30 Hz for an accommodating projector frame rate, 4424, 120 Hz for an accommodating projector refresh rate, 4426, and 480 Hz for an accommodating projector focus adjustment rate, 4428, projecting over four focal depths. Exemplary wide field projector rates for some embodiments are: 30 Hz for a wide field projector frame rate, 4430, and 120 Hz for a wide field projector refresh rate, 4432. An exemplary jitter stabilization refresh rate, 4434, for some embodiments of a jitter stabilization system, 4414, is 120 Hz. And, an exemplary beam launching array refresh rate, 4436, is 120 Hz.

Figure 45:
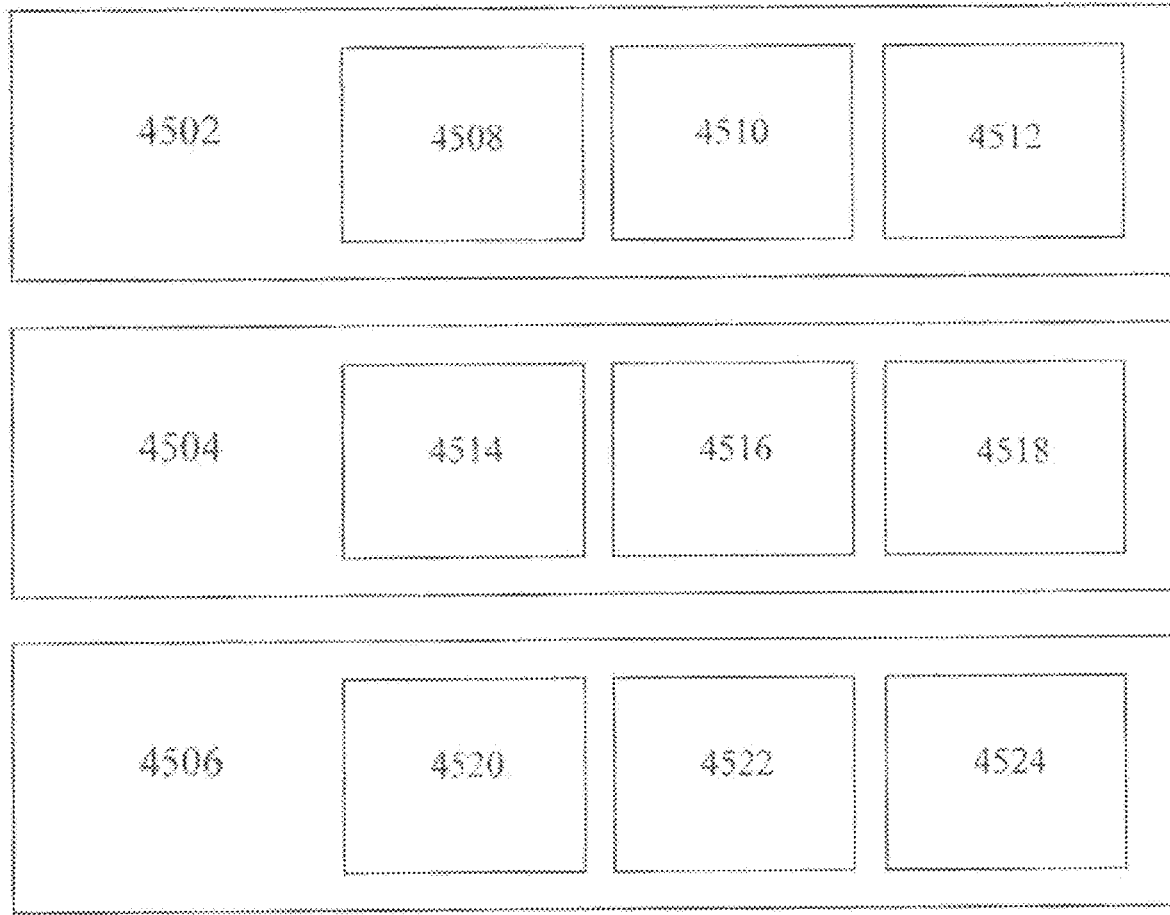
FIG. 45 illustrates exemplary rates for a number of HMD commands according to some embodiments.

A timing sequence undertaken by an example HMD controller is illustrated in FIG. 45. Referring to FIG. 45, there are three sequences of commands that are updated at three key commanding frequencies: a High-Rate, 4502, or about 480 Hz, a Mid-Rate, 4504, or about 120 Hz, and a Low-Rate, 4506, or about 30 Hz: Commands that are updated at the High-Rate comprise:

Receive Jitter Data, 4508, comprising: measured head motion jitter,
Receive Eye-Tracking Data, 4510, comprising: measured gaze vector; and
Update Accommodating Projector Focal Depth, 4512, comprising: refreshing the accommodating projector's focal depth position.
Commands that are updated at the Mid-Rate comprise:
Update the Control States, 4514, comprising: update commands to the jitter stabilization system,
Command the beam launching array, 4516 comprising: updates to gaze direction of the BLA; and
Refresh Projector Systems, 4518, comprising: refreshing the projector pixel for both the accommodating projector and the wide field projector.
Commands that are updated at the Low-Rate comprise:
Receive Render Data, 4520, comprising: un-rasterized augmentation data,
Update Accommodating Projector, 4522, comprising: RGB(x, y, z) projector state updates; and
Update the Wide Field Projector, 4524, comprising: RGB (x,y) projector state updates.

A-HMD Integrated System

Figure 46:
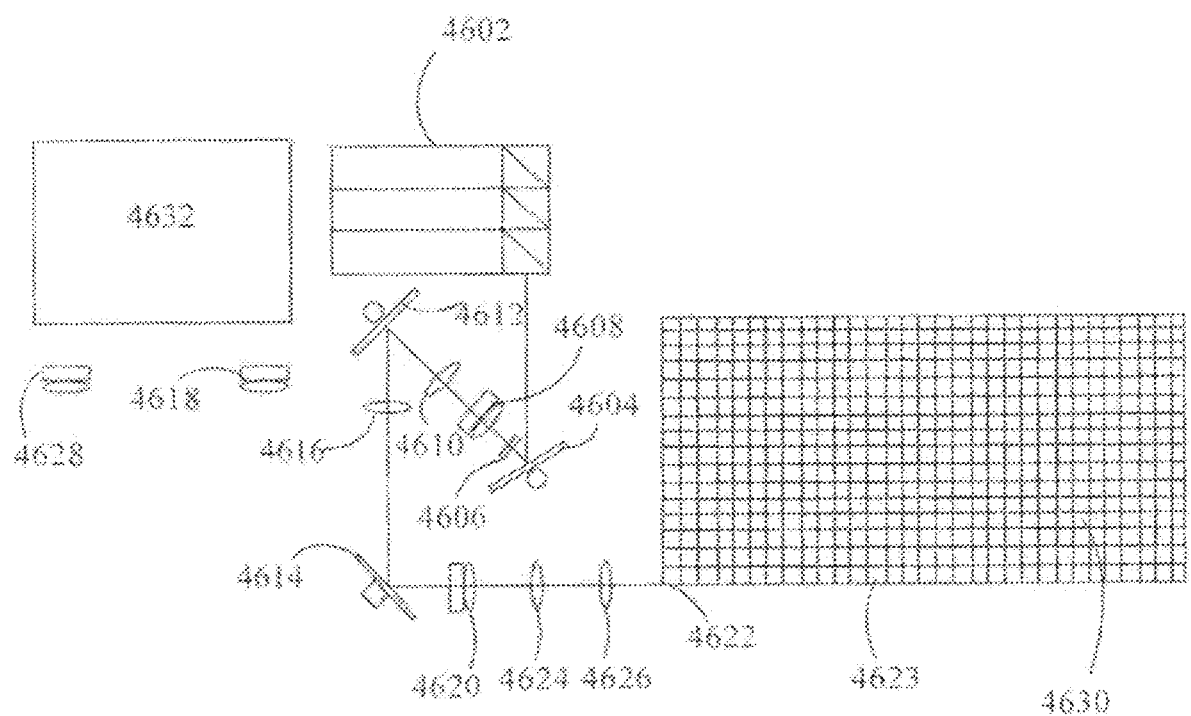
FIG. 46 depicts an exemplary A-HMD system according to some embodiments.

An example configuration of an A-HMD is illustrated in FIG. 46. The A-HMD shown in FIG. 46 comprises an accommodating projector, an augmentation stabilization system, a ray densification system, and a first portion of an image fusion system. Not shown in FIG. 46 is a beam combiner that reflects output augmentation imagery from a beam launch array incident an eye of a user.

Referring to FIG. 46, light, which is color encoded, is projected by a projection source, 4602, and reflected by a MEMs mirror, 4604. The MEMs mirror scans the light in response to a field mapping. The field mapping, having been generated by a controller, defines augmentation imagery that is to be imaged within a field of view of a user. The light being scanned upon an aperture stop, 4606, is imaged incident an adjustable focus optic, 4608. The adjustable focus optic, 4608, operates in response to the field mapping in order to modify the vergence of the light, thereby adding one or more focal depth values to the light. In some embodiments the light is further acted upon by a lens, 4610. The light is then modified by an augmentation stabilization system. The embodiment of the augmentation stabilization system shown in FIG. 46 comprises a fast steering mirror (FSM), 4612, and a pupil adjustment mirror (PAM), 4614, as well as a number of optics, 4616. The number of optics, within the augmentation stabilization system, image the light to pupil planes, coincident with the FSM, 4612, and the PAM, 4614. Measurements relating to high frequency (greater than 10 Hz) changes to a pose of the user's head are made by a jitter sensor, 4618. The jitter sensor, 4618, may comprise one or more electronic elements selected from a list of: accelerometers, gyroscopes, magnetometers and inertial measurement units (IMUs). FSM, 4612, and the PAM, 4614, translate the light in response to small eye movement measurements correlated from measurement taken by the jitter sensor, 4618. Another lens, 4620, is used in some embodiments to reimage the light. The light in some embodiments is decreased in size by a compressor such that the diameter of the projected beam matches, or is smaller than an entrance aperture, 4622, of the beam launching array (BLA), 4623. In the version an image fusion system shown, the compressor comprises a first compressor lens, 4624, and a second compressor lens, 4626. The light is input coupled into the image fusion system and the beam launch array, 4623. An eye-tracking system, 4628, measures a location of the user's pupil and thereby determines a gaze vector that is associated with the user's line of sight. The light is output coupled from the beam launch array, 4623, from a beam launching cube, 4630. The beam launch cube, 4630, from which the light is reflected, is selected by a controller in response to eye-tracking data measured by the eye-tracking system, 4628, in order to ultimately image the light at the eye of the user. Light being output coupled from the beam launching cube, 4630, and prior to being imaged at the user's eye, is reflected by a curved beam combiner, not shown. The curved beam combiner being placed in the user's line of sight allows for the light from the beam launch array to be reflected into the user's eye, in addition to external light from the surroundings. The above described series of events is duplicated for the user's second eye allowing for stereoscopic perception of the augmentation imagery. And thus, the user can see both the world, as it is around her, and be immersed in augmentation imagery simultaneously. The HMD systems are controlled by an HMD controller, 4632, which causes the systems to update and refresh, at the above described rates. The user may move: her eyes, her head; and her body, without ever perceiving that some of what she is seeing, the augmentation imagery, is virtually generated, and not a palpable part of her surroundings, as her eyes would have her believe.

Additional Versions

A Liquid Crystal Wedge, or Wave Front Corrector, Augmentation Stabilization System As explained above, Augmentation jitter is the apparent motion of augmentation imagery relative to the user's view of the real world. This can have the effect of making augmentation imagery shake or move in relation the viewed scene. It is a problem for AR head mounted displays (HMDs) because it breaks a user's sense of immersion. The motion of the HMD relative to the world-view creates projected augmentation jitter. The motion of a human head relative to the real world may be represented by 6 degrees of freedom: x, y, z, x_rot, y_rot, z_rot. If we assume small rotations and translations of the head position, then the projected augmentation imagery is just translated relative to the world-view. According to the Fourier shift theorem, a shift in the image plane results in a phase gradient in the pupil plane (tip/tilt) and vice versa. Therefore, translations of augmentation imagery relative to the world-view may be corrected by applying a tip/tilt to the exit pupil of the projector system. Normally this is achieved with a tip/tilt mirror (jitter mirror), such as a MEMs mirror. However, the same function may be achieved with a set of liquid crystal (LC) wedges.

Figure 47A:
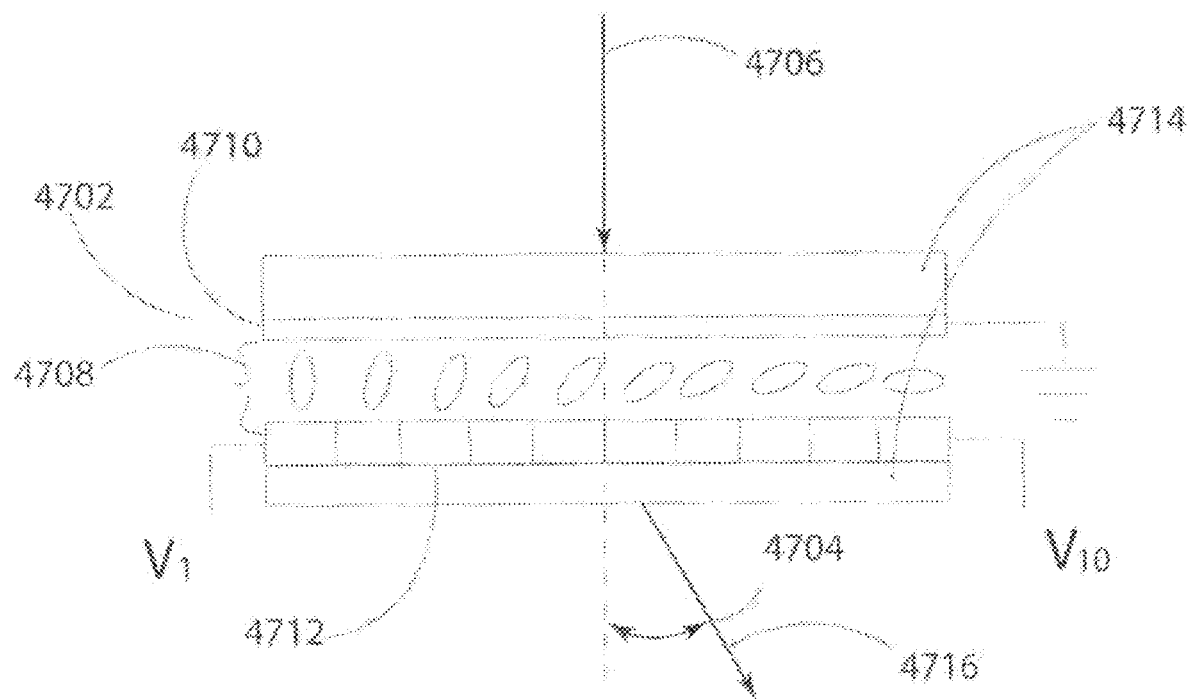
FIGS. 47A-B depicts a wave front corrector configured to introduce a tip gradient according to some embodiments.
Figure 47B:
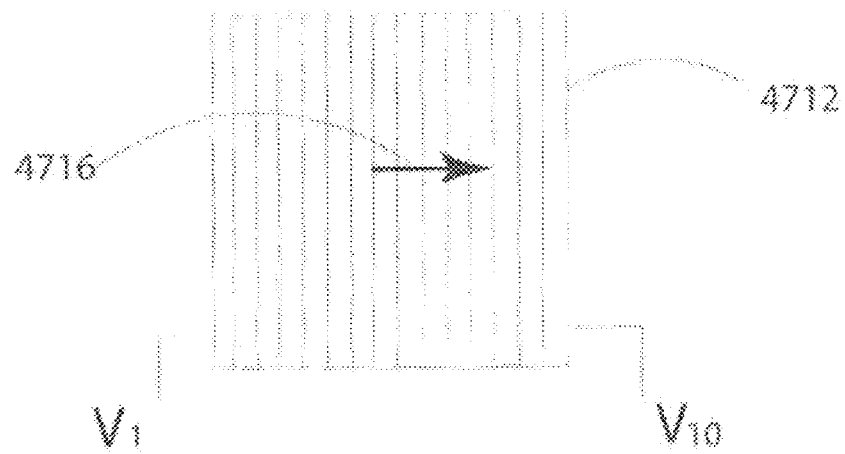

FIGS. 47A-B depicts a wave front corrector or liquid crystal wedge, 4702, introducing a tip gradient, 4704. An input beam, 4706, is shown entering the wave front corrector perpendicularly from the top. The wave front corrector is constructed as described above. A liquid crystal layer, 4708, is located between two transparent electrodes, 4710 and 4712, and two optically clear substrates, 4714. In the shown embodiment, a common electrode, 4710, is un-patterned and electrically connected to ground. A patterned electrode, 4712, is arranged, such that electrodes are patterned in individual strips. It can be seen from FIG. 47A that a potential V1 is introduced on a left most region of the patterned electrode, 4712. The nine regions to the right of the left most region have a potential applied to them, which is lower than the potential in the region to their immediate left. The right most region of the patterned electrode has little-to-no potential, V10, applied to it. The potentials V1 through V10 are applied in a steady ramp from a high at V1 to a low at V10. The applied voltage results in a change in an orientation of liquid crystal molecules within the liquid crystal layer, 4708. The change in orientation of liquid crystal molecules causes a change in an index of refraction across the surface of the wave front corrector, thereby introducing a tip to the output beam, 4716.

Figure 48:
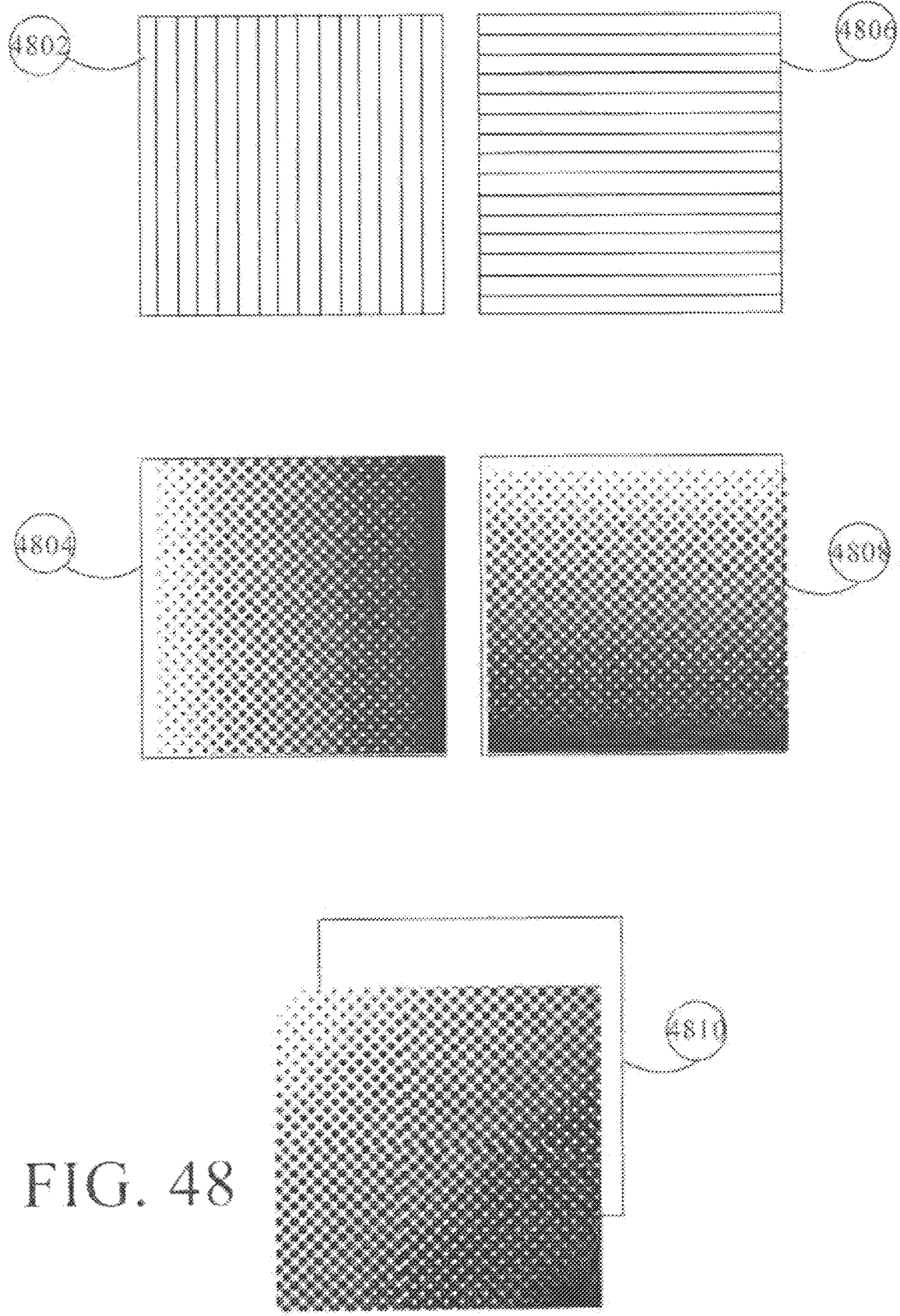
FIG. 48 illustrates gradient anode patterns, optical path differences resulting from gradient anode patterns, and a combined optical path difference according to some embodiments.

FIG. 48 depicts a number of wave front correctors, such as liquid crystal wedges (LCW), which are patterned to produce a tip/tilt gradient in a passing beam. A LCW has an electrode pattern comprising: a series of strips through which a non-uniform potential is applied across the liquid crystal layer. A phase gradient (tip/tilt) may be introduced by varying the potential in a linear ramp, causing the input beam to deflect at an angle equal to an induced wedge angle. A horizontal wedge, 4802, creates a horizontal tilt, 4804, in the horizontal plane and steers the beam to the left or right. A vertical wedge, 4806, creates a tilt in the vertical plane, 4808, and steers the beam up or down. The vertical wedge, 4806, and the horizontal wedge, 4802, acting in concert produce a total tilt, 4810, in two planes. Some embodiments of an augmentation stabilization control system comprise: at least two liquid crystal wedges, and a jitter sensor (e.g. a gyro, accelerometer). Alternatively, a single wave front corrector may be configured with multiple etched electrode layers, in order to produce both tip and tilt gradients.

Augmentation Stabilization Control System to Correct Optical Jitter

Figure 49:
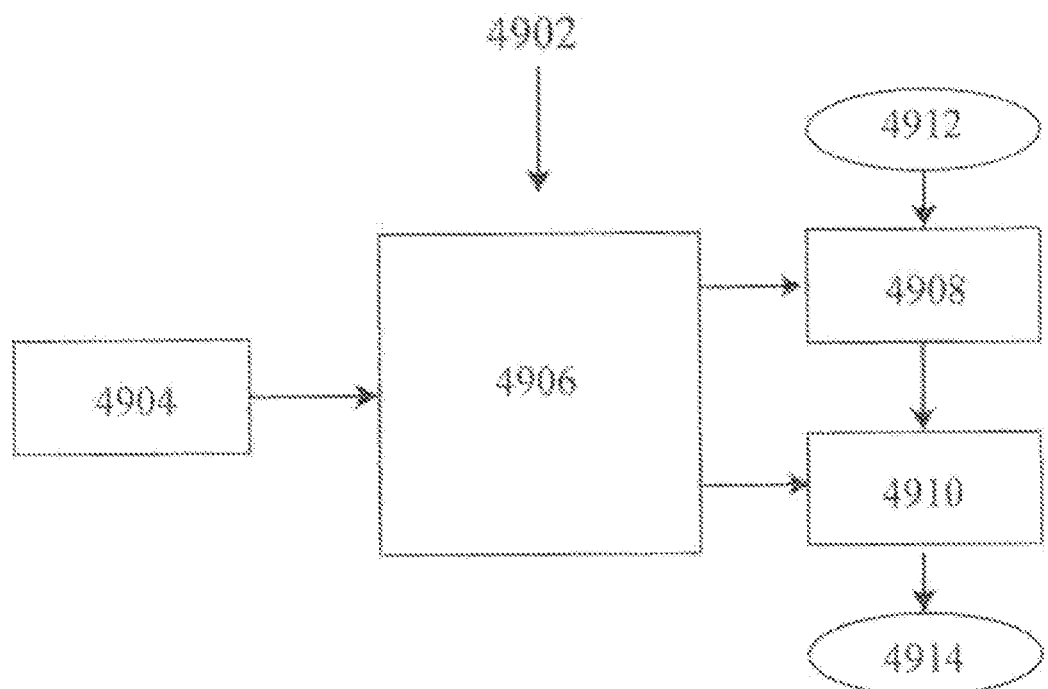
FIG. 49 shows a block diagram from an open and closed loop augmentation stabilization system according to some embodiments.
Figure 49:
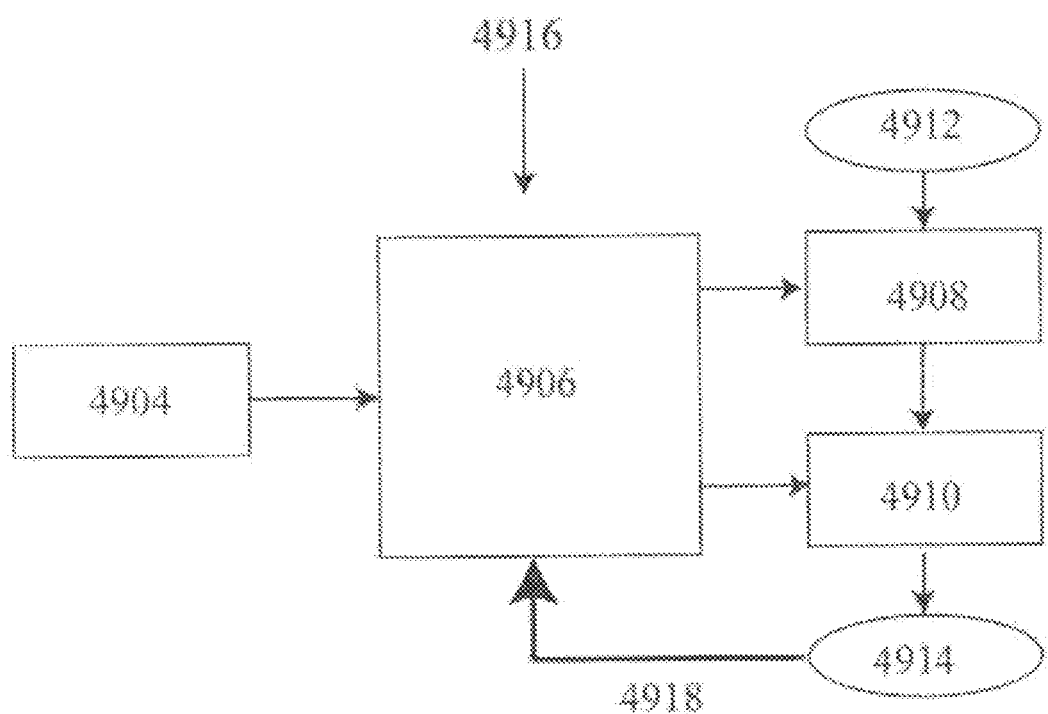

An augmentation stabilization control system may be operated in either open, 4902, or closed loop, 4916. The two control processes are illustrated in FIG. 49. Optical jitter as described in detail above, results from HMD movement relative a user's eyes. In the open-loop mode, 4902, the projector's optical system is held rigidly in respect to the user, and therefore no feedback is required. The open loop augmentation stabilization system then operates to correct augmentation jitter, and not optical jitter. As described in detail above, a jitter sensor, 4904, provides data to a jitter controller, 4906, which operates a X-Tilt LC Wedge, 4908, and a Y-Tilt LC Wedge, 4910, to adjust incoming optical data, 4912, and reposition the resulting image, 4914. The augmentation stabilization control system may also be operated in closed-loop mode, 4916, if the projector system is not held rigidly. The closed-loop control system can correct for optical projector jitter by applying a jitter correction to offset the error. In this case, the feedback, 4918, is a measurement of the projector jitter directly, either through in scene motion detection, or an optical jitter sensor in the projector beam's path. Examples of jitter sensors that detect optical jitter include: shearing interferometer, Shack-Hartmann sensor, pyramid sensor, curvature sensor, and speckle jitter sensor. Regardless of jitter sensing means, the sensed jitter of the projector relative to its initial axis may be corrected for, with a closed-loop augmentation stabilization control system. The examples of open and closed loop augmentation stabilization control systems explained in reference to FIG. 49 comprise liquid crystal wedges. Other augmentation stabilization control systems, such as those described in detail above that comprise fast steering mirrors, may also be operated in closed loop mode in order to reduce optical jitter.

Figure 50:
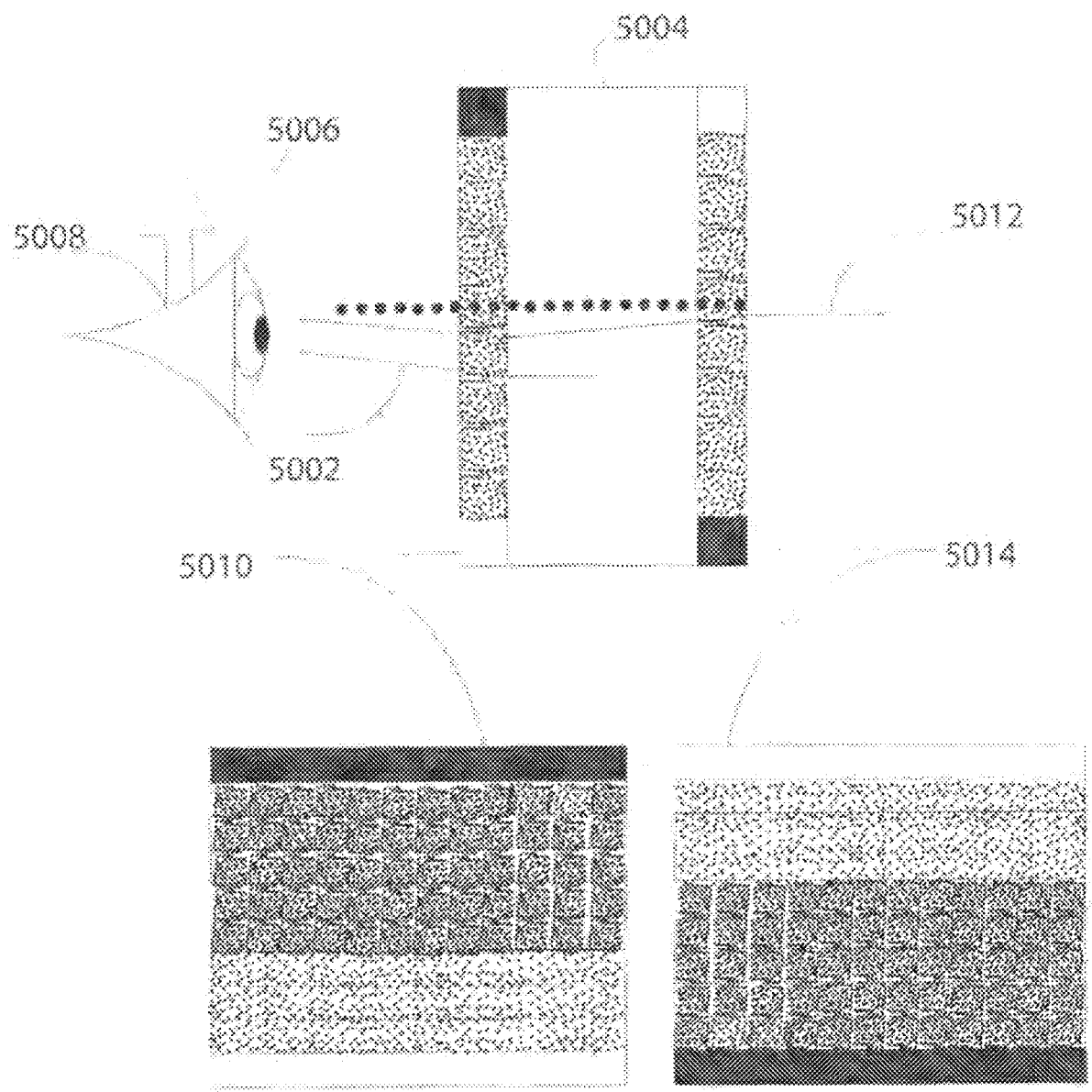
FIG. 50 illustrates an alternative embodiment of an augmentation stabilization system configured with multiple wave front correctors and a waveguide according to some embodiments.

Alternative Embodiment: Augmentation Stabilization Control System to Correct Jitter with an Embodiment Comprising a Waveguide In an alternative embodiment, projected light, 5002, associated with display imagery is projected through a waveguide, 5004. FIG. 50 illustrates a stabilization control system configured to correct jitter, 5006. Jitter causes projected light, 5002, to be dislocated relative a user's eye, 5008, as it is being emitted from the waveguide, 5004. A first wave front corrector, 5010, is located between the waveguide, 5004, and the eye, 5008. In some embodiments, the wave front corrector is configured to produce a tip and/or a tilt. As described above, the tip/tilt introduced by the first wave front corrector, 5010, can translate the projected light, and the associated augmentation imagery, thus correcting the jitter. In some embodiments, the projected light, 5002, and the light from the surroundings, 5012, have the same polarization, or both light sources are unpolarized. In this case, the first wavefront corrector, in correcting the mislocation of the projected light, 5002, also mislocates the light from the surroundings, 5012. A second wave front corrector, 5014, is used to produce a contrary tip and/or tilt, thus acting to undo the effects of the first wave front corrector on the light from the surroundings, 5012. In alternative embodiments, only the first wave front corrector is required, because the light from the surroundings is of a different polarization than the projected light or is unpolarized. The augmentation stabilization control system further comprises a jitter sensor, described above, which measures augmentation and/or optical jitter.

Multi-Projector Systems

Figure 51:
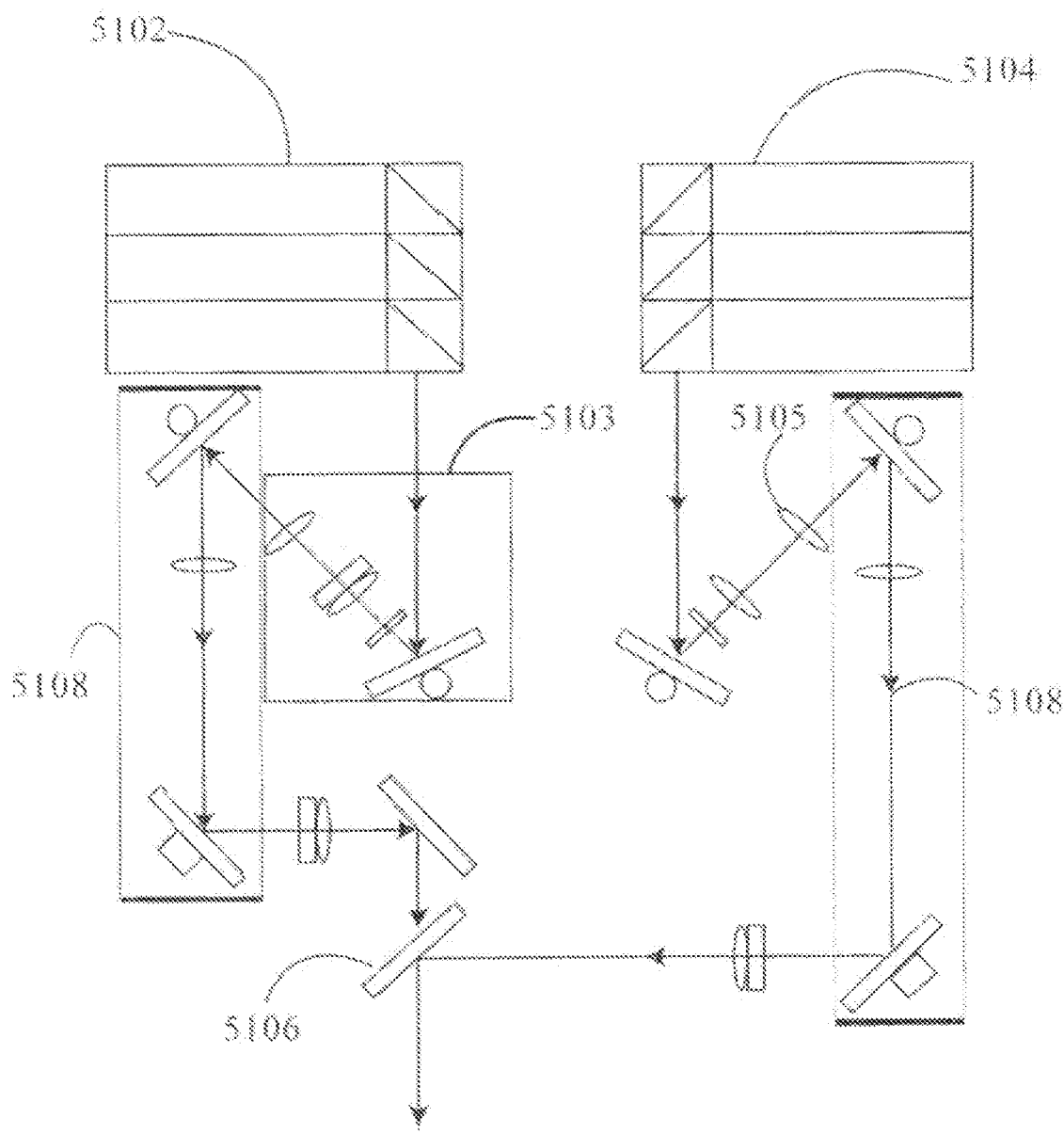
FIG. 51 shows a schematic containing an inner and an outer projection system for displaying imagery to a user according to some embodiments.

In some embodiments, an A-HMD comprises a light generator having more than one projector to generate augmentation imagery to project into a single eye of a user. For example, a ray densification system may comprise two projectors, as shown in FIG. 51. A first projector system, 5102, comprises an accommodating projector system, 5103, that renders an inner FOV. In some versions, the first projector system renders only the inner 30° (+/−15°) of the total FOV by applying an inner FOV aperture stop. A second projector system, 5104, comprises a wide field non-accommodating projector, 5105, that renders an outer FOV by applying the outer FOV aperture stop. In some versions, the second projector is non-accommodating, because the human eye cannot see in focus beyond the inner 30° FOV (+/−15°). Even though a user can have a sense of depth due to stereoscopic vision, the image quality is poor and symbols are not recognizable. Beams from the first and second projector systems are brought back together in a pupil plane and recombined by a beam combiner, 5106. This recombined pupil may then be re-imaged onto the entrance pupil of the eye (or onto another intermediate pupil) and the image that forms on the retina of the eye will merge the inner and outer FOV images to form a total FOV image. By doing this we may increase either the refresh rate or the resolution of the rendered scene as compared to a projector that renders the wide FOV. The projector of the inner FOV is an accommodating projector, because the human eye can accommodate for focal depth over the central portion of the FOV. However, the human eye can focus on only one depth at a time, so if the eye tracking precision is high enough only one focal depth need be rendered. Eye-Tracking precision specifications may be relaxed somewhat if the projector is run faster and includes multiple "nearby" focal depths. In some embodiments, both inner, 5102, and outer, 5104, projection systems comprise augmentation stabilization systems, 5108. Other embodiments, comprise a single augmentation stabilization system that acts on both the inner and outer FOV of the displayed image.

Eye Refractive Error

Figure 52:
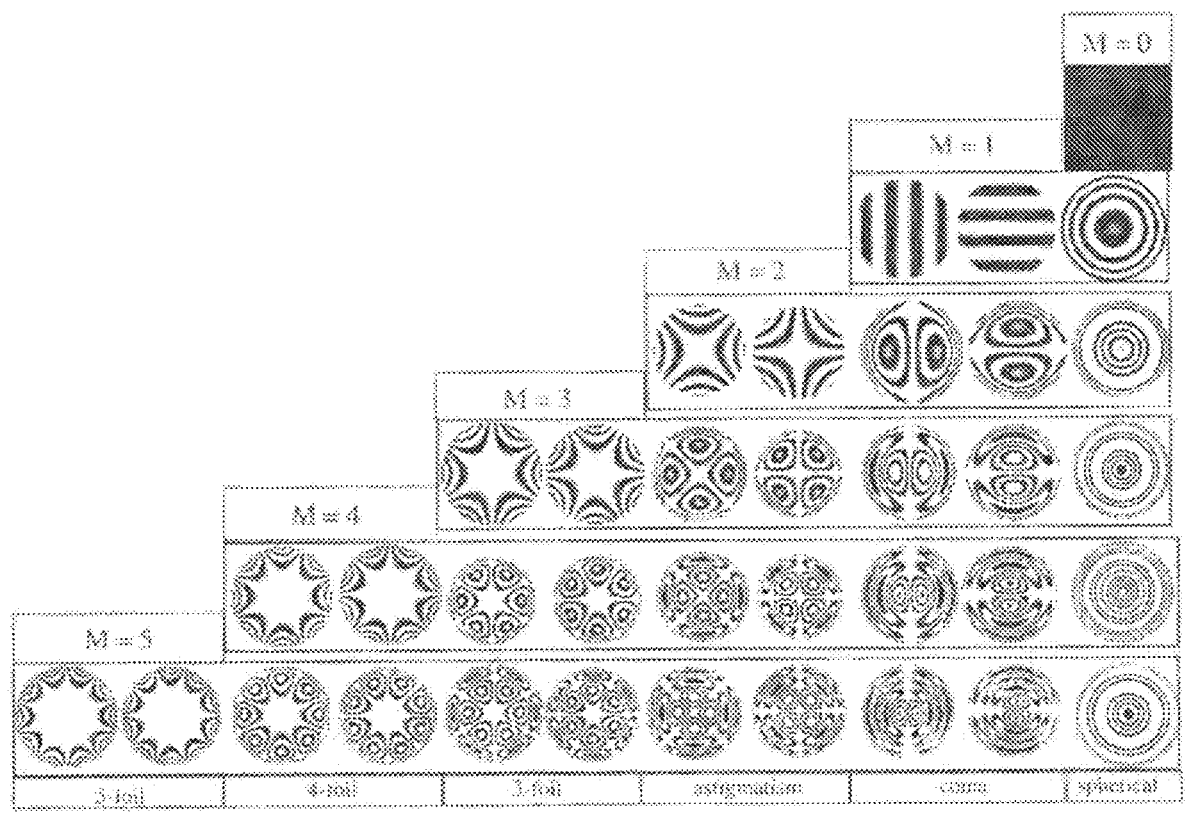
FIG. 52 represents Zernike modes.

The human eye's ability to accurately form an image of an object varies from person to person and is measured by the eye's refraction error (also known as wave front error). An eye's refraction error may be measured in several ways: an autorefractor, a retinascope, or with a wave-front sensor. Wave front error is a two-dimensional measurement of the wave front's departure from an ideal planar wave front. The 2D patterns are often decomposed into Zernike modes, because the modes map well into optical distortions such as defocus, astigmatism, and coma. Zernike modes are shown in FIG. 52, grouped according to their symmetry number, M. In general, the more diversity of information that is retrieved, the more accurately the refraction error may be decomposed into Zernike modes. Often times very little diversity is used and the total refractive error integrated over all modes is used as a metric of eye performance.

Autofocus

Head Mounted Displays (HMDs) can be configured to fit a variety of different people with different shaped heads, and different optical prescriptions. The distance between a projector and the pupil of a user's eye (the HMD eye depth) will vary from person to person. Therefore, some embodiments of an accommodating HMD adjust the prescription of the system to compensate for variable HMD eye depth.

Some embodiments of an autofocus optical system use a control system consisting of a sensor and a tunable optical element to focus automatically. Auto-focus methods are, active, passive, or a hybrid of the two. An active autofocus system measures the distance to an object by emitting a probe signal and measuring the probe's response. Whereas a passive system, determine correct focus by measuring light from an object itself without an active probe.

Examples of active probes include: ultrasonic sound waves, radio waves, or infrared light pulses. In either of these cases, measuring the pulse frequency Doppler shift or the pulse's time of flight is used to determine the range to an object. Examples of passive autofocus systems include: phase detection systems and contrast detection systems. In low light, hybrid systems are often used that use an assist lamp to illuminate an object so that a passive detection technique is viable.

Some versions of an autofocus system comprise a liquid crystal (LC) lens as the tunable optical element. In this case, the focal length of the LC lens is varied until a sharp image forms in a predetermined test plane (possibly the retina of the eye). An exemplary system uses two lenses combined to form an effective lens that will exactly image the projected light onto the retina of the user's eye. The effective focal length of an optical system, $f_{eff}$, composed of two lenses is given by:

$$\frac{1}{f_{eff}} = \frac{1}{f_1} + \frac{1}{f_2} - \frac{d}{f_1 f_2} \quad (7)$$

where $f_1$ and $f_2$ are the focal lengths of the two lenses and d is the distance between them. The combined lens system will form an image at a distance, $s_i$, behind the combined lens when an object is placed a distance, $s_o$, in front of the combined lens as given by:

$$\frac{1}{f_{eff}} = \frac{1}{s_o} + \frac{1}{s_i} \quad (8)$$

A typical autofocus system would adjust the distance d, between the lenses to adjust the location where an image is formed, $s_i$, by adjusting the effective focal length, $f_{eff}$. However, with an LC lens we can directly adjust the focal length of one or both of the lenses in the combined lens system. This allows you to adjust the effective focal length, $f_{eff}$, without the need to physically move a lens.

As a control system, the first lens is the lens of a user's eye with focal length, $f_1$ and the second lens is an adjustable LC lens with variable focal length, $f_2$. The focal length of the LC lens is adjusted until it is matched correctly with $f_1$ to form a combined lens with the correct effective focal length, $f_{eff}$, for a given object distance, so, and image distance, $s_i$, where $s_i$ is specific to a user's eye. The LC autofocus system can correct for both the variation in eye prescription as well as the variable distance between the combined lens system and the user's eye.

For an afocal system, there is no net curvature of the wavefront. In other words, a collimated beam entering the entrance pupil is reimaged at the exit pupil of the system. In this case the effective focal length is infinity (object is at infinity). This is achieved for a two-lens system by separating the lenses by a distance equal to the sum of their focal lengths:

$$d=f_1+f_2 \quad (9)$$

This is a simple case of an autocollimator, where now we adjust the focal length, $f_2$, of the LC lens, until it matches $d-f_1$, which occurs when the exit pupil wave front is planar. In this case the combined lens system will form the best image on the back retina of the user's eye, which can be used as the control sensor.

With user feedback, best focus may be found by adjusting the focal length of the LC Lens until the user indicates that best focus has been reached. Otherwise, 1D (diodes and arrays of diodes) or 2D (camera systems: CCDs, EMCCDs, etc.) optical sensor may be used in an autoreflector configuration as shown in FIG. 53.

Figure 53:
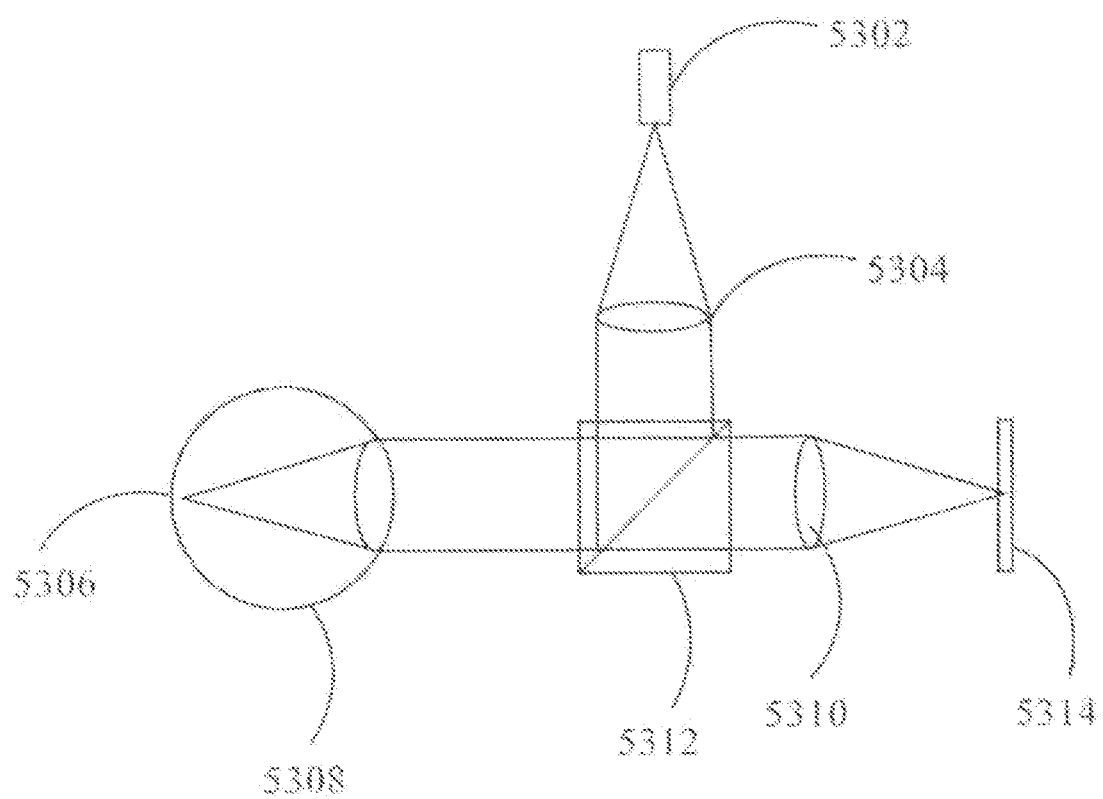
FIG. 53 shows a schematic of a liquid crystal autorefractor according to some embodiments.

Referring to an exemplary autoreflector shown in FIG. 53, a light source, 5302, produces light, which is collimated by a collimating lens, 5304. The light reflected from the back of the retina, 5306, will be imaged by a combined lens system composed of the user's eye, $f_1$, 5308, and an LC lens, $f_2$, 5310. A beam splitter, 5312, is used as a beam return mirror. A second detector, 5314, is placed off-axis with the user's eye. The combined lens will image the retina some distance behind the combined lens system. Now $f_2$ is adjusted until the combined lens system maximizes the sharpness or contrast metric in the image plane of the autofocus sensor system.

Low-Order Wave-Front Control with Liquid Crystal Optics

An embodiment of an Autofocus system as described above also adjusts a prescription of the system to account for the optical prescription of a user's eyes. This could be useful if the HMD is operated in a pure VR mode, where the system could be used to correct for a user's prescription so she doesn't need to use her own eyewear. In an AR mode, the LC control system can be pared with a second system that corrects the external "see-through" optical system.

Figure 54:
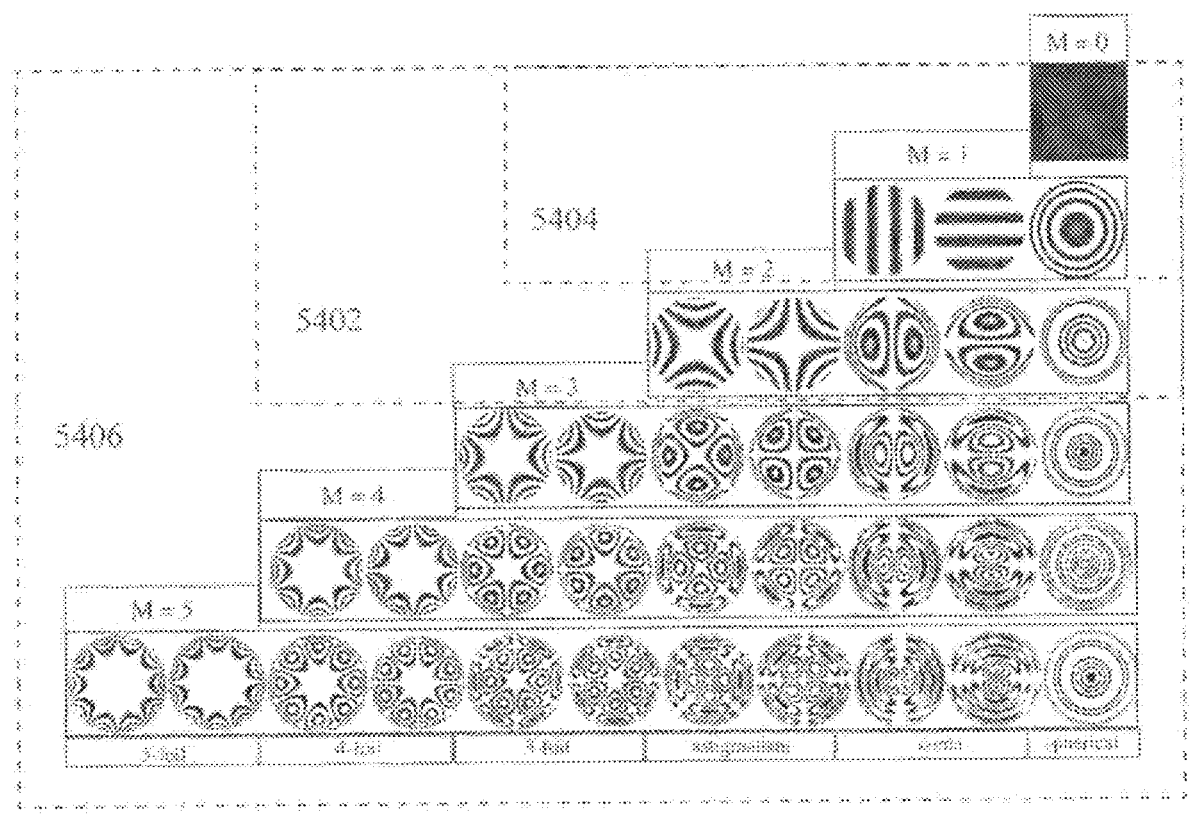
FIG. 54 illustrates wave front control system comparison, comprising: jitter and focus correction, low-order control, and high-order control systems according to some embodiments.

For low order correction, we correct more Zernike modes than just focus. Instead we correct the low order, 5402, Zernike modes that dominate the refractive error of the user's eye, typically this is the first nine Zernike modes. This is achieved with a stack of LC devices similar to the LC lens. Each element of the stack has an anode with the distribution pattern of one of the low order Zernike modes (see FIG. 54). A stack of 8 may be achieved in less than a centimeter wide optical stack. Such a device may be used to offset the low-order error of a user's eye, to achieve best image quality. This effectively corrects for the prescription of a user's eye. FIG. 54 depicts what Zernike modes are controlled for each of three wavefront control systems. The First system just controls jitter (tip/tilt) and focus (autofocus), 5404. This is the current system design. However, with the LC stack Zernike corrector, a low-Order control system may be obtained. If even more Zernike modes are accounted for, a higher-Order control, 5406, will control more modes than just the first nine modes.

Virtual Reality HMD

Above a foveated optical system is described as being incorporated in an augmented reality (AR) head mounted display (HMD). Another, suitable application for a foveated optical system, or a wave front corrector, is virtual reality (VR) HMDs. VR HMDs do not pass visible light from the surroundings to a user. Instead, the user is fully immersed in the virtual imagery provided by the VR HMD. Currently available stereoscopic VR HMDs, such as the Oculus Rift, do not accommodate the stereoscopic virtual imagery. That is to say: the user is provided with a dynamic precept of depth through parallax between the stereoscopic images, and a static focal depth cue through the displayed light. For VR HMDs the focal depth is typically held constant at optical infinity. It is hypothesized that the focus of a person's eyes is interrelated with their precepts of depth from stereoscopic viewing. Dysfunction therefore arises when the stereoscopic view tells the user's mind that the image is at a certain depth, but the user's eyes must focus at a different depth in order to bring the image in to focus. For some users, this can result in poor virtual reality experiences, and even discomfort, which can persist after the user has removed the HMD. A wave front corrector may be used to alter the Zernike mode associated with focus, in order to change the focal depth of light projected in a VR HMD.

Figure 55:
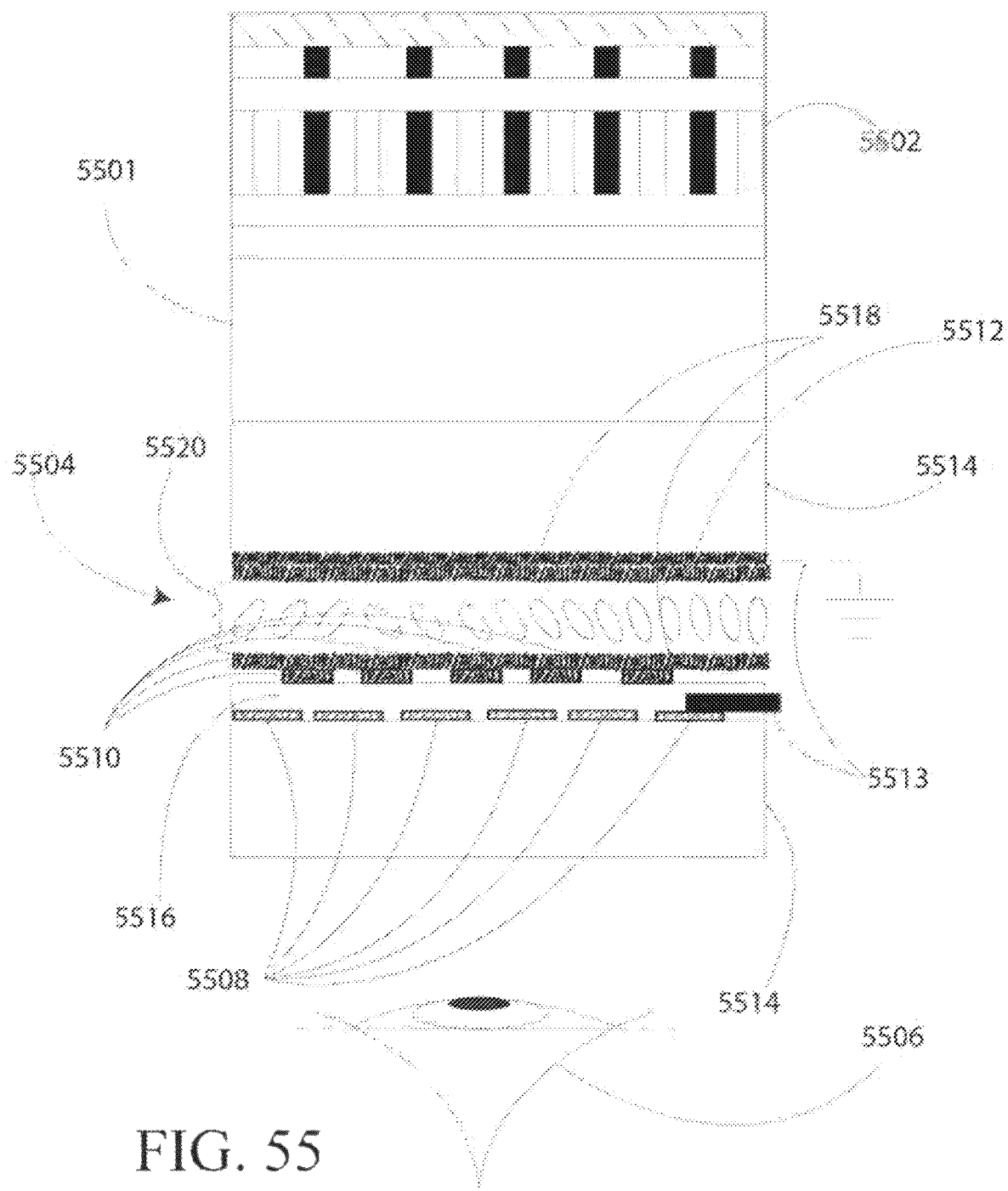
FIG. 55 illustrates a side-by-side view, as displayed by a virtual reality (VR) HMD according to some embodiments.

One half of an embodiment of a VR HMD, 5501, incorporating a wave front corrector is illustrated in FIG. 55. In some embodiments a VR HMD is configured with an OLED display, 5502. Alternatively, a liquid crystal display (LCD), or similar may be used. OLED displays are in many ways preferential, as they do not require backlighting, and can therefore: achieve higher contrast ratios, and be made thinner and lighter than LCDs. As shown in FIG. 55, a wave front corrector, 5504, is placed between the display, 5502, and a user's eye, 5506. The wave front corrector may be configured to alter a focal depth of the virtual imagery, by altering the focus of a wave front, as described above. As described above some embodiments of a wave front corrector for VR applications comprise: patterned, 5508, floating, 5510, and ground electrodes, 5512; conductors, 5513; one or more substrates, 5514; a Silicon Oxide layer, or similar, 5516; one or more alignment layers, 5518; and a liquid crystal layer, 5520.

Figure 56:
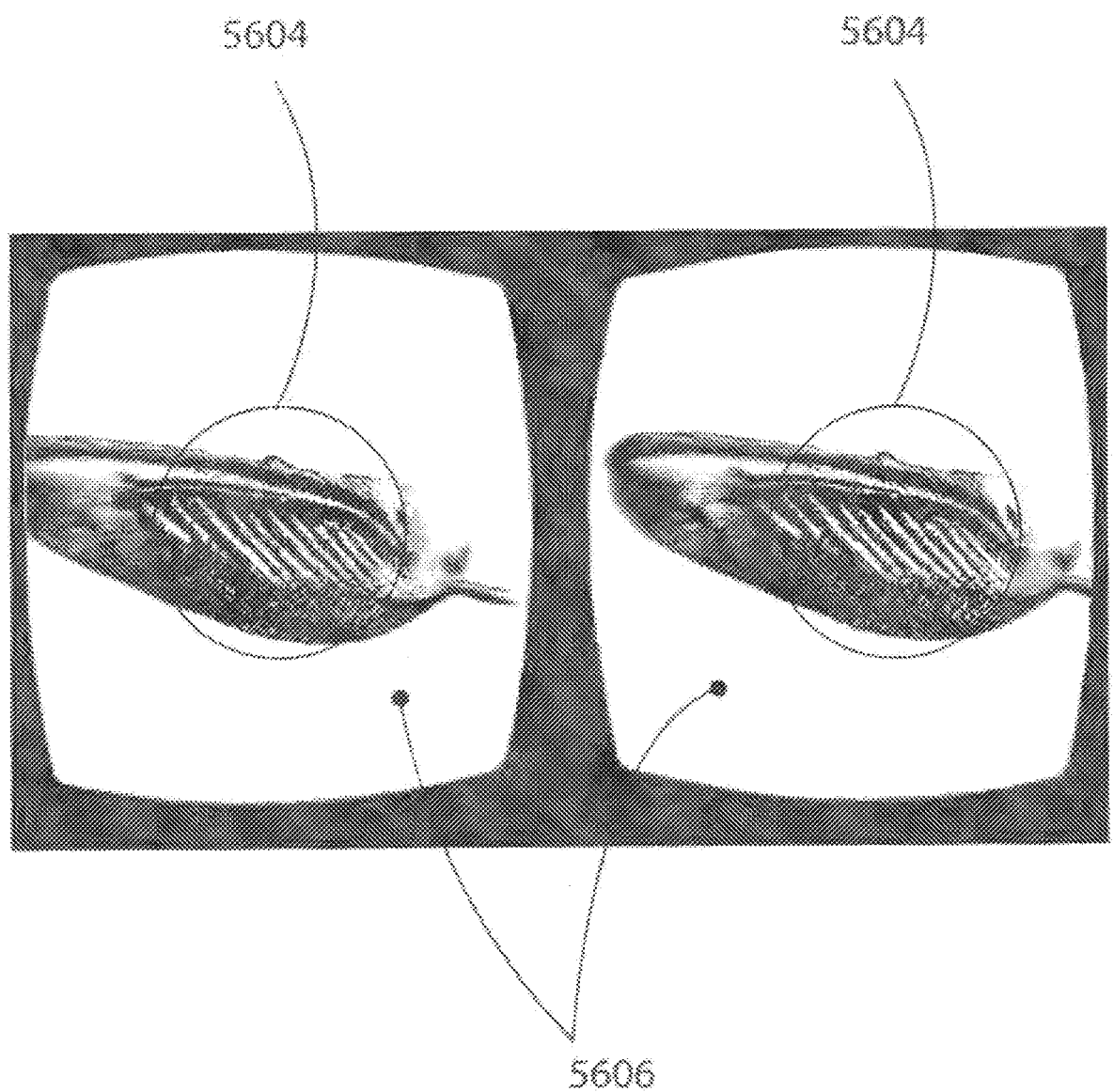
FIG. 56 is an artistic rendering of stereo views produced by a VR HMD with a foveated optical system according to some embodiments.

In other embodiments, the VR HMD further comprises an eye-tracking system, and the wave front corrector is operationally responsive to eye position, such that a region of interest, 5604, coincides with a viewing angle of the user. As described above, the wave front corrector may be configured for foveated operation and correct the region of interest, 5604, such that it is at a higher resolution than the scene outside the region of interest, 5606. FIG. 56 illustrates a side-by-side view of virtual imagery as displayed by a VR HMD configured with a foveated optical system. While using the VR HMD the user is unable to view her surroundings. Instead, the user may view only the scene displayed by the VR HMD. In the embodiment shown in the FIG. 56, an eye tracking system, not shown, measures eye positions of the user's eyes, and the wave front corrector corrects aberrations in a region of interest, 5604, which is generally located where the user looking. In another embodiment, one or more focal depths may be applied within the region of interest, by using a variable focus optic, or a wave front corrector that can excite Zernike mode 4, or defocus. In some embodiments, the resolution within the region of interest is diffraction limited, or limited by the resolution of the display, 5502. In some embodiments, a wave front corrector is configured in a VR HMD, in place of conventional optics. Some VR HMDs, such as those similar to Google Cardboard, use a single 25 mm biconvex lens with a 40 mm focal length for each eye. A 25.4 mm N-BK7 biconvex lens having a 40 mm focal length (Thorlabs Part No. LB1027-A) has a center thickness of greater than 6 mm, and will produces images with spherical aberrations. As described above a wave front corrector may be constructed which is less than 1 mm thick, and may be configured to provide diffraction limited imaging.

Unmanned Aircraft

Unmanned aircraft, or drones, 5701, are increasingly common, and are used in various applications. Typically, drones are outfitted with a camera, 5703, such that the operator may take pictures, videos, or operate the drone from the drone's vantage point. Much like the requirements for HMDs, a drone imaging system provides a wide field of view, such that the drones surroundings may be perceived by the viewer. Many drones have camera's that provide a field of view greater than 70°-90°, however the "fast" optical systems required to provide these wide angles, typically produce more aberrations. Therefore, the images produced over a wide field of view may be of poor quality. Alternatively, conventional wide angle optical systems include many elements in order to correct the many aberrations. Conventional wide angle optical systems are therefore large and heavy, to descriptors which are typically unwelcome payload on small aircraft. Although a wide field of view may be needed to operate the drone, or understand the drone's vantage point, there is often a region of interest, within the larger field of view, which is the focus of the viewer. It is advantageous for a drone imaging system that allows a wide field of view and a high quality region of interest within the field of view, which is generally free from aberrations.

Figure 57A:
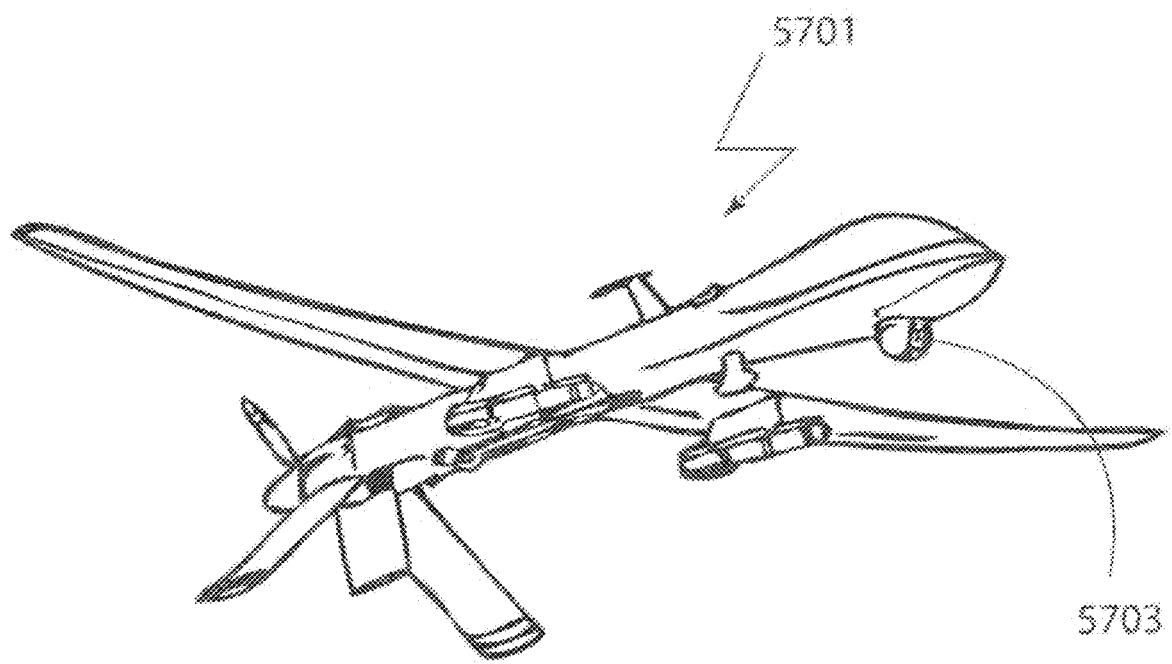
FIGS. 57A-57B depicts two different types of unmanned aircraft configured with foveated optical systems for imaging according to some embodiments.
Figure 57B:
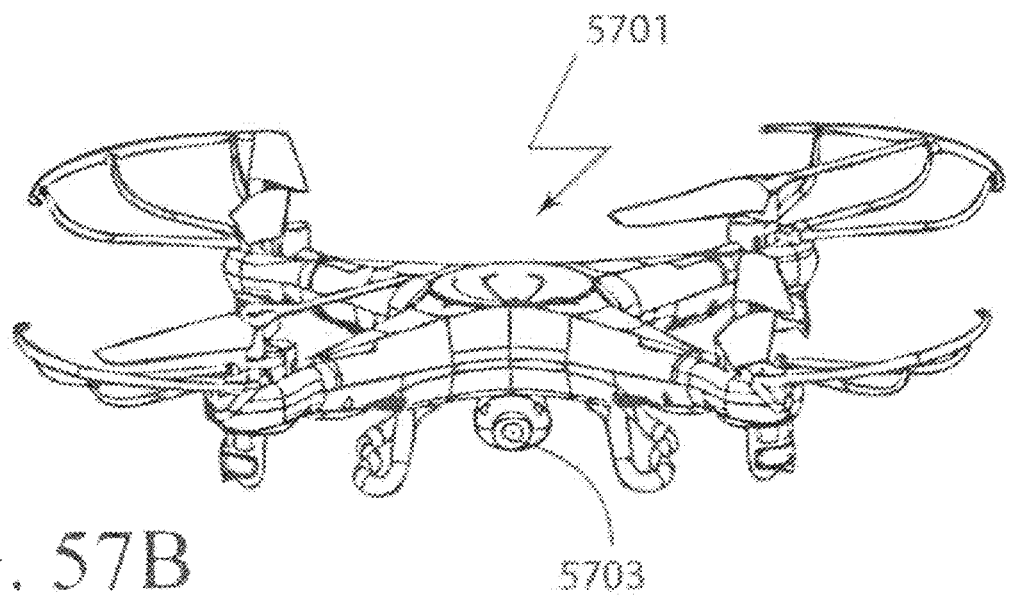

Unmanned vehicles have found applications in military and civilian markets. FIG. 57 illustrates two different types of unmanned aircraft that include at least one camera. FIG. 57A illustrates a fixed wing type unmanned airplane. FIG. 57B shows a quadcopter unmanned aircraft.

Figure 58:
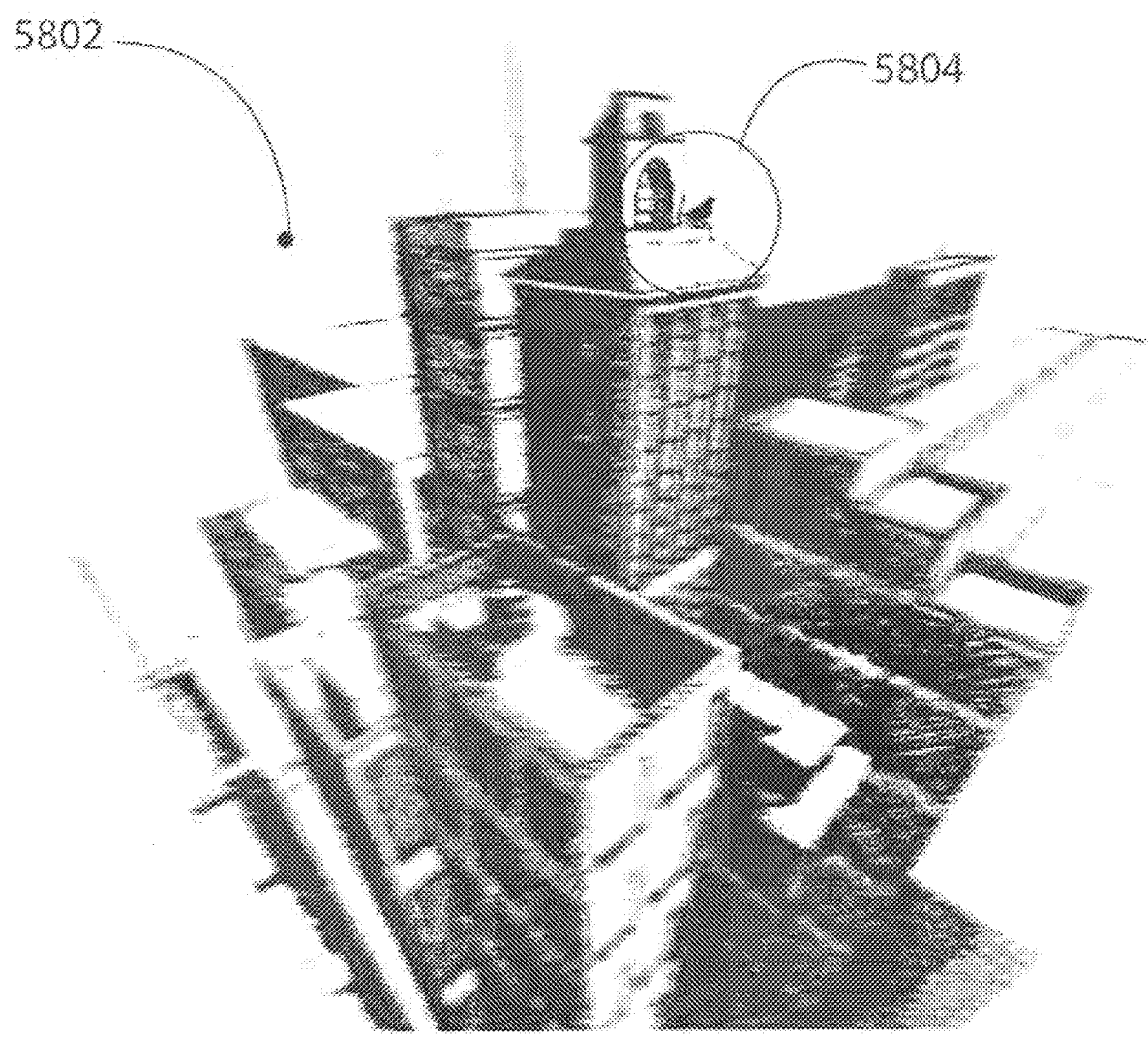
FIG. 58 is an artistic rendering of an aerial photograph taken by a camera configured with a foveated optical system according to some embodiments.

FIG. 58 illustrates the view from a camera configured with a wide-angle foveated optical system in a drone application. It can be appreciated from FIG. 58 that the wide-angle foveated optical system allows for a wide-angle view of the surroundings, 5802. Additionally, a region of interest (ROI), 5804, within the field of view has been corrected and is free of aberrations. This is advantageous for many unmanned aircraft applications. For example, in FIG. 58 a small bird can be seen within the ROI, 5804, even as a wide-angle is displayed. This allows, a bird watching enthusiast to determine the species of the bird, while seeing enough of the surroundings to safely operate the drone.

Although the present invention has been disclosed in considerable detail with reference to certain preferred versions thereof, other versions are possible. For example, in an alternative embodiment, multiple wave front correctors are configured to correct and adjust different modes. A first wave front corrector may be configured only to correct astigmatic modes (described above), and second wave front corrector may be positioned adjacent the first wave front corrector. In some embodiments, the second wave front corrector corrects other types of aberrations. Additionally, the second wave front corrector is configured to alter the focus of the passing light, and/or introduce tip/tilt gradients to correct for jitter, according to focus and jitter control systems as described above.

Figure 59:
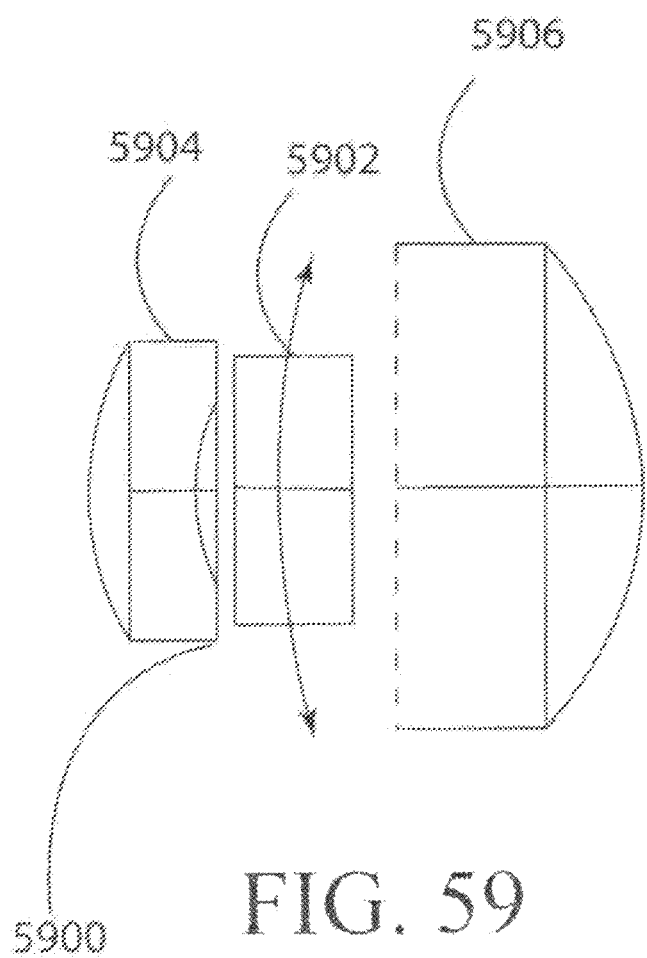
FIG. 59 depicts an alternative embodiment of a wide-angle foveated image system configured with a rotatable wave front corrector according to some embodiments.
Figure 60:
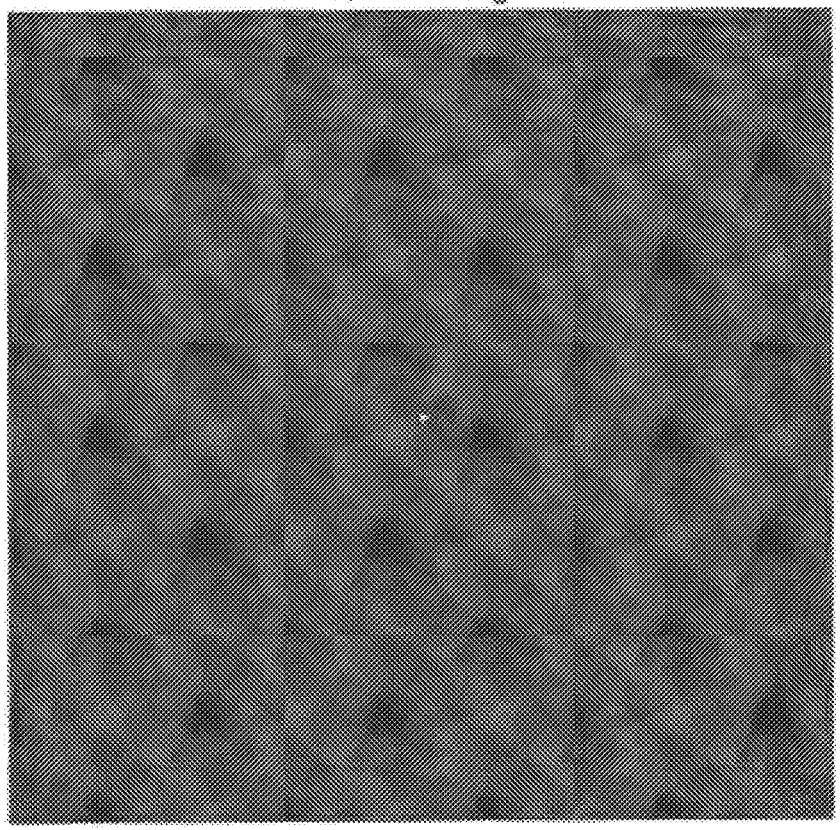
FIGS. 60-93 show full sized corrected and uncorrected point source function images corresponding to those of FIGS. 23A-23C.
Figure 61:
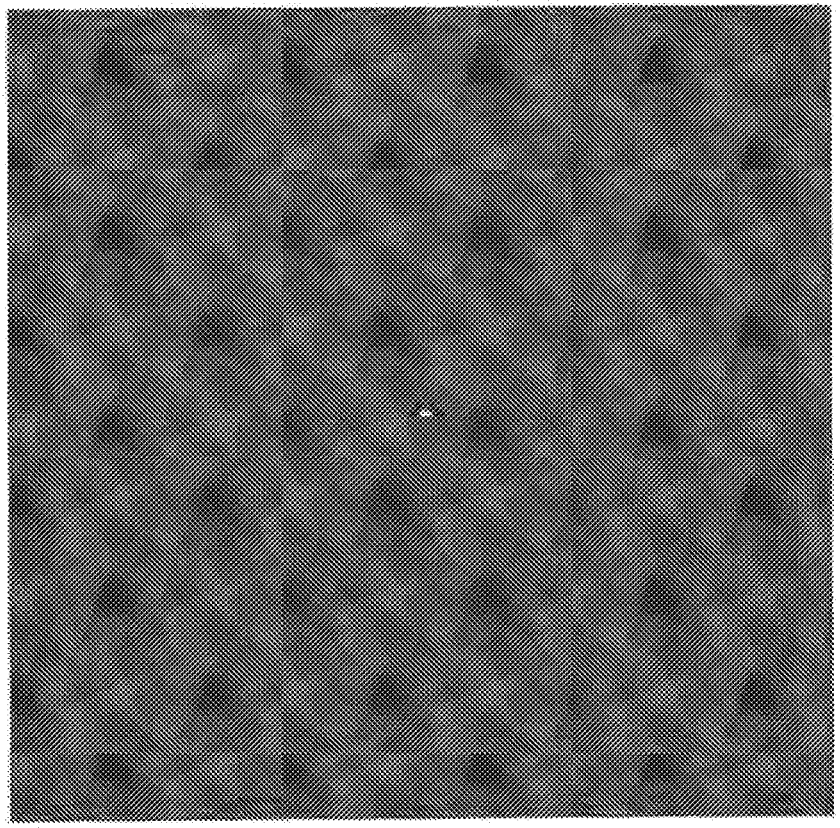
Figure 62:
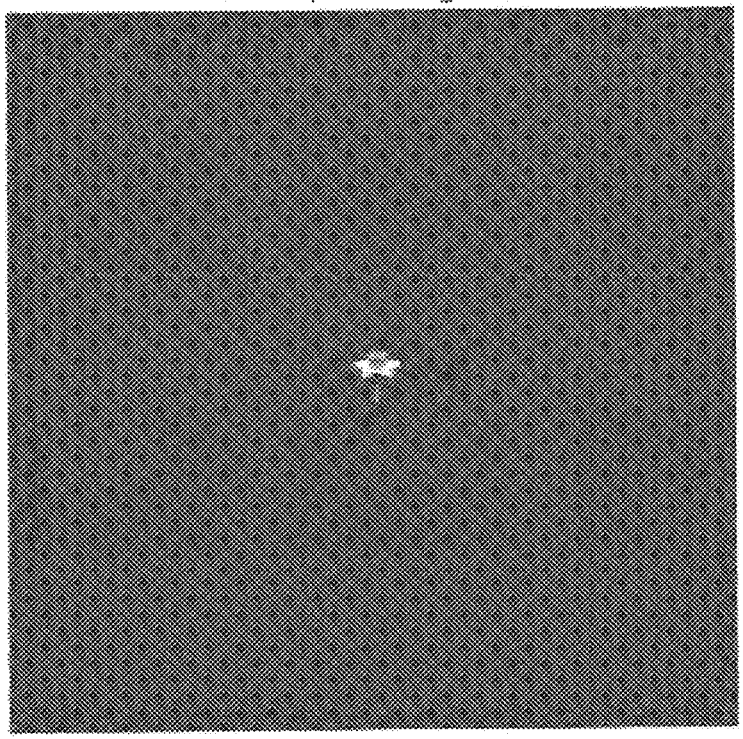
Figure 63:
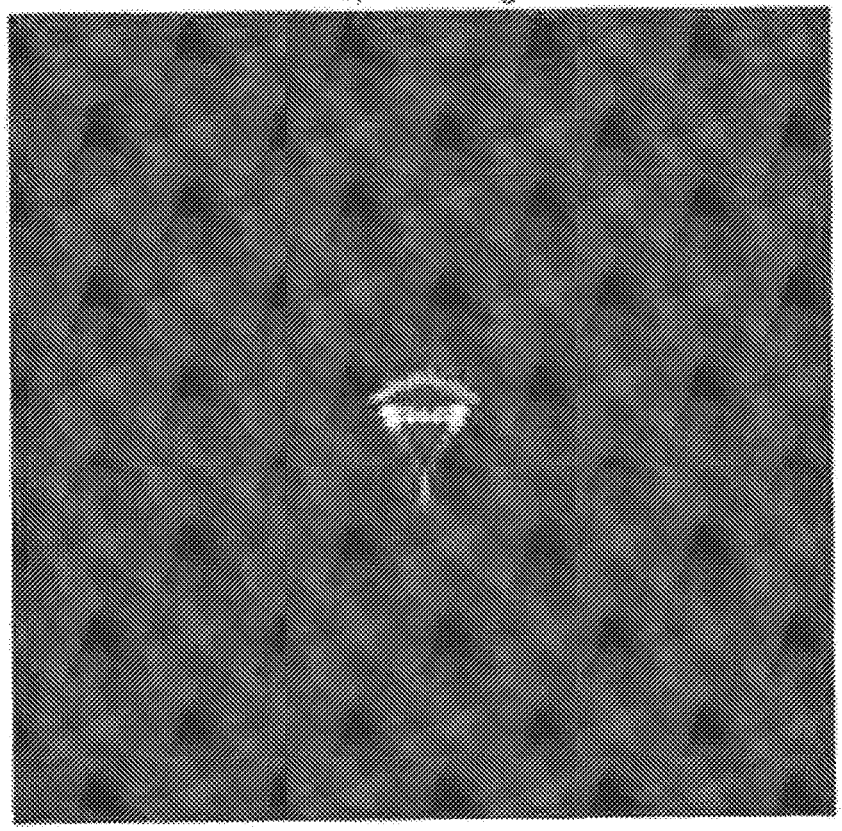
Figure 64:
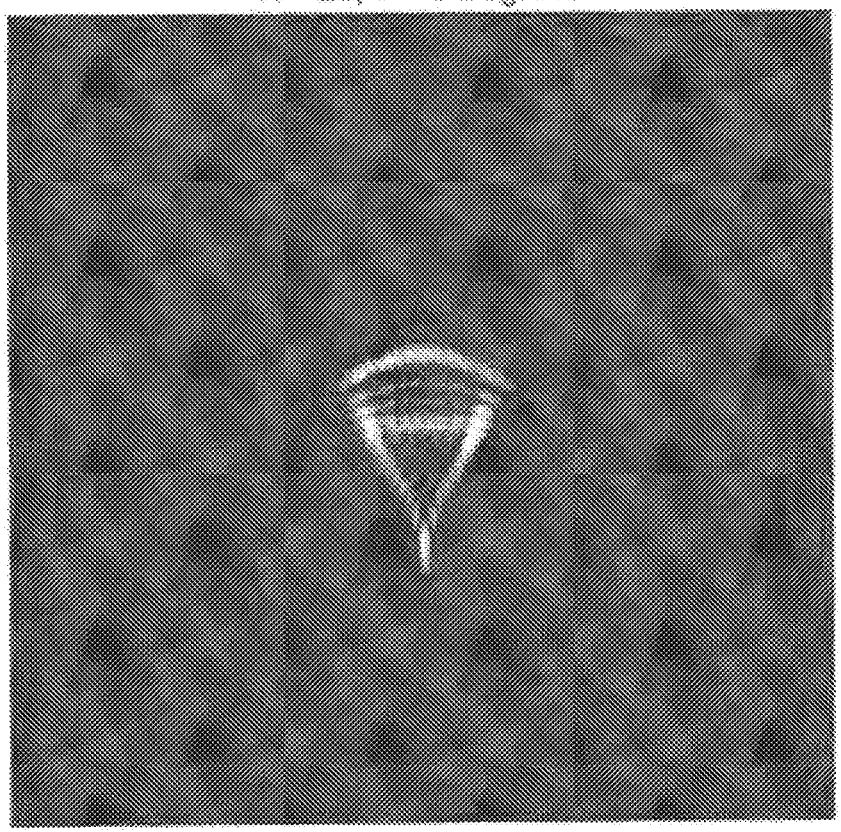
Figure 65:
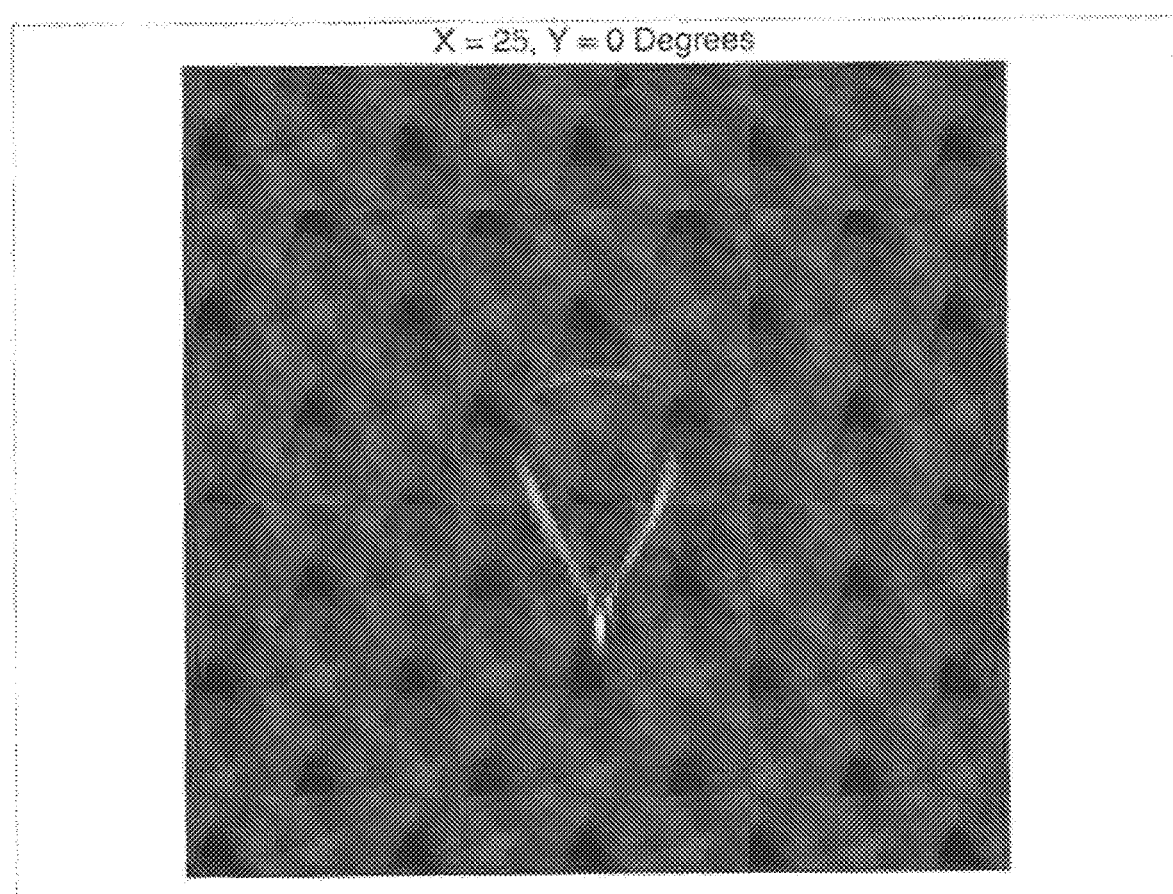
Figure 66:
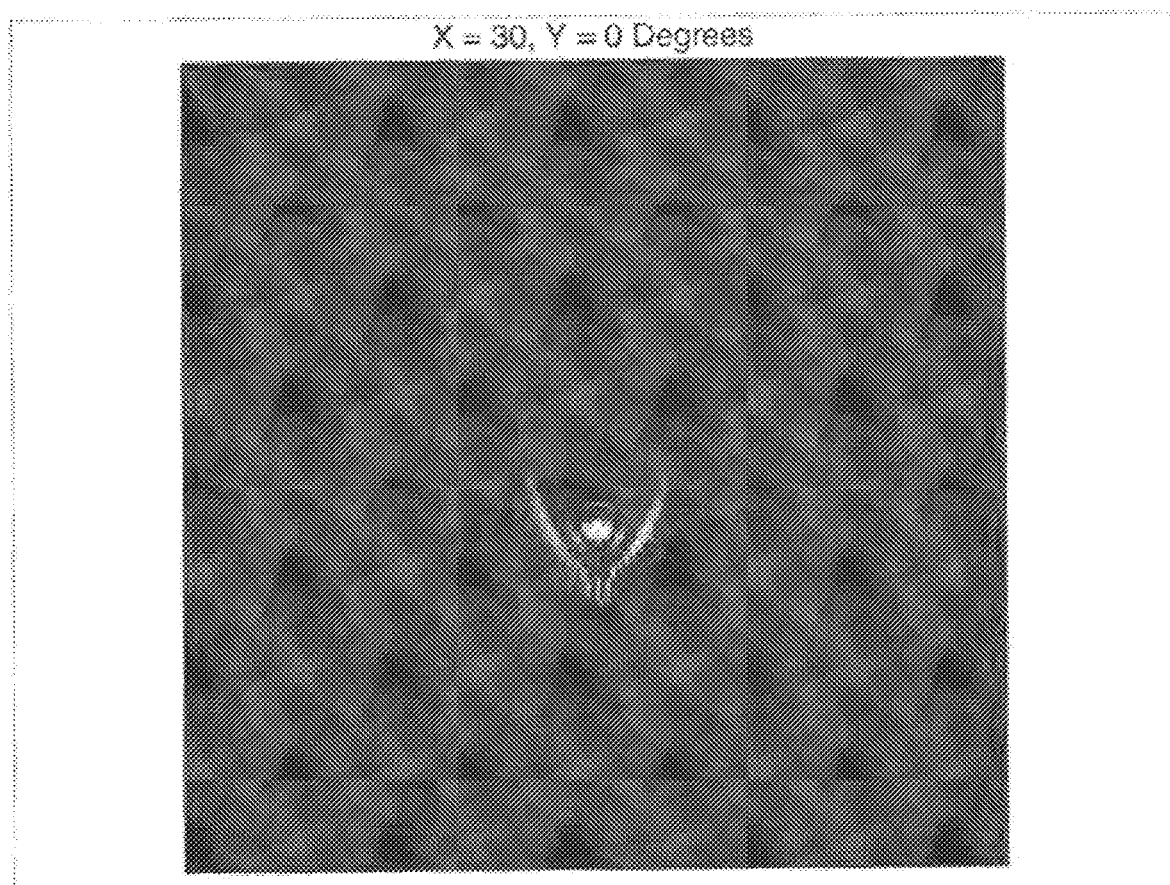
Figure 67:
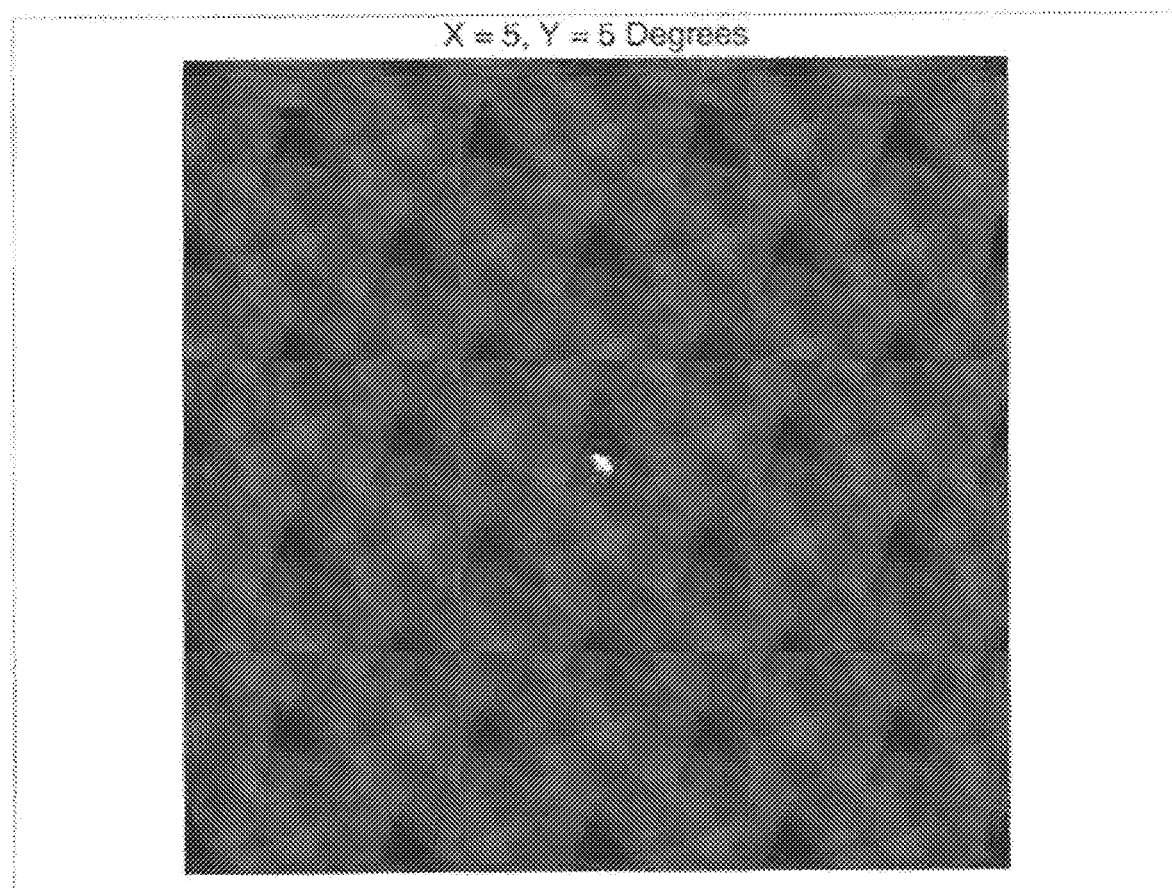
Figure 68:
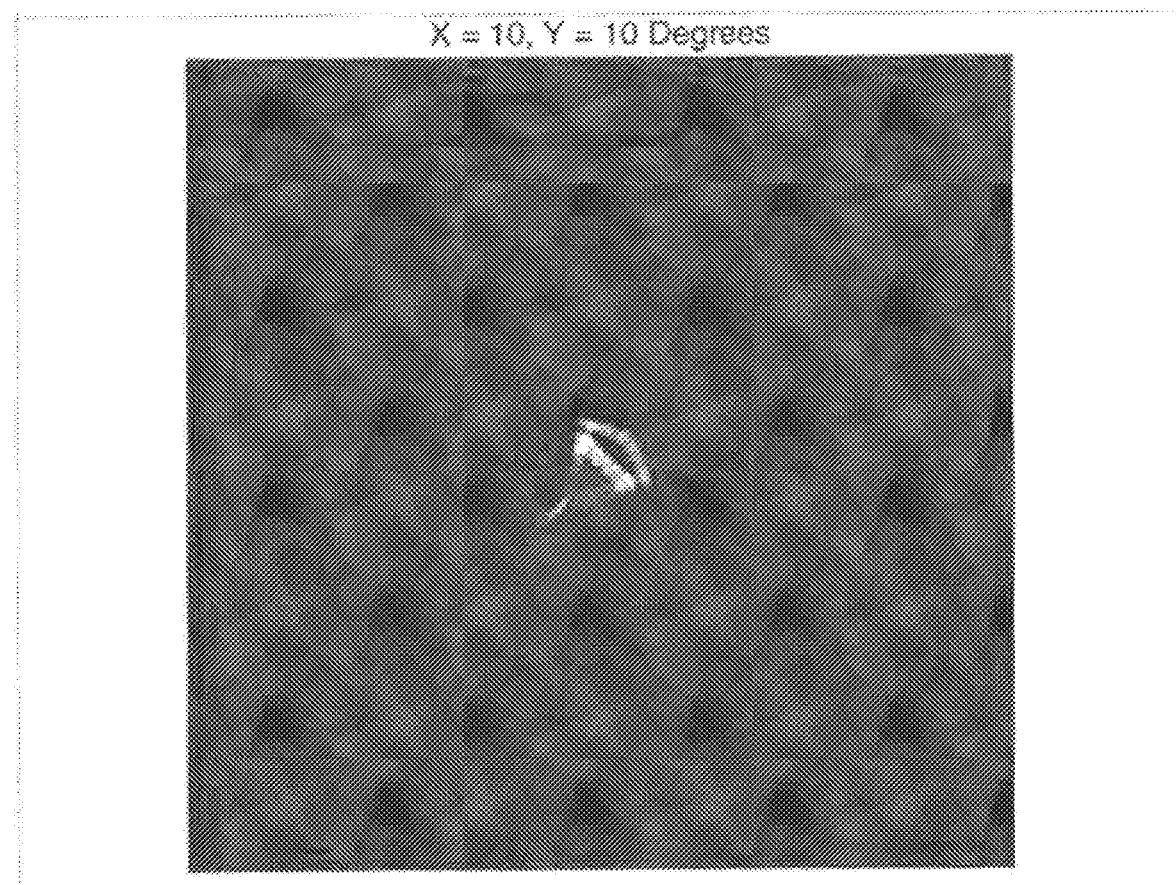
Figure 69:
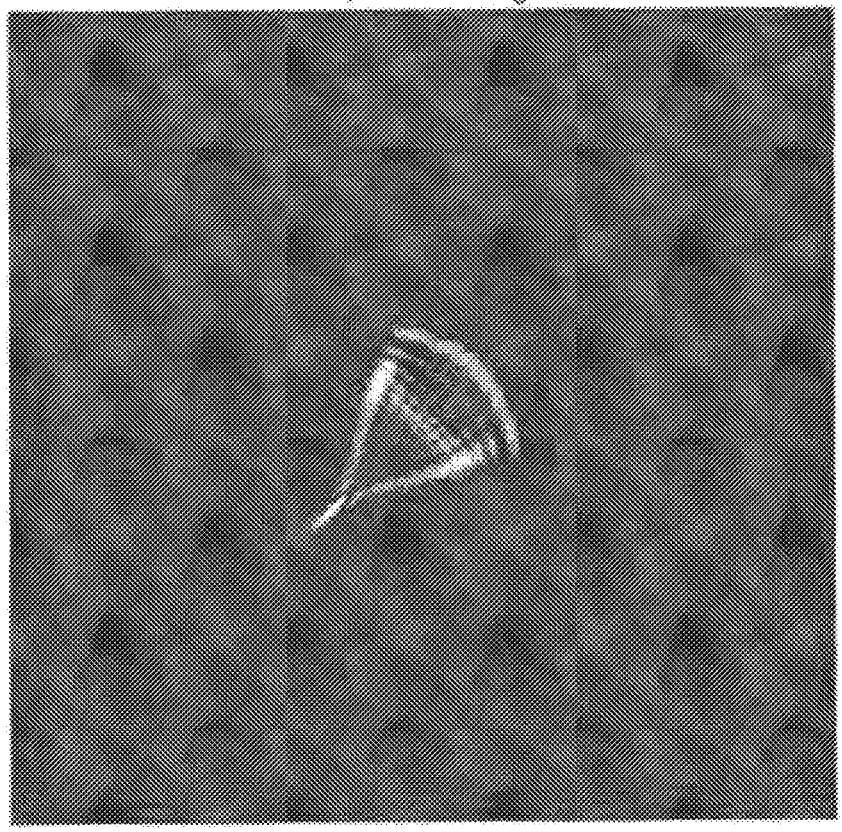
Figure 70:
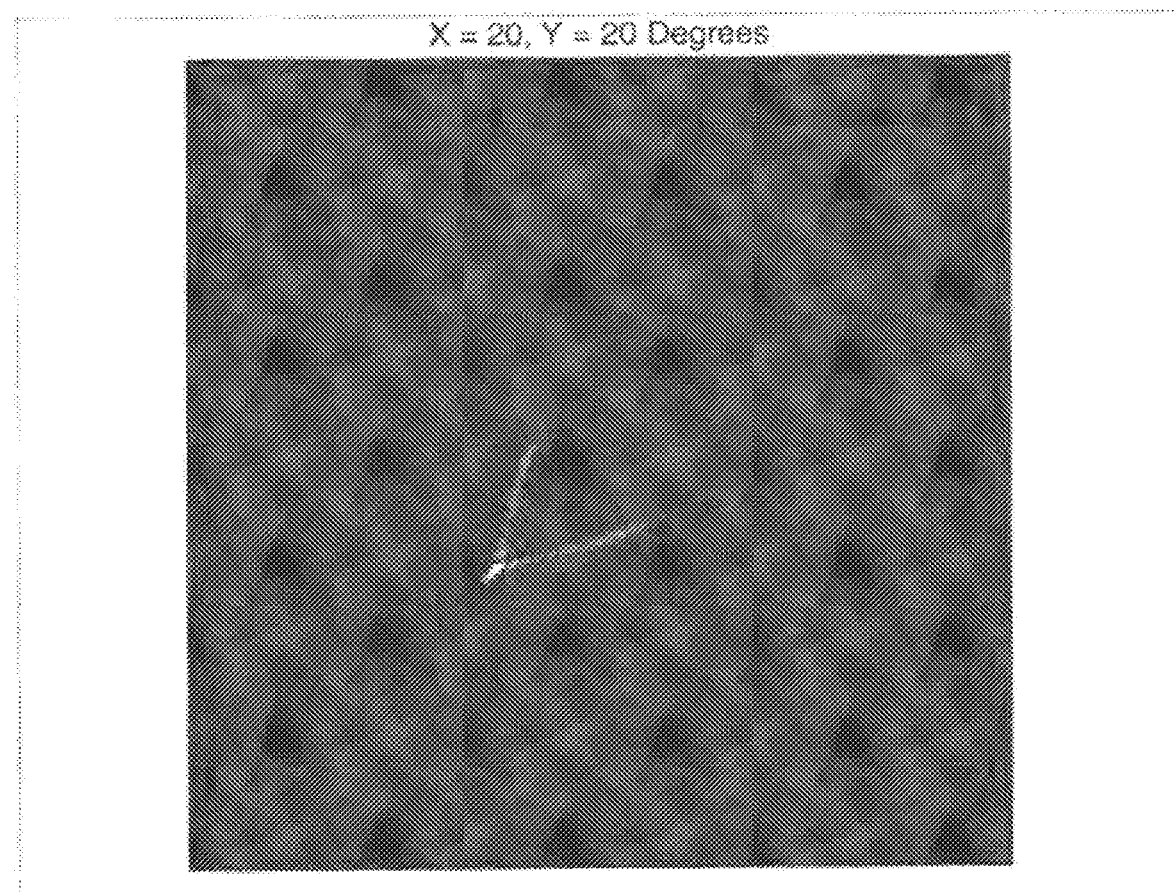
Figure 71:
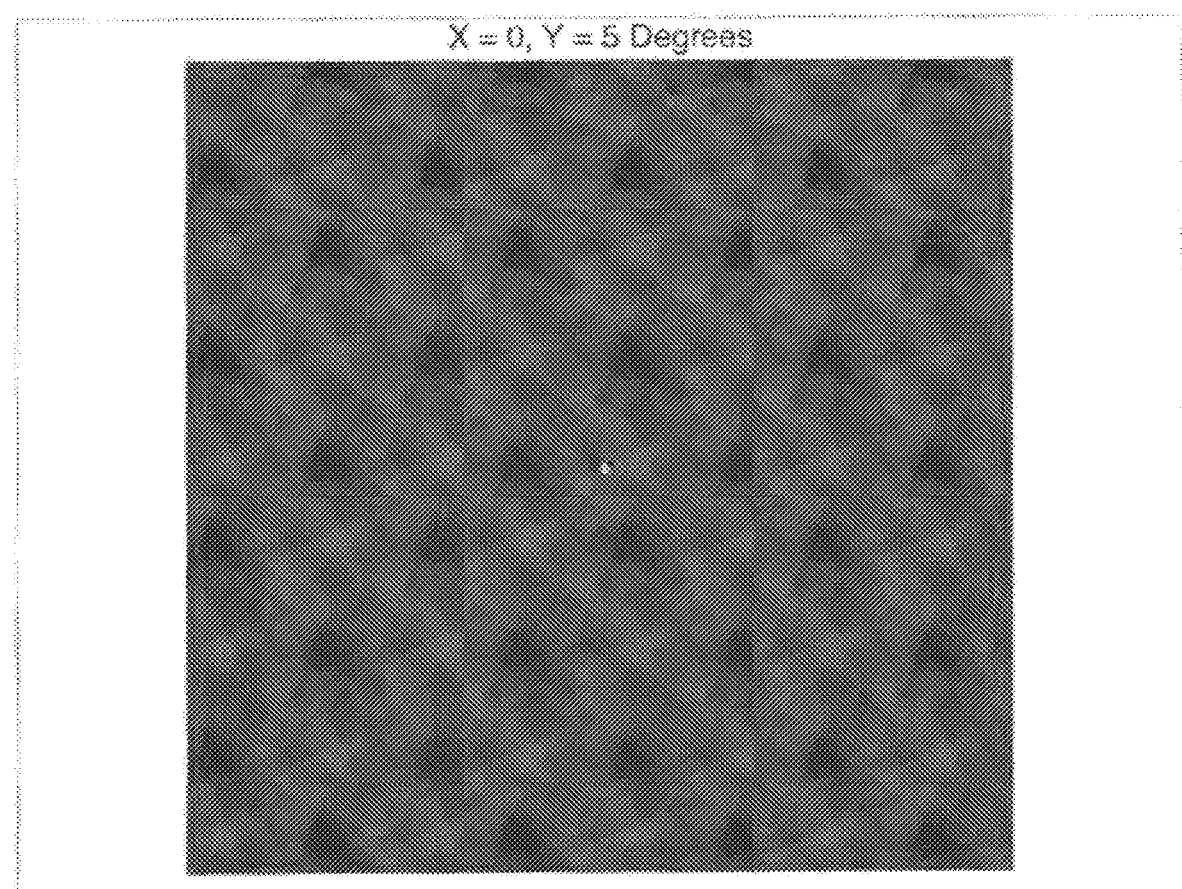
Figure 72:
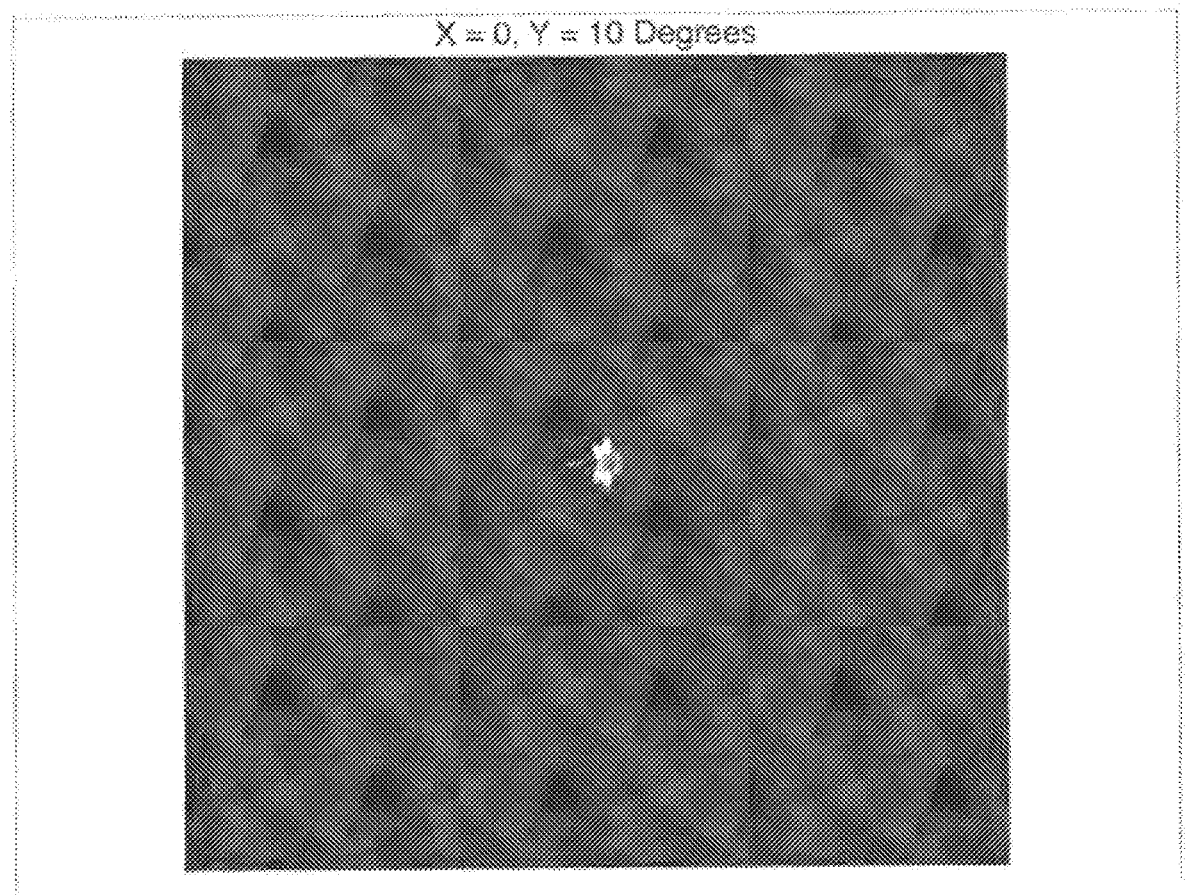
Figure 73:
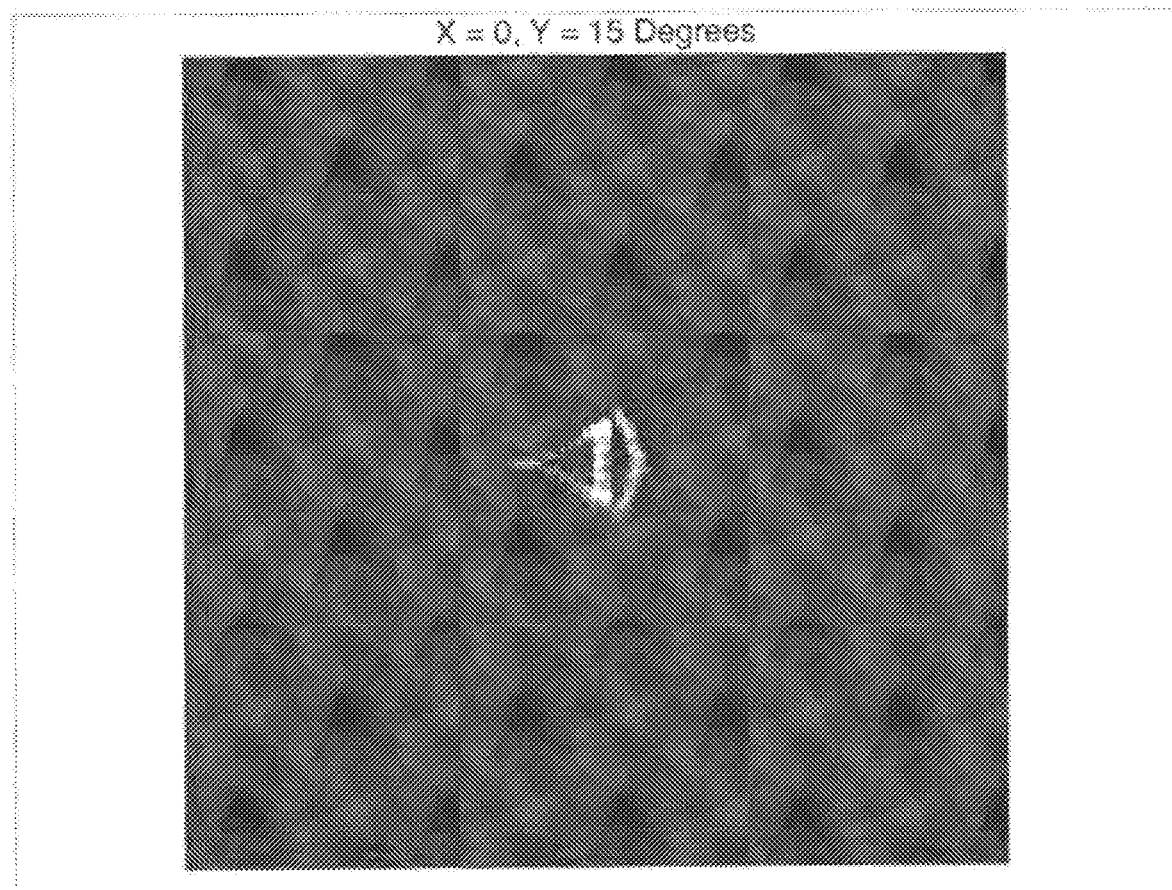
Figure 74:
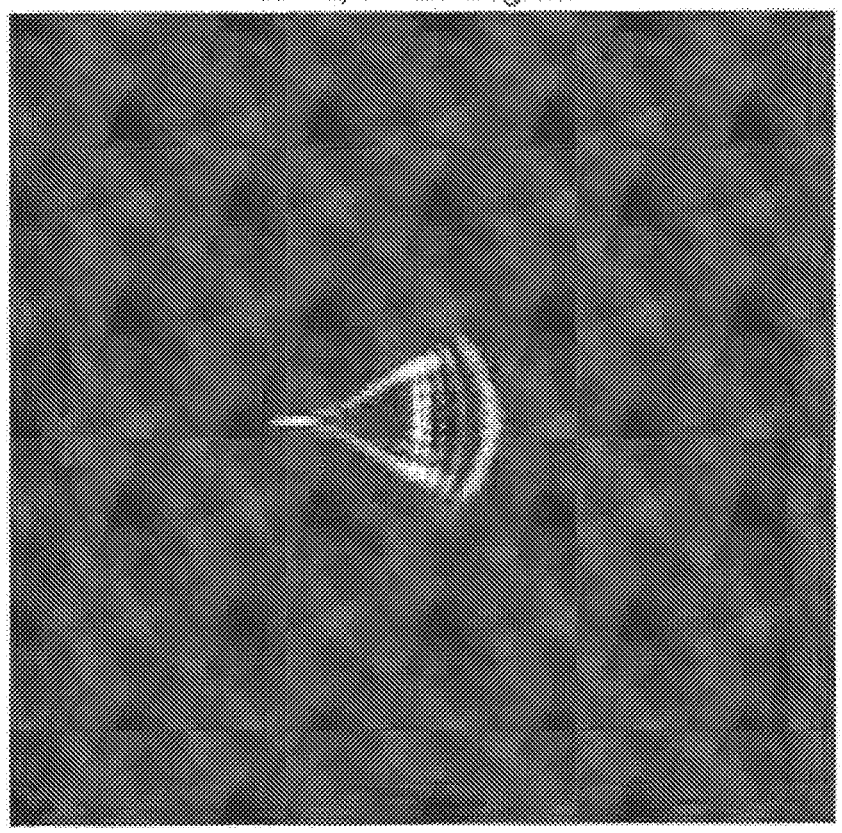
Figure 75:
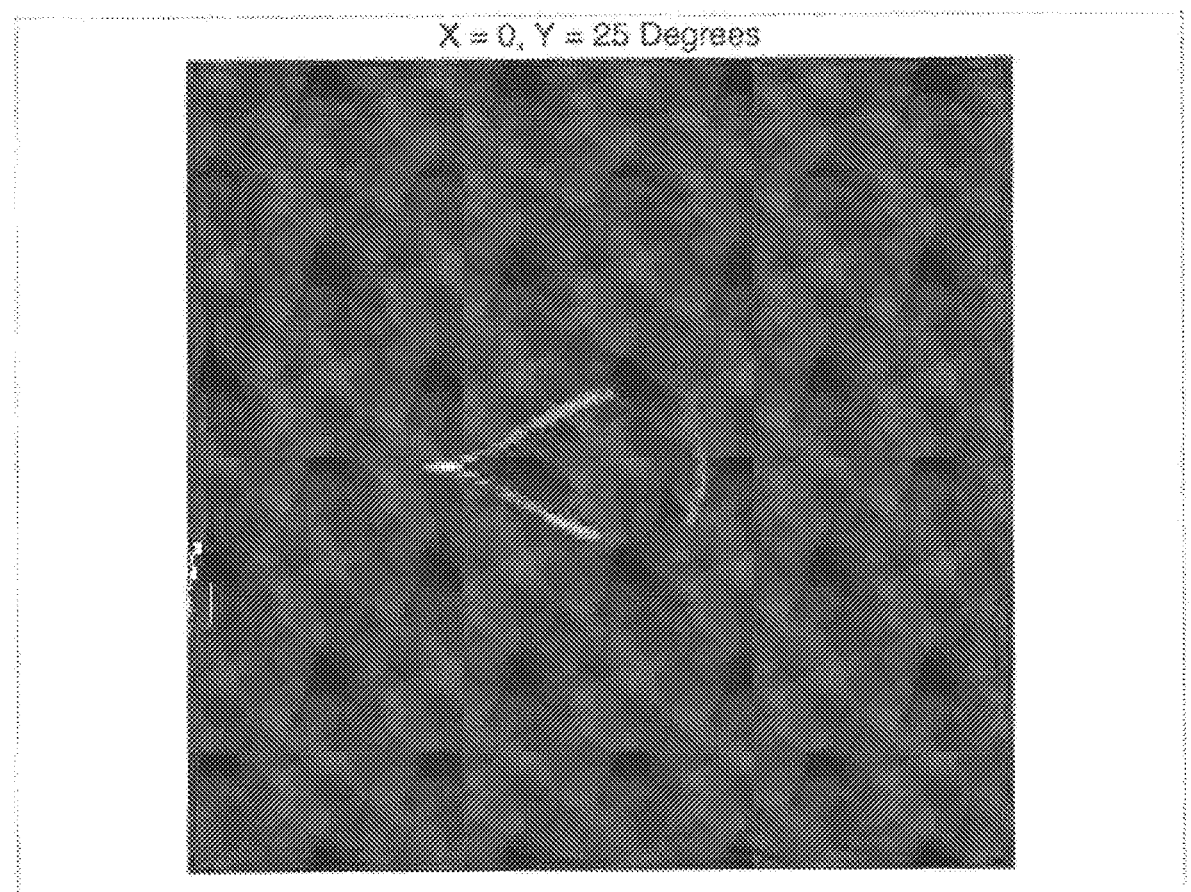
Figure 76:
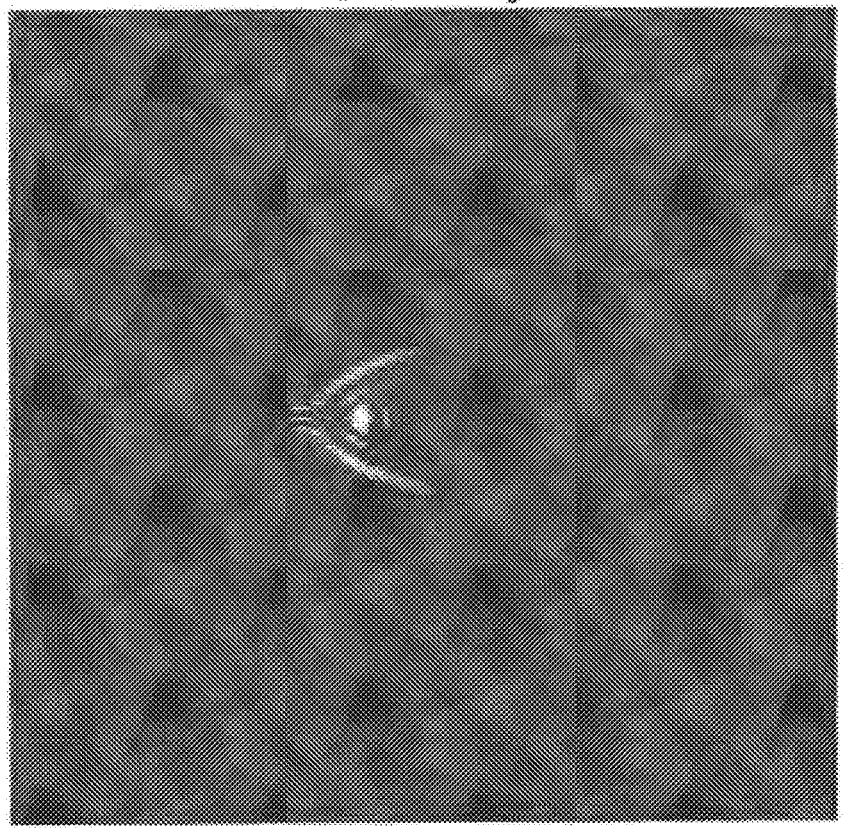
Figure 77:
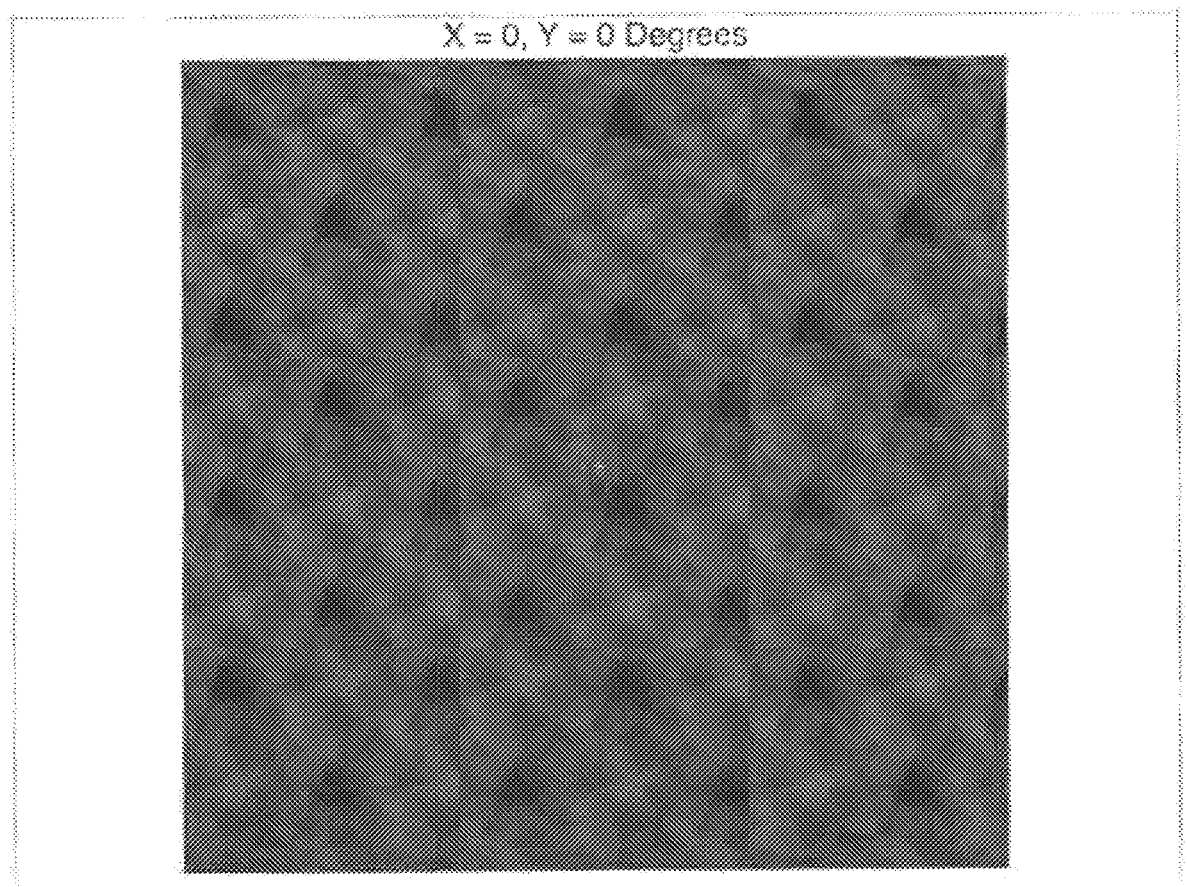
Figure 78:
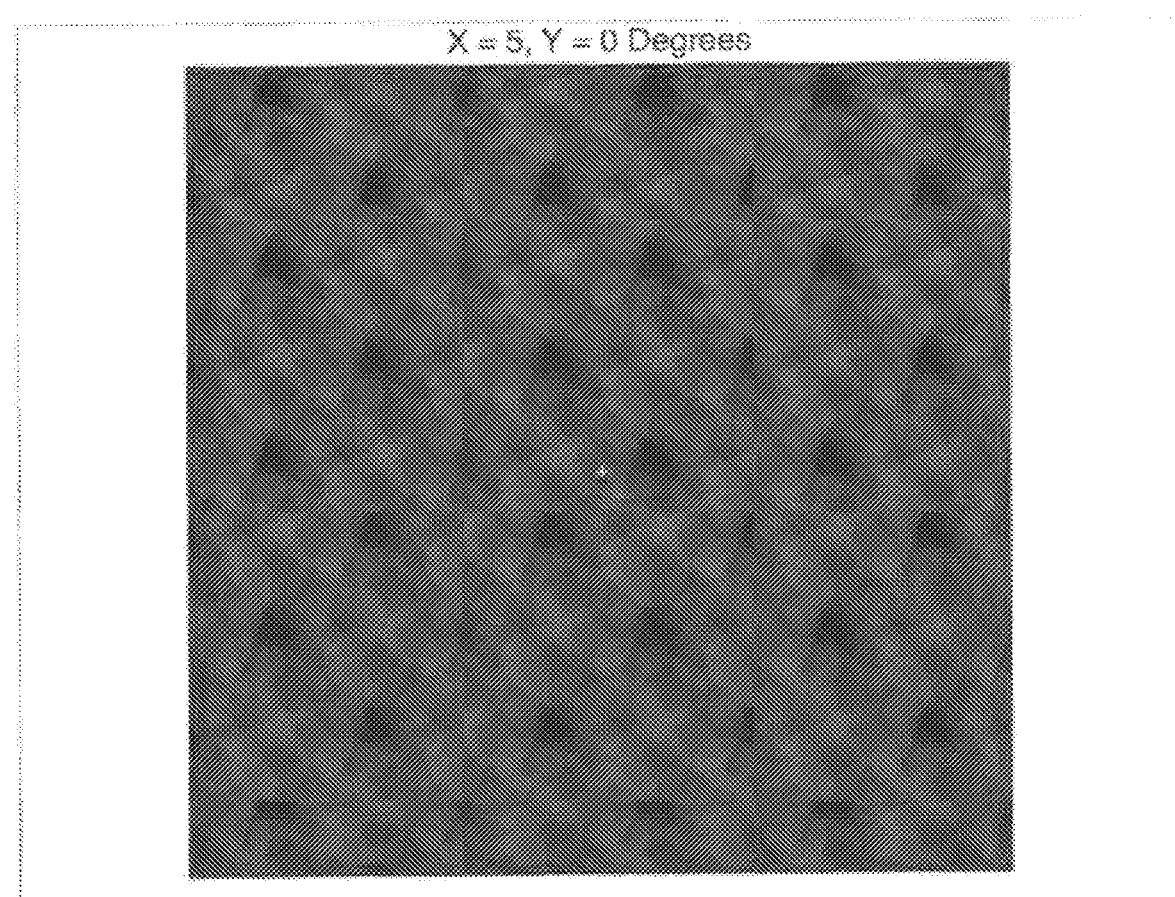
Figure 79:
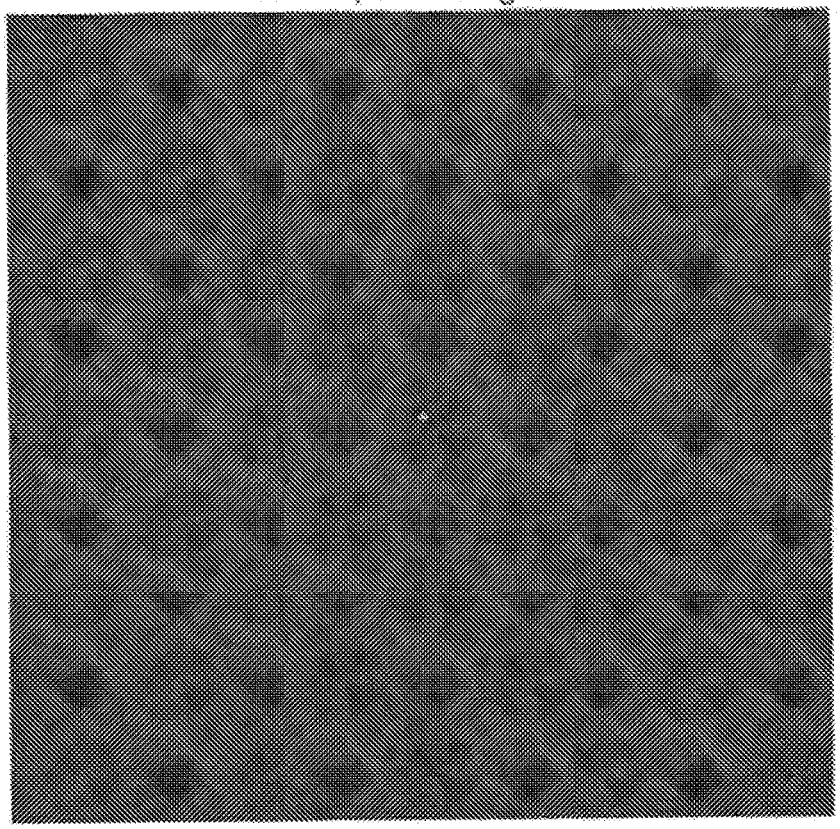
Figure 80:
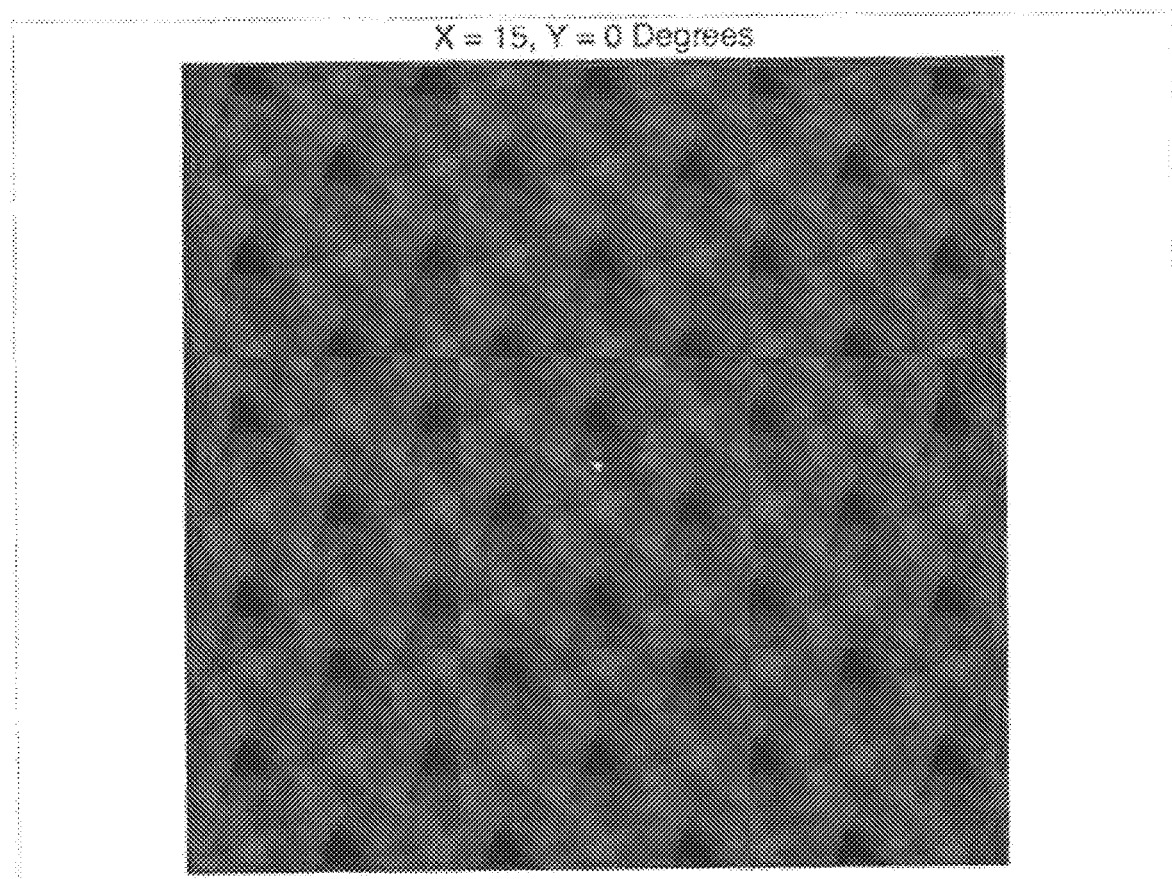
Figure 81:
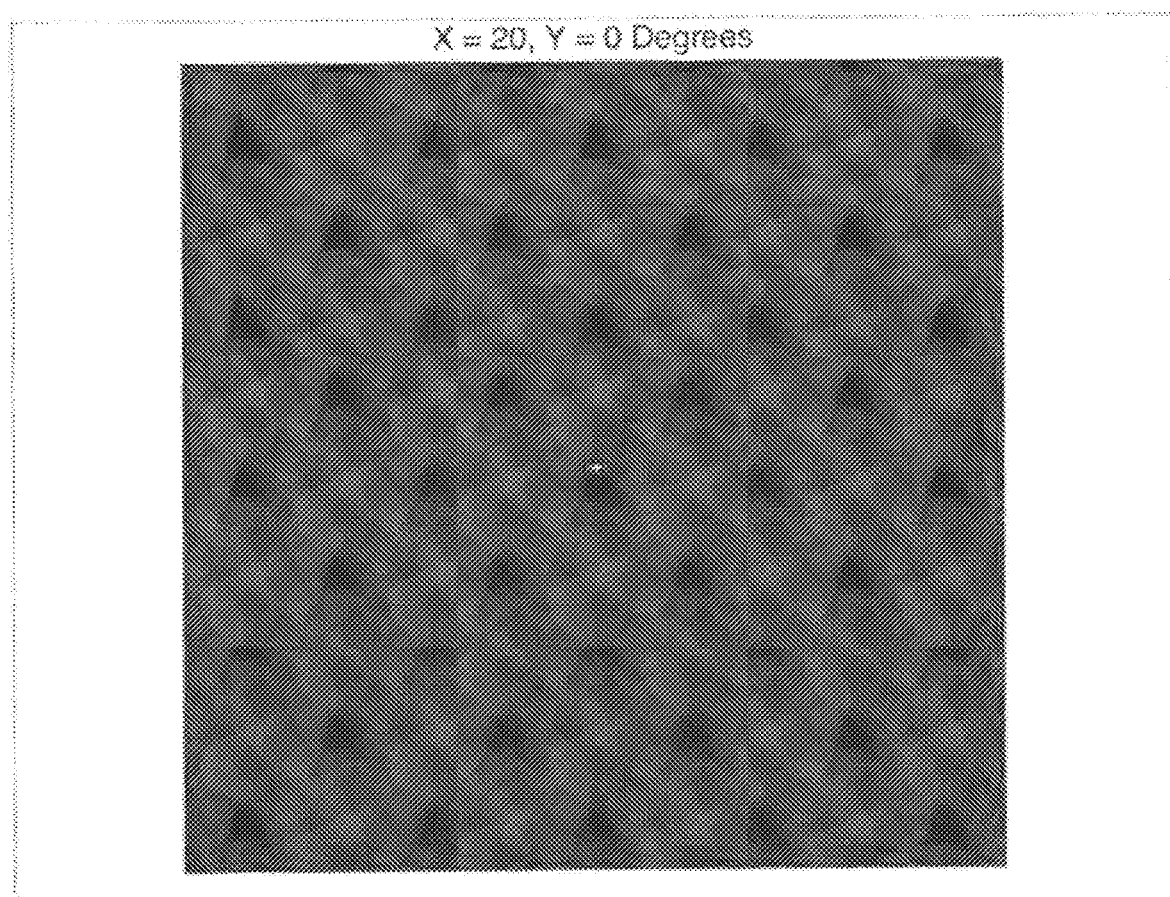
Figure 82:
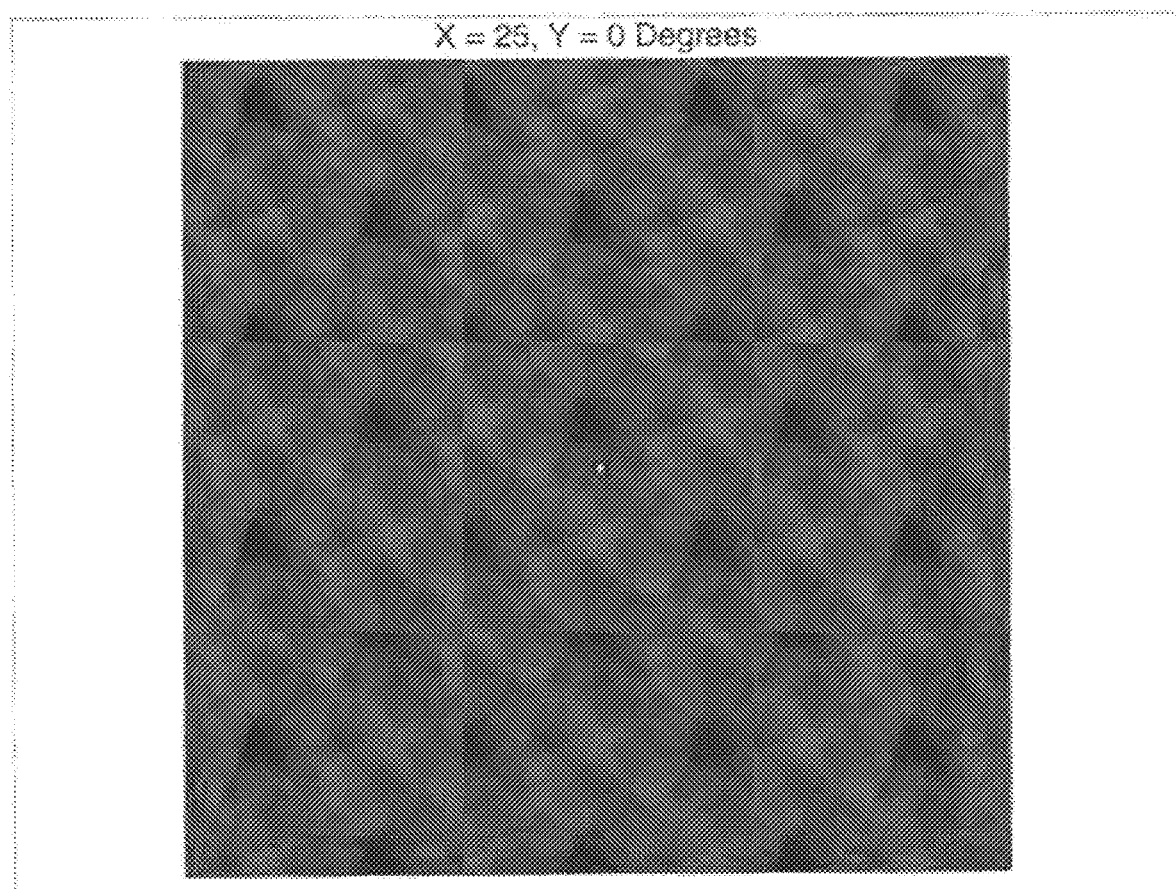
Figure 83:
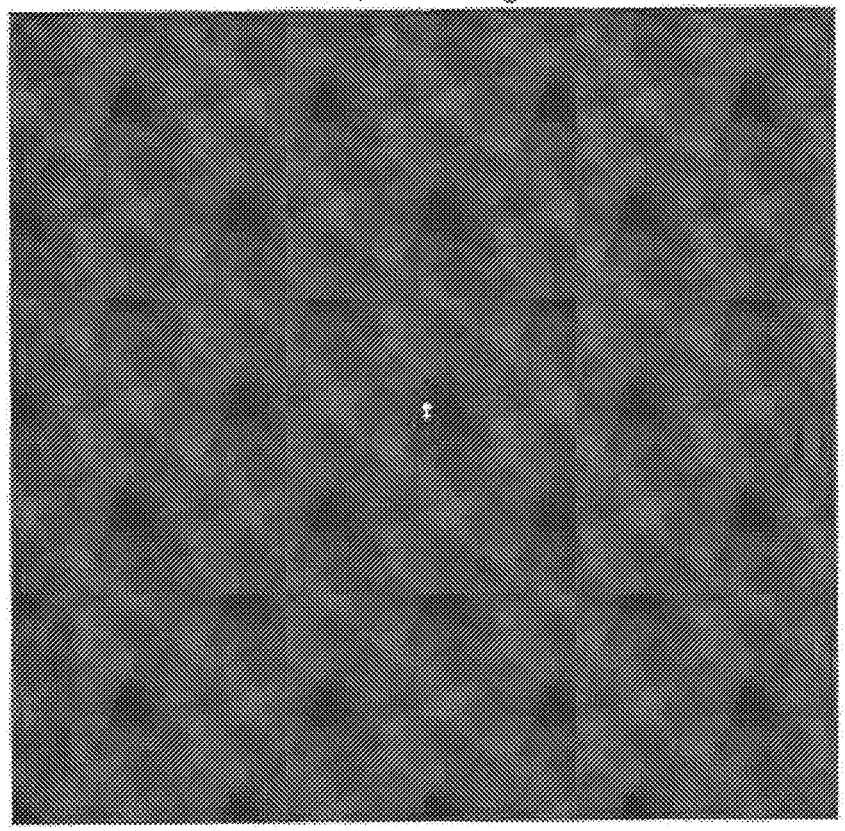
Figure 84:
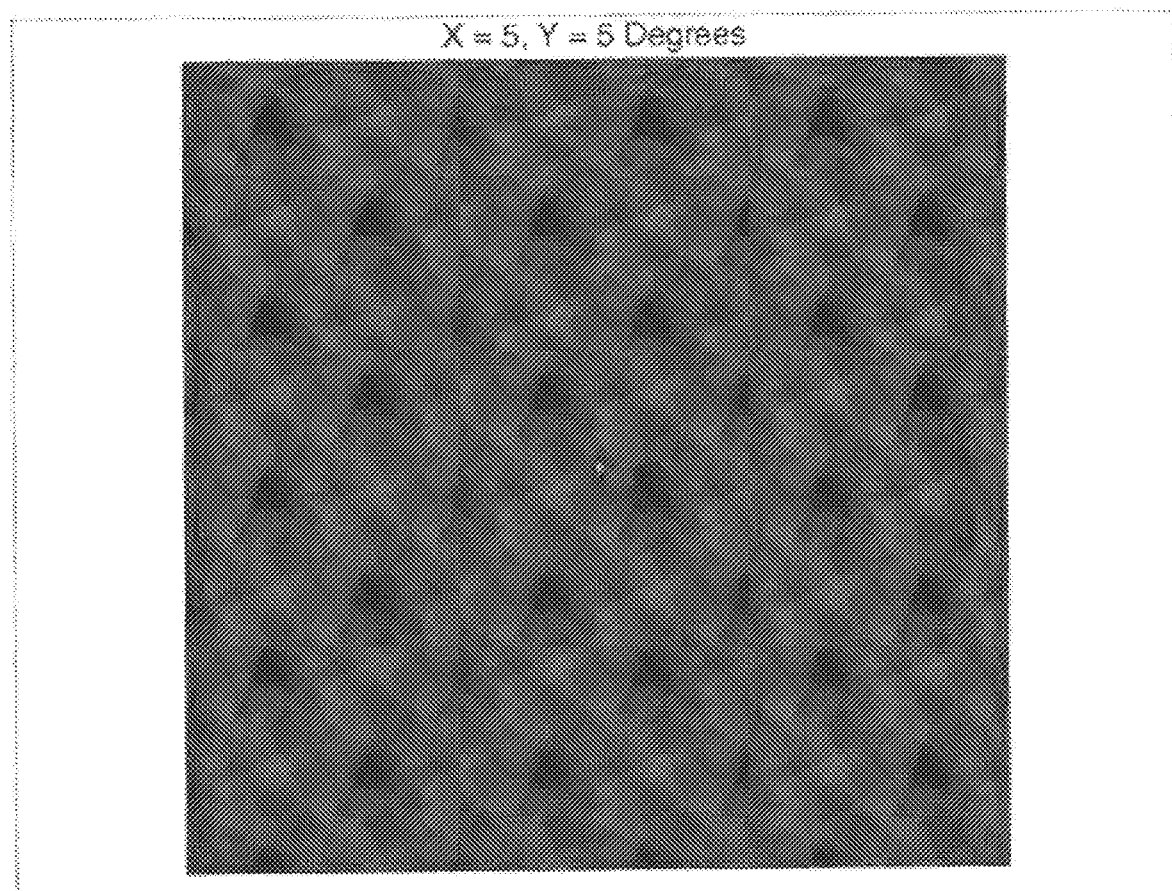
Figure 85:
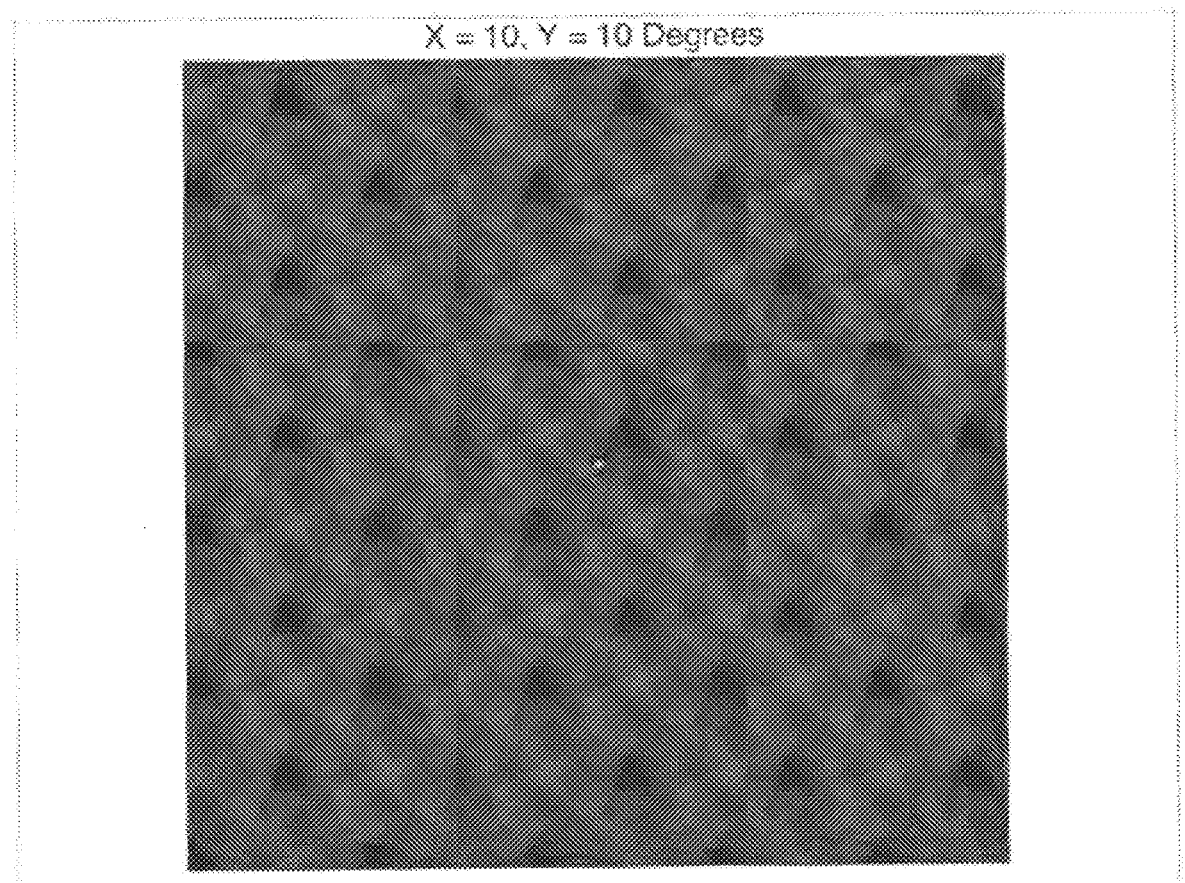
Figure 86:
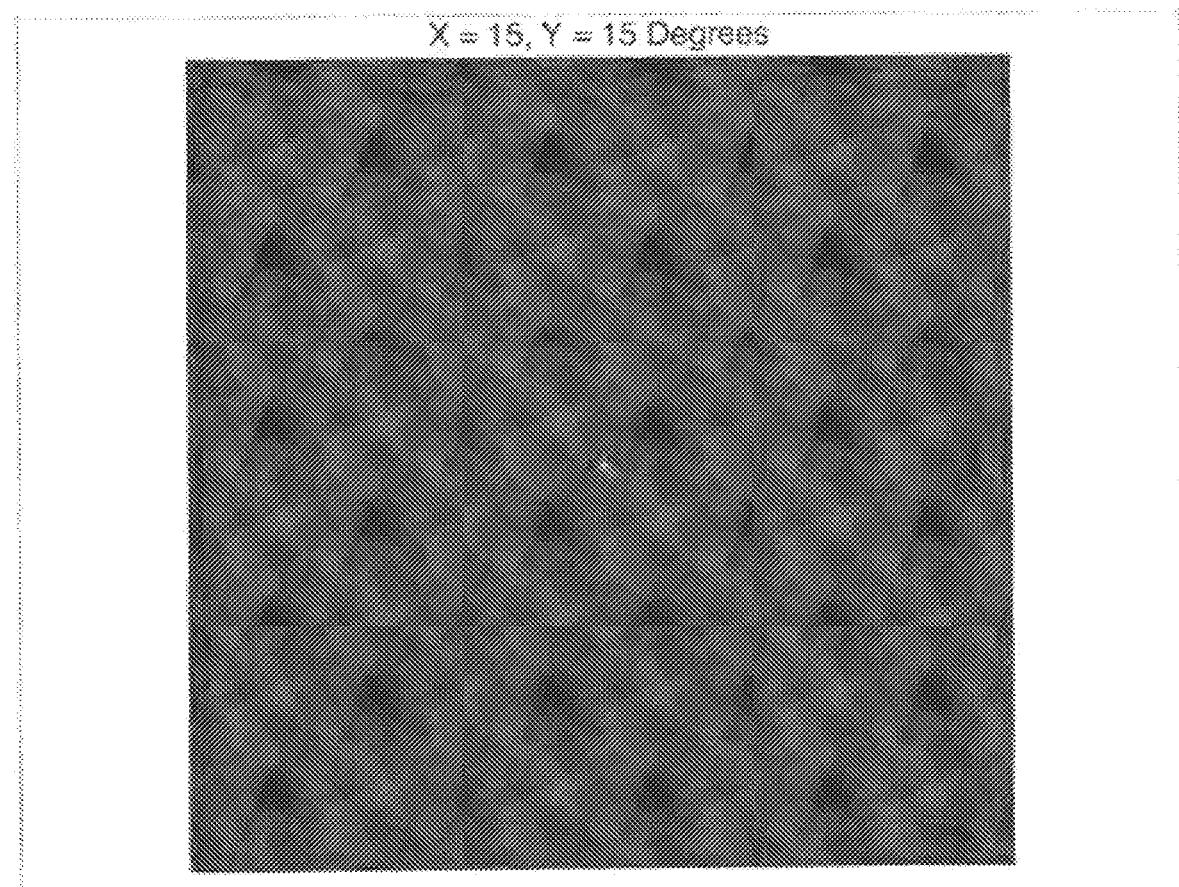
Figure 87:
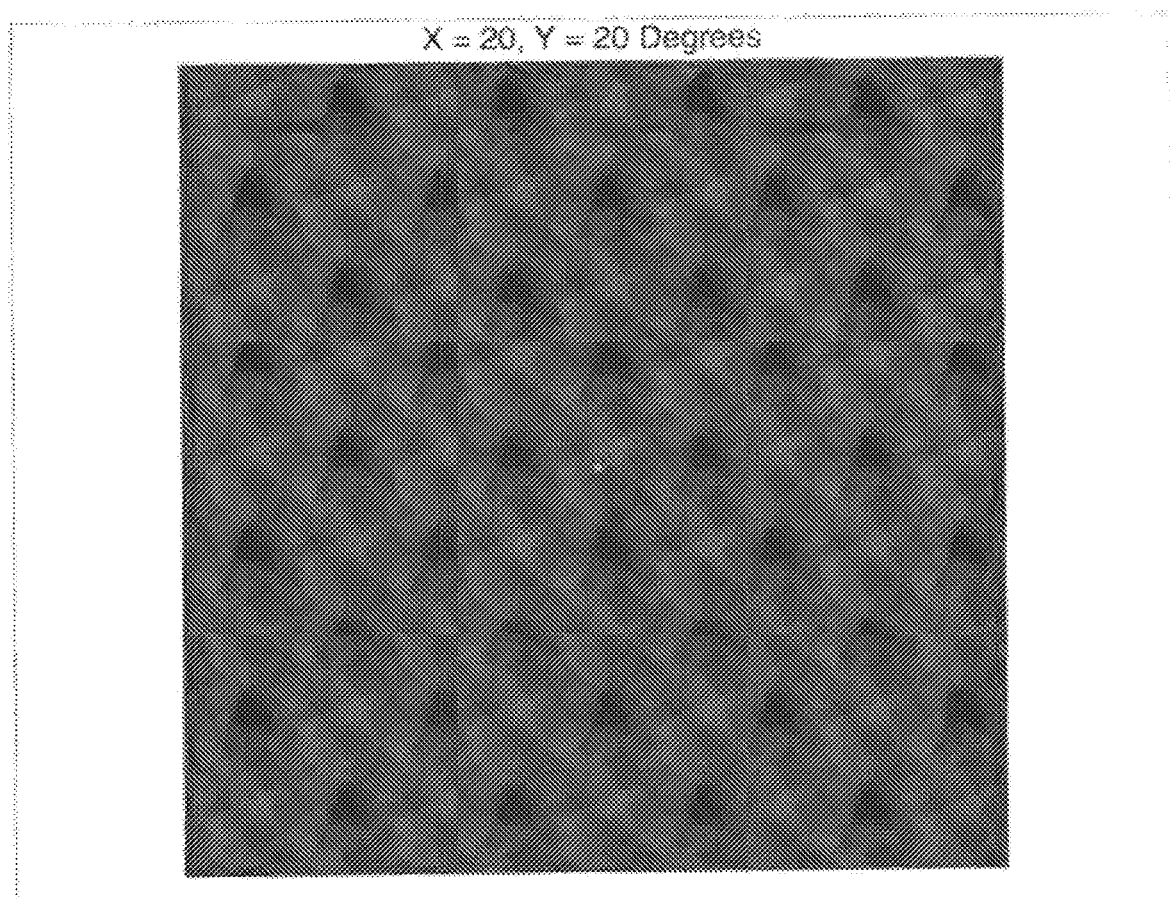
Figure 88:
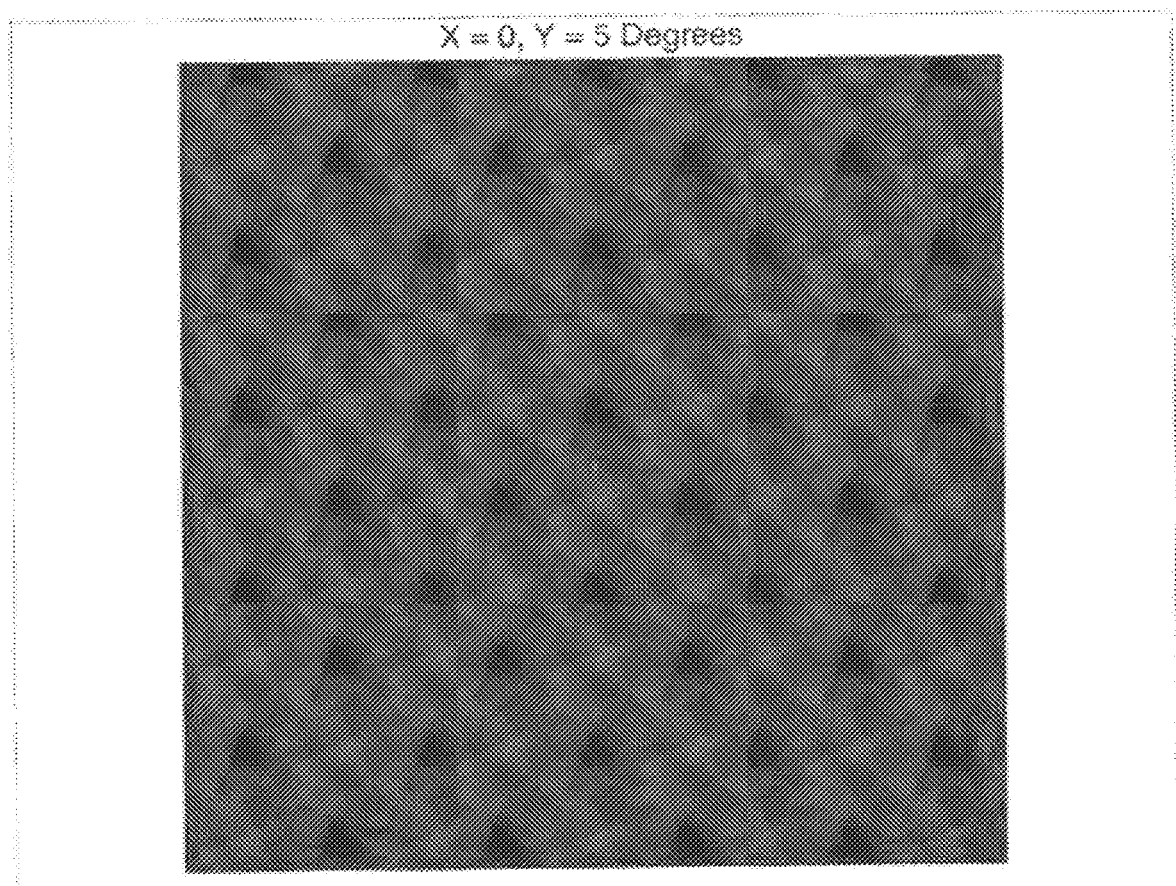
Figure 89:
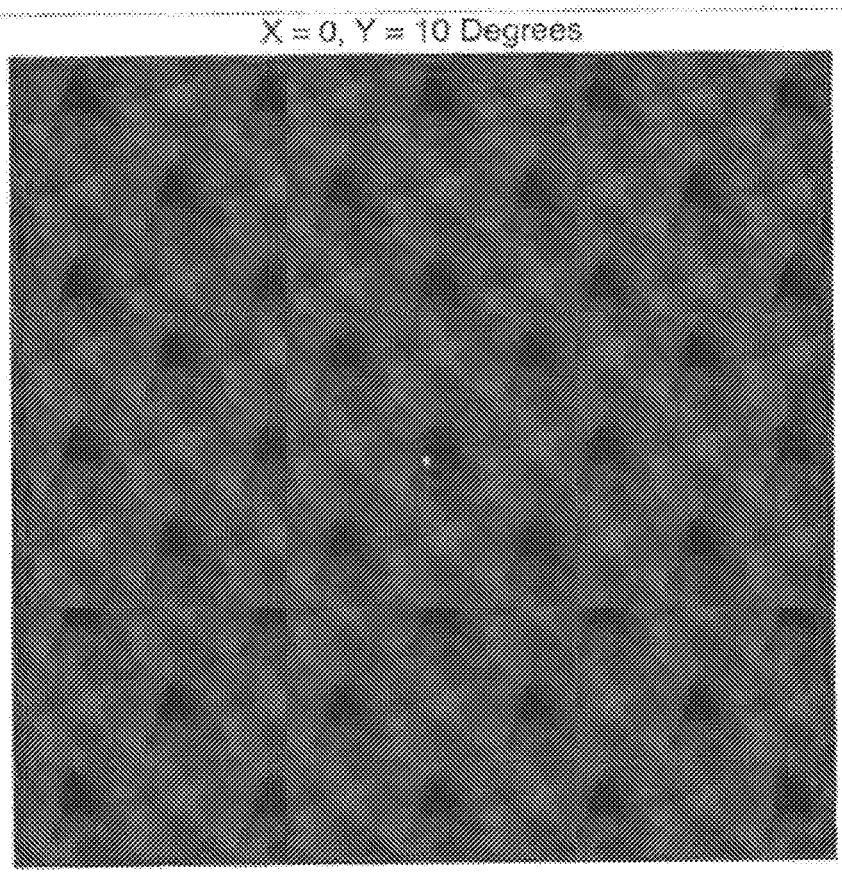
Figure 90:
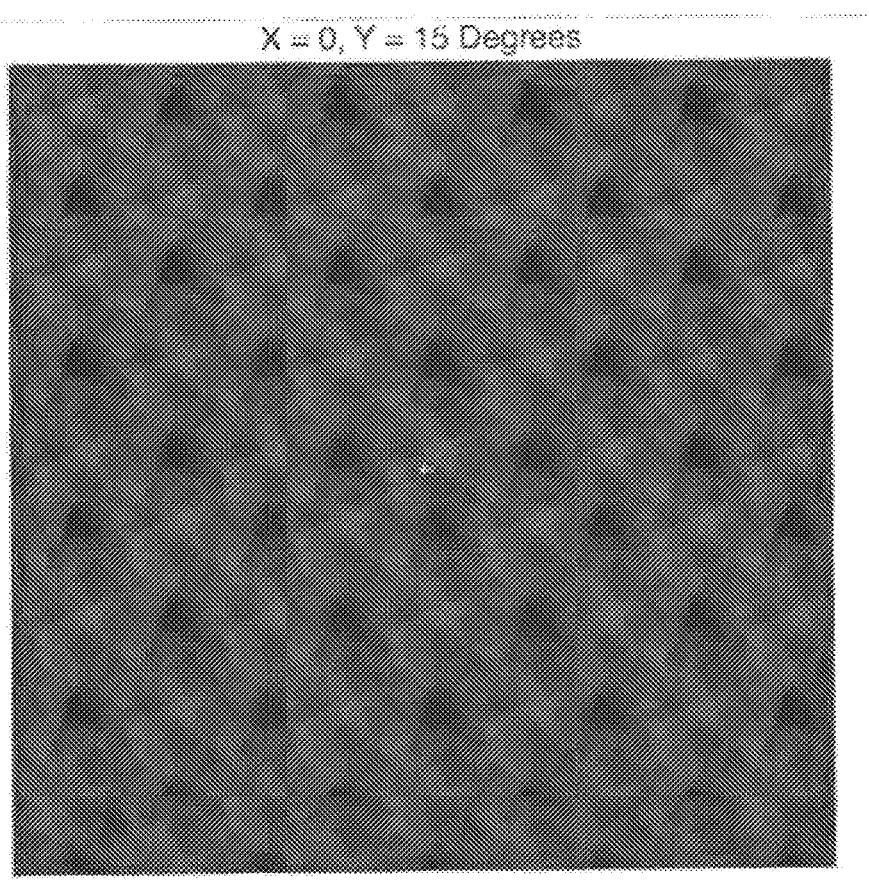
Figure 91:
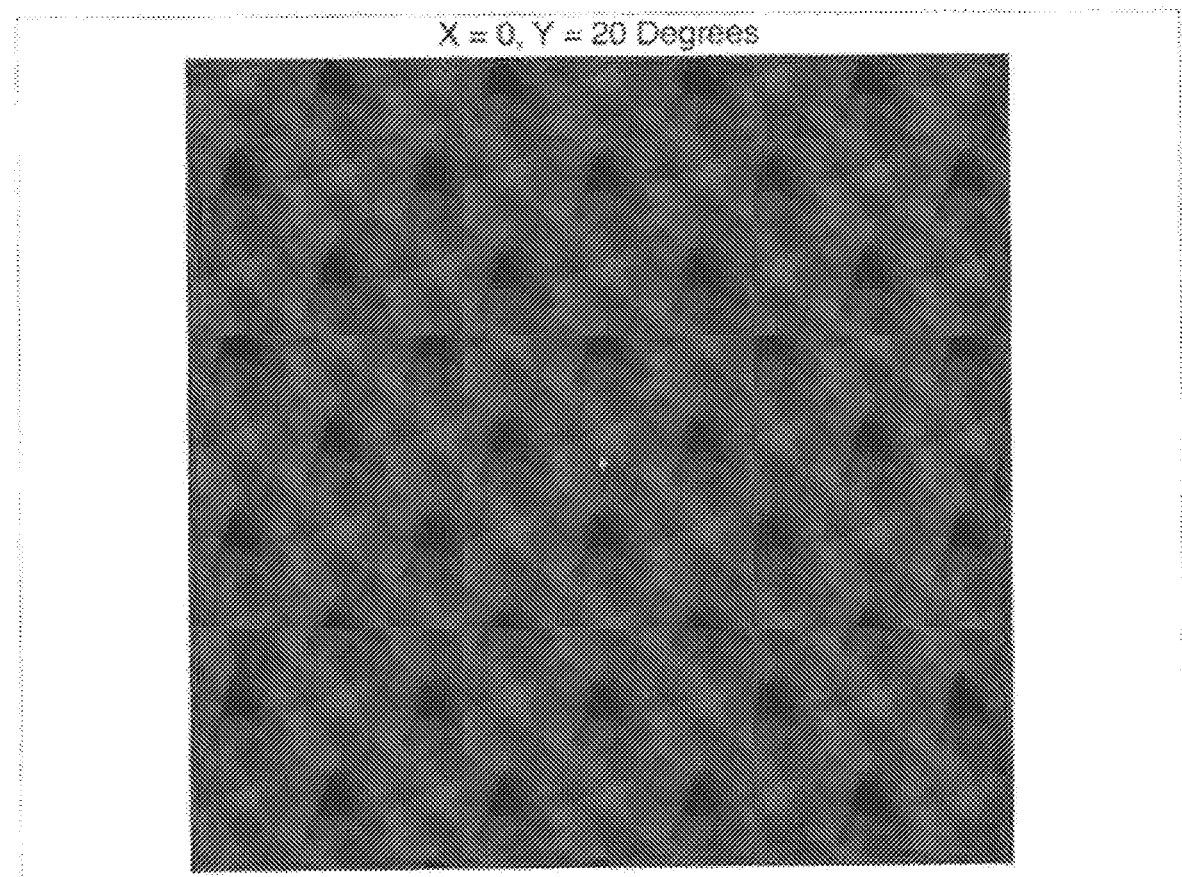
Figure 92:
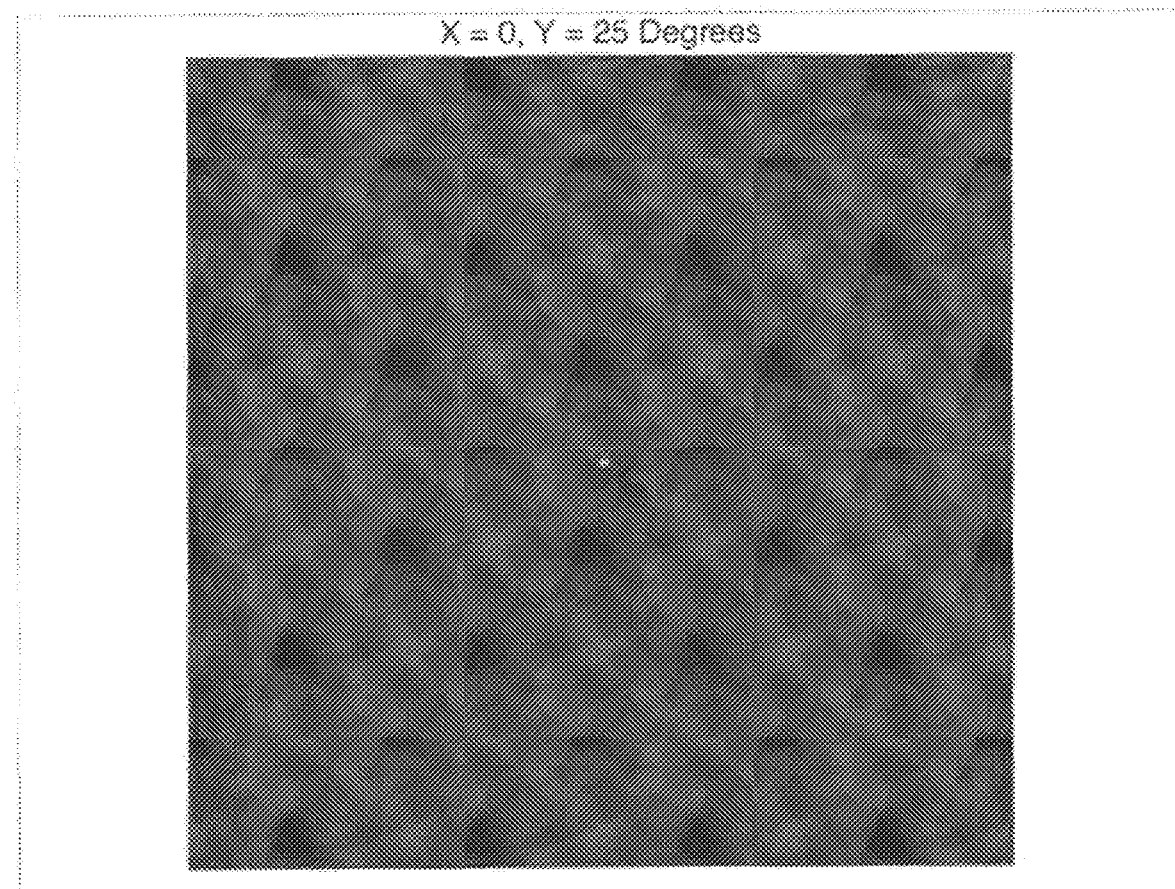
Figure 93:
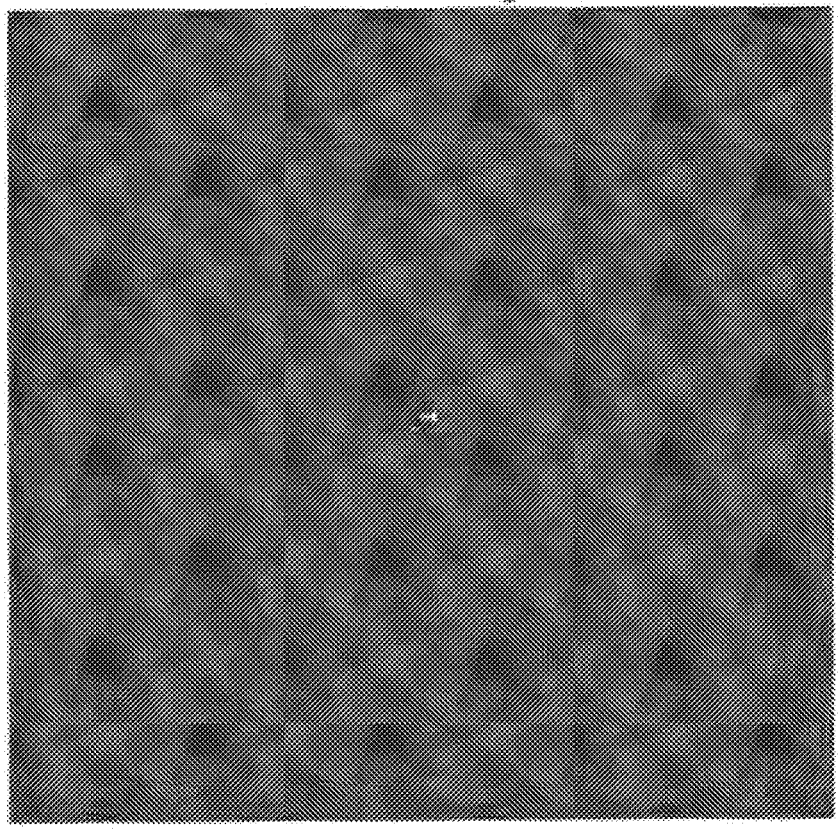
Figure 94:
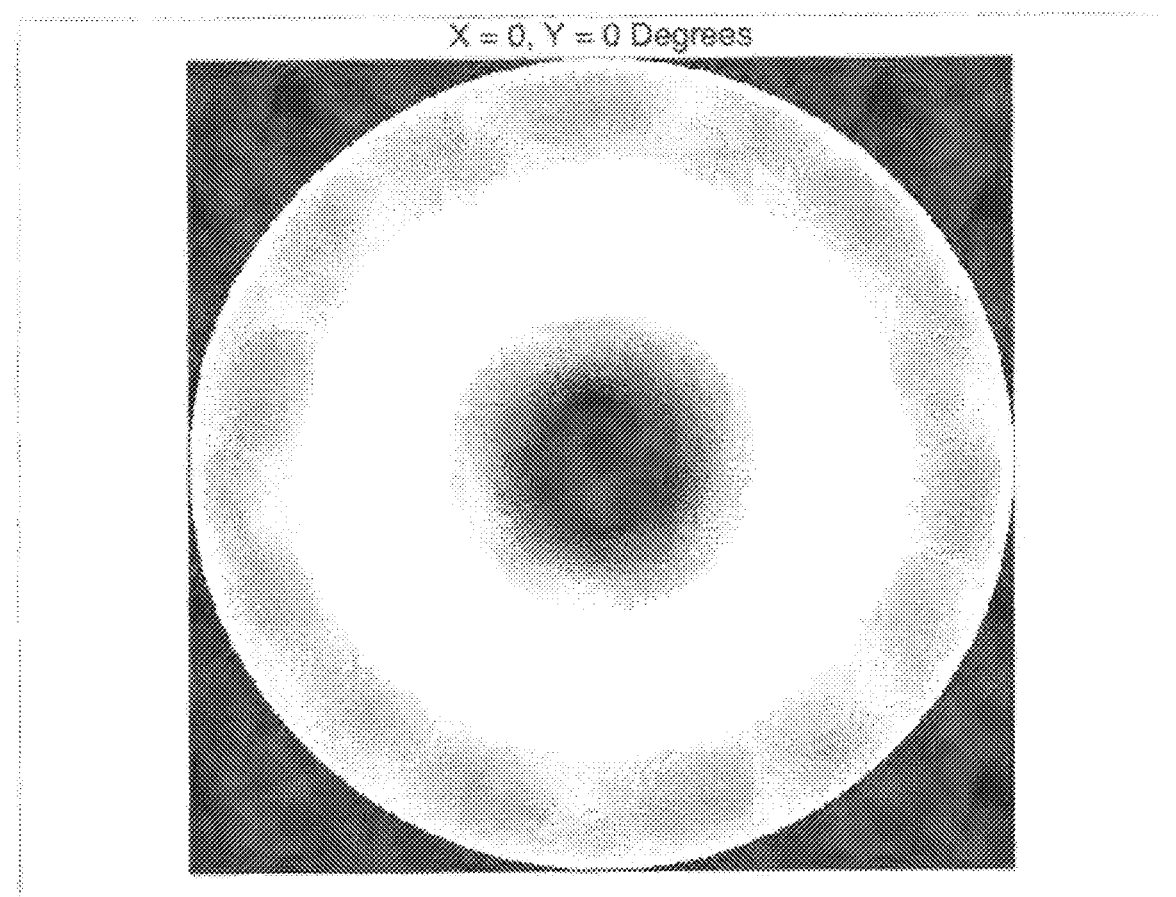
FIGS. 94-127 show full sized corrected and uncorrected wave front images corresponding to those of FIGS. 24A-24C.
Figure 95:
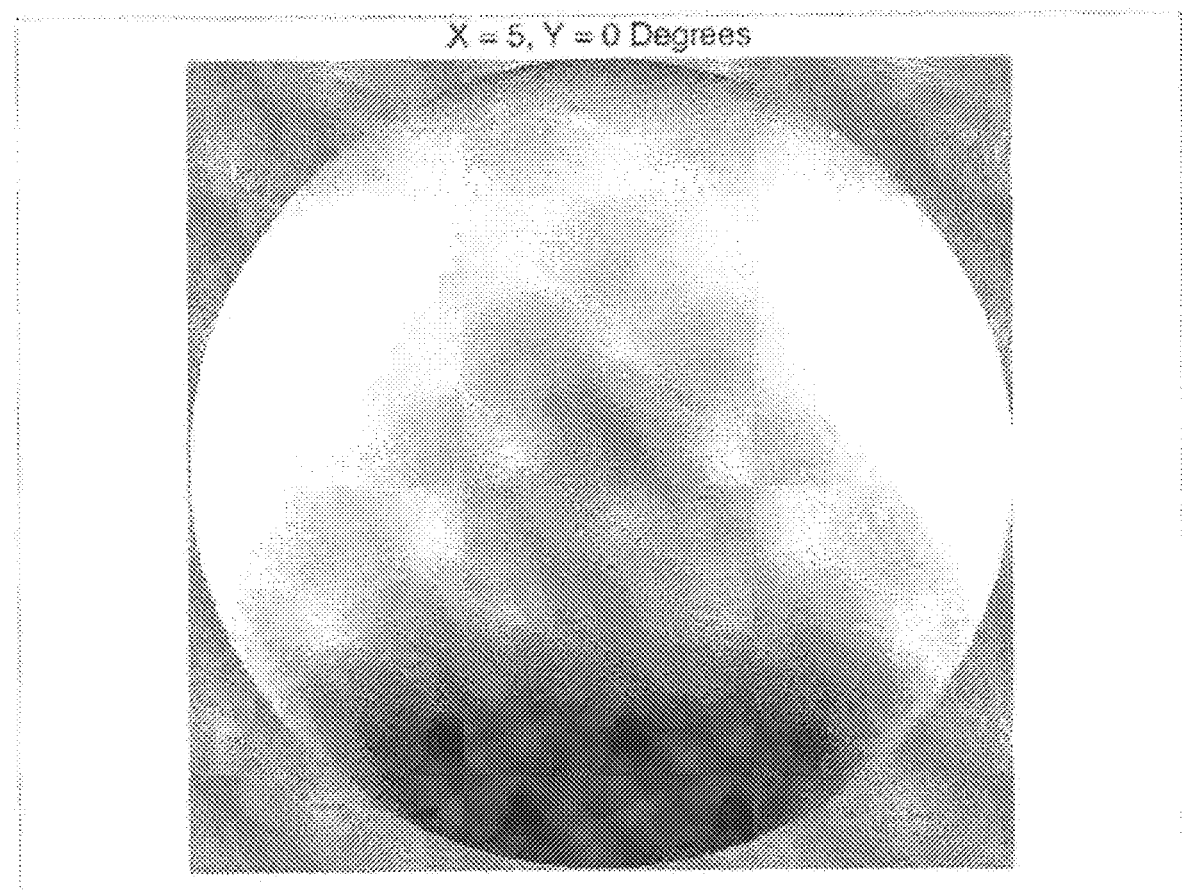
Figure 96:
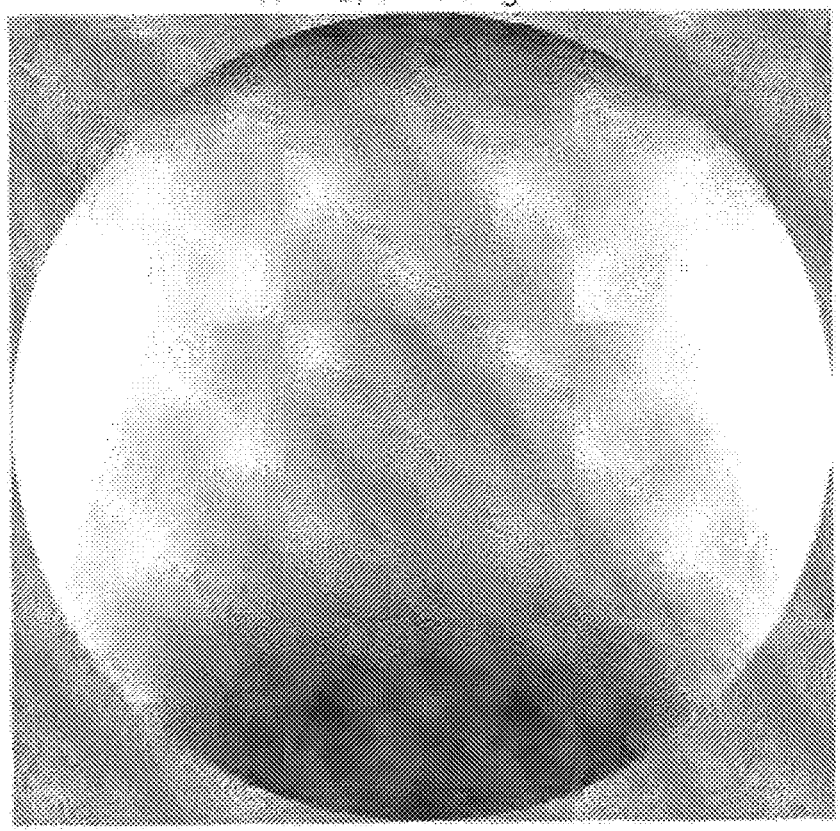
Figure 97:
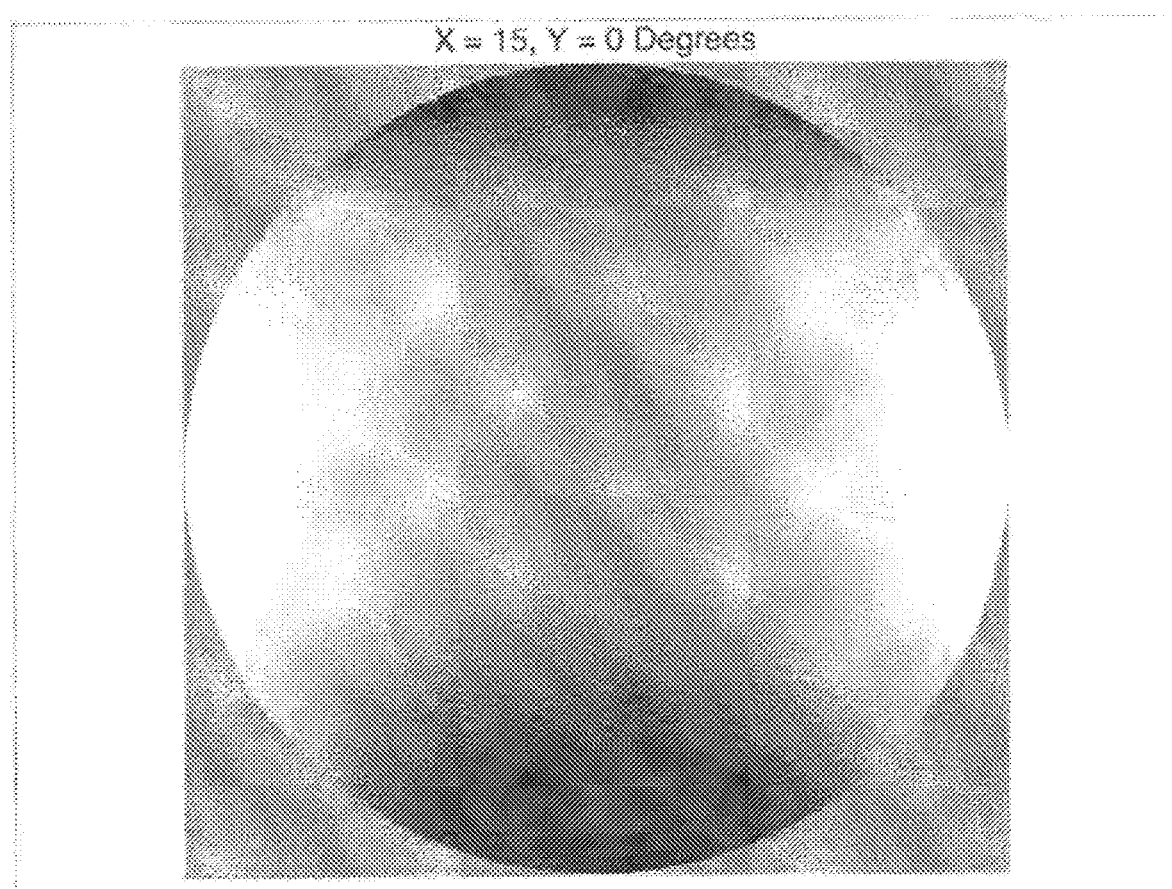
Figure 98:
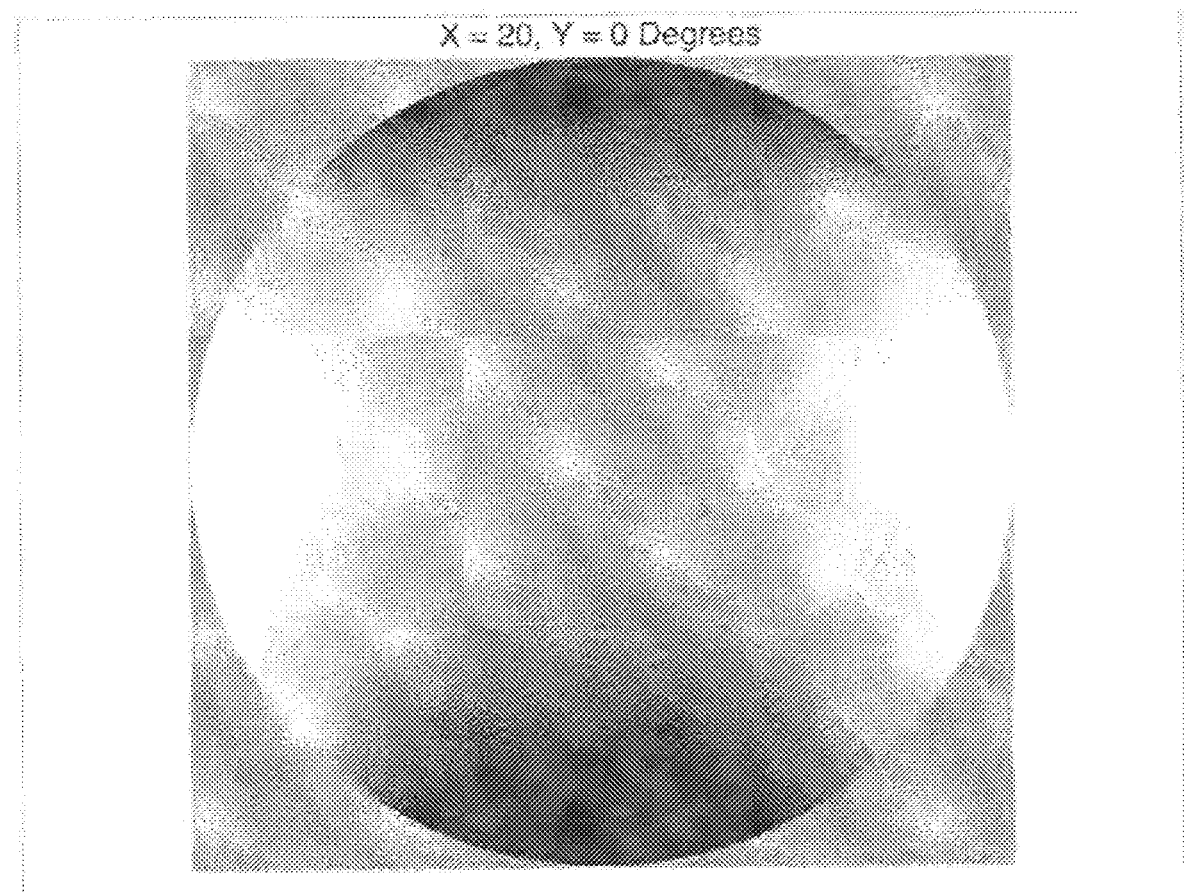
Figure 99:
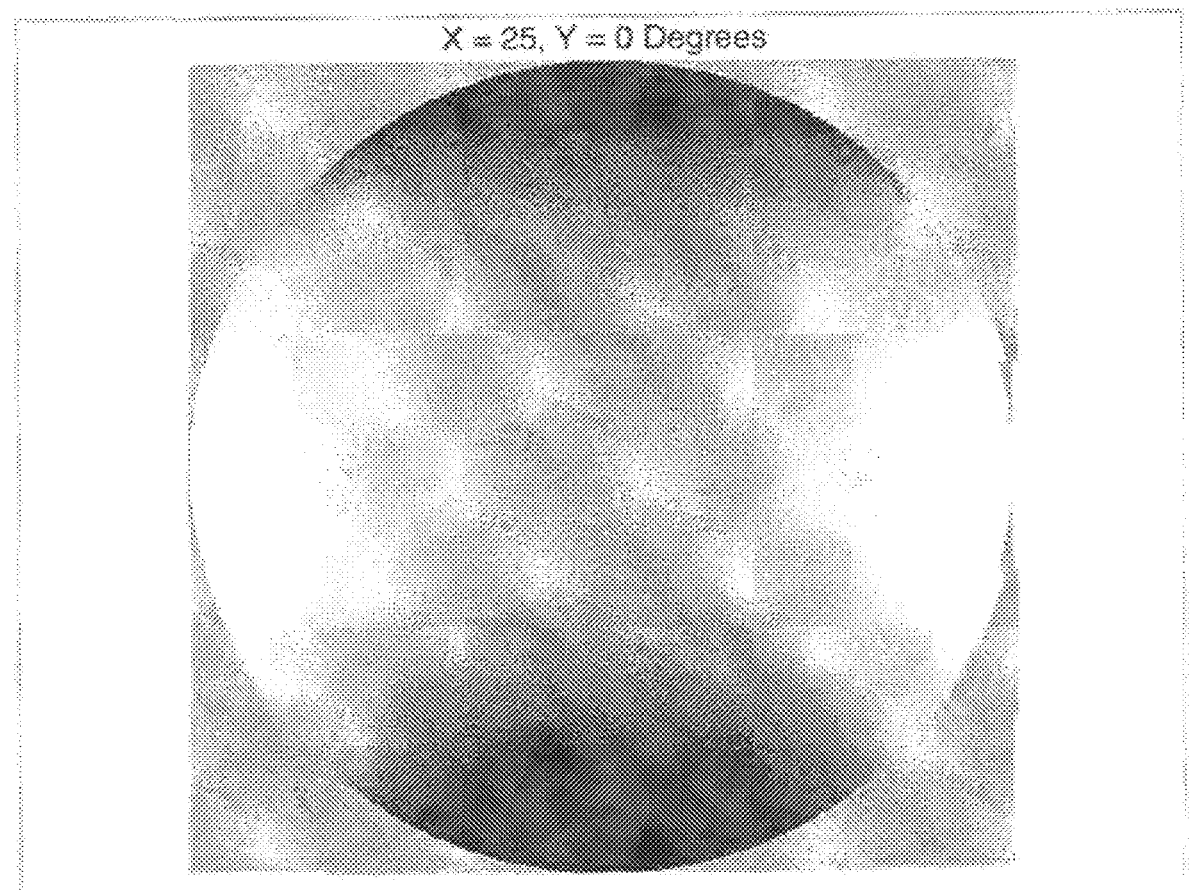
Figure 100:
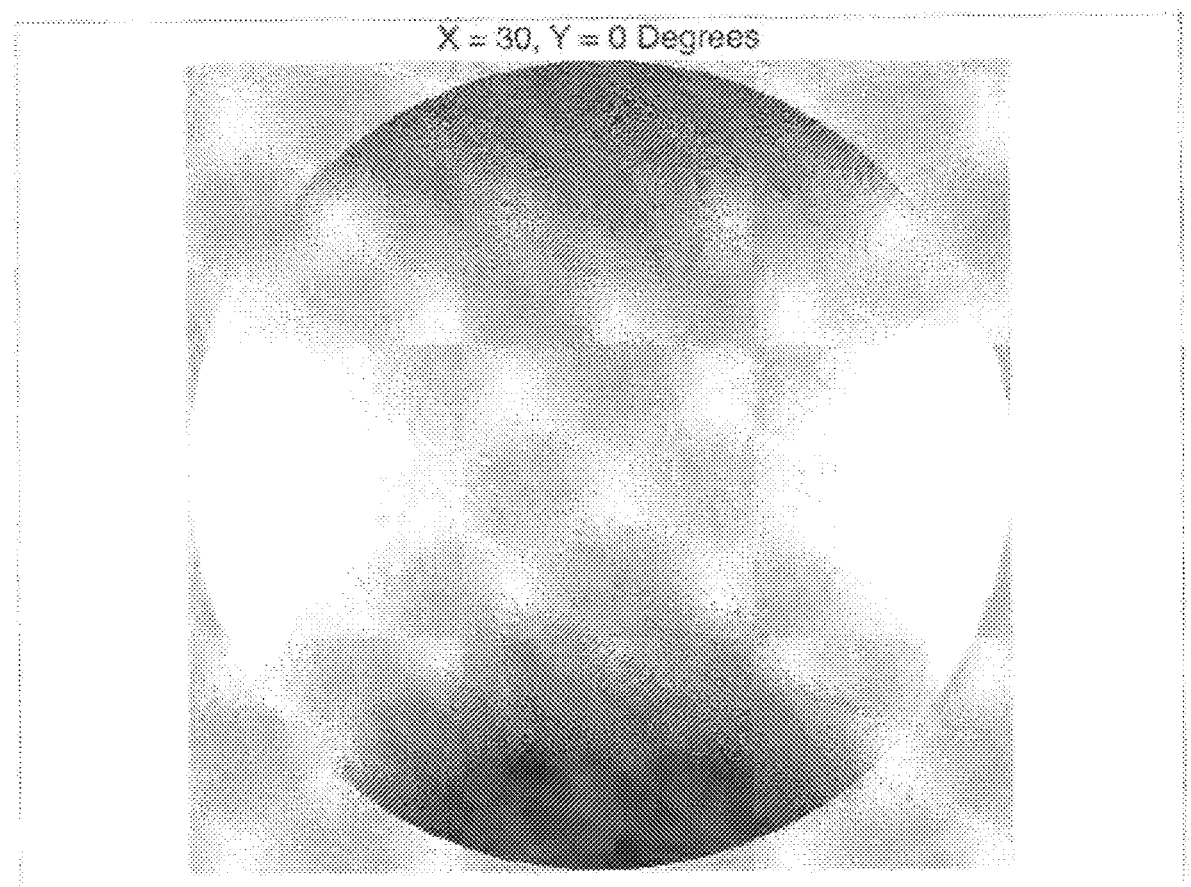
Figure 101:
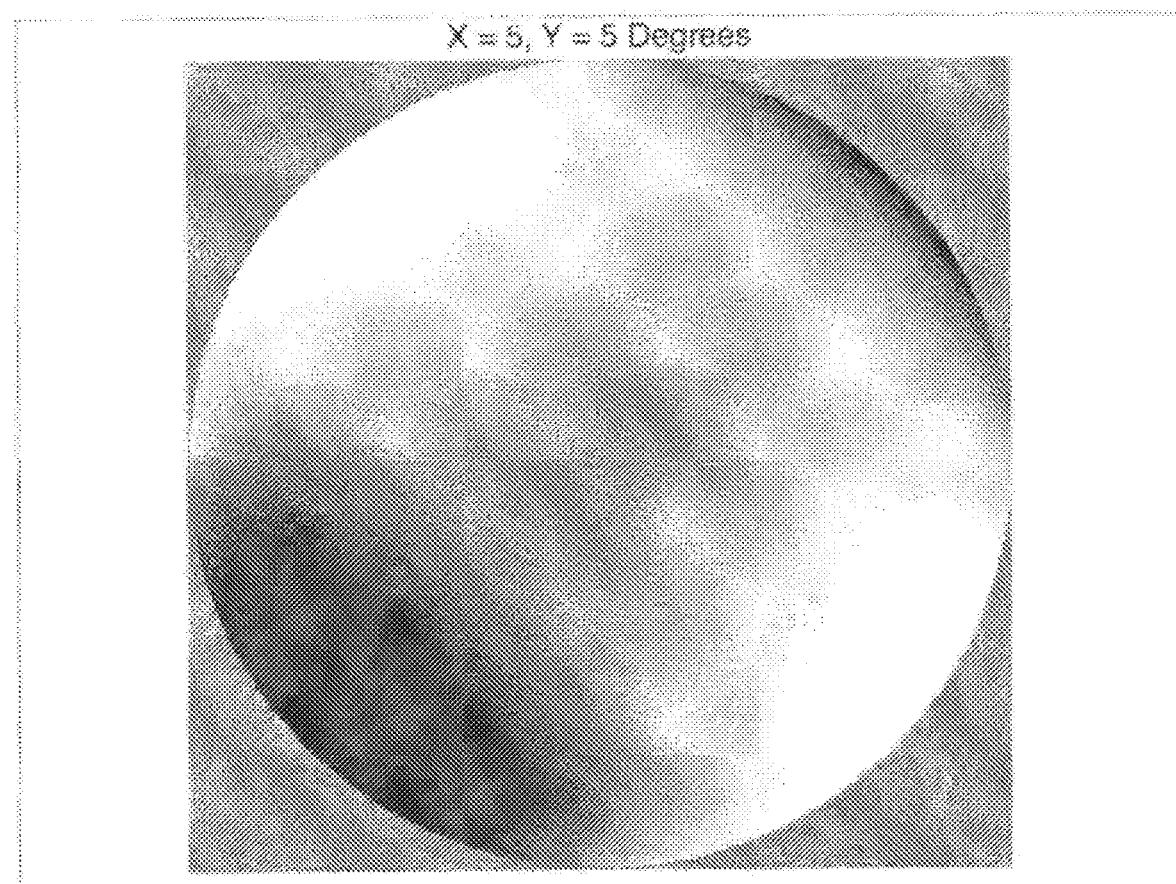
Figure 102:
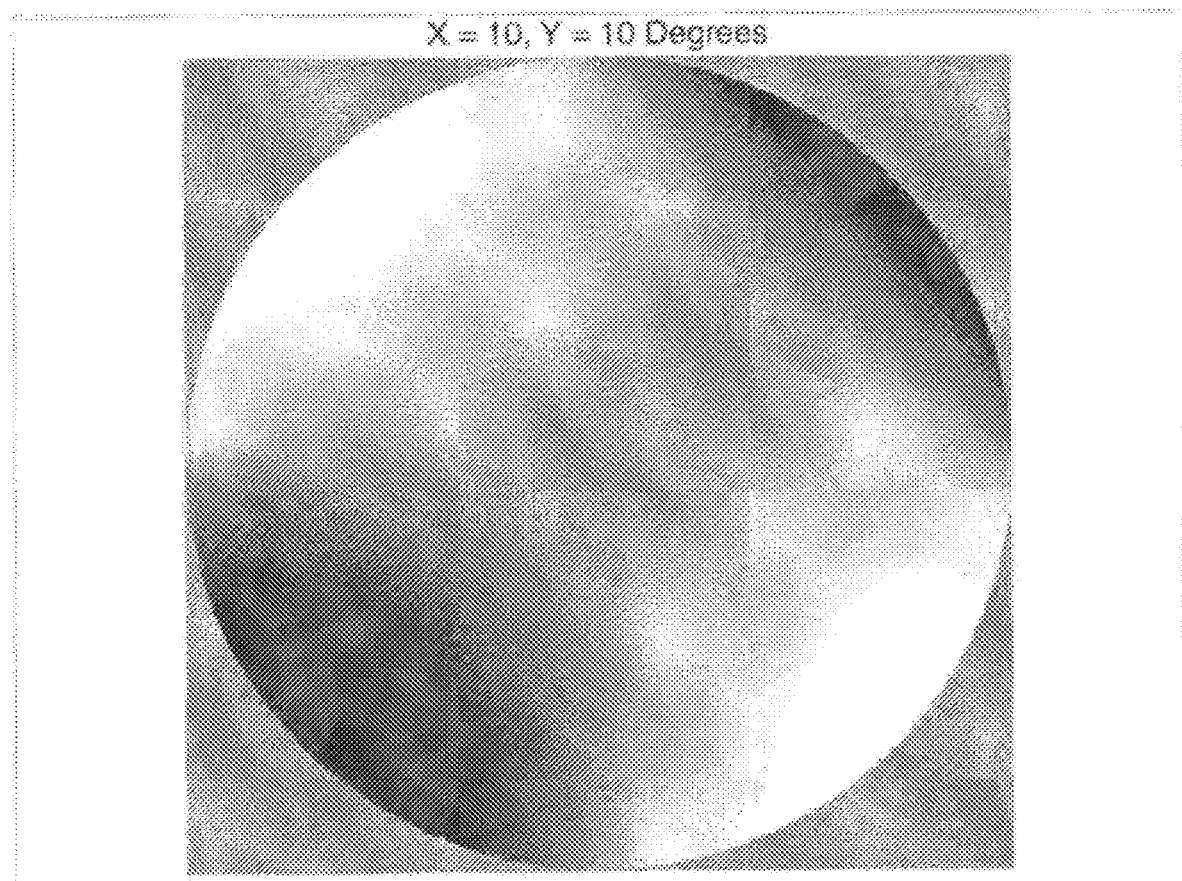
Figure 103:
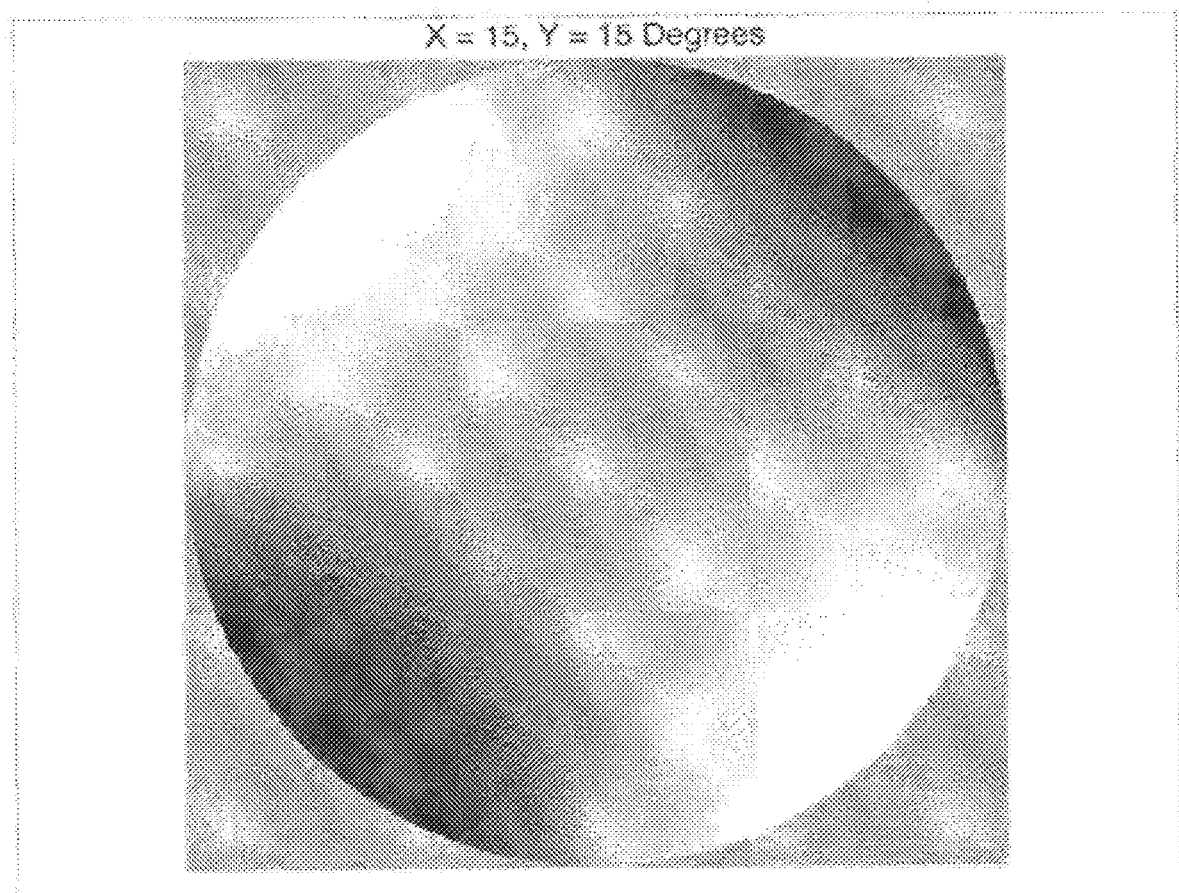
Figure 104:
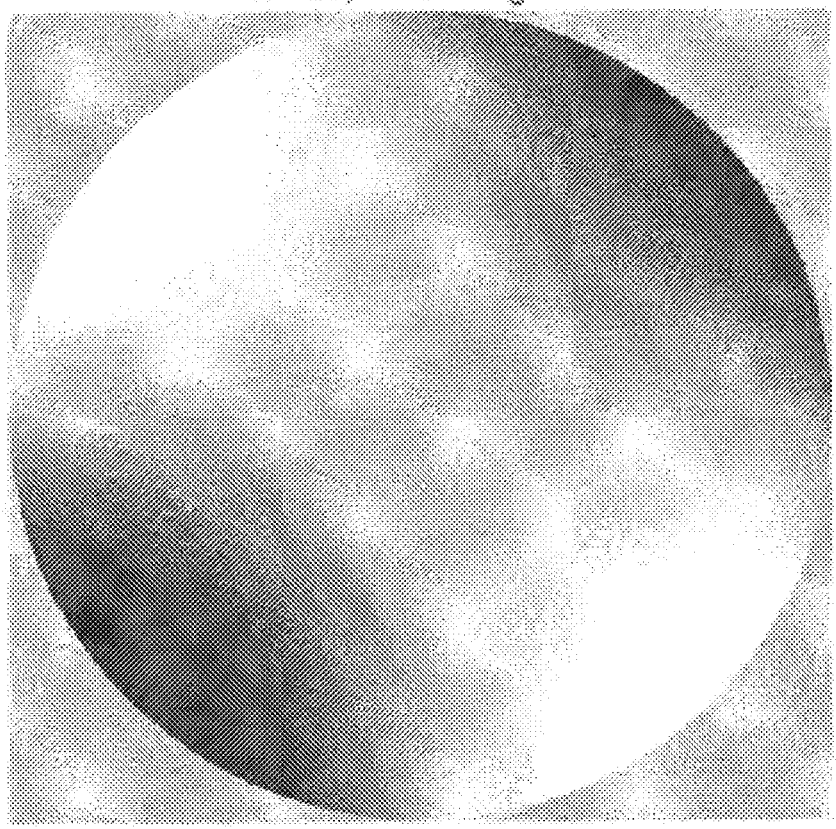
Figure 105:
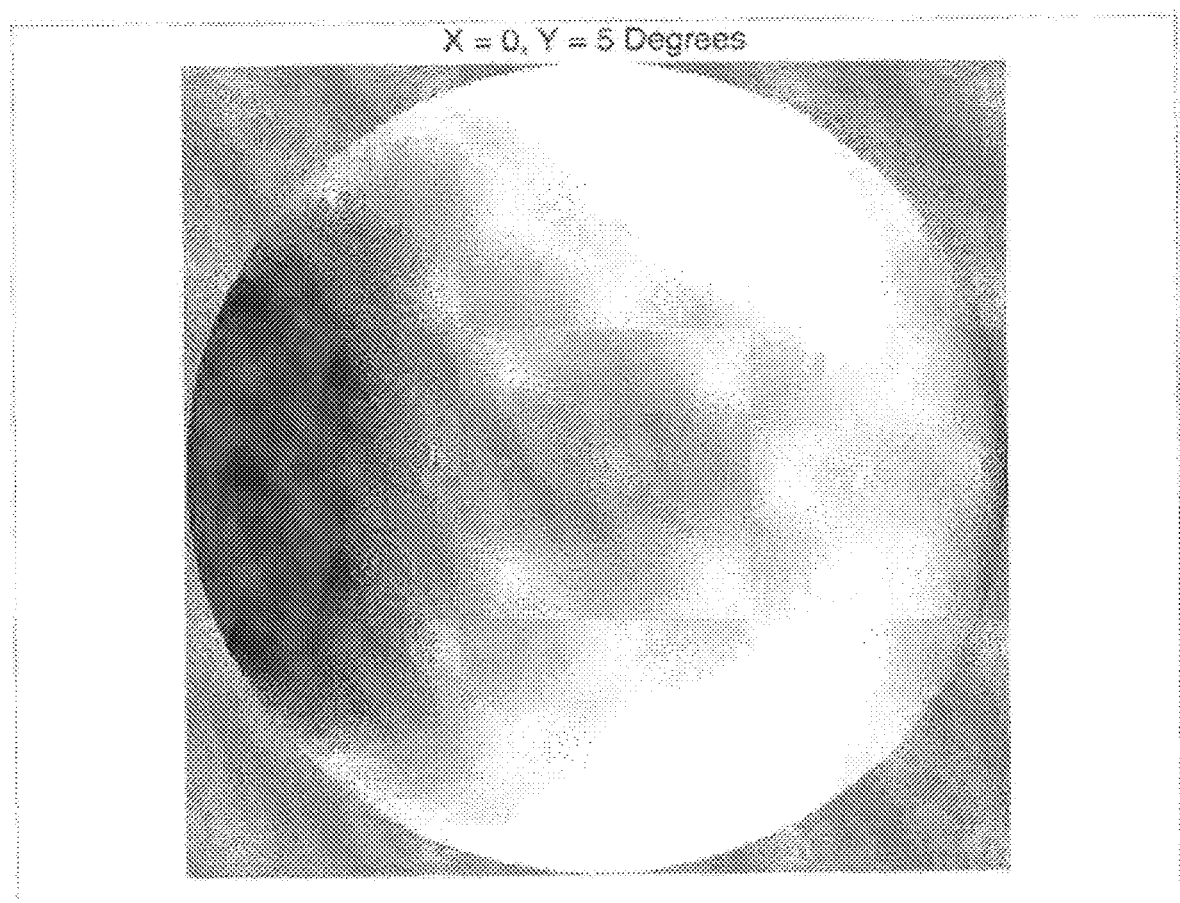
Figure 106:
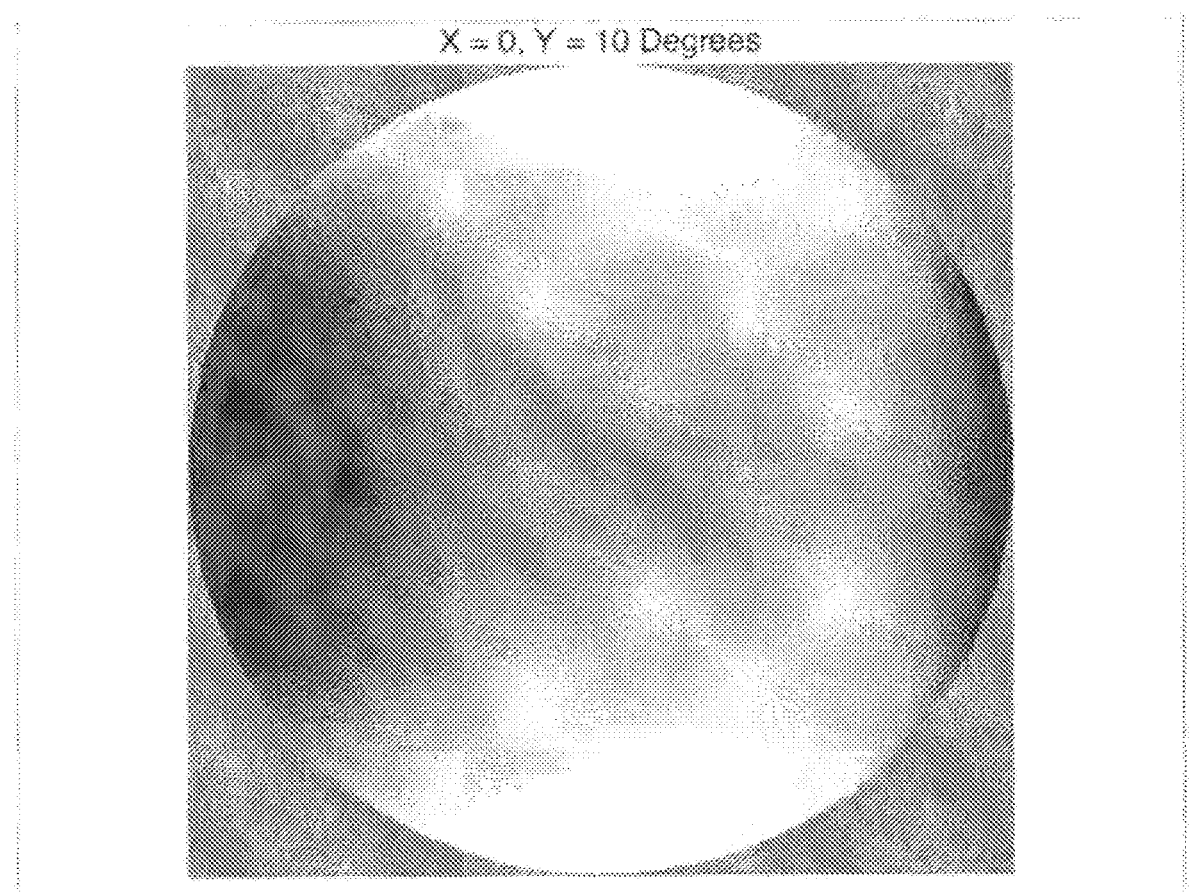
Figure 107:
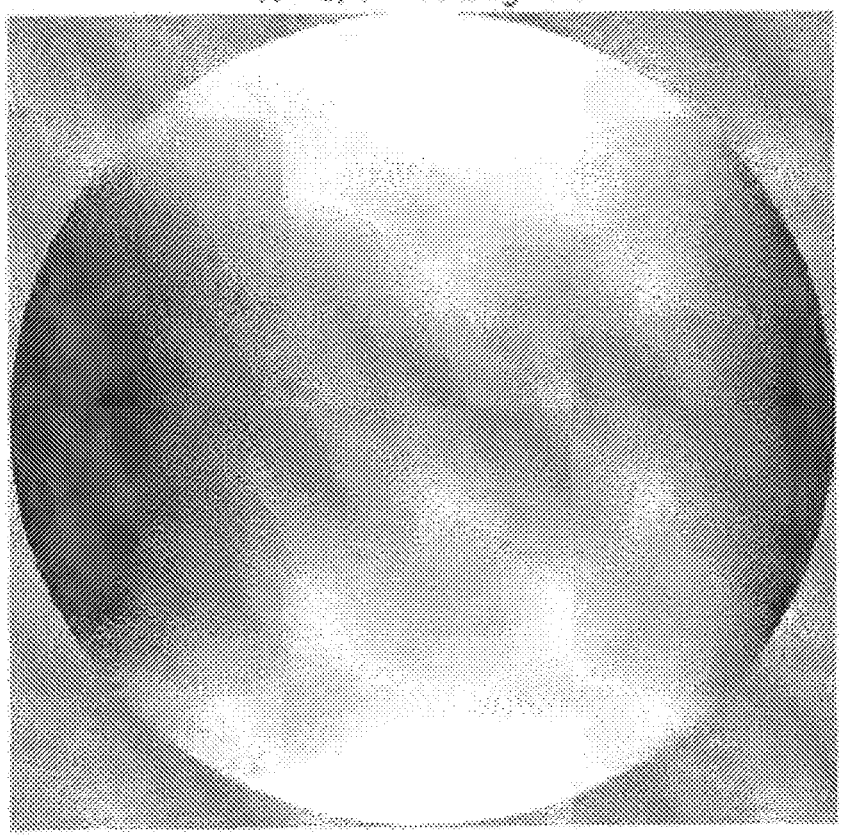
Figure 108:
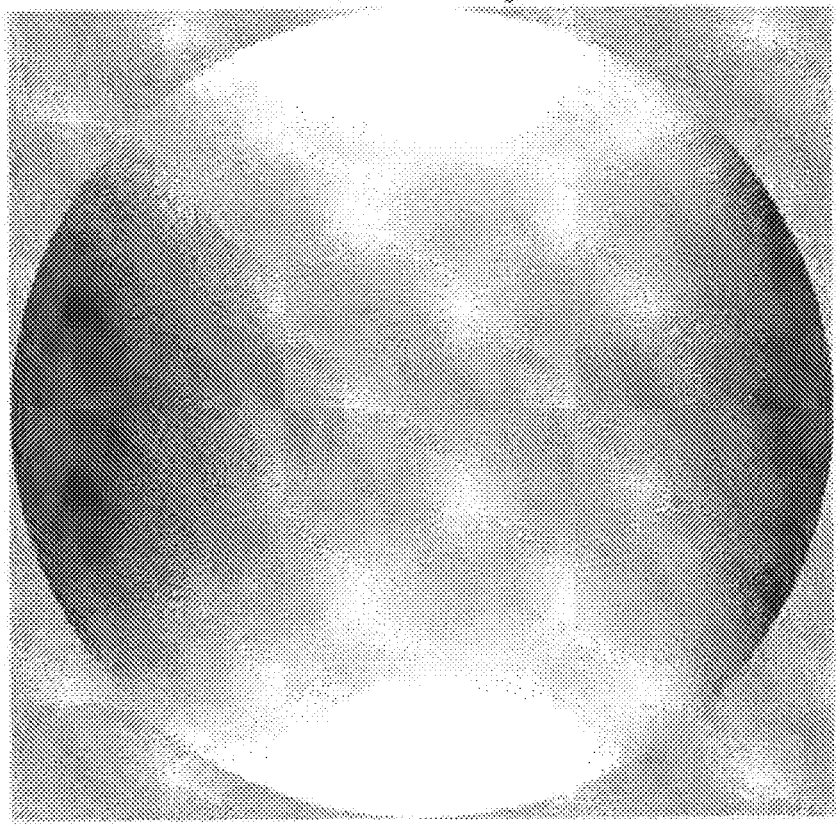
Figure 109:
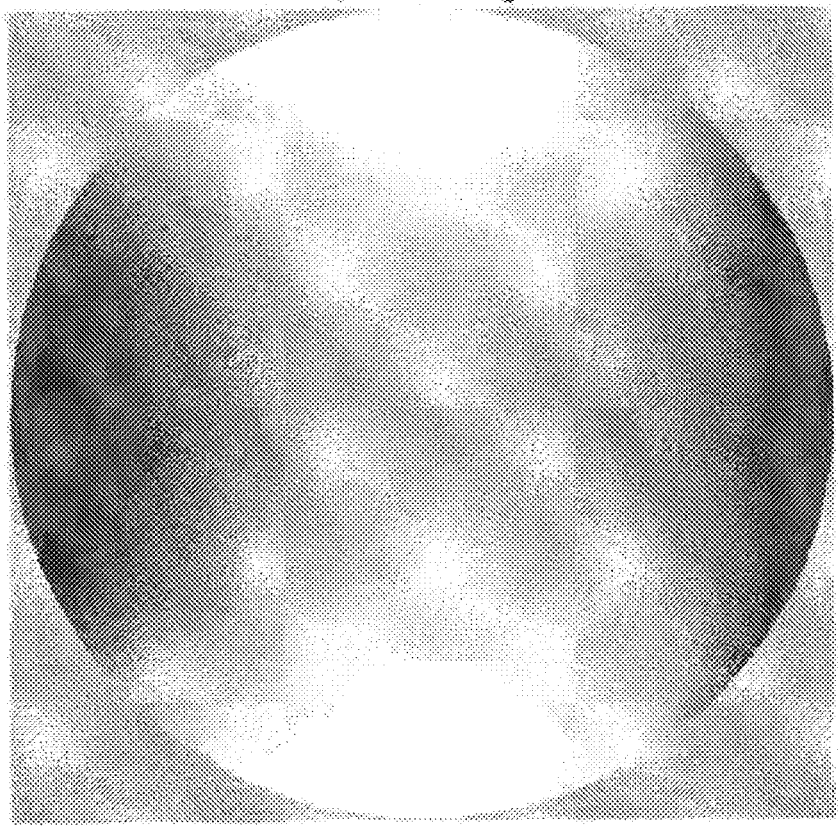
Figure 110:
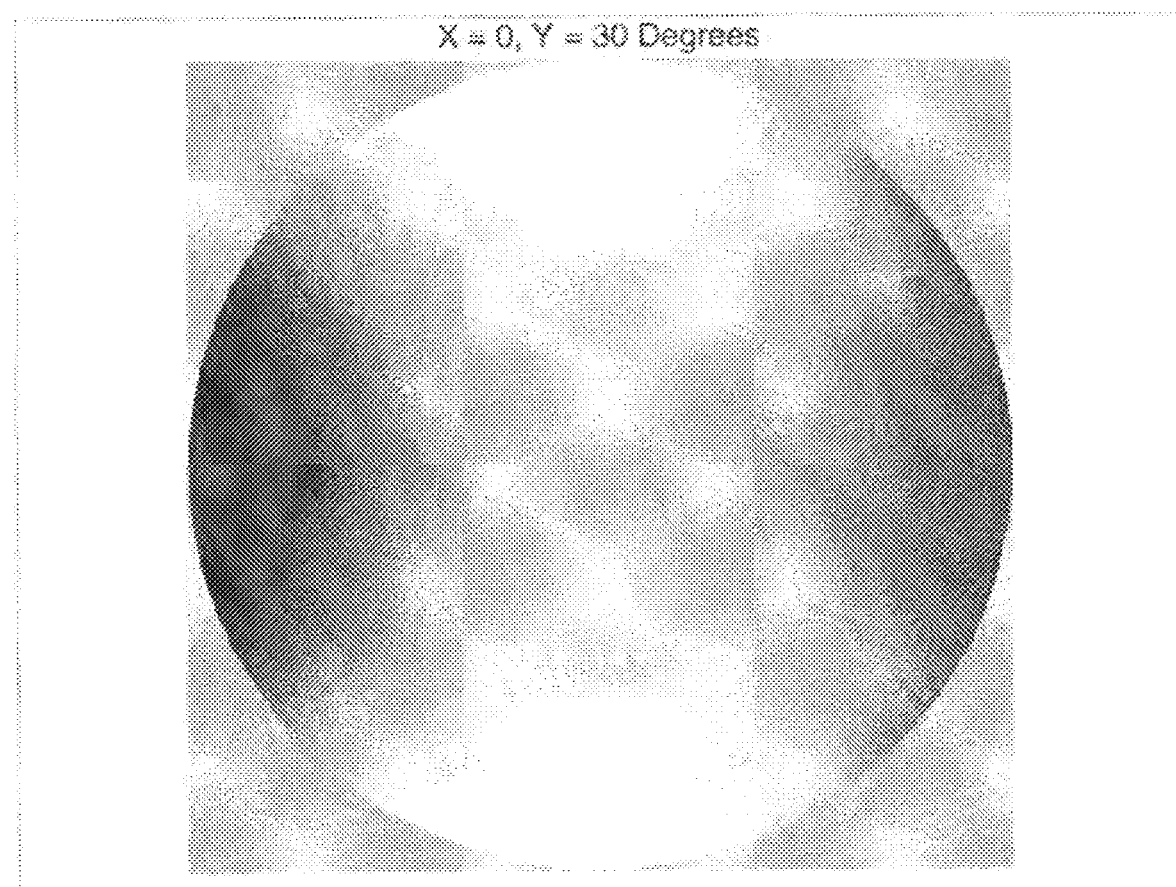
Figure 111:
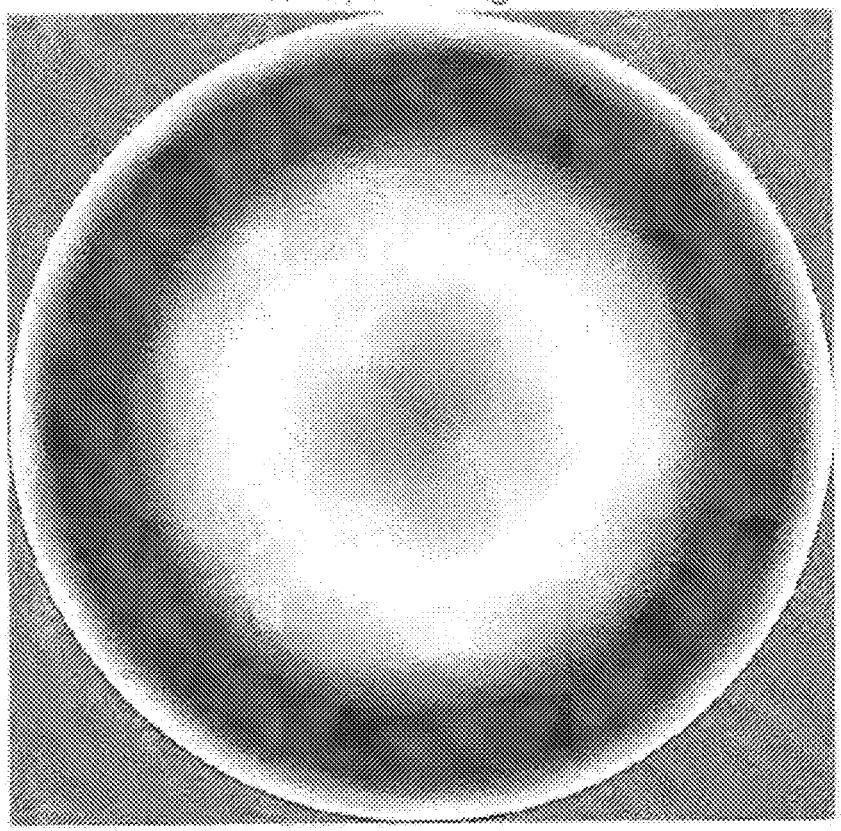
Figure 112:
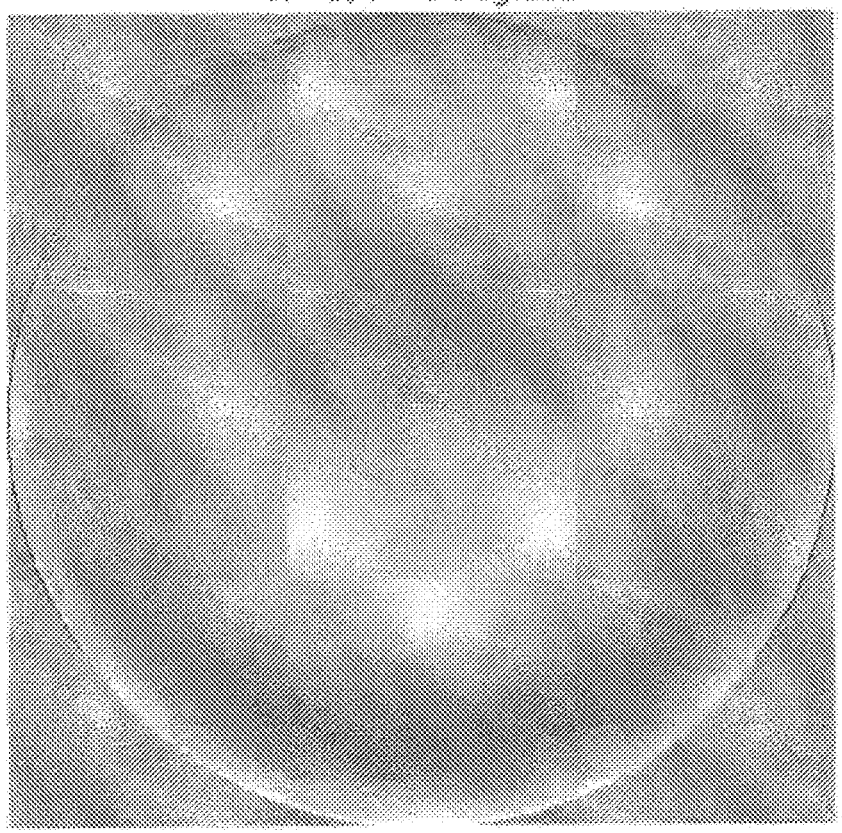
Figure 113:
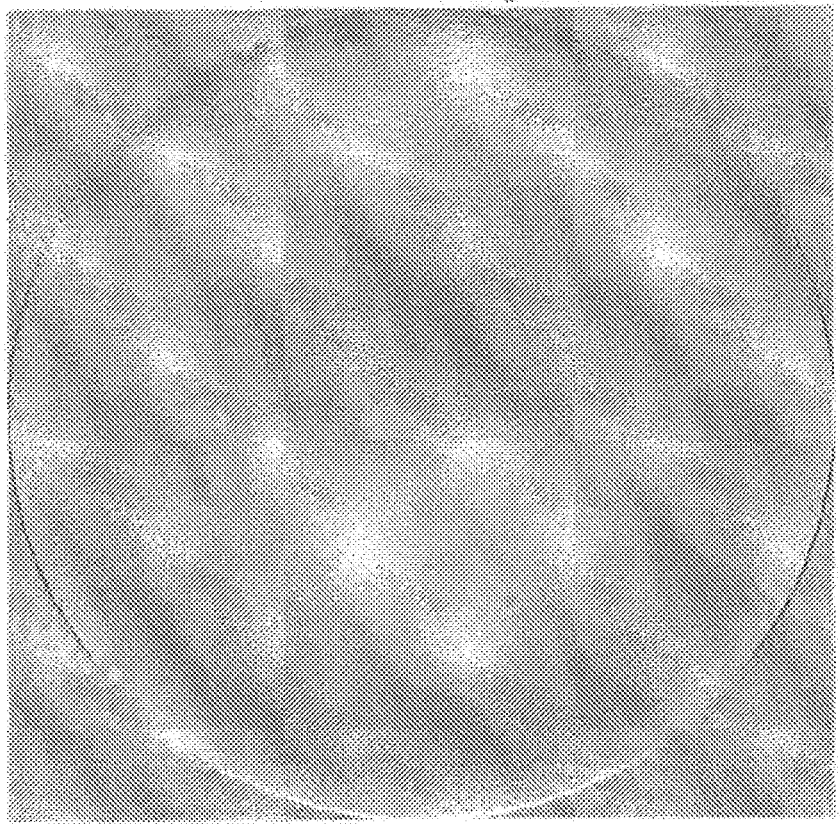
Figure 114:
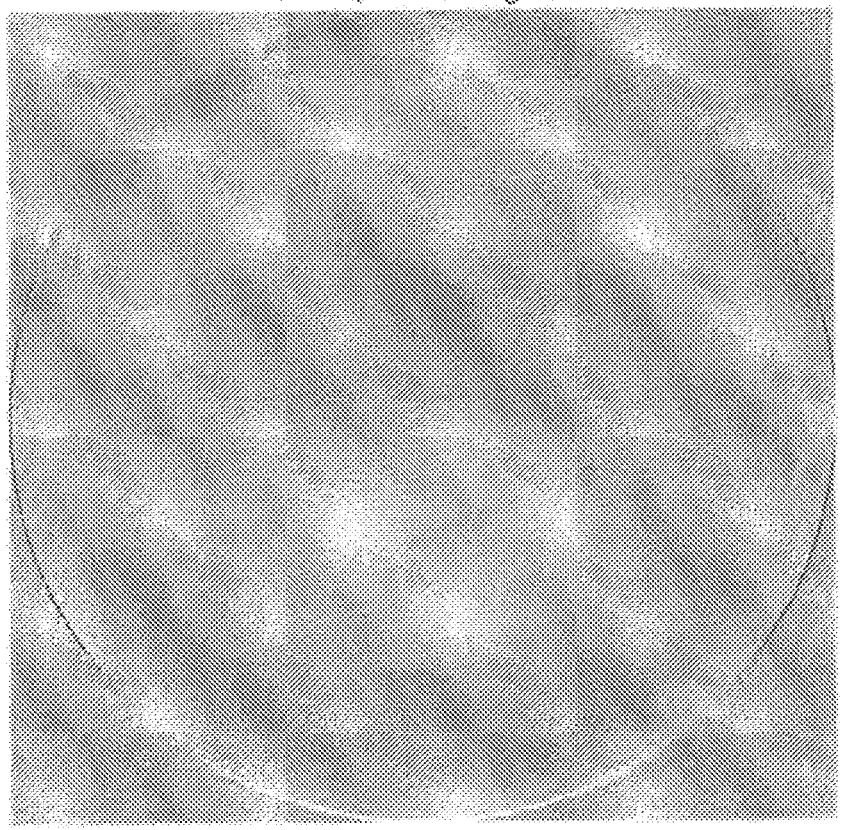
Figure 115:
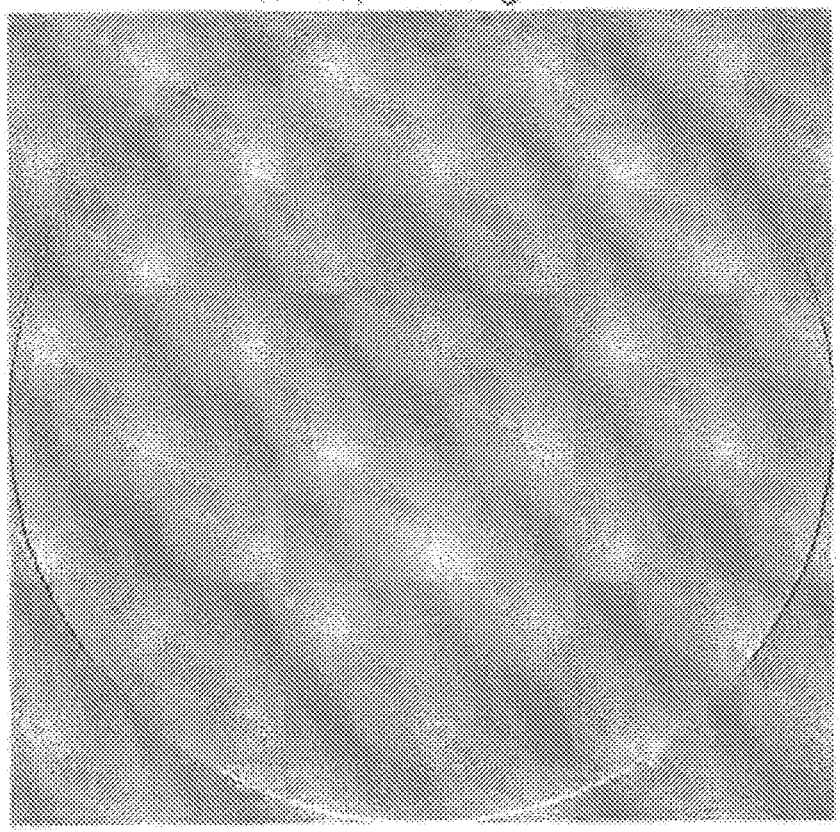
Figure 116:
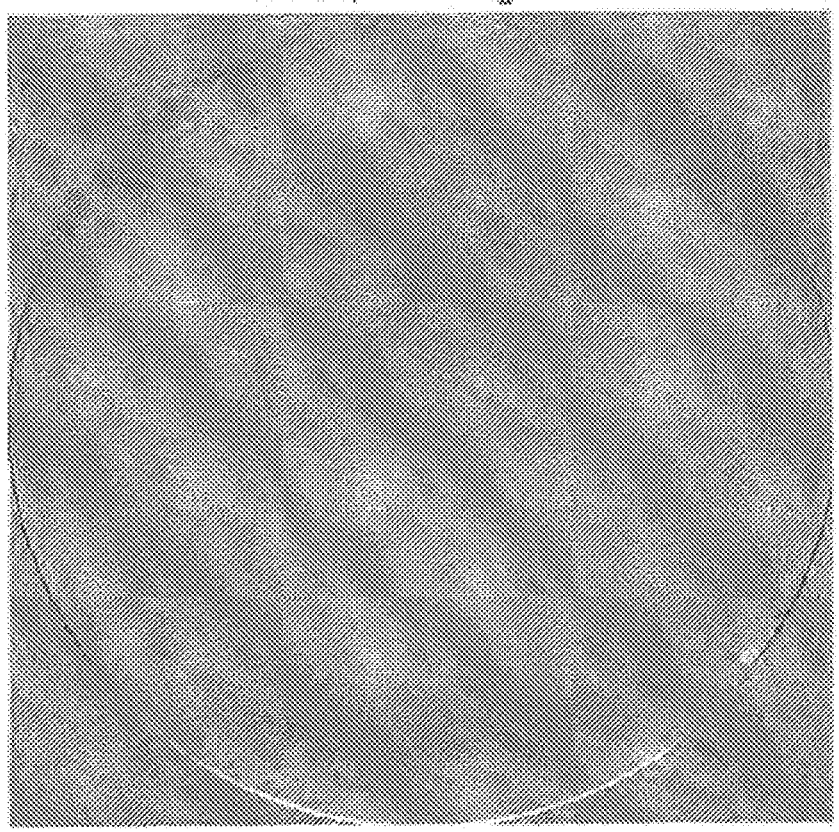
Figure 117:
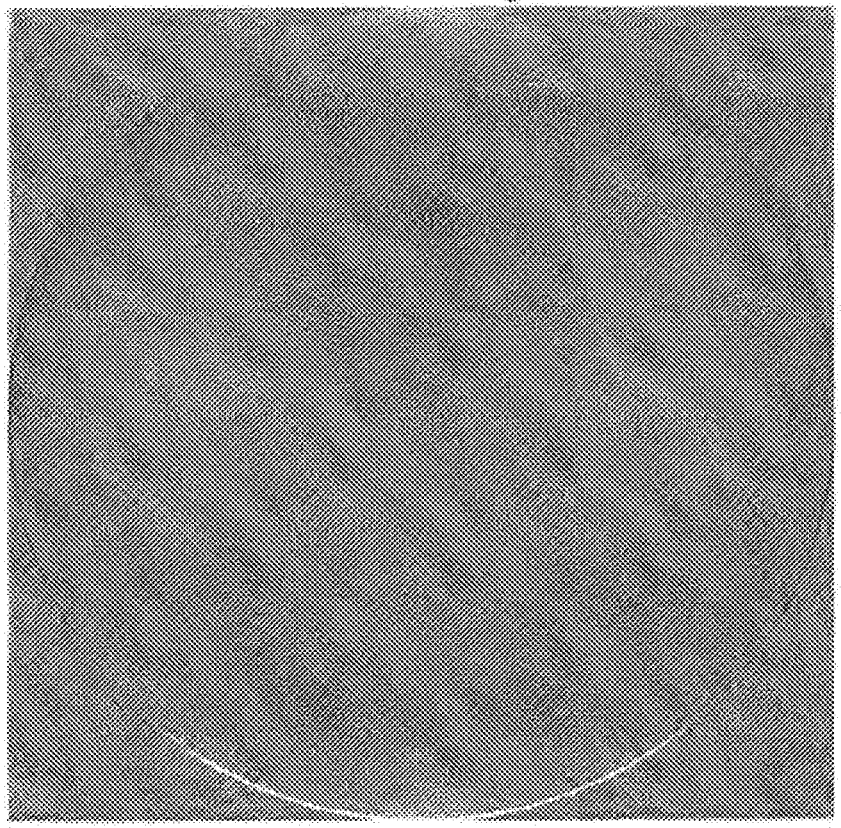
Figure 118:
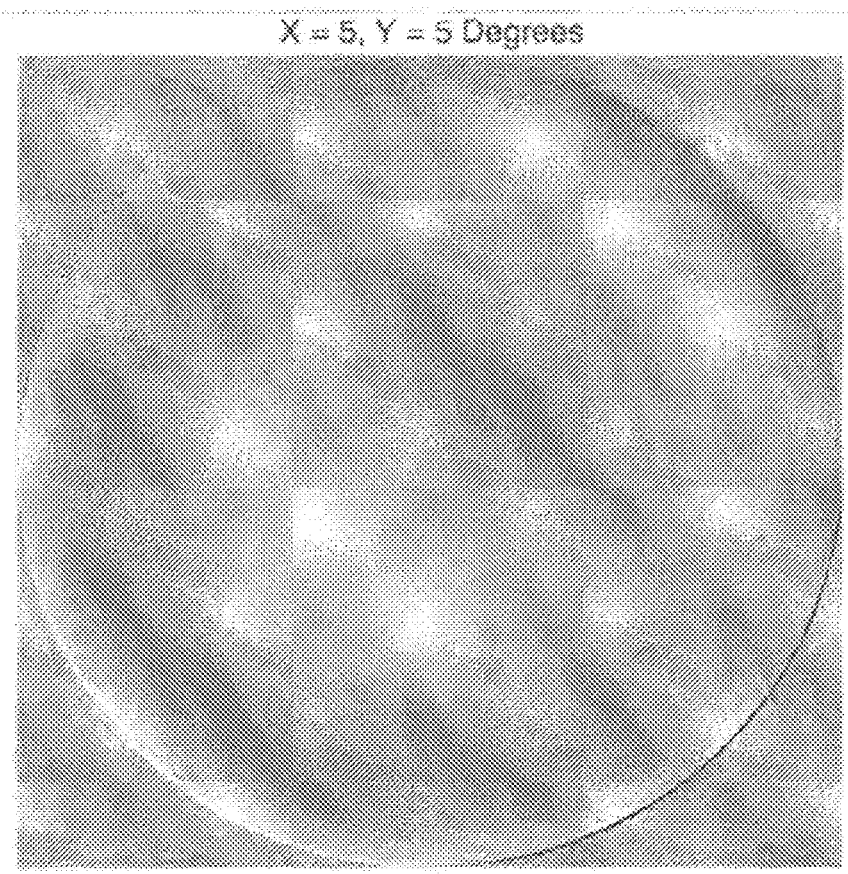
Figure 119:
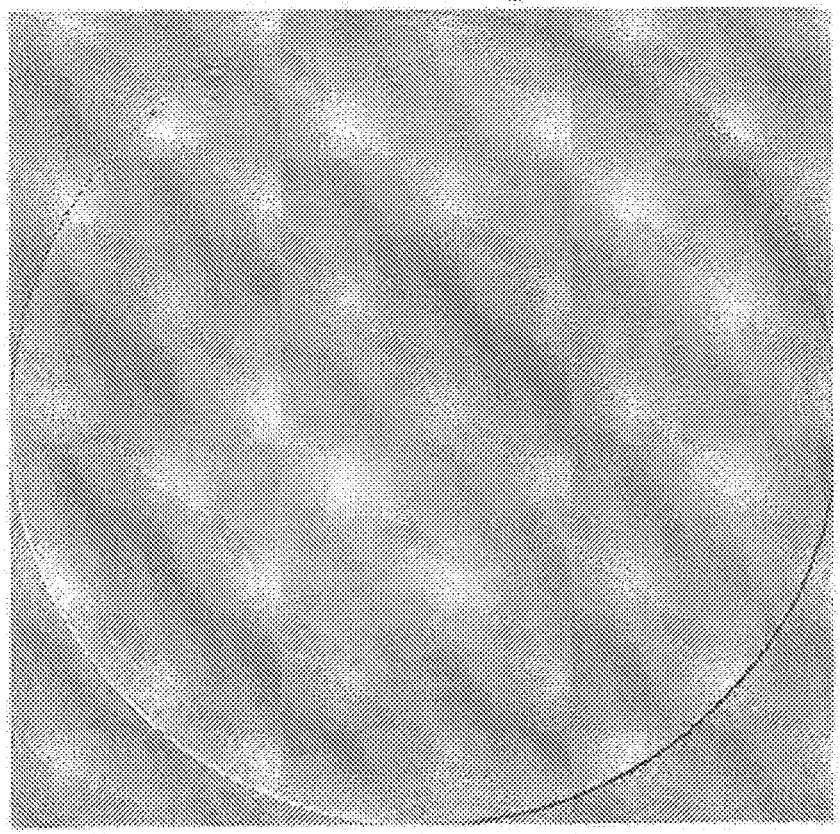
Figure 120:
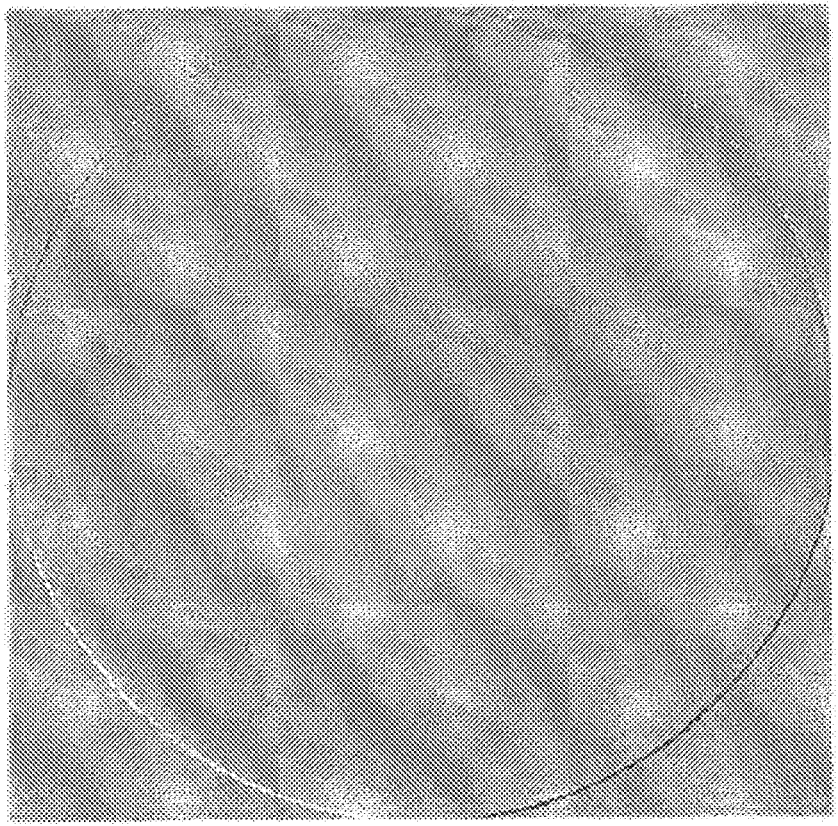
Figure 121:
Figure 122:
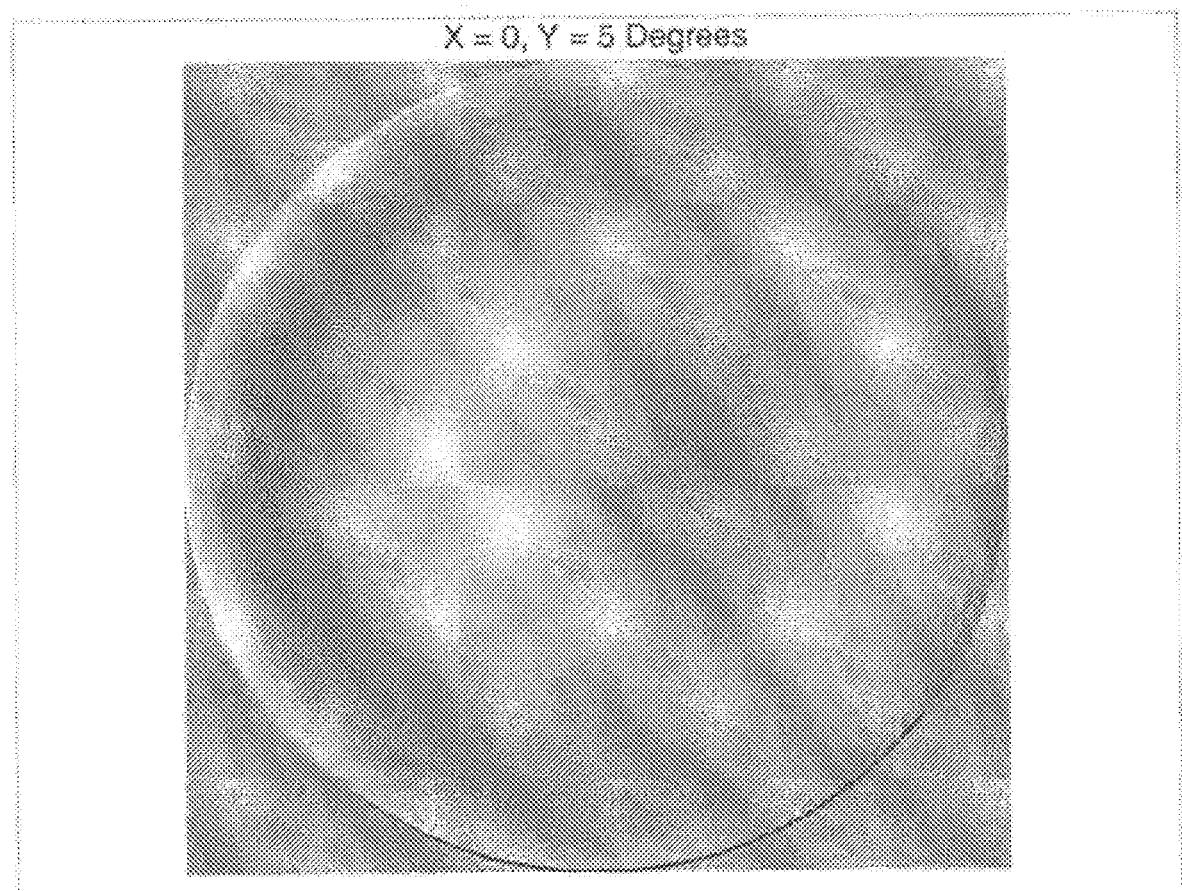
Figure 123:
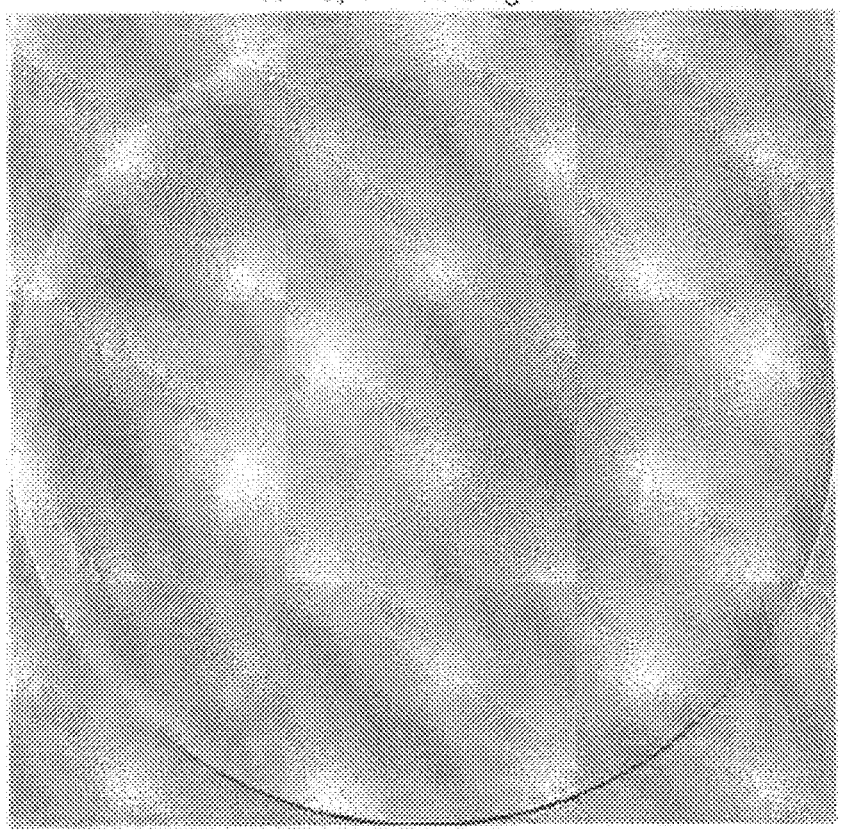
Figure 124:
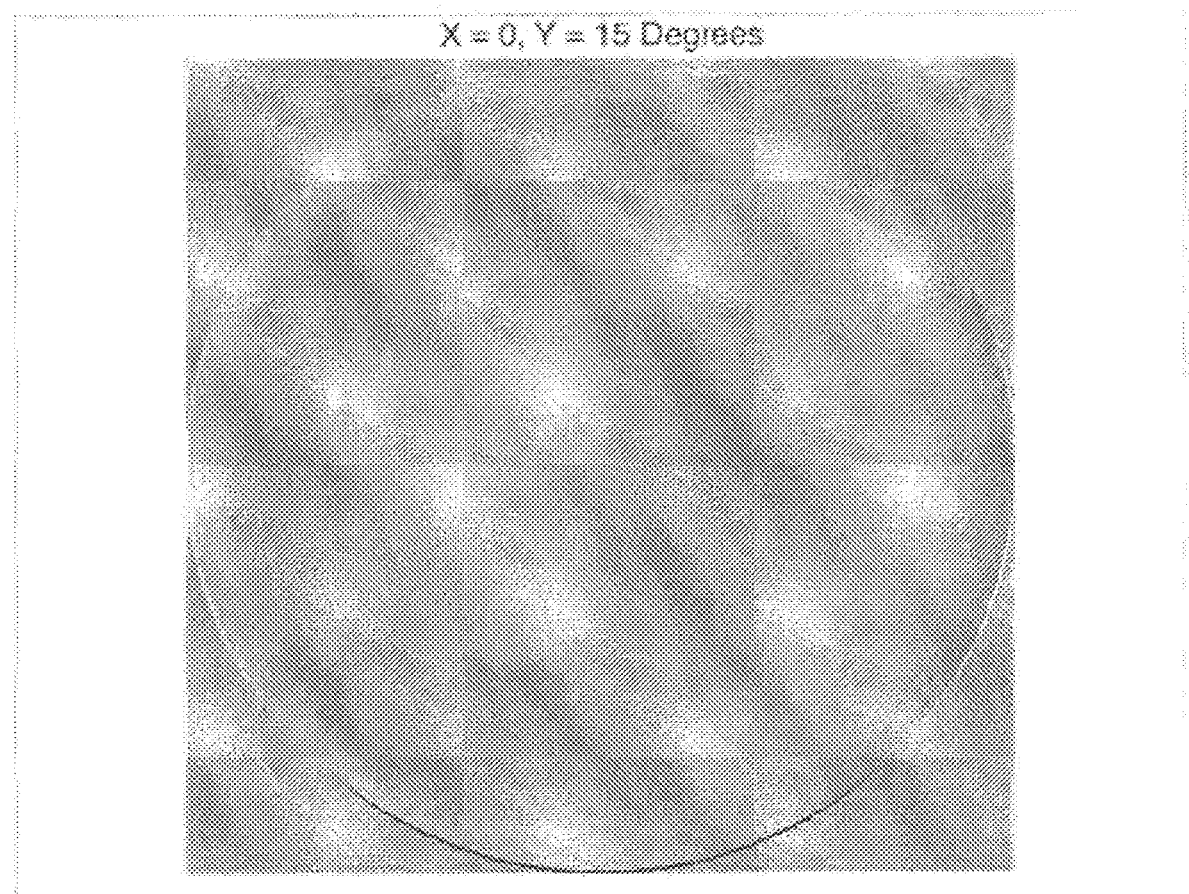
Figure 125:
Figure 126:
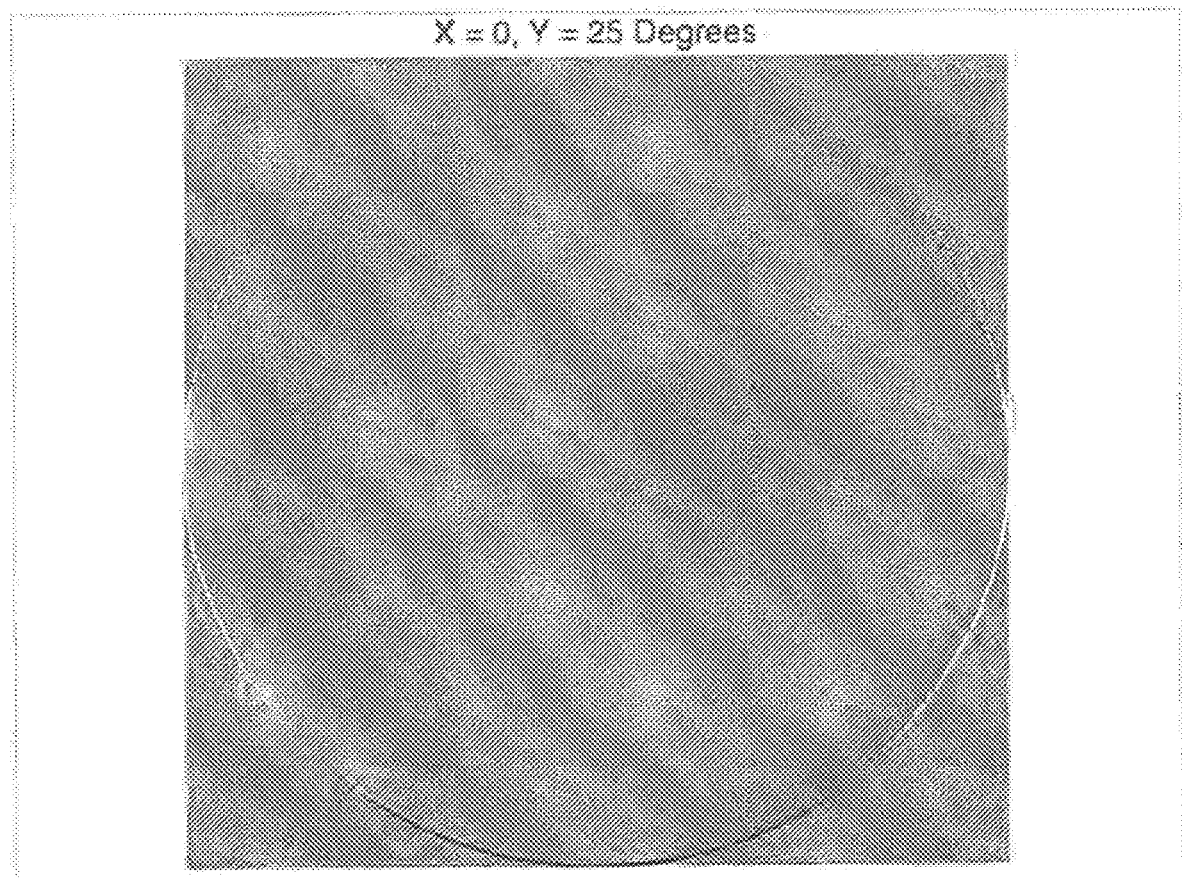
Figure 127:
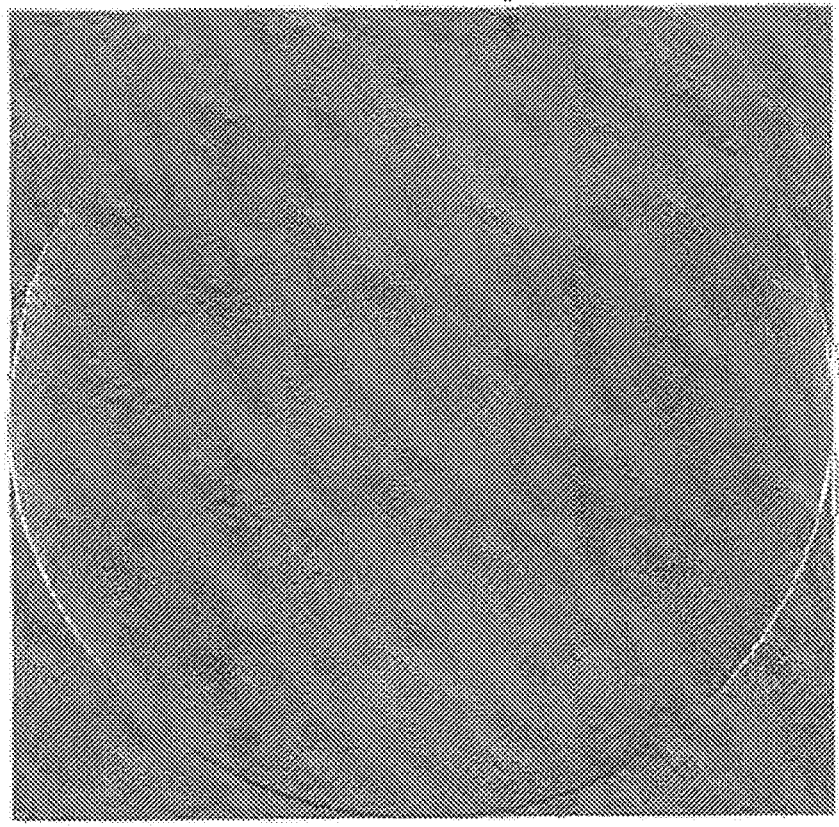

Another alternative embodiment is illustrated in FIG. 59. In this case, the number of etched electrode layers present in the wave front corrector may be reduced. For example, corrections of astigmatic aberrations, over many field angles typically require at least two electrode patterns, see above. Instead, a foveated imaging system, 5900, having a selectably rotating wave front corrector, 5902, allows for astigmatic aberrations to be corrected around all field angles with only one electrode pattern. In some embodiments, rotation of the wave front corrector is achieved through a system comprising: bearings, a magnet on a wave front corrector mount, and an electro magnet; the system being configured such that energizing the electro-magnet rotates the wave front corrector a known amount. Alternatively, rotation of the wave front corrector is achieved by a piezo actuator, a cog and motor, or a galvanometer. In some embodiments the foveated optical system, 5900, also includes two conventional non-adaptive optics, 5904 and 5906.

Yet another alternative embodiment comprises multiple electrode patterns on a single electrode layer. The more complicated single-layer electrode patterns have sufficient electrodes to produce wave front changes in multiple Zernike modes. These single-layer electrode patterns require more complex conductor routing, but reduce the total number of electrode layers required in the LC cell. In other embodiments, a floating layer is included that includes patterns that affect the wave front corrector's excitation of multiple wave front error sources, such as: focus, vertical astigmatism, and oblique astigmatism.

Certain control elements of the subject matter described herein can be implemented in digital electronic circuitry, or in computer software, firmware, or hardware, including the structural means disclosed in this specification and structural equivalents thereof, or in combinations of them. Such subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer having a graphical user interface through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Throughout this disclosure various functions for an athletic head mounted display have been specified in terms of human perceptibility rather than quantifiable units. It is the intention of the author that these specifications, given in these terms, to be as instructive as is possible to the reader wishing to practice that which is disclosed. The specifications as defined in terms of perceptibility are, at times in the disclosure, defined as best case or ideal, and should not be viewed as limiting. It should be noted that in some embodiments, within the scope of the present disclosure; the presence of engineering trade-offs and design constraints require the function of a system or subsystem to be outside the functional specifications as described above.

Although the present invention has been disclosed in considerable detail with reference to certain preferred versions thereof, other versions are possible. For example: discrete beam launching elements that are not cubic in shape. More than two projector's may be used to display images over a wide field of view having different image resolutions delivered to different regions of a user's field of view with different capabilities to resolve. A beam launching device may be implemented without a beam splitter, and instead be positioned to reflect imagery directly into a user's eye. Additionally, the following is a list of embodiments contemplated by the present disclosure:

A1. A system for selectively reflecting an image, the system comprising:
a substrate having a first surface through which light is input coupled; and
a switchable reflector located within the substrate and oriented between the first surface and a second surface of the substrate; the switchable reflector being configured to selectively reflect the light through a third surface of the substrate.

A2. The system of embodiment A1, wherein the light is visible light

A3. The system of embodiment A1, wherein the switchable reflector is switchable between reflective and non-reflective states at a rate at least as great as 30 Hz.

A4. The system of embodiment A3, wherein the switchable reflector is switchable between reflective and non-reflective states at a rate no greater than 120 Hz.

A5. The system of embodiment A1, wherein the light has a width at least as great as 1 mm.

A6. The system of embodiment A5, wherein the switchable reflector comprises a clear aperture greater than 1 mm.

A7. The system of embodiment A1, wherein the light is reflected incident a pupil of a user.

A8. The system of embodiment A7, wherein the light is reflected incident a retina of the user.

A9. The system of embodiment A8, wherein the light is reflected incident the retina of the user, such that the light is imaged within a central field of view of the user.

A10. The system of embodiment A1, wherein the light comprises augmentation imagery.

A11. A system for selectively reflecting an image, the system comprising:
a substrate that is optically transparent to light being input coupled into the substrate through a first surface,
a switchable reflector located within the substrate and oriented between the first surface and a second surface of the substrate; the switchable reflector being configured to selectively reflect the light through a third surface of the substrate; and
an adjustable focus optic, such that a wave front of the light may be selectively shaped.

A12. The system of embodiment A11, wherein the adjustable focus optic comprises a liquid crystal lens.

A13. A system for selectively reflecting an image, the system comprising:
a substrate that is optically transparent to light,
an adjustable gradient optic, such that the light may be selectively steered,
a first surface of the substrate through which the light may be input coupled; and
a switchable reflector located within the substrate and oriented between the first surface and a second surface of the substrate; the switchable reflector being configured to selectively reflect the light through a third surface of the substrate.

A14. The system of embodiment A13, wherein the adjustable gradient optic comprises a liquid crystal wedge.

A15. A system for selectively reflecting an image, the system comprising:
a substrate that is optically transparent to light,
an adjustable gradient optic, such that the light may be selectively steered,
a first surface of the substrate through which the light may be input coupled,
a switchable reflector located within the substrate and oriented between the first surface and a second surface of the substrate; the switchable reflector being configured to selectively reflect the light through a third surface of the substrate; and
an adjustable focus optic, such that a wave front of the light may be selectively shaped.

A16. A system for selectively reflecting a light from a plurality of switchable reflectors, the system comprising:
an array, comprising a plurality of switchable reflectors, and having a light directed incident and substantially along the array,
the array being configured to selectively reflect the light from one or more of the switchable reflectors.

A17. The system of embodiment A16, wherein the array is curved.

A18. The system of embodiment A16, wherein the light is visible light

A19. The system of embodiment A16, wherein the plurality of switchable reflectors are switchable between reflective and non-reflective states at a rate at least as great as 30 Hz.

A20. The system of embodiment A19, wherein the plurality of switchable reflectors are switchable between reflective and non-reflective states at a rate no greater than 120 Hz.

A21. The system of embodiment A16, wherein the light has a width at least as great as 1 mm.

A22. The system of embodiment A21, wherein the plurality of switchable reflectors comprises at least one clear aperture greater than 1 mm.

A23. The system of embodiment A16, wherein the light is reflected incident a pupil of a user.

A24. The system of embodiment A23, wherein the light is reflected incident a retina of the user.

A25. The system of embodiment A24, wherein the light is reflected incident the retina of the user, such that the light is imaged within a central field of view of the user.

A26. The system of embodiment A16, wherein the light comprises augmentation imagery.

A27. A system for selectively reflecting a light incident a user's pupil, the system comprising:
an eye tracking system that generates eye-tracking data related to a position of a user's pupil; and
an array, comprising a plurality of switchable reflectors, and having a light directed incident and substantially along the array, the array being configured to selectively reflect the light from one or more of the switchable reflectors, in response to the eye-tracking data.

A28. A system for selectively reflecting a light from a plurality of switchable reflectors, the system comprising:
an array, comprising a plurality of switchable reflectors, and having a light directed incident and substantially along the array,
the array being configured to selectively reflect the light from one or more of the switchable reflectors; and
a beam combiner oriented such that the light reflected from the array is directed incident the beam combiner.

A29. A system for selectively reflecting a light from a plurality of switchable reflectors, the system comprising:
an array, comprising a multitude of switchable reflectors, and having a light directed toward and substantially along the array,
The array being configured to selectively reflect the light from one or more of the switchable reflectors; and
an adjustable gradient optic incident the light, configured to selectively steer the light.

A30. A system for selectively projecting light from a multitude of locations, the system comprising:
an array, comprising a multitude of switchable reflectors, and having a light directed toward and substantially along the array,
The array being configured to selectively reflect the light from one or more of the switchable reflectors; and
an adjustable focus optic incident the light, configured to selectively shape a wave front of the light.

A31. An accommodating projection system comprising:
a field mapping comprising: a color mapping, and a depth mapping,
a light generator that projects light, in response to the color mapping; and
an adjustable focus optic that selectively shapes a wave front of the light in response to the depth mapping.

A32. The system of embodiment A31, wherein the adjustable focus optic comprises an annular spatial light modulator.

A33. The system of embodiment A31, wherein the adjustable focus optic comprises a liquid crystal lens.

A34. The system of embodiment A31, wherein the light comprises augmentation imagery.

A35. An accommodating projection system comprising:
a controller that generates a color mapping, and a depth mapping,
a light generator that projects light, in response to the color mapping; and
an adjustable focus optic that selectively shapes a wave front of the light in response to the depth mapping.

A36. An accommodating projection system comprising:
an eye tracking system that generates eye-tracking data, in response to a position of a user's pupil.
a controller that generates a color mapping, and a depth mapping in response to the eye-tracking data,
a light generator that projects light, in response to the color mapping; and
an adjustable focus optic that selectively shapes a wave front of the light, in response to the depth mapping.

A37. An accommodating projection system comprising:
an eye tracking system that generates eye-tracking data, having a gaze vector, in response to a position of a user's pupil.

a controller that generates a color mapping, and a depth mapping in response to the eye-tracking data; wherein the depth mapping comprises at least one depth value associated with a distance along the gaze vector,
a light generator that projects light, in response to the color mapping; and
an adjustable focus optic that selectively shapes a wave front of the light, in response to the at least one depth value.

A38. The system of embodiment A37, further comprising:
a calculated depth value associated with a distance along the gaze vector; and
at least one associated depth being proximal the calculated depth value.

A39. An accommodating projection system comprising:
a controller that sequentially generates color mappings, and depth mappings,
a light generator that projects light, in response to a color mapping; and
an adjustable focus optic that selectively shapes a wave front of the light, in response to a depth mapping.

A40. An accommodating projection system comprising:
an eye tracking system that generates eye-tracking data, in response to a position of a user's pupil.
a controller that sequentially generates color mappings, and depth mappings in response to the eye-tracking data,
a light generator that projects light, in response to a color mapping; and
an adjustable focus optic that selectively shapes a wave front of the light, in response to a depth mapping.

A41. An accommodating projection system comprising:
an eye tracking system that generates eye-tracking data having a gaze vector, in response to a position of a user's pupil.
a controller that sequentially generates color mappings, and depth mappings in response to the eye-tracking data; wherein a depth mapping comprises at least one depth value associated with a distance along the gaze vector,
a light generator that projects light, in response to a color mapping; and
an adjustable focus optic that selectively shapes a wave front of the light, in response to the at least one depth value.

A42. An accommodating projection system comprising:
a controller that sequentially generates color mappings at a projector update rate,
a light generator that projects light, at a refresh rate, in response to a color mapping; and
an adjustable focus optic that selectively shapes a wave front of the light, at an accommodation update rate, in response to a depth mapping.

A43. The system of embodiment A42, wherein the accommodation update rate is at least 30 Hz.

A44. The system of embodiment A42, wherein the accommodation update rate is at least as great as the refresh rate.

A45. The system of embodiment A42, wherein the projector update rate is no greater than 240 Hz.

A46. A system for generating eye-tracking data and determining a gaze vector of a user's eye, the system comprising:
a light source that generates a diffuse light, being at least partially directed toward a user's eye, a camera located proximate the user's eye, such that light reflected from the user's eye is measured by the camera and a pupil of the user's eye may be determined; and a centroiding system that algorithmically determines eye-tracking data, in response to the pupil and a known orientation of the camera with respect to the user's eye.

A47. A system for generating eye-tracking data and determining a gaze vector of a user's eye, the system comprising:

a light source that generates a diffuse light, being at least partially directed toward a user's eye, a camera located proximate the user's eye, such that light reflected from the user's eye is measured by the camera and a pupil of the user's eye may be determined; and a centroiding system that algorithmically determines eye-tracking data, in response to the pupil and a known orientation of the camera with respect to the user's eye; wherein the eye-tracking data comprises a gaze vector.

A48. A system for sensing, correcting and updating a location of augmentation imagery, in response to high frequency movements, the system comprising:

a light generator that projects light incident a user's pupil, a jitter sensor that generates jitter data; and an augmentation stabilization control system that adjusts a position of the light at the user's pupil, in response to the jitter data, at an augmentation stabilization rate.

A49. The system of embodiment A48, wherein the augmentation stabilization rate is at least 30 Hz.

A50. The system of embodiment A48, wherein the light at the user's pupil comprises augmentation imagery.

A51. The system of embodiment A48, wherein the jitter sensor comprises and inertial measurement unit.

A52. The system of embodiment A48, wherein the augmentation stabilization control system comprises an adjustable gradient optic.

A53. The system of embodiment A52, wherein the adjustable gradient optic comprises a liquid crystal wedge.

A54. The system of embodiment A48, further comprising a projection jitter sensor.

A55. The system of embodiment A48, further comprising a feedback measured in response to a position of the light.

A56. The system of embodiment A48, wherein the jitter data is related to movements of a user's eye.

A57. The system of embodiment A48, wherein the jitter data is related to movements of a user's head.

A58. The system of embodiment A48, wherein the jitter data is related to movements of the light.

A59. A system for sensing a location of augmentation imagery, in response to high frequency movements, the system comprising:

a controller that generates a field mapping at a projector update rate, a light generator that projects light associated with the field mapping at a refresh rate at least as great as the projector update rate; and a jitter sensor that generates jitter data at a jitter sensing rate at least as great as the projector update rate.

A60. A system for sensing a location of augmentation imagery in response to high frequency movements, the system comprising:

a controller that generates a field mapping at a projector update rate, a light generator that projects light associated with the field mapping at a refresh rate at least as great as the projector update rate, an eye tracking system that generates eye-tracking data in response to a position of a user's pupil at an eye-tracking rate at least as great as the projector update rate; and a jitter sensor that generates jitter data at a jitter sensing rate at least as great as the projector update rate.

A61. A system for sensing, correcting and updating the location of augmentation imagery, in response to high frequency movements, the system comprising:

a controller that generates a field mapping at a projector update rate, a light generator that projects light associated with the field mapping, a jitter sensor that generates jitter data, in response to movements; and an augmentation stabilization control system that adjusts the position of the light at the user's pupil, in response to the jitter data, and at an augmentation stabilization rate that is at least as great as the projector update rate.

A62. A system for sensing, correcting and updating the location of augmentation imagery, in response to high frequency movements, the system comprising:

a controller that generates a field mapping at a projector update rate, a light generator that projects light associated with the field mapping, an eye tracking system that generates eye-tracking data in response to a position of a user's pupil, a jitter sensor that generates jitter data, in response to movements; and an augmentation stabilization control system that adjusts the position of the light at the user's pupil, in response to the eye-tracking data and the jitter data.

A63. A system for sensing, correcting and updating the location of augmentation imagery, in response to high frequency movements, the system comprising:

a controller that generates a field mapping, at a projector update rate, a light generator that projects light associated with the field mapping, an eye tracking system that generates eye-tracking data in response to a position of a user's pupil, a jitter sensor that generates jitter data, in response to movements; and an augmentation stabilization control system that adjusts the position of the light at the user's pupil, in response to the eye-tracking data and the jitter data, and at an augmentation stabilization rate, which is at least as great as the projector update rate.

A64. A system for sensing, correcting and updating the location of augmentation imagery, in response to high frequency movements, the system comprising:

a controller that generates a field mapping, a light generator that projects light associated with the field mapping, at a refresh rate, an eye tracking system that generates eye-tracking data in response to a position of a user's pupil, a jitter sensor that generates jitter data, in response to movements; and an augmentation stabilization control system that adjusts the position of the light at the user's pupil, in response to the eye-tracking data and the jitter data, and at an augmentation stabilization rate, which is at least as great as the refresh rate.

A65. A system according to any one of embodiments A59-A64, in which the jitter data is related to movements of the user's head.

A66. A system according to any one of embodiments A59-A64, in which the jitter data is related to movements of the user's eye.

A67. A system according to any one of embodiments A59-A64, in which the jitter data is related to movements of the light.

A68. A system according to any one of embodiments A59-A64, in which the projector update rate is at least 30 Hz.

A69. A system according to any one of embodiments A59-A64, in which the refresh rate is at least 60 Hz.

A70. A system for generating render data, the system comprising:
render data,
an eye tracking system that generates eye-tracking data in response to a position of a user's pupil; and
a controller that generates a field mapping in response to the render data and the eye-tracking data.

A71. The system of embodiment A70, wherein: the eye tracking system is configured to generate eye-tracking data at an eye-tracking rate at least 11 Hz.

A72. The system of embodiment A71, wherein the eye-tracking rate is no greater than 240 Hz.

A73. A system for generating render data, the system comprising:
render data,
an eye tracking system that generates eye-tracking data in response to a position of a user's pupil; and
a controller that generates a color mapping in response to the render data and the eye-tracking data.

A74. A system for generating render data, the system comprising:
render data,
an eye tracking system that generates eye-tracking data in response to a position of a user's pupil; and
a controller that generates a color mapping in response to the render data and the eye-tracking data, wherein the color mapping comprises at least two resolutions.

A75. A system for generating render data and projecting light associated with the render data, the system comprising:
render data,
an eye tracking system that generates eye-tracking data in response to a position of a user's pupil and a pose of a user's head,
a controller that generates a color mapping in response to the render data and the eye-tracking data, wherein the color mapping comprises at least two resolutions; and
a light generator that projects light associated with the color mapping.

A76. A system for generating render data and projecting light associated with the render data, the system comprising:
render data,
an eye tracking system that generates eye-tracking data in response to a position of a user's pupil; and
a controller that generates a color mapping in response to the render data and the eye-tracking data, wherein the color mapping, comprising a first resolution and a second resolution,
a light generator that projects light associated with the color mapping, such that the light comprises: a first group of light rays, associated with the first resolution; and a second group of light rays, associated with the second resolution.

A77. A system for generating render data and projecting light associated with the render data, the system comprising:
render data,
an eye tracking system that generates eye-tracking data in response to a position of a user's pupil; and
a controller that generates a color mapping in response to the render data and the eye-tracking data, wherein the color mapping, comprising a first resolution and a second resolution,
a light generator that projects light associated with the color mapping, such that the light comprises: a first group of light rays associated with the first resolution, which are projected incident a central field of view of a user; and a second group of light rays associated with the second resolution, which are projected incident a peripheral field of view of a user.

A78. A system for selectively reflecting and focusing an image, the system comprising:
a light, comprising: a first group of light rays and a second group of light rays,
an optical element to modify the light, such that the second group of light rays undergo greater divergence than the first group of light rays; and
a switchable reflector located incident the light, which is configured to selectively reflect the light incident the optical element.

A79. A system for selectively reflecting an image, the system comprising:
a light, comprising: a first group of light rays and a second group of light rays,
a switchable partial reflector located incident the light, the switchable partial reflector configured to selectively partially reflect: a reflected portion of the light, and selectively partially transmit: a non-reflected portion of the light,
a switchable reflector being configured to selectively retro-reflect the first group of light rays from the non-reflected portion of the light; and
a reflector being configured to retro-reflect the second group of light rays from the reflected portion of the light, such that the first group of light rays and the second group of light rays are, at least partially, recombined at the switchable partial reflector.

A80. The system of embodiment A79, wherein the reflector further comprises a curvature, such that a vergence of the second group of light rays is modified.

A81. A system for selectively reflecting an image, the system comprising:
a light, comprising: a first group of light rays and a second group of light rays,
a switchable partial reflector located incident the light, the switchable partial reflector configured to selectively partially reflect: a reflected portion of the light, and selectively partially transmit: a non-reflected portion of the light,
a switchable reflector being configured to selectively retro-reflect the second group of light rays from the non-reflected portion of the light; and
a reflector being configured to retro-reflect the first group of light rays from the reflected portion of the light, such that the first group of light rays and the second group of light rays are, at least partially, recombined at the switchable partial reflector.

A82. A system for selectively reflecting an image, the system comprising:
a light, comprising: a first group of light rays and a second group of light rays,
a first switchable reflector and a second switchable reflector that are located incident the light; and
the first switchable reflector being selectively reflective to the first group of light rays and the second switchable reflector being selectively reflective to the second group of light rays.

A83. A system for selectively reflecting and focusing an image, the system comprising:
A system for selectively reflecting and focusing an image, the system comprising:
a light, comprising: a first group of light rays and a second group of light rays,
a first switchable reflector and a second switchable reflector that are located incident the light,
the first switchable reflector being selectively reflective to the first group of light rays and the second switchable reflector being selectively reflective to the second group of light rays,
a first optical element to modify a vergence of the first group of rays; and
a second optical element to modify a vergence of the second group of light rays.

A84. The system of embodiment A83, wherein: the second optical element further comprises a diffractive optical element.

A85. The system of embodiment A83, wherein: the first optical element further comprises an imaging lens.

A86. The system of embodiment A83, wherein: the first optical element further comprises an adjustable focus optic that selectively modifies a vergence the first group of light rays.

A87. The system of embodiment A83, wherein: the second optical element further comprises an adjustable focus optic that selectively modifies a vergence of the second group of light rays.

A88. A system according to any one of embodiments A76-A87, in which the first group of light rays subtend an angle no greater than 10 degrees.

A89. A system according to any one of embodiments A76-A87, in which the second group of light rays subtend an angle no less than 10 degrees.

A90. A method for selectively reflecting an image, the method comprising:
projecting light associated with an image; and
selectively steering the light, and selectively reflecting the light; such that, the light is imaged by a user's eye.

A91. The method of embodiment A90, wherein the light comprises visible spectrum light.

A92. The method of embodiment A90, wherein selectively reflecting the light may occur at a rate of at least 30 Hz.

A93. The method of embodiment A92, wherein the rate is no greater than 120 Hz.

A94. The method of embodiment A90, wherein the light has a width at least as great as 1 mm.

A95. The method of embodiment A90, wherein the light is imaged within a central field of view of the user.

A96. The method of embodiment A90, wherein the light comprises augmentation imagery.

A97. The method of embodiment A90, wherein selectively steering the light comprises: introducing a phase gradient by linearly varying a multitude of spatial light modulator elements.

A98. A method for selectively reflecting an image, the method comprising:
input coupling light into a substrate,
selectively steering the light with an adjustable gradient optic; and
selectively reflecting the light with a switchable reflector, such that light being reflected is output coupled from the substrate.

A99. A method for selectively reflecting an image, the method comprising:
input coupling light by way of a first surface of a substrate,
selectively steering the light with an adjustable gradient optic; and
selectively reflecting the light with a switchable reflector, such that light being reflected is output coupled by way of a second surface from the substrate.

A100. A method for selectively reflecting an image, the method comprising:
input coupling light into a first surface of a substrate,
selectively steering the light; and
selectively reflecting the light, such that light being reflected is output coupled by way of a second surface of the substrate, and light not being reflected is output coupled by way of a third surface from the substrate.

A101. A method for selectively reflecting an image, the method comprising:
input coupling light into a substrate,
selectively reflecting the light, such that light being reflected is output coupled from the substrate; and
selectively shaping a wave front of the light being reflected.

A102. A method for selectively reflecting an image, the method comprising:
input coupling light into a substrate,
selectively steering the light,
selectively reflecting the light with a switchable reflector, such that light being reflected is output coupled from the substrate; and
selectively shaping a wave front of the light being reflected.

A103. A method according to any one of embodiments A101 and A102, in which selectively shaping a wave front of the light comprises: radially varying a multitude of spatial light modulator elements.

A104. A method for selectively reflecting a light from a plurality of locations, the method comprising:
directing a light incident an array of switchable reflectors; and
selectively reflecting the light from one or more switchable reflectors.

A105. The method of embodiment A104, wherein the light comprises visible spectrum light.

A106. The method of embodiment A104, wherein selectively reflecting the light may occur at a rate of at least 30 Hz.

A107. The method of embodiment A106, wherein the rate is no greater than 120 Hz.

A108. The method of embodiment A104, wherein the light has a width at least as great as 1 mm.

A109. The method of embodiment A104, wherein the light is imaged by an eye of a user.

A110. The method of embodiment A109, wherein the light is imaged within a central field of view of the user.

A111. The method of embodiment A104, wherein the light comprises augmentation imagery.

A112. A method for selectively reflecting a light incident a user's pupil, the method comprising:
tracking the position of a user's pupil,
directing a light incident an array of switchable reflectors; and
selectively reflecting the light from one or more switchable reflectors, such that the light is imaged onto the user's pupil.

A113. A method for selectively reflecting a light from a plurality of locations, the method comprising:
directing a light incident an array of switchable reflectors,
selectively reflecting the light from one or more switchable reflectors; and
combining the light with an external light from one or more external light source.

A114. A method for selectively reflecting a light from a plurality of locations, the method comprising:
directing a light incident an array of switchable reflectors,
selectively steering the light; and
selectively reflecting the light from one or more switchable reflectors.

A115. The method of embodiment A114, wherein selectively steering the light comprises: introducing a phase gradient by linearly varying a multitude of spatial light modulator elements.

A116. A method for selectively reflecting a light from a plurality of locations, the method comprising:
directing a light incident an array of switchable reflectors,
selectively reflecting the light from one or more switchable reflectors; and
selectively shaping a wave front of the light being reflected from the one or more switchable reflectors.

A117. The method of embodiment A116, wherein selectively shaping a wave front of the light comprises: radially varying a multitude of spatial light modulator elements.

A118. A method according to any one of embodiments A104-A117, in which the array is curved.

A119. A method for selectively reflecting an image, the method comprising:
projecting light associated with an image; and
selectively steering the light, and selectively reflecting the light; such that, the light is imaged by a user's eye at a specified depth.

A120. A method for projecting accommodated imagery, the method comprising:
generating a color mapping, and a depth mapping,
projecting light, in response to the color mapping; and
selectively shaping a wave front of the light, in response to the depth mapping.

A121. The method of embodiment A120, wherein selectively shaping a wave front of the light comprises radially varying a multitude of spatial light modulator elements.

A122. The method of embodiment A120, wherein the light at an image plane comprises augmentation imagery.

A123. A method for projecting accommodated imagery, the method comprising:
tracking a position of a user's eye,
generating a color mapping and a depth mapping, in response to the position of the user's eye,
projecting light, in response to the color mapping; and
selectively shaping a wave front of the light, in response to the depth mapping.

A124. A method for projecting accommodated imagery, the method comprising:
tracking a position of a user's eye,
determine a gaze vector in response to the position of the user's eye,
generating a color mapping, in response to the position of the user's eye,
generating at least one depth value associated with a distance along the gaze vector,
projecting light, in response to the color mapping; and
selectively shaping a wave front of the light, in response to the at least one depth value.

A125. The method of embodiment A124, further comprising:
generating a calculated depth value associated with a distance along the gaze vector; and
generating at least one associated depth being proximal the calculated depth value.

A126. A method for projecting accommodated imagery, the method comprising:
sequentially generating a color mapping, and a depth mapping,
projecting light, in response to the color mapping; and
selectively shaping a wave front of the light, in response to the depth mapping.

A127. A method for projecting accommodated imagery, the method comprising:
tracking a position of a user's eye,
sequentially generating a color mapping and a depth mapping, in response to the position of the user's eye,
projecting light, in response to the color mapping; and
selectively shaping a wave front of the light, in response to the depth mapping.

A128. A method for projecting accommodated imagery, the method comprising:
tracking a position of a user's eye,
determine a gaze vector in response to the position of the user's eye,
sequentially generating a color mapping, in response to the position of the user's eye,
sequentially generating at least one depth value associated with a distance along the gaze vector,
projecting light, in response to the color mapping; and
selectively shaping a wave front of the light, in response to the at least one depth value.

A129. A method for projecting accommodated imagery, the method comprising:
sequentially generating a color mapping, at a projector update rate,
projecting light, at a refresh rate, in response to the color mapping,
sequentially generating a depth mapping; and
selectively shaping a wave front of the light, at an accommodation update rate, in response to the depth mapping.

A130. The method of embodiment A129, wherein the accommodation update rate is at least 30 Hz.

A131. The method of embodiment A129, wherein the accommodation update rate is at least as fast as the refresh rate.

A132. The method of embodiment A129, wherein the projector update rate is no greater than 240 Hz.

A133. A method for sensing, correcting and updating a location of augmentation imagery, in response to jitter, the method comprising:
projecting light incident a user's pupil,
sensing jitter; and
adjusting a position of the light at the user's pupil, in response to the jitter.

A134. The method of embodiment A133, wherein the light comprises augmentation imagery.

A135. The method of embodiment A133, wherein sensing the jitter comprises an inertial measurement unit.

A136. The method of embodiment A133, wherein adjusting the position of the light, further comprises: selectively steering the light.

A137. The method of embodiment A136, wherein selectively steering the light, further comprises: introducing a phase gradient by linearly varying a multitude of spatial light modulator elements.

A138. The method of embodiment A136, wherein selectively steering the light further comprises: varying a reflection angle of a reflector.

A139. The method of embodiment A133, wherein sensing the jitter, further comprises: measuring inertial changes of a device collocated with a user's head.

A140. The method of embodiment A133, wherein sensing the jitter, further comprises: measuring a position of the light.

A141. A method for sensing a location of augmentation imagery, in response to jitter, the method comprising:
generating a field mapping, at a projector update rate,
projecting light associated with the field mapping at a refresh rate at least as great as the projector update rate; and
sensing jitter at a jitter sensing rate, at least as great as the projector update rate.

A142. A method for sensing a location of augmentation imagery, in response to jitter, the method comprising:
generating a field mapping, at a projector update rate,
projecting light associated with the field mapping at a refresh rate at least as great as the projector update rate,
tracking a position of a user's pupil at an eye-tracking rate; and
sensing jitter at a jitter sensing rate, at least as great as the projector update rate.

A143. A method for sensing, correcting and updating a location of augmentation imagery, in response to jitter, the method comprising:
generating a field mapping, at a projector update rate,
projecting light associated with the field mapping,
sensing jitter; and
adjusting a position of the light at a user's pupil, in response to the jitter, at an augmentation stabilization rate that is at least as great as the projector update rate.

A144. A method for sensing, correcting and updating a location of augmentation imagery, in
response to jitter, the method comprising:
generating a field mapping, at a projector update rate,
projecting light associated with the field mapping,
tracking a position of a user's pupil,
sensing jitter; and
adjusting a position of the light at the user's pupil, in response to the position of the user's pupil and the jitter.

A145. A method for sensing, correcting and updating a location of augmentation imagery, in response to jitter, the method comprising:
generating a field mapping, at a projector update rate,
projecting light associated with the field mapping,
tracking a position of a user's pupil,
sensing jitter; and
adjusting a position of the light at the user's pupil, in response to the position of the user's pupil and the jitter, at an augmentation stabilization rate that is at least as great as the projector update rate.

A146. A method for sensing, correcting and updating a location of augmentation imagery, in response to changes of a position of a user's pupil and jitter, the method comprising:
generating a field mapping,
projecting light associated with the field mapping, at a refresh rate,
tracking a position of a user's pupil
sensing jitter; and
adjusting a position of the light at the user's pupil, in response to the position of the user's pupil and the jitter, at an augmentation stabilization rate that is at least as great as the refresh rate.

A147. A method for sensing, correcting and updating a location of augmentation imagery, in response to changes of a position of a user's pupil and jitter, the method comprising:
generating a field mapping, at a projector update rate,
projecting light associate with the field mapping,
sensing jitter; and
adjusting a position of the light incident a user's pupil, in response to the jitter, by:
  modifying the light to form a first pupil plane,
  selectively steering the light at the first pupil plane,
  modifying the light to form a second pupil plane,
  selectively steering the light at the second pupil plane; and
  modifying the light to form a third pupil plane, at the user's pupil.

A148. A method for sensing, correcting and updating a location of augmentation imagery, in response to jitter, the method comprising:
generating a field mapping, at a projector update rate,
projecting light associate with the field mapping,
sensing jitter; and
adjusting a position of the light incident a user's pupil, in response to the jitter, by:
  selectively steering the light in a first plane,
  selectively steering the light in a second plane; and
  modifying the light to form a third pupil plane, at the user's pupil.

A149. A method according to any one of embodiments 142 and 146, in which the refresh rate is at least 60 Hz.

A150. A method according to any one of embodiments 142-148, in which the projector update rate is at least 30 Hz.

A151. A method for generating augmentation imagery, the method comprising:
tracking a position of a user's pupil; and
generating a field mapping associated with augmentation imagery, in response to render data and the position of the user's pupil.

A152. A method for generating augmentation imagery, the method comprising:
tracking a position of a user's pupil; and
generating a color mapping associated with augmentation imagery, in response to render data and the position of the user's pupil.

A153. A method for generating augmentation imagery, the method comprising:
tracking a position of a user's pupil; and
generating a color mapping associated with augmentation imagery, in response to render data and the position of the user's pupil; wherein the color mapping comprises a plurality of resolutions.

A154. A method for generating augmentation imagery, the method comprising:

tracking a position of a user's pupil; and
generating a field mapping associated with augmentation imagery, in response to render data and the position of the user's pupil; wherein the field mapping comprises nonlinear mapping.

A155. A method for generating augmentation imagery, the method comprising:
tracking a position of a user's pupil,
generating a color mapping associated with augmentation imagery, in response to render data and the position of the user's pupil; wherein the color mapping comprises a plurality of resolutions; and
projecting light associated with the color mapping.

A156. A method for generating augmentation imagery, the method comprising:
tracking a position of a user's pupil,
generating a color mapping associated with augmentation imagery, in response to render data and the position of the user's pupil; wherein the color mapping comprises a plurality of resolutions; and
projecting light associated with the color mapping, wherein the light comprises: a first group of light rays associated with one or more resolutions of the color mapping; and a second group of light rays associated with one or more resolutions of the color mapping.

A157. A method for generating augmentation imagery, the method comprising:
tracking a position of a user's pupil,
generating a color mapping associated with augmentation imagery, in response to render data and the position of the user's pupil; wherein the color mapping comprises a plurality of resolutions; and
projecting first group of light rays associated with one or more resolutions of the color mapping incident a central field of view of a user; and
projecting second group of light rays associated with one or more resolutions of the color mapping incident a peripheral field of view of a user.

A158. A method according to any one of embodiments A156 and A157, in which the first group of light rays subtend an angle no greater than 10 degrees.

A159. A method according to any one of embodiments A159 and A157, in which the second group of light rays subtend an angle at least 10 degrees.

A160. A method for generating augmentation imagery, the method comprising:
tracking a position of a user's pupil,
generating a field mapping associated with augmentation imagery, in response to render data and the position of the user's pupil; wherein the field mapping comprises nonlinear mapping; and
projecting light associated with the color mapping.

A161. A method for selectively reflecting and focusing an image, the method comprising:
projecting a light, comprising a first group of light rays and a second group of light rays,
selectively reflecting the light; and
modifying the light, such that a divergence of the first group of light rays is less than a divergence of the second group of light rays.

A162. A method for selectively reflecting an image, the method comprising:
projecting a light, comprising a first group of light rays and a second light rays,
selectively reflecting the first light rays from a first switchable reflector; and
selectively reflecting the second group of light rays from a second switchable reflector.

A163. A method for selectively reflecting an image incident a central and peripheral field of view of a user, the method comprising:
projecting a light, comprising a first group of light rays and a second group of light rays,
selectively reflecting the first group of light rays from a first switchable reflector, such that the first group of light rays are imaged at a central field of view of a user; and
selectively reflecting the second group of light rays from a second switchable reflector, such that the second group of light rays are imaged a peripheral field of view of the user.

A164. The method of embodiment A163, further comprising: modifying a vergence of the second group of light rays.

A165. The method of embodiment A163, further comprising: modifying a vergence of the first group of light rays.

A166. The method of embodiment A163, further comprising: selectively shaping a wave front of the first group of light rays.

A167. A method for selectively reflecting and focusing an image, the method comprising:
projecting a light, comprising a first group of light rays and a second group of light rays,
selectively reflecting the first group of light rays from a first switchable reflector,
modifying a vergence of the first group of light rays,
selectively reflecting the second group of light rays from a second switchable reflector; and
modifying a vergence of the second group of light rays.

A168. A method for selectively reflecting and focusing of an image, the method comprising:
projecting a light, comprising a first group of light rays and a second group of light rays,
selectively reflecting the first group of light rays from a first switchable reflector,
selectively reflecting the second group of light rays from a second switchable reflector; and
modifying a vergence of the second group of light rays, such that the second group of light rays diverge more than the first group of light rays.

A169. A method for selectively reflecting and focusing of an image, the method comprising:
projecting a light, comprising a first group of light rays and a second group of light rays,
selectively reflecting the first group of light rays from a first switchable reflector,
selectively reflecting the second group of light rays from a second switchable reflector; and
selectively modifying a vergence of the first group of light rays.

A170. A method for selectively reflecting and focusing an image, the method comprising:
projecting a light, comprising a first group of light rays and a second group of light rays,
modifying the light, such that the second group of light rays diverge more than the first group of light rays; and
selectively reflecting the light.

A171. A method for selectively reflecting an image, the method comprising:
projecting a light, comprising a first group of light rays and a second group of light rays, selectively partially reflecting a reflected portion of the light,
selectively partially transmitting a non-reflected portion of the light,
selectively retro-reflecting the first group of light rays from the non-reflected portion of light,
retro-reflecting the second group of light rays from the reflected portion of the light; and
partially recombining the first group of light rays and the second group of light rays.

A172. A method for selectively reflecting an image, the method comprising:
projecting a light, comprising a first group of light rays and a second group of light rays,
selectively partially reflecting a reflected portion of the light,
selectively partially transmitting a non-reflected portion of the light,
selectively retro-reflecting the second group of light rays from the non-reflected portion of light,
retro-reflecting the first group of light rays from the reflected portion of the light; and
partially recombining the first group of light rays and the second group of light rays.

The following is another list of embodiments contemplated by the present disclosure:

B1. An optical system for introducing wave front changes, the system comprising:
a liquid crystal cell; and
an electrode layer affecting the liquid crystal cell, the electrode layer being divided into a plurality of electrodes separated by contour lines; wherein the contour lines are associated with a wave front mode of an orthonormal basis set, such that along an individual contour line the wave front mode has a value that is within 30% of a constant wave front value; the optical system being configured to produce a wave front change associated with said wave front mode, such that the wave front change is at least 60% that of an ideal wave front change.

B2. The system of embodiment B1, wherein the orthonormal basis set further comprises: a Zernike basis set.

B3. The system of embodiment B1, wherein the wave front change has a maximum optical path difference of at least 3 waves.

B4. The system of embodiment B1, wherein the wave front change is at least 80% that of an ideal wave front change.

B5. The system of embodiment B1, wherein the electrode layer further comprises one or more transparent resistors configured to bridge adjacent electrodes.

B6. The system of embodiment B1, further comprising a floating electrode layer between the electrode layer and the liquid crystal cell, the floating electrode layer comprising: a plurality of floating electrodes arranged such that: floating electrodes are located between contour lines of the electrode layer and the liquid crystal cell.

B7. The system of embodiment B1, wherein the wave front mode is Zernike mode Noll index number 5.

B8. The system of embodiment B1, further comprising:
a controller for controlling an electrical potential of one or more electrodes.

B9. An optical system comprising:
a liquid crystal cell; and
an electrode layer affecting the liquid crystal cell, the electrode layer being divided into a plurality of electrodes separated by equi-phase contour lines belonging to Zernike mode Noll index number 5; the optical system being configured to produce a wave front change that has a maximum optical path difference of at least 3 waves and is associated with the Zernike mode Noll index number 5, such that the wave front change is at least 60% that of an ideal oblique astigmatism wave front change.

B10. An optical system comprising:
a liquid crystal cell; and
an electrode layer affecting the liquid crystal cell, the electrode layer being divided into a plurality of electrodes separated by equi-phase contour lines belonging to Zernike mode Noll index number 6; the optical system being configured to produce a wave front change that has a maximum optical path difference of at least 3 waves and is associated with Zernike mode Noll index number 6, such that the wave front change is at least 60% that of an ideal vertical astigmatism wave front change.

B11. A foveated optical system, the foveated optical system comprising:
one or more optics for imaging a wide field of view,
a wave front correction optic, comprising a plurality of optical regions arranged in a pattern associated with a wave front mode of an orthonormal basis set: the plurality of optical regions being adapted to vary optical path differences in response to corresponding electrical signals; and
a controller for controlling the electrical signals, such that a wave front error is reduced over a selectable region of interest within the wide field of view.

B12. The system of embodiment B11, wherein the orthonormal basis set further comprises: a Zernike basis set.

B13. The system of embodiment B11, wherein the wave front error is reduced by 60%.

B14. The system of embodiment B11, wherein the wave front error is reduced by 80%.

B15. The system of embodiment B11, wherein the optical path differences have a maximum optical path difference equal to at least three waves.

B16. The system of embodiment B11, wherein the wide field of view is at least 50° in at least one axis.

B17. The system of embodiment B11, wherein the selectable region of interest is at least 2° in at least one axis.

B18. The system of embodiment B11, wherein the wave front mode is Zernike mode Noll index number 5.

B19. The system of embodiment B11, wherein the wave front mode is Zernike mode Noll index number 6.

B20. A foveated optical system, the foveated optical system comprising:
one or more optics for imaging a wide field of view that is at least 50° in at least one axis,
a wave front correction optic, comprising a plurality of optical regions, arranged in a pattern associated with a wave front mode of a Zernike basis set: the plurality of optical regions being adapted to vary optical path differences in response to corresponding electrical signals, wherein the optical path differences have a maximum optical path difference of at least three waves; and
a controller for controlling the electrical signals, such that a wave front error is reduced by 60% over a selectable region of interest that is at least 2° in at least one axis within the wide field of view.

B21. A method of reducing a wave front error within a selectable region of interest within a wide field of view, the method comprising:

imaging a wide field of view; and controlling a plurality of optical path differences over a plurality of regions arranged in a pattern associated with a wave front mode of an orthonormal basis set, such that the wave front error is reduced over a selectable region of interest within the wide field of view.

B22. The method of embodiment B21, wherein the orthonormal basis set further comprises: a Zernike basis set.

B23. The method of embodiment B21, wherein the wave front error is reduced by 60%.

B24. The method of embodiment B21, wherein the wave front error is reduced by 80%.

B25. The method of embodiment B21, wherein the optical path differences have a maximum optical path difference of at least three waves.

B26. The method of embodiment B21, wherein the wide field of view is at least 50° in at least one axis.

B27. The method of embodiment B21, wherein the selectable region of interest is at least 2° in at least one axis.

B28. The method of embodiment B21, wherein the wave front mode is Zernike mode Noll index number 5.

B29. The method of embodiment B21, wherein the wave front mode is Zernike mode Noll index number 6.

B28. A method of reducing a wave front error within a selectable region of interest within a wide field of view, the method comprising:

imaging a wide field of view that is at least 50° in at least one axis; and controlling a plurality of optical path differences having a maximum optical path difference of at least 3 waves, over a plurality of regions arranged in a pattern associated with a wave front mode of a Zernike basis set, such that the wave front error is reduced by 60% over a selectable region of interest that is at least 2° in at least one axis, within the wide field of view.

Therefore, the spirit and scope of the appended claims should not be limited to the description of the preferred versions contained herein.

What is claimed is:

1. A system for foveated display of augmentation imagery, the system comprising:
   an eye tracking system configured to:
     receive a position of a pupil of a user; and
     generate eye tracking data, at an eye tracking rate, in response to the position of the pupil of the user, wherein the eye tracking data comprises a gaze vector;
   a head tracking system configured to:
     estimate a change in orientation of the user's head at a head tracking rate; and
     generate jitter data at a jitter sensing rate, wherein the jitter data represents the change in orientation of the user's head;
   a light generator configured to generate, a color encoded light associated with the augmentation imagery, the light generator comprising a 2D pixelated display and an optical system;
   a controller in communication with the light generator, the head tracking system, and the eye tracking system, the controller configured to:
     receive render data, the eye tracking data, and the jitter data, wherein the render data comprises content and location information relating to the augmentation imagery;
     generate a field mapping, at a projector update rate no greater than the eye tracking rate, the head tracking rate, and the jitter sensing rate, in response to the render data, wherein the field mapping comprises a color mapping;
     generate a color mapping with a plurality of resolutions, as a function of the render data and the eye tracking data;
     estimate an image displacement with respect to the augmentation imagery as a function of the change in orientation of the user's head, at an augmentation stabilization rate that is equal to or greater than the projector update rate; and
     stabilize, in response to the jitter data, a position of the color encoded light within a field of view of the user, wherein the position of the color encoded light within the field of view of the user is stabilized at the augmentation stabilization rate; and
   wherein:
     the 2D pixelated display is configured to project the color encoded light incident to an optical system at a refresh rate equal to or greater than the projector update rate; and
     the optical system is configured to image the color encoded light into the field of view of the user.

2. The system of claim 1, wherein the field mapping further comprises a depth mapping comprising at least one depth value associated with a distance along the gaze vector and the controller is further configured to estimate the image displacement as a function of the at least one depth value and the change in the global coordinates of the user's head.

3. The system of claim 1, wherein the controller is further configured to generate the color mapping, in response to the eye tracking data.

4. The system of claim 3, wherein the color encoded light has a first group of light rays and a second group of light rays with a different resolution than the first group of light rays; and the light generator is further configured to:
   project, using the color mapping, the first group of light rays within a central vision of the user as a function of the eye tracking data and a first resolution of the plurality of resolutions of the color mapping; and
   project, using the color mapping, the second group of light rays outside a central vision of the user as a function of the eye tracking data and a second resolution of the plurality of resolutions of the color mapping.

5. The system of claim 4, wherein the color encoded light comprises a foveated image.

6. The system of claim 4, wherein the first group of light rays subtends an angle no greater than 10 degrees.

7. The system of claim 6, wherein the second group of light rays subtends an angle no less than 10 degrees.

8. The system of claim 1, wherein the eye tracking system comprises a video-based eye tracker, the video-based eye tracker comprising:
   a light source configured to generate a diffuse light;
   the optical system further configured to:
     direct the diffuse light at least partially toward the user's eye; and
     direct reflected diffuse light, reflected from the user's eye, at least partially toward a camera;
   the camera configured to:
     measure the diffuse light reflected from the user's eye; and
     generate an image of the pupil of the user; and
   a centroiding system configured to algorithmically determine the eye tracking data in response to the image of the pupil and an orientation of the camera with respect to the user's eye.

9. The system of claim 8, wherein the light source is an infrared light source and the camera is an infrared camera.

10. The system of claim 1, wherein the 2D pixelated display is configured to project linearly polarized light; and the optical system comprises a polarizer.

11. The system of claim 1, wherein the optical system is configured to image the color encoded light over a wide field of view of the user in excess of 84 degrees.

12. The system of claim 1, wherein the color mapping comprises a non-linear mapping.

13. The system of claim 1, wherein the 2D pixelated display comprises an OLED display.

14. A method for foveated display of augmentation imagery, the method comprising:
- receiving, using an eye tracking system, a position of a pupil of a user;
- generating, using the eye tracking system, eye tracking data, at an eye tracking rate, in response to the position of the pupil of the user, wherein the eye tracking data comprises a gaze vector;
- estimating, using a head tracking system, a change in orientation of the user's head at a head tracking rate;
- generating, using the head tracking system, jitter data at a jitter sensing rate, wherein the jitter data represents the change in orientation of the user's head;
- generating, using a light generator, a color encoded light associated with the augmentation imagery, wherein the light generator comprises a 2D pixelated display and an optical system;
- receiving, using a controller in communication with the light generator, the head tracking system and the eye tracking system, render data, the eye tracking data, and the jitter data, wherein the render data comprises content and location information relating to the augmentation imagery;
- generating, using the controller, a field mapping, at a projector update rate no greater than the eye tracking rate, the head tracking rate, and the jitter sensing rate, in response to the render data, wherein the field mapping comprises a color mapping;
- generating, using the controller, a color mapping with a plurality of resolutions, as a function of the render data and the eye tracking data;
- estimating, using the controller, an image displacement with respect to the augmentation imagery as a function of the change in orientation of the user's head, at an augmentation stabilization rate that is equal to or greater than the projector update rate;
- stabilizing, using the controller, in response to the jitter data, a position of the color encoded light within a field of view of the user, wherein the position of the color encoded light within the field of view of the user is stabilized at the augmentation stabilization rate;
- projecting, using the 2D pixelated display, the color encoded light incident to an optical system at a refresh rate equal to or greater than the projector update rate; and
- imaging, using the optical system, the color encoded light into the field of view of the user.

15. The method of claim 14, wherein the field mapping further comprises a depth mapping comprising at least one depth value associated with a distance along the gaze vector and the controller is further configured to estimate the image displacement as a function of the at least one depth value and the change in the global coordinates of the user's head.

16. The method of claim 14, further comprising generating, using the controller, the color mapping, in response to the eye tracking data.

17. The method of claim 16, wherein the color encoded light has a first group of light rays and a second group of light rays with a different resolution than the first group of light rays; and the method further comprises:
- project, using the light generator and the color mapping, the first group of light rays within a central vision of the user as a function of the eye tracking data and a first resolution of the plurality of resolutions of the color mapping; and
- project, using the light generator and the color mapping, the second group of light rays outside a central vision of the user as a function of the eye tracking data and a second resolution of the plurality of resolutions of the color mapping.

18. The method of claim 17, wherein the color encoded light comprises a foveated image.

19. The method of claim 17, wherein the first group of light rays subtends an angle no greater than 10 degrees.

20. The method of claim 14, wherein the 2D pixelated display comprises an OLED display.

* * * * *